United States Patent [19]
Kishi et al.

[11] Patent Number: 5,289,291
[45] Date of Patent: Feb. 22, 1994

[54] IMAGE READING APPARATUS

[75] Inventors: Masamichi Kishi; Munehiro Nakatani; Hiroya Sugawa, all of Osaka, Japan

[73] Assignee: Minolta Camera Kabushiki Kaisha, Osaka, Japan

[21] Appl. No.: 788,778

[22] Filed: Nov. 6, 1991

Related U.S. Application Data

[63] Continuation of Ser. No. 375,728, Jul. 5, 1989, Pat. No. 5,079,638.

[30] Foreign Application Priority Data

| Jul. 5, 1988 | [JP] | Japan | 63-167555 |
| Jul. 5, 1988 | [JP] | Japan | 63-167556 |
| Jul. 5, 1988 | [JP] | Japan | 63-167557 |
| Jul. 5, 1988 | [JP] | Japan | 63-167558 |
| Oct. 24, 1988 | [JP] | Japan | 63-267911 |
| Feb. 16, 1989 | [JP] | Japan | 1-37228 |

[51] Int. Cl.$^5$ .......................... H04N 1/40; H04N 1/387
[52] U.S. Cl. ..................... 358/443; 358/452; 358/453
[58] Field of Search .............. 358/443, 447, 448, 452, 358/453, 474, 75, 488, 80

[56] References Cited

U.S. PATENT DOCUMENTS

| 4,562,486 | 12/1985 | Suzuki et al. | 358/464 |
| 4,608,596 | 8/1986 | Williams et al. | 358/75 |
| 4,674,861 | 6/1987 | Kawamura | 358/75 |
| 4,750,044 | 6/1988 | Nakajima | 358/452 |
| 4,896,208 | 1/1990 | Moriya et al. | 358/452 |
| 4,929,979 | 5/1990 | Kimoto et al. | 355/38 |
| 4,992,864 | 2/1991 | Akiyama | 358/80 |
| 5,012,299 | 4/1991 | Sawamura et al. | 358/80 |

*Primary Examiner*—Edward L. Coles, Sr.
*Assistant Examiner*—Jerome Grant
*Attorney, Agent, or Firm*—Willian Brinks Olds Hofer Gilson & Lione

[57] ABSTRACT

An image reading apparatus having a high-contrast mode of operation for reading character images and a halftone mode of operation for reading halftone images, including an image sensor converting optical image information into electric signals, an optical system for projecting an image on a document onto the image sensor, a threshold signal generator capable of generating a plurality of first threshold signals and operative to output one of the first threshold signals, a threshold signal generator capable of generating a plurality of second threshold signals and operative to output one of the second threshold signals, a mode selector circuit for selecting the high-contrast or halftone mode of operation, a density selector circuit for selecting the first threshold signal during the high-contrast mode of operation and the second threshold signal during the halftone mode of operation, and a combination of circuit networks for outputting halftone image signals during the high-contrast mode of operation on the basis of the electric signals from the image sensor and the first threshold signal from the first threshold signal generator and outputting high-contrast image signals during the halftone mode of operation on the basis of the electric signals from the image sensor and the second threshold signal from the second threshold signal generator.

11 Claims, 66 Drawing Sheets

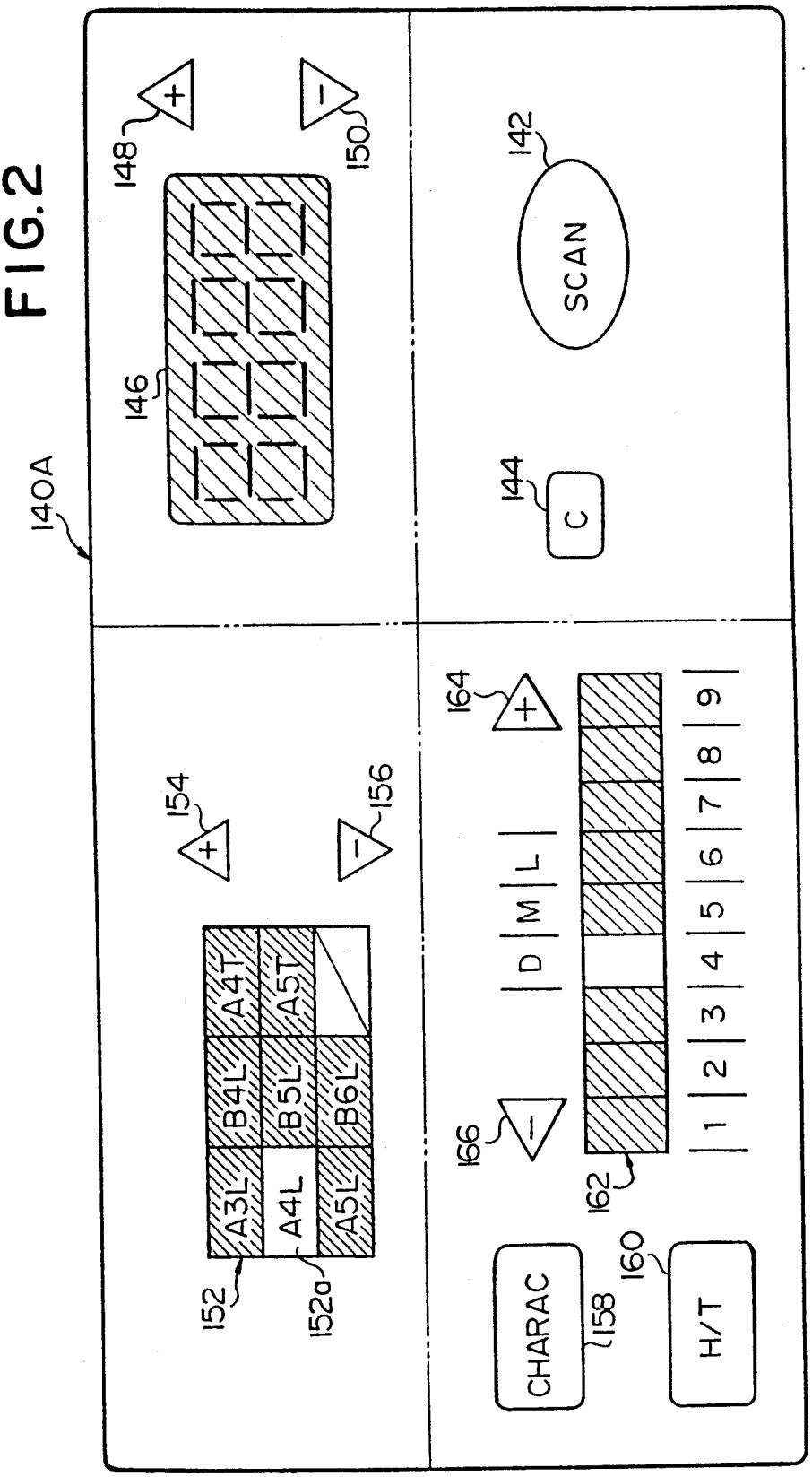

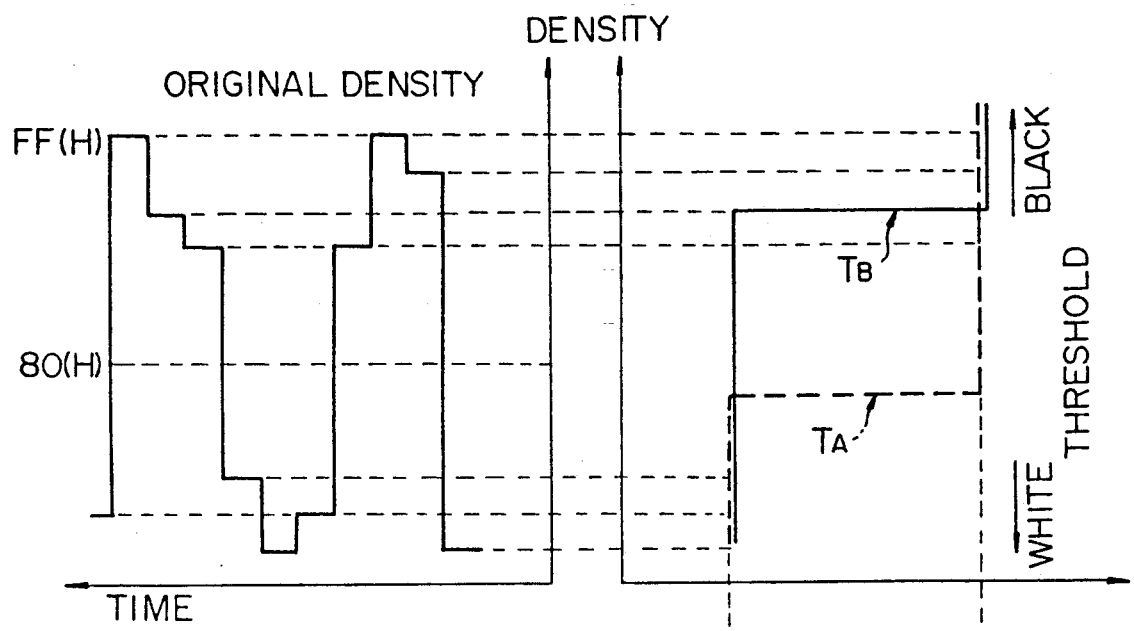
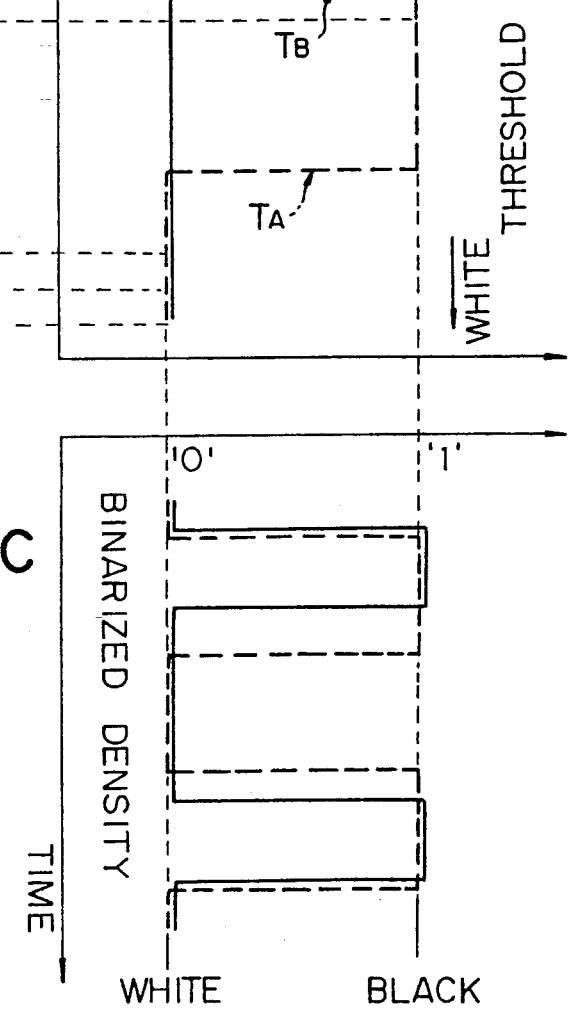
FIG.3A  FIG.3B
FIG.3C

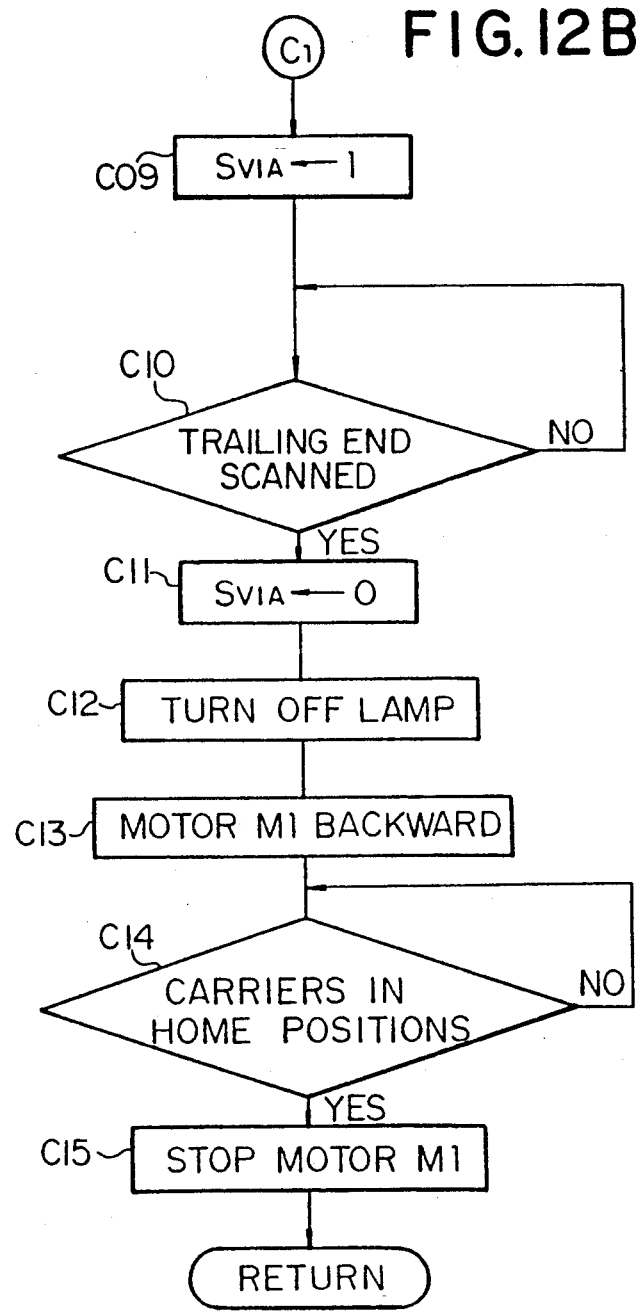

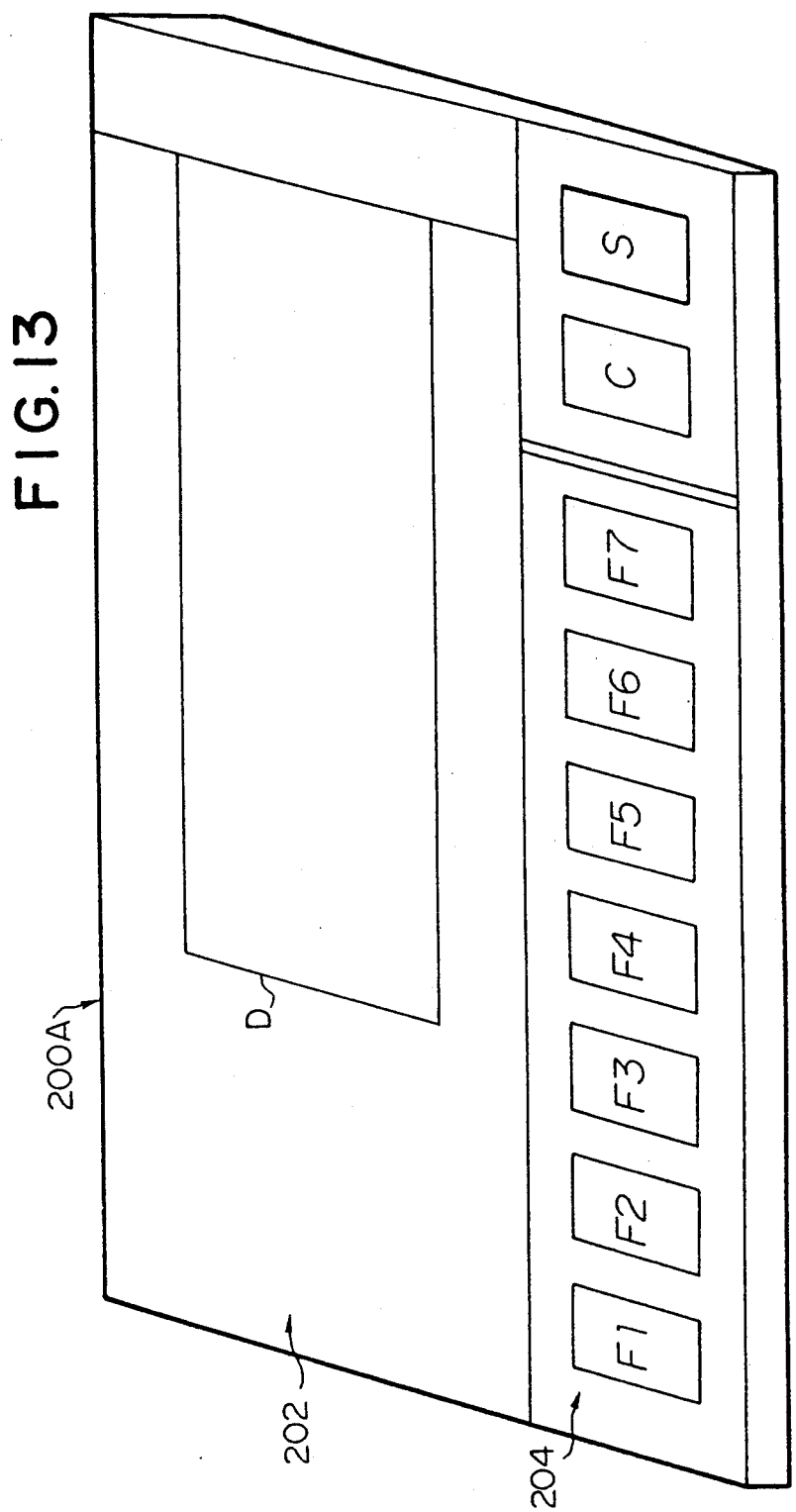

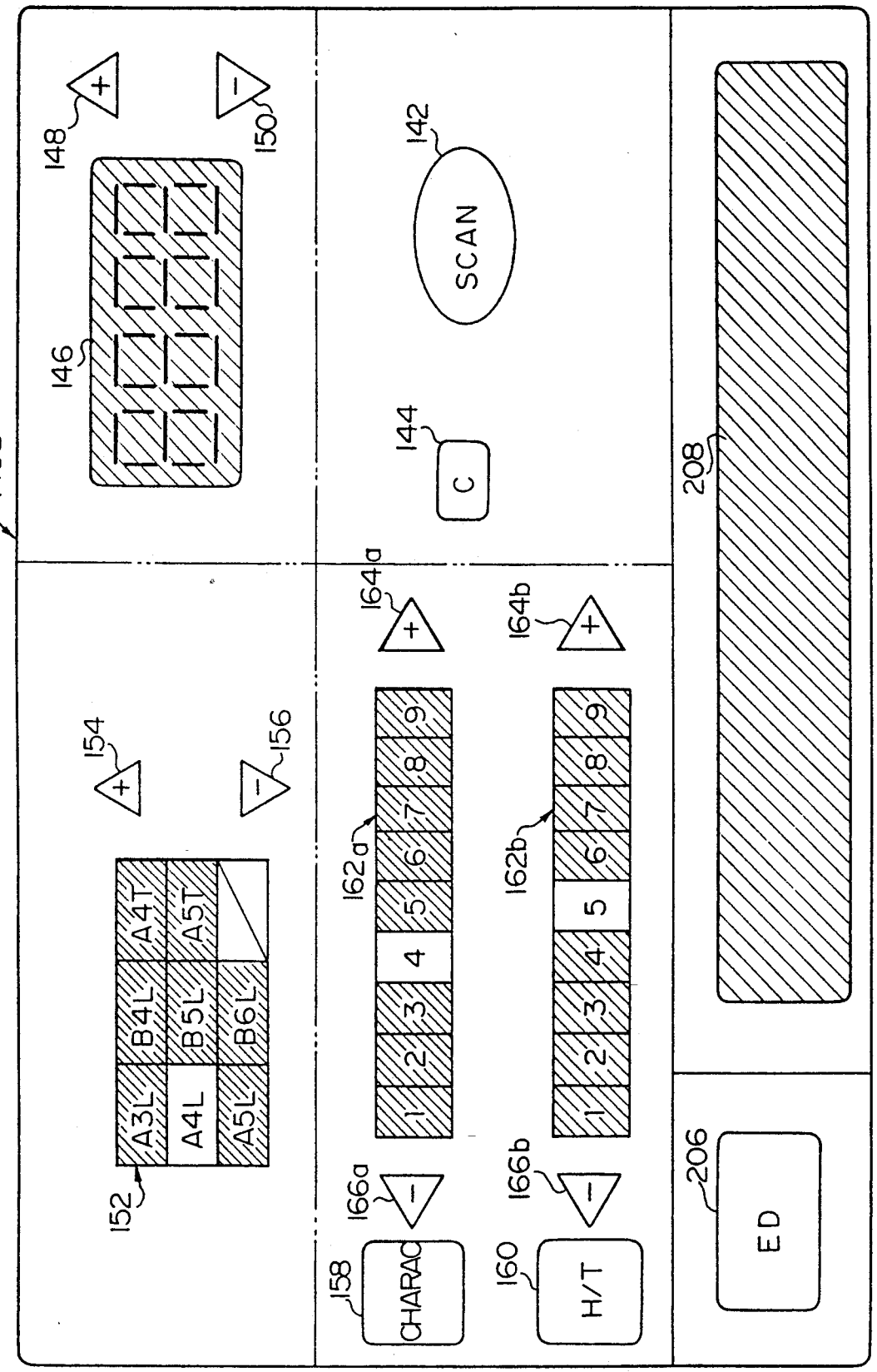

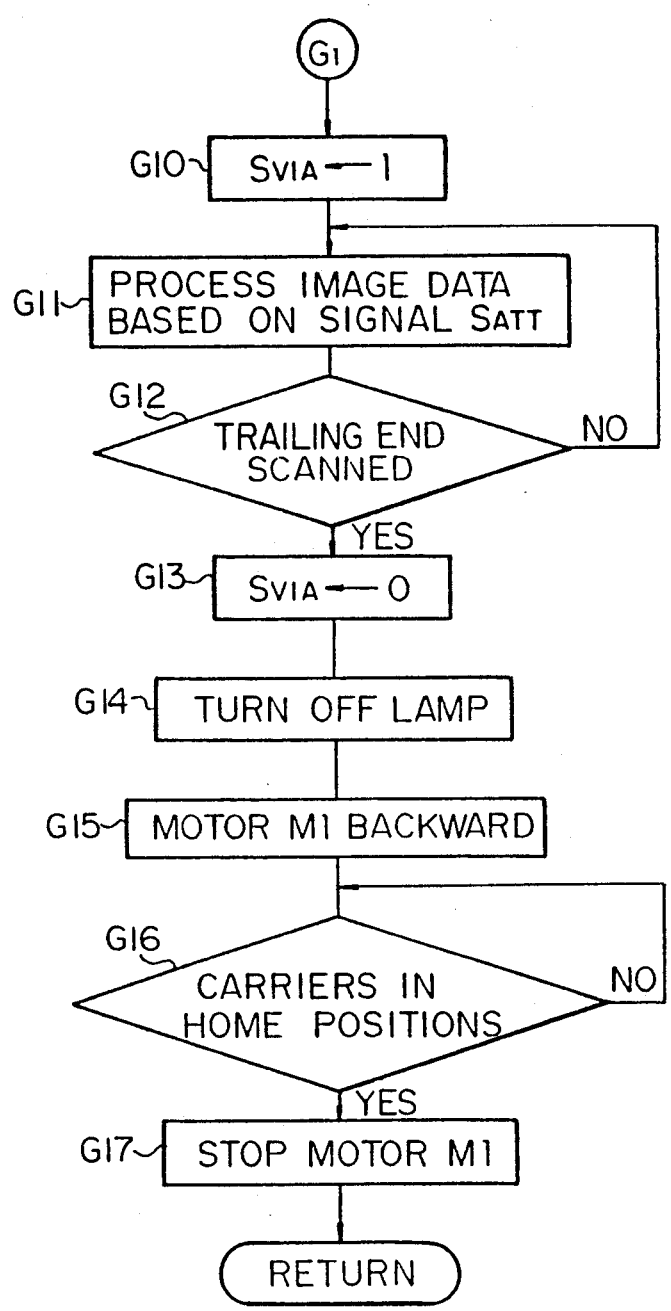

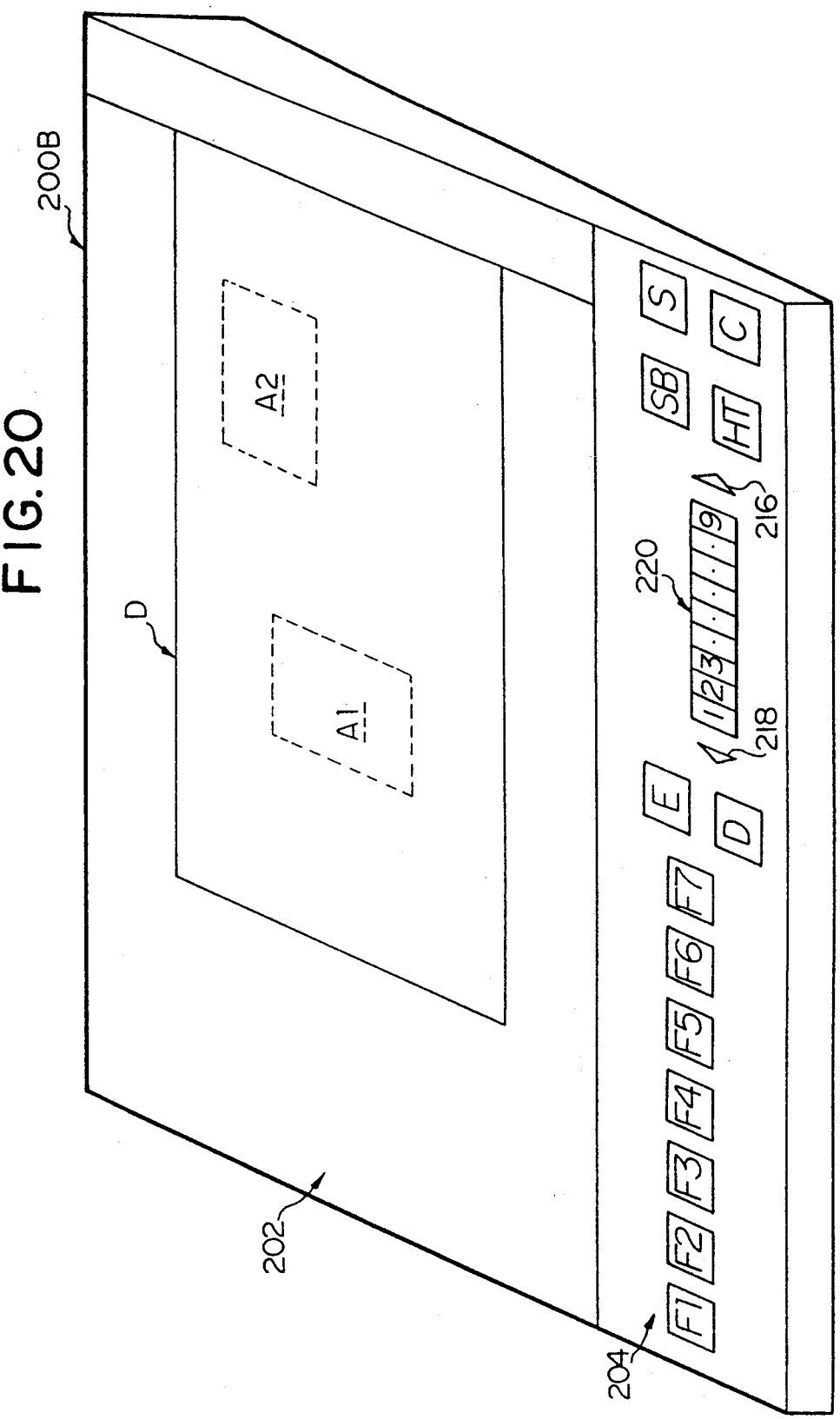

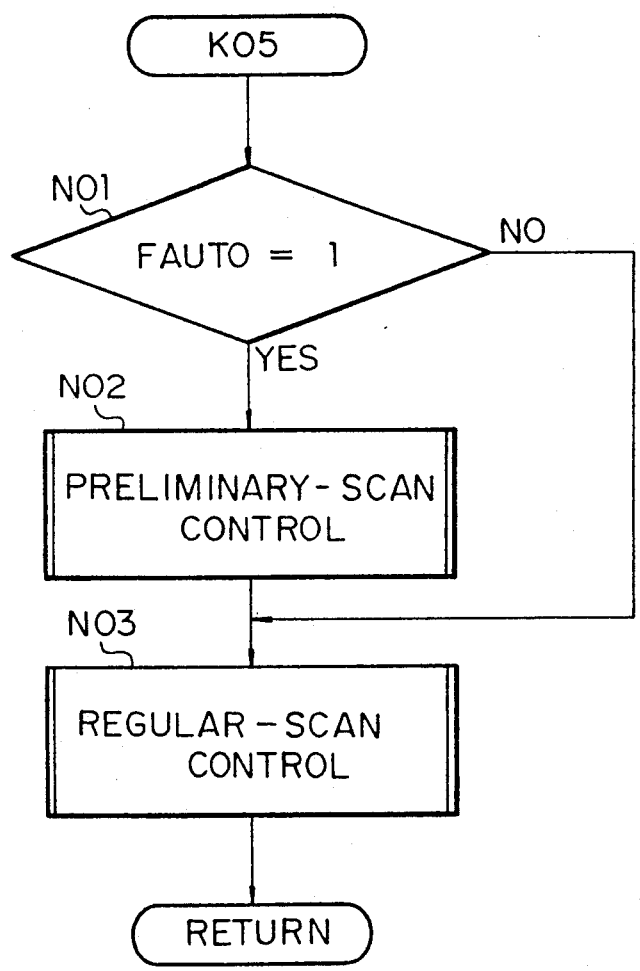

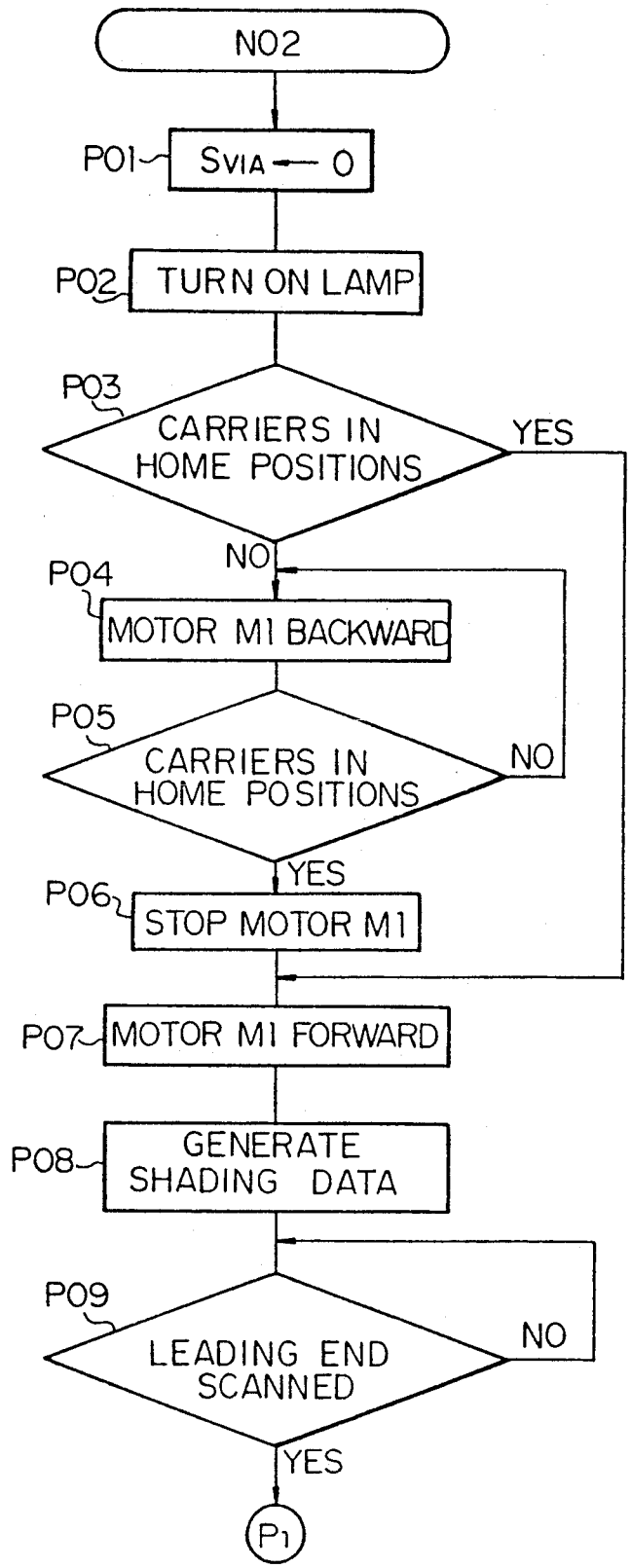

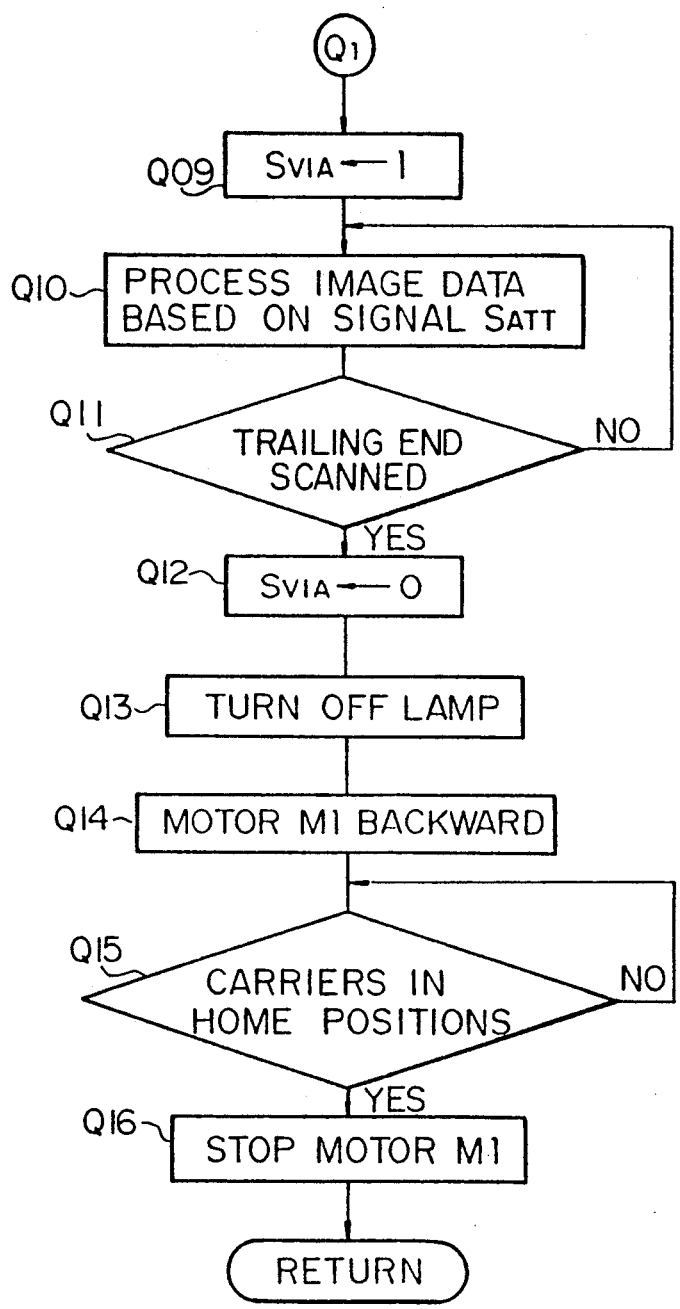

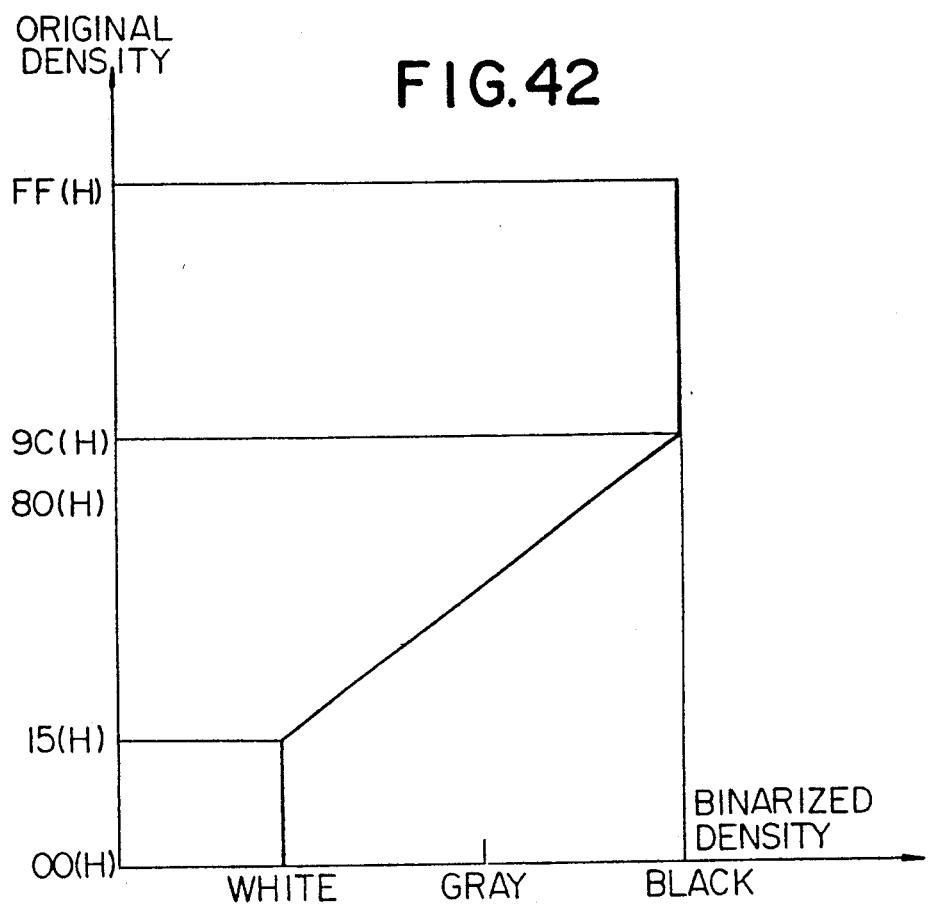

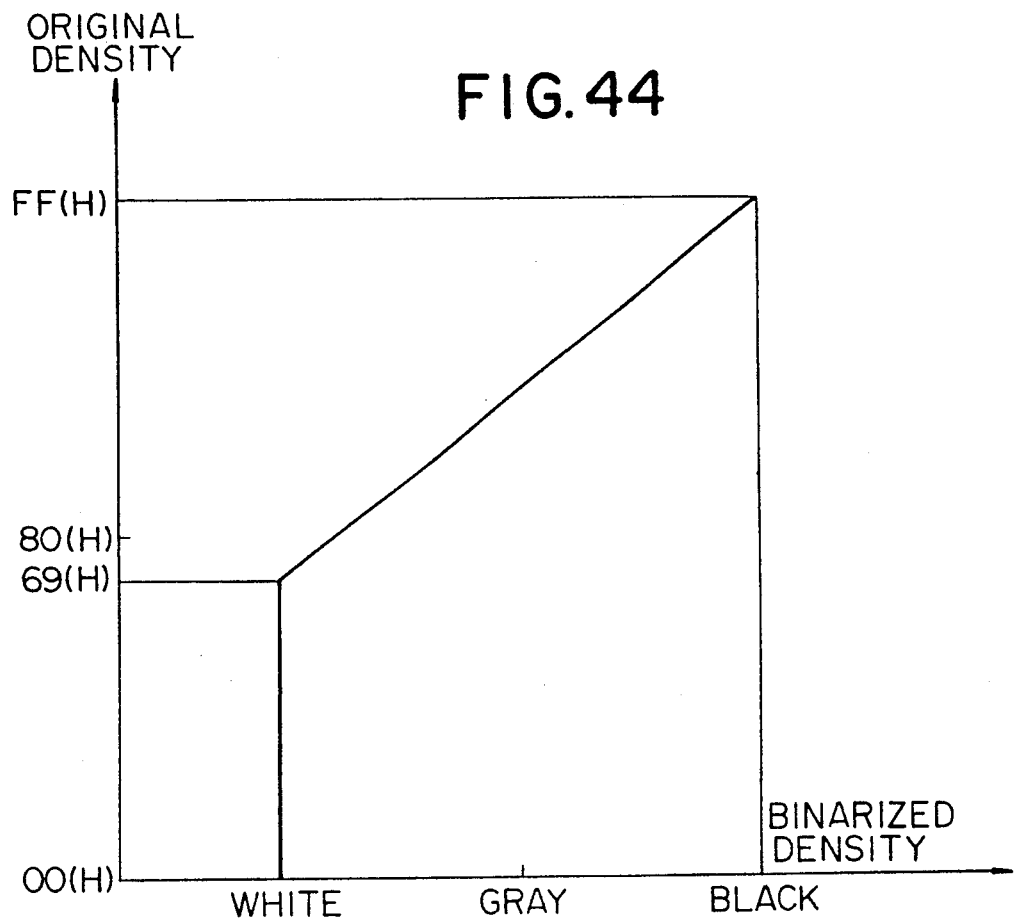

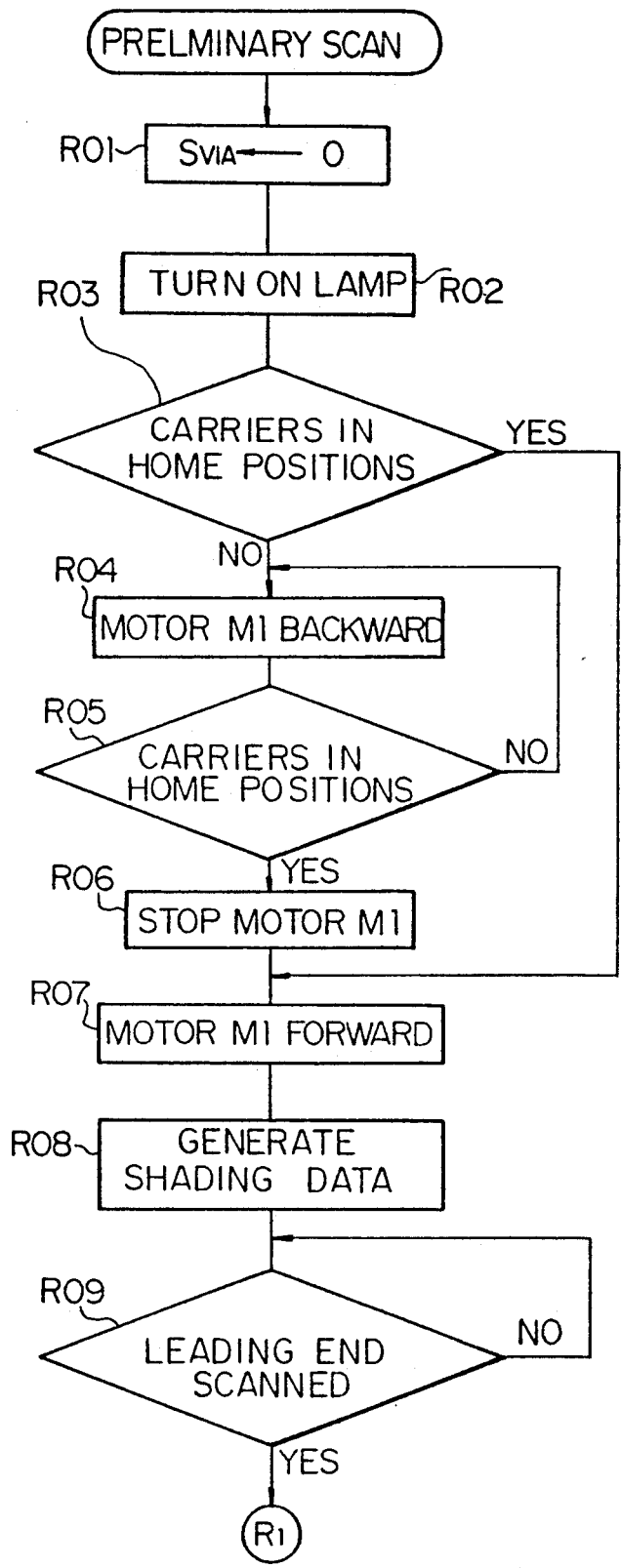

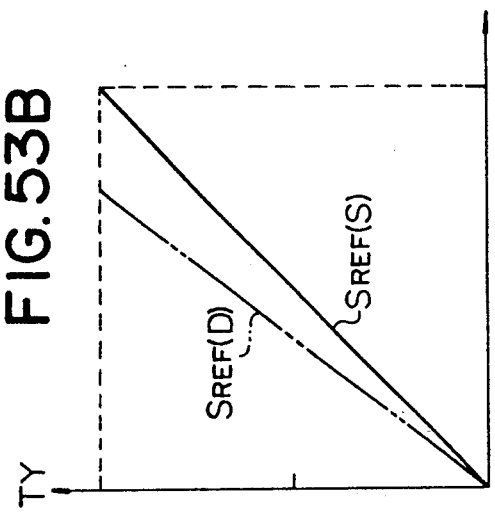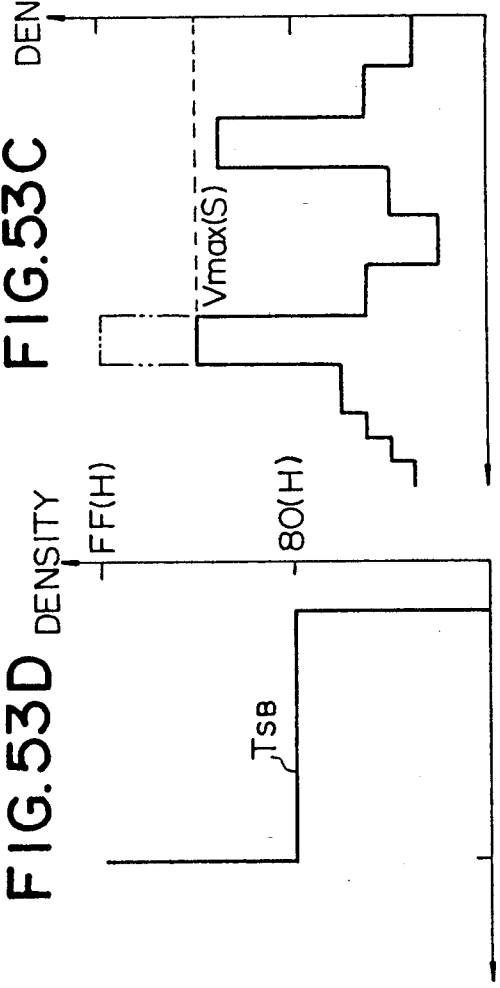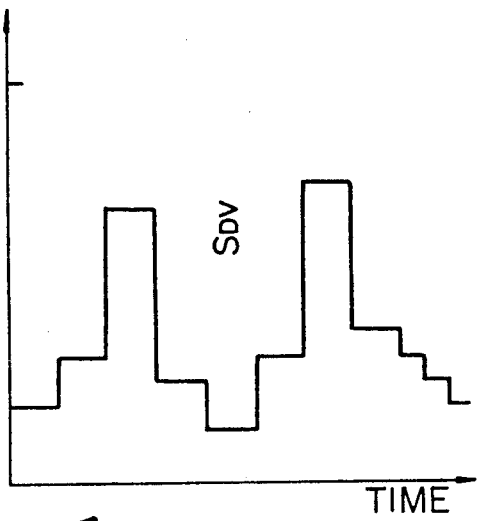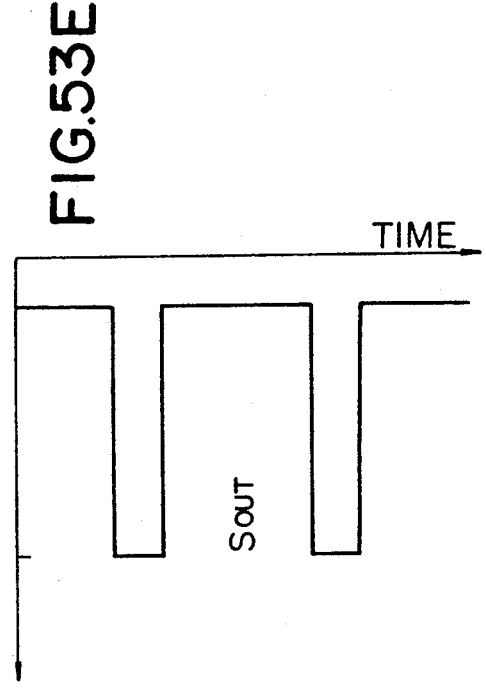

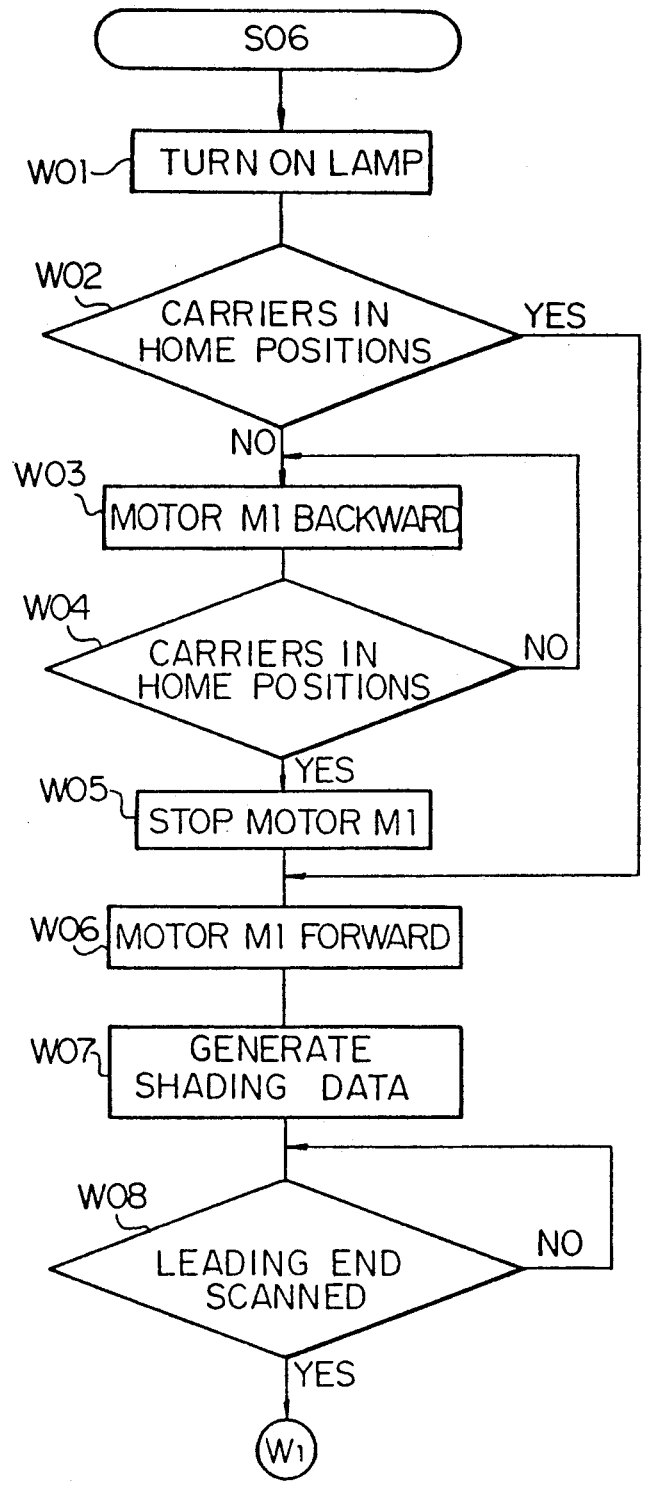

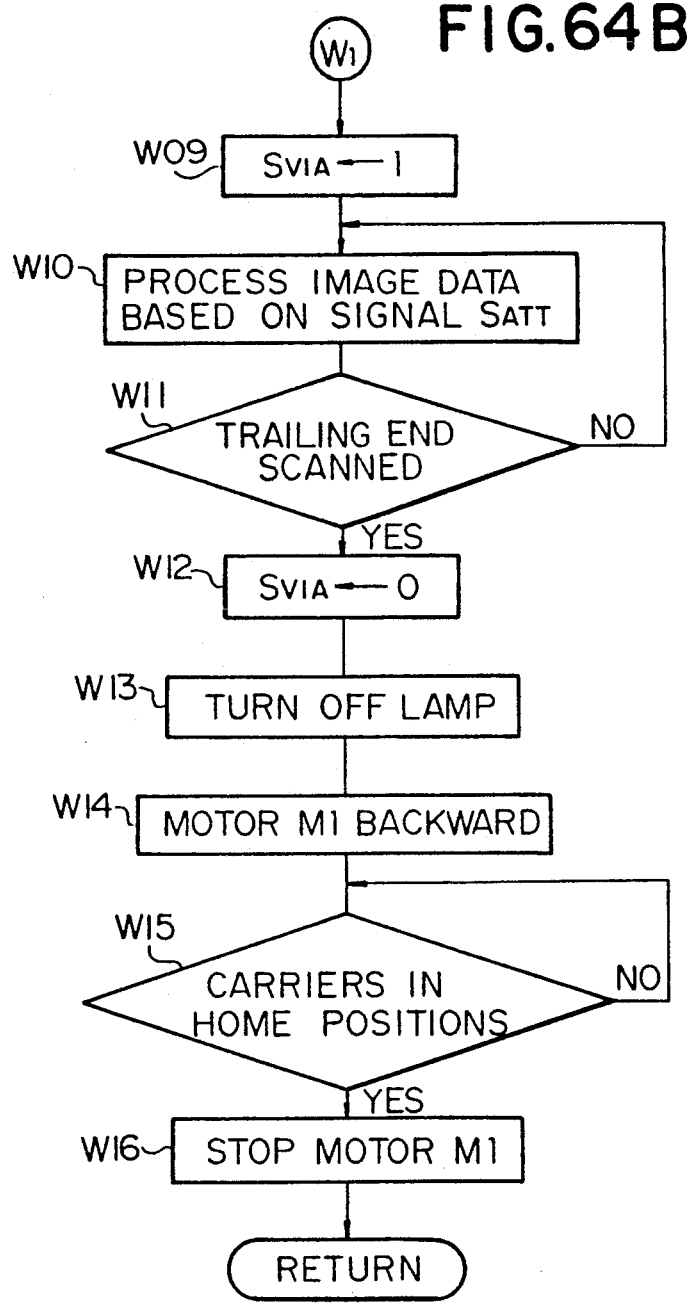

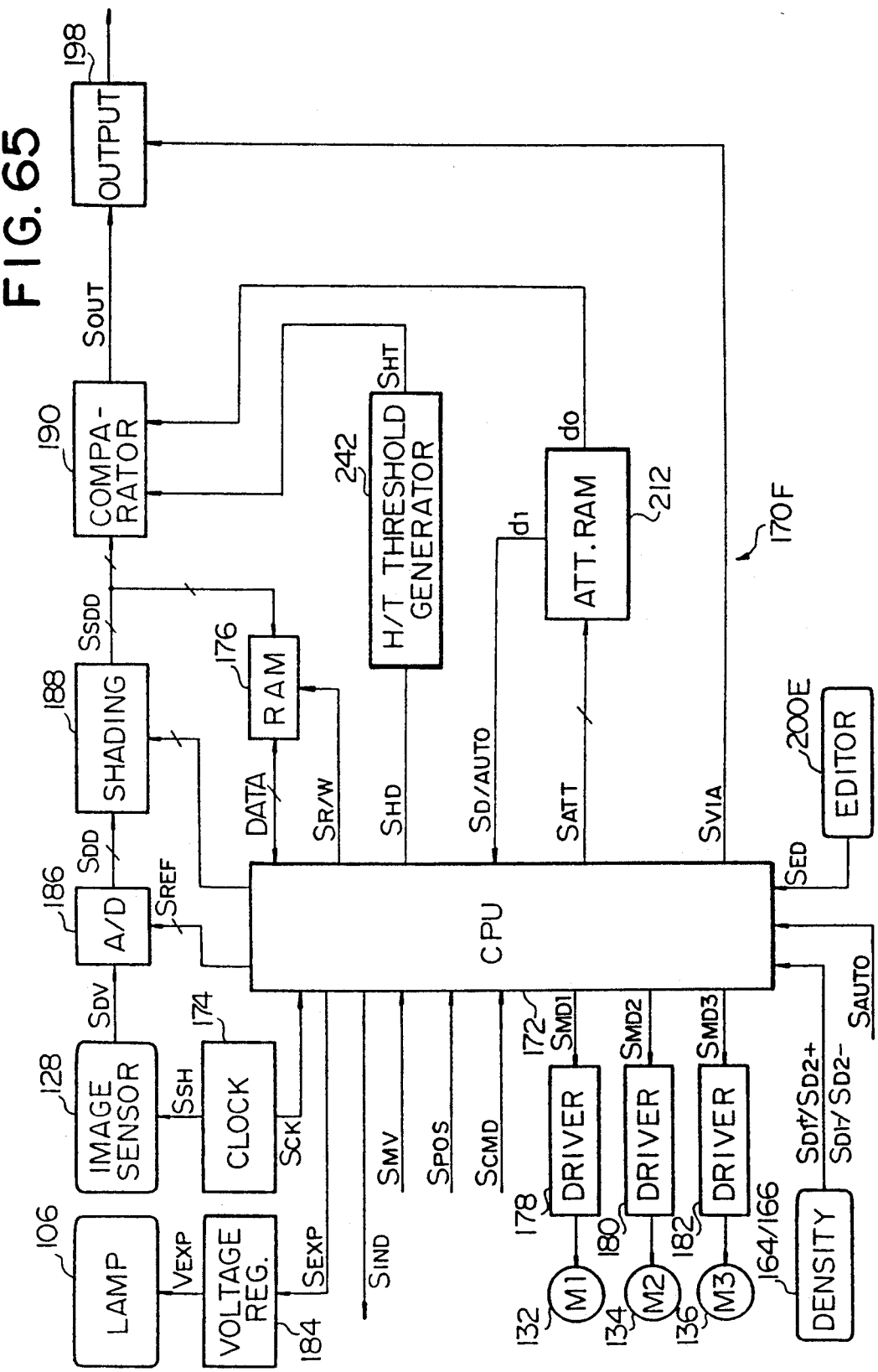

IMAGE READING APPARATUS

This application is a continuation of application Ser. No. 07/375,728, filed Jul. 5, 1989 now U.S. Pat. No. 5,079,638.

FIELD OF THE INVENTION

The present invention relates to an image reading apparatus and, more particularly, to an image reading apparatus of the type in which optical image information picked up from an image-carrying document is projected onto an array of photoelectric transducers for conversion into electric signals representative of the image on the document and processing the electric signals to generate binary signals representing the image to be reproduced.

BACKGROUND OF THE INVENTION

In a known image reading apparatus of the described type, optical image information picked up from an image-carrying document is projected onto an array of photoelectric transducers for producing analog electric signals representative of the image on the document. These analog electric signals representing the image on the original document are converted into digital signals by means of an analog-to-digital converter. The digital signals thus generated are supplied to a comparator circuit for comparison with a reference signal indicative of a predetermined image density for thereby producing binary signals representing the image to be reproduced.

As the reference signal used in producing the binary signals from the digital signals output from the analog-to-digital converter may utilize either a signal corresponding to a fixed image density or a signal stepwise variable within a predetermined range in accordance with a prescribed rule formulated by a "dither" pattern of the signal values dictating the stepwise variation of the reference signal. The former manner of producing the binary signals is known as the simple binarization mode and is frequently used for the reproduction of high-contrast images such as typically character images or images mostly composed of linear features. The latter manner of producing the binary signals is known as the halftone mode and is frequently used for the reproduction of halftone images such as typically photographic or pictorial images.

In the meantime, a known image reading apparatus of the described type has capabilities to adjust the density with which the images picked up from a document are to be reproduced. Such capabilities are useful for the reproduction of images clearly without respect to the density distribution of the original images on the document. The image reading apparatus having the density adjusting capabilities may have an automatic density control mode for automatically adjusting the density of the images to be reproduced, and a manual density control mode allowing the user of the apparatus to manually select the density of the images.

A conventional image reading apparatus having the automatic and manual density adjusting functions is however not fully acceptable for clearly reproducing images on a document having both character images and photographic or pictorial features or, in general, a document having irregular density distribution.

SUMMARY OF THE INVENTION

It is, accordingly, an important object of the present invention to provide an improved image reading apparatus which is capable of clearly reproducing images on a document.

It is another important object of the present invention to provide an improved image reading apparatus which will make it possible to reproduce images on a document clearly without respect to the density distribution of the original images on the document.

It is still another important object of the present invention to provide an improved image reading apparatus capable of clearly reproducing images on a document having irregular density distribution.

It is still another important object of the present invention to provide an improved image reading apparatus capable of clearly reproducing images on a document having both character images and photographic or pictorial features.

BRIEF DESCRIPTION OF THE DRAWINGS

The features and advantages of an image reading apparatus according to the present invention will be more clearly appreciated from the following description taken in conjunction with the accompanying drawings which show various preferred embodiments of an image reading apparatus according to the drawings. In the invention:

FIG. 2 is a plan view showing the key/indicator configuration of a control panel included in a first preferred embodiment of an image reading apparatus according to the present invention;

FIGS. 3A to 3C are diagrams showing the basic principles on which the original density levels of pixels forming a frame of image are to be binarized in reading the image in the simple binarization mode of image reading operation, wherein FIG. 3A shows the distribution of the original pixel densities indicated by digital data in hexadecimal notation, FIG. 3B shows examples of a fixed threshold value which may be used in binarizing the original pixel densities, and FIG. 3C shows the distribution of the binarized densities of the pixels having their original density levels indicated by the digital data illustrated in FIG. 3A;

FIGS. 6A to 6C are diagrams similar to FIGS. 3A to 3C but now show the basic principles on which the original density levels of pixels forming a frame of image are to be binarized with use of a group of conceptual threshold values in relation to a plurality of values representing the density distribution of the pixel matrix in reading the image in the halftone mode of image reading operation, wherein FIG. 6A shows the original density levels of the pixels indicated by digital data expressed in hexadecimal notation, FIG. 6B shows examples of the groups of conceptual threshold values which may be used in relation to values representing the density distribution of the pixel matrix in binarizing the original pixel densities, and FIG. 6C shows the distribution of the binarized densities of the pixels having their original density levels indicated by the digital data illustrated in FIG. 6A;

FIGS. 12A and 12B are flowcharts showing the details of an image read control subroutine program further included in the main routine program illustrated in FIG. 10;

FIG. 13 is a perspective view showing the key and tablet configuration of an editor module forming part of a second preferred embodiment of an image reading apparatus according to the present invention;

FIG. 14 is a plan view similar to FIG. 2 but now shows the key/indicator configuration of a control panel further included in the second preferred embodiment of an image reading apparatus according to the present invention;

FIGS. 19A and 19B are flowcharts showing the details of an image read control subroutine program further included in the main routine program illustrated in FIG. 16;

FIG. 20 is a perspective view showing the key and tablet configuration of an editor module forming part of a third preferred embodiment of an image reading apparatus according to the present invention;

FIG. 31 is a flowchart showing the details of an image read control subroutine program further included in the main routine program illustrated in FIG. 28;

FIGS. 32A and 32B are flowcharts showing the details of a preliminary scan control subroutine program included in the image read control routine program illustrated in FIG. 31;

FIGS. 33A and 33B are flowcharts showing the details of a regular scan control subroutine program also included in the image read control routine program illustrated in FIG. 31;

FIG. 42 is a diagram showing the input-output characteristics of a group of conceptual threshold values, viz., the relationship between the original image densities of a document scanned and the image densities binarized on the principles indicated in FIG. 38;

FIG. 43 is a diagram showing an example of the dither pattern which may be used to provide the input-output characteristics indicated in FIG. 42;

FIG. 44 is a diagram similar to FIG. 42 but shows the the relationship between the original image densities of a document scanned and the image densities binarized on the principles indicated in FIG. 40;

FIG. 45 is a diagram similar to FIG. 42 but shows an example of the dither pattern which may be used to provide the input-output characteristics indicated in FIG. 44;

FIGS. 52A and 52B are flowcharts showing the details of a preliminary scan control subroutine program to be executed by the central processing unit included in the control circuit illustrated in FIG. 46;

FIGS. 53A to 53E are diagrams showing the basic principles on which binarized image density data signals are to be produced from analog image density data signals with standard reference voltage signals applied to the analog-to-digital converter during simple binarization mode of image reading operation;

FIGS. 64A and 64B are flowcharts showing the details of a regular scan control subroutine program also included in the main routine program illustrated in FIG. 60;

FIG. 65 is a block diagram similar to FIG. 59 but now shows the general construction and arrangement of a control circuit for use in a seventh preferred embodiment of an image reading apparatus according to the present invention.

DESCRIPTION OF THE PREFERRED EMBODIMENTS

Figure 1:
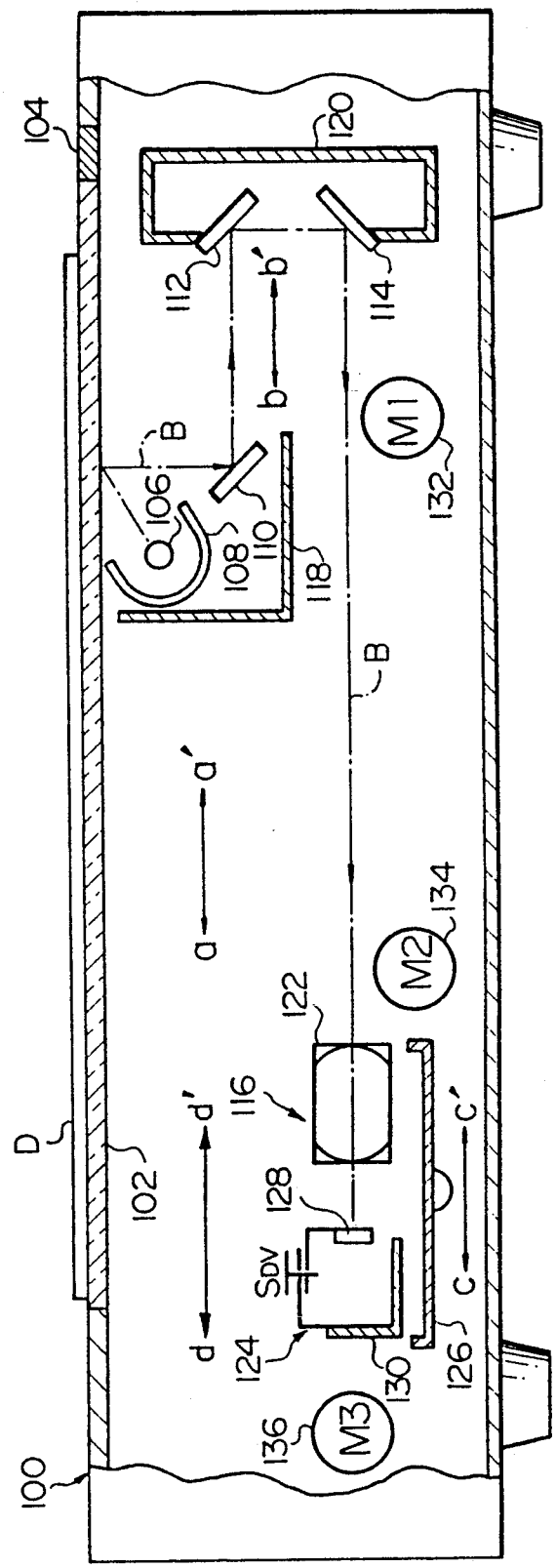
FIG. 1 is a side elevation view showing the general arrangement of an image reading apparatus forming each of the preferred embodiments of an image reading apparatus according to the present invention, particularly, an optical image scanning and image sensing systems forming part of the apparatus.

Various preferred embodiment of an image reading apparatus according to the present invention will be hereinafter described with reference to the drawings. These preferred embodiments of the present invention are assumed, for purposes of description, as being generally similar in hardware construction. FIG. 1 shows the general arrangement of an image reading apparatus forming each of such preferred embodiment of the present invention, particularly, an optical image scanning system which forms part of the apparatus. The image reading apparatus herein shown may be part of an image duplicating apparatus adapted to reproduce a printed duplicate of an original image-carrying medium which is herein referred to as document.

Referring to FIG. 1, the image reading apparatus embodying the present invention comprises a housing structure 100 having a horizontal upper panel which is in part formed by a transparent document support table 102 of, typically, glass. On this document support table 102 of glass is to be placed an image-carrying document D to be duplicated. The position of the document D thus placed on the document support table 102 is indicated by a document scale 104 arranged on the upper panel of the housing structure 100. The document scale 104 has a lower face having imprinted thereon graphic patterns including a focus adjusting pattern, a reduction/magnification ratio detecting pattern, and a shading data correcting pattern, though not shown in the drawings. The document D placed on the document support table 102 is held in position and is shielded from external light by means of a suitable lid member hingedly connected to the housing structure 100, though not shown in the drawings.

The optical image scanning system of the apparatus embodying the present invention comprises a source of light typically implemented by a halogen exposure lamp 106 located immediately underneath the document support table 102, and a concave reflector mirror 108 located in conjunction with the exposure lamp 106 so that the light emanating from the lamp is directed in major proportion toward the lower face of the document support table 102. The light thus directed toward the lower face of the document support table 102 is reflected from the lower image-carrying face of the document D placed on the table 102 and the resultant image-bearing beam of light B is directed and re-directed successively by means of first, second and third plane reflector mirrors 110, 112 and 114 to horizontally advance toward a lens/sensor assembly 116.

The exposure lamp 106, concave reflector mirror 108 and first plane reflector mirror 110 are supported in combination on a common lamp/mirror carrier 118 which is horizontally movable back and forth along the document support table 102 as indicated by arrowheads a and a'. In addition, the second and third plane reflectors 112 and 114 are jointly supported on a common mirror carrier 120 which is also horizontally movable back and forth along the document support table 102 as indicated by arrowheads b and b'. Though not shown in the drawings, suitable detecting means is provided in association with each of the lamp/mirror carrier 118 and mirror carrier 120 to detect if the associated carrier is in a predetermined home position with respect to the document support table 102.

The lens/sensor assembly 116 comprises a lens unit 122 and a sensor unit 124 mounted on a common lens/sensor carrier 126 which is movable back and forth in parallel with the path of light advancing from the third plane reflector mirror 114, as indicated by arrowheads c and c'. The image-bearing beam of light B reflected from the third plane reflector mirror 114 is thus passed through the lens unit 122 to the sensor unit 124. The sensor unit 124 comprises a photosensitive image sensor 128 which is mounted on a sensor holder 130 supported on the lens/sensor carrier 126. The photosensitive image sensor 128 is implemented by an array of photoelectric transducers such as typically semiconductor charge-coupled devices (CCD's) and is operative to generate a set of electric signals responsive to the image information contained in the image-bearing beam B incident on the array of the charge-coupled devices. The sensor holder 130 is movable back and forth on the lens/sensor carrier 126 in parallel with the path of light entering the lens/sensor assembly 120, as indicated by arrowheads d and d'.

Drive means are provided to drive each of the carriers 118, 120 and 126 for movement. These drive means include a reversible scanner drive motor 132 (M1) for driving each of the lamp/mirror carrier 118 and mirror carrier 120. This scanner drive motor 132 is operatively coupled to the lamp/mirror and mirror carriers 118 and 120 through suitable reduction gear or belt and pulley arrangement (not shown) so that the mirror carrier 120 carrying the mirrors 112 and 114 is to be driven for movement at a speed equal to one half of the speed at which the lamp/lens carrier 118 carrying the lamp 106 and mirrors 108 and 110 is driven for movement.

The drive means further include a reversible lens/sensor drive motor 134 (M2) for driving the lens/sensor carrier 126. This lens/sensor drive motor 134 is to be actuated into operation to adjust the image reduction/magnification ratio by movement of the lens unit 122 in the direction of arrowhead c or in the direction of arrowhead c'. The sensor holder 130 is driven for movement on the lens/sensor carrier 126 in the direction of the arrowhead d or in the direction of arrowhead and d' by means of a sensor drive motor 136 (M3). Immediately after the apparatus is switched in, the sensor drive motor 136 is actuated into operation so that the image picked up from the focus adjusting pattern imprinted on the lower face of the document scale 104 as has been noted is correctly focussed on the array of the charge-coupled devices forming the image sensor 128.

First Preferred Embodiment (FIGS. 2 to 12)

FIG. 2 shows the key/indicator configuration of a control panel 140A which forms part of a first preferred embodiment of an image reading apparatus according to the present invention. On the control panel 140A are provided a scan start key 142 (labelled "SCAN") to be used to enter an instruction to start a cycle of operation to scan a document D placed on the document support table 102, viz., read the image information on the document D placed on the table 102, a common clear key 144 (labelled "C") to be used to enter an instruction to clear or cancel a command which has once been entered to select any desired mode of operation, a four-digit eight-segment numerical display section 146 for indicating the reduction/magnification ratio detected from the reduction/magnification ratio detecting pattern on the lower face of the document scale 104, an image scale-up key 148 (labelled "+") to be used to enter an instruction to increase the valid reduction/magnification ratio for image reproduction, an image scale-down key 150 (labelled "−") to be used to enter an instruction to increase the valid reduction/magnification ratio for image reproduction, a sheet size indicator section 152 which consists of a plurality of subsections for indicating different standardized sizes, respectively, of print output sheets such as the subsection 152a for indicating the standard A4 size in longitudinal as shown highlighted, a first sheet size select key 154 (labelled "+") used to move highlight through the subsections of the indicator section 152 in one direction to select any of the print output sheet sizes indicated by the subsections, a second sheet size select key 156 (labelled "−") used to move highlight through the subsections of the indicator section 152 in the opposite direction to select any of the print output sheet sizes indicated by the subsections, a simple binarization or "character" mode select key 158 (labelled "CHARAC") to be used to enter an instruction to select a simple binarization mode of image reading operation, a halftone mode select key 160 (labelled "H/T") to be used to enter an instruction to select a halftone mode of image reading operation, a density indicator section 162 consisting of a series of subsections arranged in the order of lightness indicated by letters "D" (dark), "M" (medium) and "L" (light) for the simple binarization mode and by numerals "1" to "9" for the halftone mode, the selected density for image reading being shown highlighted such as the density "D" for the simple binarization mode and the density "4" for the halftone mode, a density "plus" key 164 (labelled "+") used to enter an instruction to increase the valid degree of lightness for image reading, and a density "minus" key 166 (labelled "−") used to enter an instruction to decrease the valid degree of lightness for image reading.

FIGS. 3A to 3C show the basic principles on which the original density levels of pixels forming a frame of image on an image-carrying document are to be binarized in reading the image in the simple binarization mode of image reading operation. The original density level of each pixel of the matrix is given by digital data expressed in hexadecimal notation and is digitally variable from 00 to FF(H) (=255 in decimal) as shown in FIG. 3A. The original pixel density of zero level indicates pure white and the original pixel density of the FF(H) level indicates pure black. For purposes of discussion, it is herein assumed that the original density levels of the individual pixels forming the matrix are binarized with use of a first threshold value $T_A$ indicated by broken lines in FIG. 3B or a second threshold value $T_B$ larger than the first threshold value $T_A$ as indicated by full lines in FIG. 3B.

FIG. 3C shows the distribution of the binarized densities of the pixels having their original density levels indicated by the digital data illustrated in FIG. 3A. As will be seen from FIG. 3C, the original pixel densities lower than the threshold value $T_A$ or $T_B$ are binarized as the density represented by logic "0" value, while the original pixel densities higher than the threshold value $T_A$ or $T_B$ are binarized as the density represented by logic "1" value.

It will be further seen from FIG. 3C that, where the relatively low threshold value $T_A$ is used for the simple binarization mode of image reading operation, the original densities of the pixels are likely to be binarized as the density of logic "1" value rather than as the density of logic "0" value. On the contrary, where the relatively high threshold value $T_B$ is used for the simple binarization mode of image reading operation, the original pixel densities are likely to be binarized as the density of logic "0" value rather than as the density of logic "1" value. These mean that a frame of image reproduced in the simple binarization mode of image reading operation using the lower threshold value $T_A$ will appear darker in its entirety than a frame of image reproduced in the simple binarization mode of image reading operation using the higher threshold value $T_B$.

The second threshold value $T_B$ is higher by a certain value than the first threshold value $T_A$ so that, where the first threshold value $T_A$ is once given, the second threshold value $T_B$ will be given automatically when a predetermined value is added to the first threshold value $T_A$. This means that the density of a frame of image reproduced in the simple binarization mode of image reading operation can be adjusted through addition of a desired value to (or through deduction of a desired value from) the preliminarily given "basic" threshold value which is herein represented by the first threshold value $T_A$.

Description will now be made in regard to the basic principles on which the original density levels of pixels forming a frame of image on an image-carrying document are to be binarized in reading the image in the halftone mode of image reading operation. As well known in the art, a threshold value used in the halftone is given in the form of a dither pattern or, in other words, a set of threshold values falling within a predetermined range, as represented by a first set of threshold values $T_{GA}$ indicated by a vertically hatched area in FIG. 4 or a second set of threshold values $T_{GB}$ indicated by a horizontally hatched area in FIG. 4. In the description to follow, it is assumed that a set of threshold values such as the set of threshold values $T_{GA}$ or $T_{GB}$ shown in FIG. 4 has a representative which may be given by the median, mean or mode of the threshold values. It is herein further assumed that a matrix of pixels having their original density levels represented by digital data has its density distribution represented by a plurality of representatives.

Figure 4:
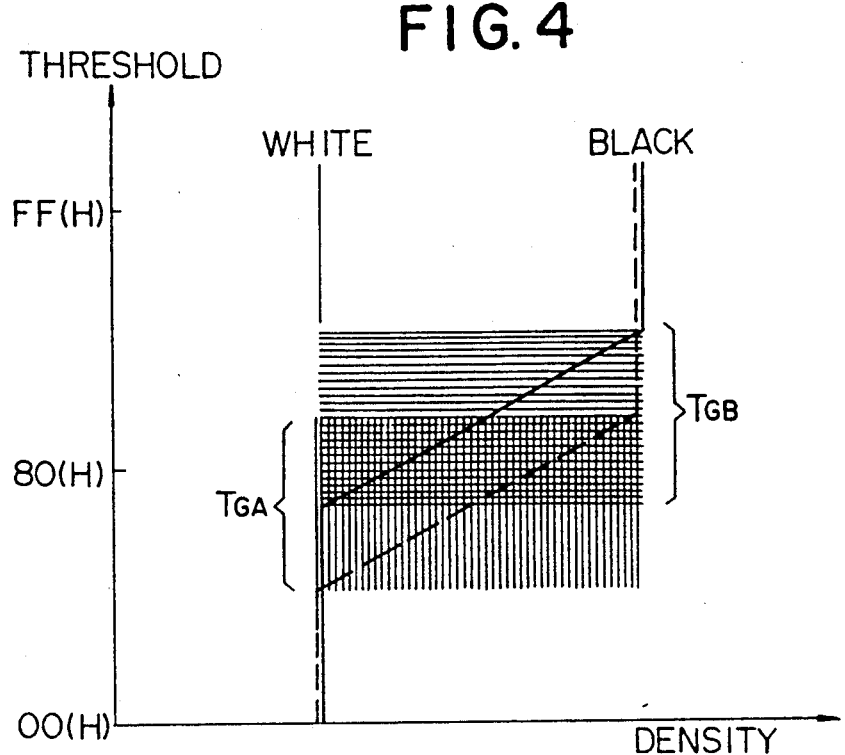
FIG. 4 is a diagram showing the basic principles on which the original density levels of pixels forming a frame of image are to be binarized in reading the image in the halftone mode of image reading operation using a set of threshold values.
Figure 5:
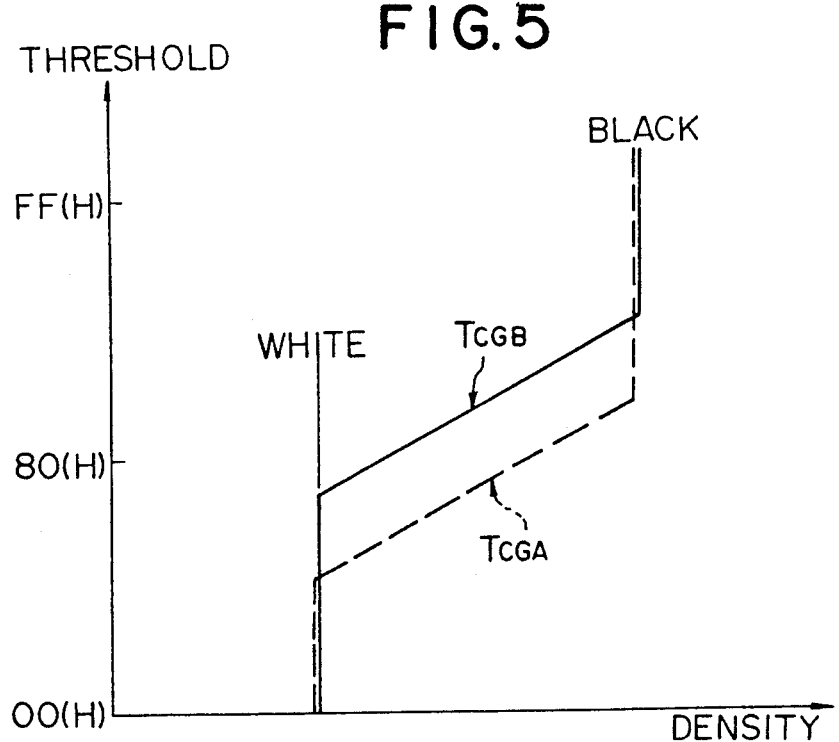
FIG. 5 is a diagram showing examples of a group of conceptual threshold values used in binarizing the original pixel densities in relation to predetermined representatives of the density distribution of the entire pixel matrix.

When a value representing the density distribution of the pixel matrix is larger than the representative of the set of threshold values such as the set of threshold values $T_{GA}$ shown in FIG. 4, the original densities of the pixels are likely to be binarized as densities indicating black rather than white and, thus, the frame of image reproduced in the halftone mode of image reading operation using the set of such threshold values will appear dark or "blackish" rather than light or "whitish". On the contrary, the original densities of pixels forming a frame of image are likely to be binarized as densities indicating white rather than black and the frame of image reproduced in the halftone mode of image reading operation using the set of such threshold values will appear light or "whitish" rather than dark or "blackish" when a value representing the density distribution of the pixel matrix is less than the representative of the set of threshold values.

For purposes of description, the degree of "whitishness" and the degree of "blackishness" of a frame of image or a matrix of pixels forming the frame of image are herein defined through introduction of a group of conceptual threshold values in relation to the representative of the density distribution of the pixel matrix. A group of conceptual threshold values is expressed by a predetermined linear or curvilinear plot varying between predetermined lower and upper limit threshold values which correspond to the densities indicating pure white and pure black, respectively, as indicated by plots $T_{CGA}$ and $T_{CGB}$ in FIG. 5.

Figure 6A:
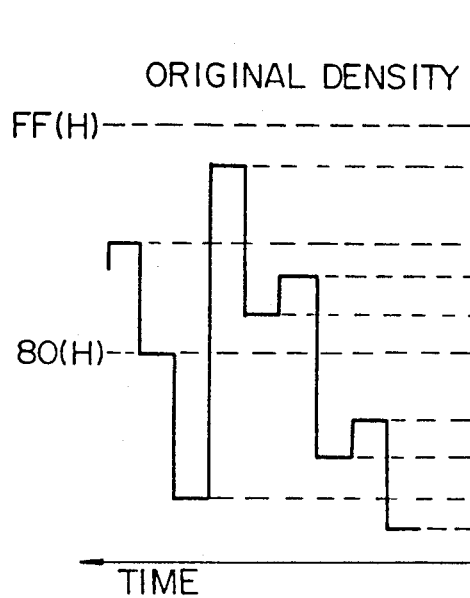
Figure 6B:
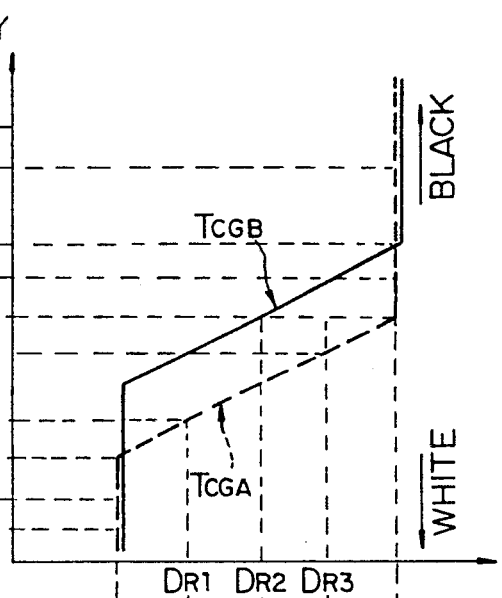
Figure 6C:
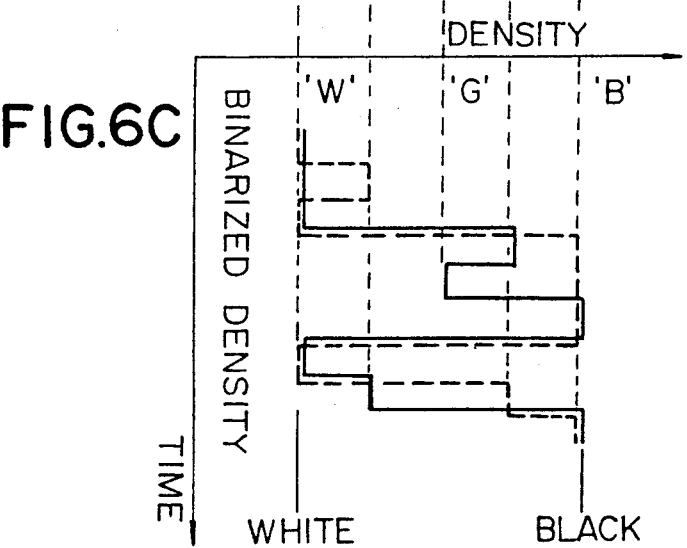

FIGS. 6A to 6C show the basic principles on which the original density levels of pixels forming a frame of image in the form of a pixel matrix are to be modified with use of a group of conceptual threshold values in relation to a plurality of values representing the density distribution of the pixel matrix in reading the image in the halftone mode of image reading operation. The original density level of each pixel of the matrix is also given by digital data expressed in hexadecimal notation and is digitally variable from 00 to FF(H) as shown in FIG. 6A. The original density levels of the individual pixels forming the matrix are modified with use of a first group of conceptual threshold values $T_{CGA}$ indicated by broken lines in FIG. 6B or a second group of conceptual threshold values $T_{CGB}$ indicated by full lines in FIG. 6B. The first group pf conceptual threshold values $T_{CGA}$ is defined to be higher in its entirety than the second group of conceptual threshold values $T_{CGB}$. Used as the values representing the density distribution of the pixel matrix include three different values $D_{R1}$, $D_{R2}$ and $D_{R3}$ which are larger in this sequence between the values representing pure white and pure black.

FIG. 6C shows the distribution of the modified densities of the pixels having their original density levels indicated by the digital data illustrated in FIG. 6A. As will be seen from FIG. 6C, the original pixel densities lower than the group of conceptual threshold values $T_{CGA}$ or $T_{CGB}$ are modified into any of five values. These modified density values consist of a value ("W") corresponding to the original pixel densities less than the first representative value $D_{R1}$, a value corresponding to the original pixel densities between the first and second representative values $D_{R1}$ and $D_{R2}$, a value ("G") corresponding to the original pixel densities between the second and third representative values $D_{R2}$ and $D_{R3}$, and a value ("B") corresponding to the original pixel densities larger than the third representative value $D_{R3}$.

It will be seen from FIG. 6C that, when the group of relatively low conceptual threshold values $T_{CGA}$ is used in relation to the predetermined representatives of the original pixel densities, the original pixel densities are likely to be modified into values effective to reproduce a frame of image which will in its entirety appear darker or more "blackish" than a frame of image reproduced with use of the group of relatively high conceptual threshold values $T_{CGB}$ in relation to the same representatives of the original pixel densities. This means that the density of a frame of image reproduced in the halftone mode of image reading operation can also be adjusted through addition of a desired value to (or through deduction of a desired value from) the preliminarily given "basic" set of threshold values which is herein represented by the first set of threshold values $T_{GA}$.

Figure 7:
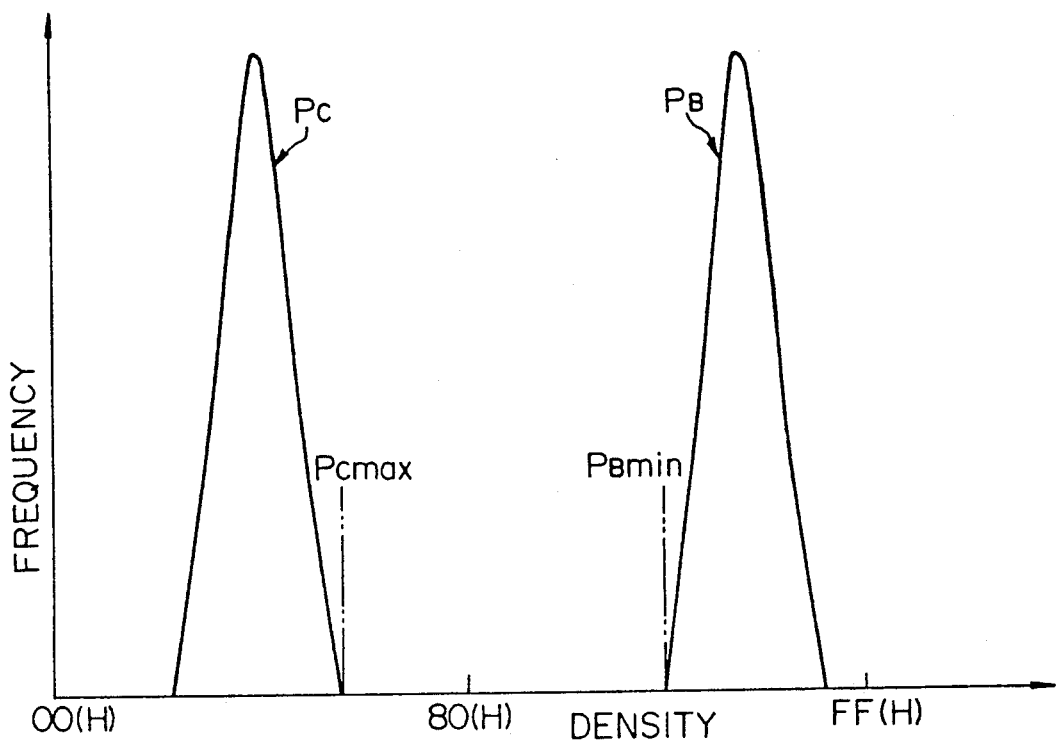
FIG. 7 is a diagram showing the distribution of the pixel densities of a frame of image detected from a character document having no halftone image area, the densities being expressed in hexadecimal notation.

FIG. 7 shows the distribution of the pixel densities of a frame of image detected from a document having no halftone image area, the densities being expressed in hexadecimal notation. As will be seen from the curve indicated in FIG. 7, the frequencies with which the pixel densities of a frame of image having no halftone image area occur have two peak zones $P_C$ and $P_B$, one zone $P_C$ corresponding to the areas (herein referred to as character areas) occupied by characters and the other zone $P_B$ corresponding to the areas (herein referred to as background areas) surrounding the character areas of the image frame. The densities of the pixels forming a frame image on this type of document (hereinafter referred to as character document) can be binarized advantageously in the simple binarization mode of image reading operation. The threshold value for use in this simple binarization mode of image reading operation is preferably selected to intervene between the maximum density $P_{Cmax}$ of the lower-density or background-area peak zone $P_C$ and the minimum density $P_{Cmin}$ of the higher-density or character-area peak zone $P_B$. The use of such a threshold value will prove advantageous for precluding the fading of characters in the character areas and the production of fogging in the background areas of the document.

It may be further noted that, for the binarization of the pixel densities of a frame of image on a character document, it is of no use to minutely vary the threshold because of the fact that there could be no pixel densities which intervene between the maximum density $P_{Cmax}$ of the background-area peak zone $P_C$ and the minimum density $P_{Cmin}$ of the character-area peak zone $P_B$. In the first preferred embodiment of a image reading apparatus according to the present invention, it is for this reason prohibited to vary the threshold between the maximum and minimum densities $P_{Cmax}$ and $P_{Cmin}$ of the peak zones $P_B$ and $P_C$, respectively, in binarizing the pixel densities of a frame of image on a character document.

Figure 8:
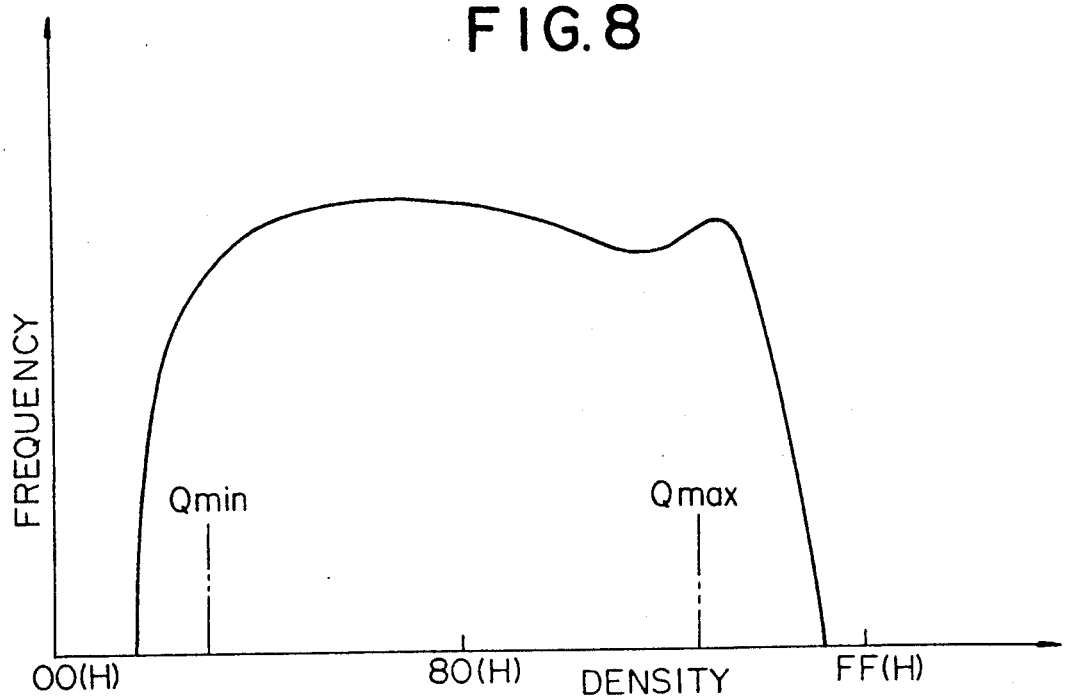
FIG. 8 is a diagram showing the distribution of the pixel densities of a frame of image picked up from a photographic document, the densities being also expressed in hexadecimal notation.

FIG. 8 shows the distribution of the pixel densities of a frame of image which may be picked up from, for example, a photographic document, the densities being also expressed in hexadecimal notation. As will be seen from the curve indicated in FIG. 8, the pixel densities of a frame of image on a photographic document occur with practically equal frequencies practically throughout the range of densities between the lower and upper limit densities corresponding to pure white (00(H)) and pure black (FF(H)), respectively.

The densities of the pixels forming a frame image on this type of document can also be binarized advantageously in the simple binarization mode of image reading operation. In the case of a photographic document, however, the threshold value for use in the simple binarization mode of image reading operation, that is, the representative value of the dither pattern is preferably selected to intervene between predetermined maximum and minimum densities $Q_{max}$ and $Q_{min}$ close to the upper and lower limit densities corresponding to pure white and pure black, respectively. The use of such a threshold value will prove advantageous for precluding the fading and blackening of image elements. It may also be noted that, for the binarization of the pixel densities of a frame of image on a photographic document, it is useful to minutely vary the threshold because of the fact that there are a number of pixel densities distributed between the maximum and minimum values densities $Q_{max}$ and $Q_{min}$ of the original pixel densities.

In the first preferred embodiment of an image reading apparatus according to the present invention, the original pixel densities of a frame of image are thus binarized by following a manipulative procedure which is started by depression of either the character mode select key 158 or the halftone mode select key 160 on the control panel 140A. The density "plus" key 164 or the density "minus" key 166 is then depressed to enter an instruction to increase or decrease the valid degree of lightness for image reading.

Each time the density "plus" key 164 is depressed, the valid density for image reading is stepwise increased a predetermined value and highlight is moved from any of the subsections of the density indicator section 162 to the subsection located to the right of the former. When the simple binarization mode of image reading operation is selected with the character mode select key 158 depressed, only the valid degree of lightness indicated by letter "D", "M" or "L" or numeral "4", "5" or "6" can be selected. If the density "plus" key 164 is depressed after the indicator subsection corresponding to the degree of lightness indicated by letter "L" or numeral "6" is highlighted, the subsection corresponding to the higher degree of lightness indicated by numeral "7" will not be highlighted.

Similarly, the valid density for image reading is stepwise decreased a predetermined value each time the density "minus" key 166 is depressed, and highlight is moved from any of the subsections of the density indicator section 162 to the subsection located to the left of the former. When the simple binarization mode of image reading operation is selected with the character mode select key 158 depressed and the density "minus" key 166 is depressed after the indicator subsection corresponding to the degree of lightness indicated by letter "D" or numeral "4" is highlighted, the subsection corresponding to the lower degree of lightness indicated by numeral "3" will not be highlighted.

Figure 9:
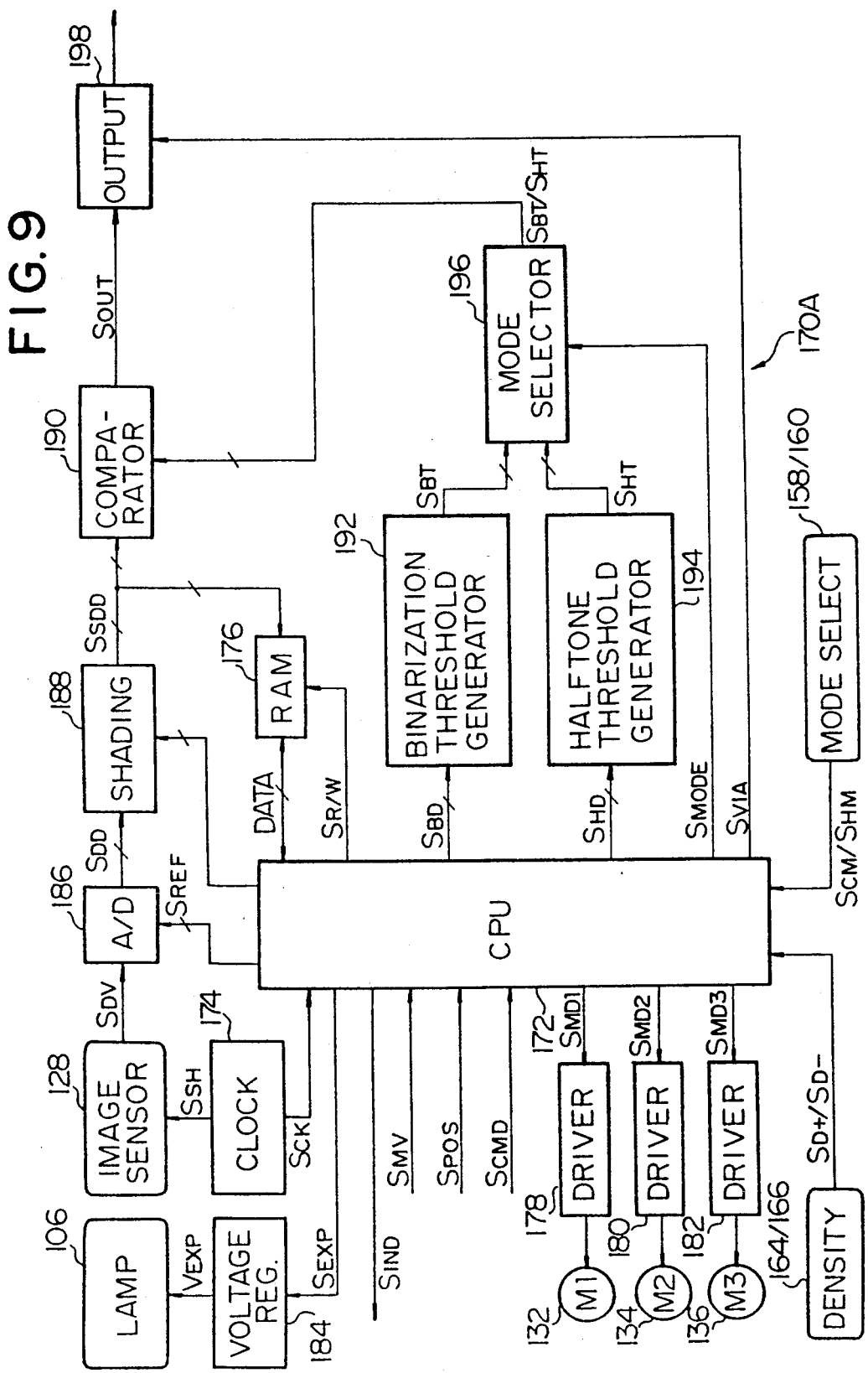
FIG. 9 is a block diagram showing the general construction and arrangement of a control circuit for use in the first preferred embodiment of an image reading apparatus according to the present invention.

FIG. 9 shows a control circuit 170A for use in the first preferred embodiment of an image reading apparatus according to the present invention.

The control circuit 170A comprises a semiconductor central processing unit 172 responsive to command signals produced from the control panel 140A and signals produced by various sensors and detectors provided in the apparatus embodying the present invention. The command signals to be supplied from the control panel 140A include signals, commonly denoted by $S_{CMD}$, generated from the scan start key 142, common clear key 144, image scale-up and scale-down keys 148 and 150, and sheet size select keys 154 and 156. The command signals from the control panel 140A further include a character mode select signal $S_{CM}$ to be supplied from the character mode select key 158, a halftone mode select signal $S_{HM}$ to be supplied from the halftone mode select key 160, a density step-up signal $S_{D+}$ to be supplied from the density "plus" key 164, and a density step-down signal $S_{D-}$ to be supplied from the density "minus" key 166.

The signals supplied from the sensors and detectors provided in the apparatus include signals, commonly denoted by $S_{MV}$, indicating the detected speeds of rotation of the scanner drive motor 132 (M1), lens/sensor drive motor 134 (M2) and sensor drive motor 136 (M3), respectively. The signals from the sensors and detectors further include signals, commonly denoted by $S_{POS}$, indicating the detected current positions of the lamp-/mirror carrier 118, mirror carrier 120, lens/sensor carrier 126, and sensor holder 130. The signal $S_{POS}$ thus supplied from the detecting means provided in association with each of the lamp/mirror carrier 118 and mirror carrier 120 is used to check if the associated carrier 118 or 120 is in a predetermined home position with respect to the document support table 102.

The central processing unit 172 further receives signals from various associated hardware units which include a clock generator circuit 174 which outputs clock pulses $S_{CK}$ and a line memory 176 implemented by a semiconductor random-access memory (RAM). The data to be stored in the line memory 176 include data representative of the detected focus adjusting pattern, reduction/magnification ratio detecting pattern, and shading data correcting pattern printed on the lower face of the document scale 104 arranged on the upper panel of the housing structure 100.

Responsive to these signals, the central processing unit 172 outputs various control signals to control the operation of various mechanical and optical functional units of the apparatus. The control signals thus output from the central processing unit 172 include motor actuation signals $S_{MD1}$, $S_{MD2}$ and $S_{MD3}$ to be supplied to driver circuits 178, 180 and 182 for actuating the scanner drive motor 132, lens/sensor drive motor 134 and sensor drive motor 136, respectively. The signals to be output from the central processing unit 172 further include a control signal $S_{EXP}$ to be supplied to a voltage regulator circuit 184 for the exposure lamp 106 and signals, commonly denoted by $S_{IND}$, to be supplied to the indicators on the control panel 140A such as the numerical display section 146, sheet size indicator section 152, and density indicator section 162 provided on the control panel 140A. Responsive to the signal $S_{EXP}$ supplied from the central processing unit 172, the voltage regulator circuit 184 outputs a lamp control voltage signal $V_{EXP}$ with which the exposure lamp 106 is to be activated to illuminate.

The central processing unit 172 further supplies signals to various associated hardware units which include an analog-to-digital (A/D) converter 186 which has an input terminal connected to the CCD image sensor 128. The image sensor 128 is responsive to sample-and-hold signals $S_{SH}$ supplied from the clock generator circuit 174 and outputs analog image density data signals $S_{DV}$ representative of the image information contained in a beam of light incident on the sensor 128. The analog-to-digital converter 186 receives these analog image density data signals from the array of the charge-coupled devices forming the image sensor 128 and outputs corresponding digital signals $S_{DD}$ on the basis of reference voltage signals $S_{REF}$ supplied from the central processing unit 172. The digital signals $S_{DD}$ thus output from the analog-to-digital converter 186 are supplied to a shading circuit 188 which compensates for the spurious components in the supplied signals $S_{DD}$ to eliminate the irregularities in the quantities of light incident on the individual charge-coupled devices forming the image sensor 128 and the irregularities in the degrees of sensitiveness of the charge-coupled devices. The shaded digital image density data signals $S_{SDD}$ thus output from the shading generator circuit 188 are representative of the original pixel densities of the frame of image detected from the document D currently in use. The image density data in the form of the shaded digital image density data signals $S_{SDD}$ is on one hand stored in the line memory 176 and on the other hand supplied to a binarizing comparator circuit 190.

The data required for the shading process to be carried out in the shading circuit 188 is supplied from the central processing unit 172. For this purpose, the central processing unit 172 reads the shading data correcting pattern detected from the lower face of the document scale 104 and stored in the line memory 176. On the basis of the shading data correcting pattern thus read from the line memory 176, the central processing unit 172 formulates the data in accordance with which shading signals are generated in the shading circuit 188.

The signals output from the central processing unit 172 further include a write/read control signal $S_{R/W}$ to be supplied to the line memory 176, a simple binarization image-density signal $S_{BD}$ to be supplied to a simple binarization threshold generator circuit 192, and a halftone image-density signal $S_{HD}$ to be supplied to a halftone threshold generator circuit 194. The simple binarization threshold generator circuit 192 is responsive to the simple binarization image-density signal $S_{BD}$ to output a simple binarization threshold signal $S_{BT}$ indicative of a fixed threshold value for use in the simple binarization mode of image reading operation, while the halftone threshold generator circuit 194 is responsive to the halftone image-density signal $S_{HD}$ to output a halftone threshold signal $S_{HT}$ indicative of a stepwise variable threshold value for use in the halftone mode of image reading operation. The simple binarization threshold signal $S_{BT}$ thus output from the simple binarization threshold generator circuit 192 or the halftone threshold signal $S_{HT}$ output from the halftone threshold signal generator circuit 194 is supplied to the binarizing comparator circuit 190 through a simple-binarization/halftone mode selector circuit 196. The simple-binarization/halftone mode selector circuit 196 becomes selectively transparent to the simple binarization threshold signal $S_{BT}$ or the halftone image-density signal $S_{HD}$ depending on a mode select signal $S_{MODE}$ supplied from the central processing unit 172 to the control terminal of the selector circuit 196.

The image density data in the form of the shaded digital image density data signals $S_{SDD}$ supplied to the binarizing comparator circuit 190 is compared with the simple binarization threshold signal $S_{BT}$ supplied from the simple binarization threshold generator circuit 192 or the halftone image-density signal $S_{HD}$ supplied from the halftone threshold signal generator circuit 194 through the simple-binarization/halftone mode selector circuit 196. The binarizing comparator circuit 190 is thus operative to output binary image signals $S_{OUT}$ each of logic "1" or "0" state responsive to the shaded digital image density data signals $S_{SDD}$ and supplies the output signals $S_{OUT}$ to an image signal output circuit 198. The image signal output circuit 198 receives, in addition to the binary image signals $S_{OUT}$ from the comparator 190, a valid image area signal $S_{VIA}$ of logic "1" or "0" state supplied from the central processing unit 172.

Responsive to the binary image signals $S_{OUT}$ supplied from the binarizing comparator circuit 190, the image signal output circuit 198 combines each of the binary image signals $S_{OUT}$ with the valid image area signal $S_{VIA}$ of logic "1" or "0" state from the central processing unit 172 in a logic "AND" operation. The resultant binary signals are delivered to a signal processing circuit of any external output unit such as a printer or a display unit (not shown) to reproduce the image represented by the output signals from the signal output circuit 198.

If desired, the simple-binarization/halftone mode selector circuit 196 may be dispensed with so that the simple binarization threshold signal $S_{BT}$ or the halftone image-density signal $S_{HD}$ is selectively passed to the binarizing comparator 190 depending on the selected mode of image reading.

Figure 10:
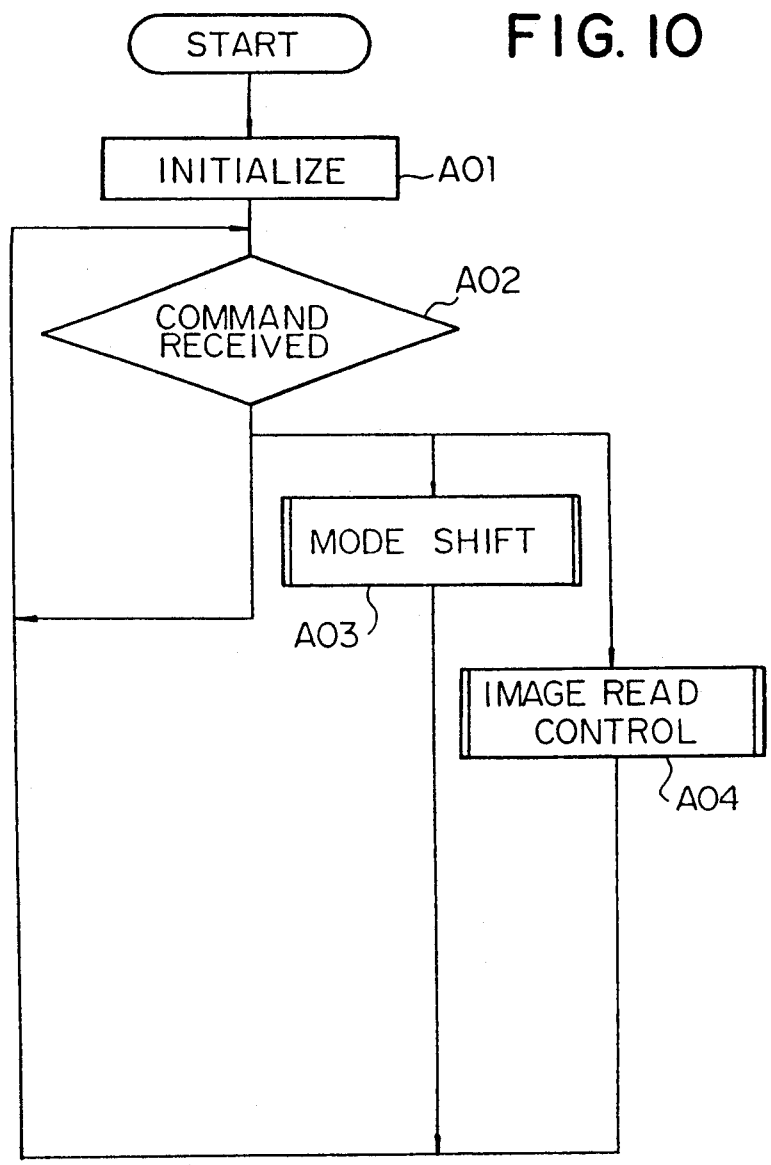
FIG. 10 is a flowchart showing a main routine program to be executed by the central processing unit included in the control circuit illustrated in FIG. 9.

FIG. 10 shows a main routine program to be executed by the central processing unit 172 included in the control circuit 170A hereinbefore described with reference to FIG. 9.

The execution of the main routine program shown in FIG. 10 is started when the apparatus is initially switched in. The main routine program starts with step A01 at which the registers included in the central processing unit 172 and the line memory 176 are reset. The step A01 is followed by step A02 to check for any command signal supplied from the control panel 140A. The command signal to be checked for at this step A02 may be the signal $S_{CMD}$ supplied from any of the scan start key 142, common clear key 144, image scale-up and scale-down keys 148 and 150 and sheet size select keys 154 and 156, or the character mode select signal $S_{CM}$ supplied from the character mode select key 158, the halftone mode select signal $S_{HM}$ supplied from the halftone mode select key 160, the density step-up signal $S_{D+}$ supplied from the density "plus" key 164, or the density step-down signal $S_{D-}$ supplied from the density "minus" key 166. In the absence detected of any command signal $S_{CMD}$ supplied from the control panel 140A, the central processing unit 172 repeats the step A02 until it is found that there is any command signal $S_{CMD}$ received from the control panel 140A.

The central processing unit 172 proceeds to step A03 and executes a mode shift subroutine program if it is detected at step A02 that there is the signal from the image scale-up or scale-down key 148 or 150, the signal from the sheet size select key 154 or 156, the character mode select signal $S_{CM}$ from the character mode select key 158, the halftone mode select signal $S_{HM}$ from the halftone mode select key 160, the density step-up or step-down signal $S_{D+}$ or $S_{D-}$ from the density "plus" or "minus" key 164 or 166. Responsive to any of these signals supplied from the control panel 140A, the central processing unit 172 executes the steps required by the supplied signal on condition that the mode of operation requested by the signal is validly acceptable in the apparatus. The details of this mode shift subroutine program A03 will be hereinafter described with reference to FIG. 11.

On the other hand, if it is detected at step A02 that there is the signal supplied from the scan start key 142 on the control panel 140A, the central processing unit 172 proceeds to subroutine program A04 and executes an image read control subroutine program. The details of this image read control subroutine program A04 will be hereinafter described with reference to FIGS. 12A and 12B.

Figure 11:
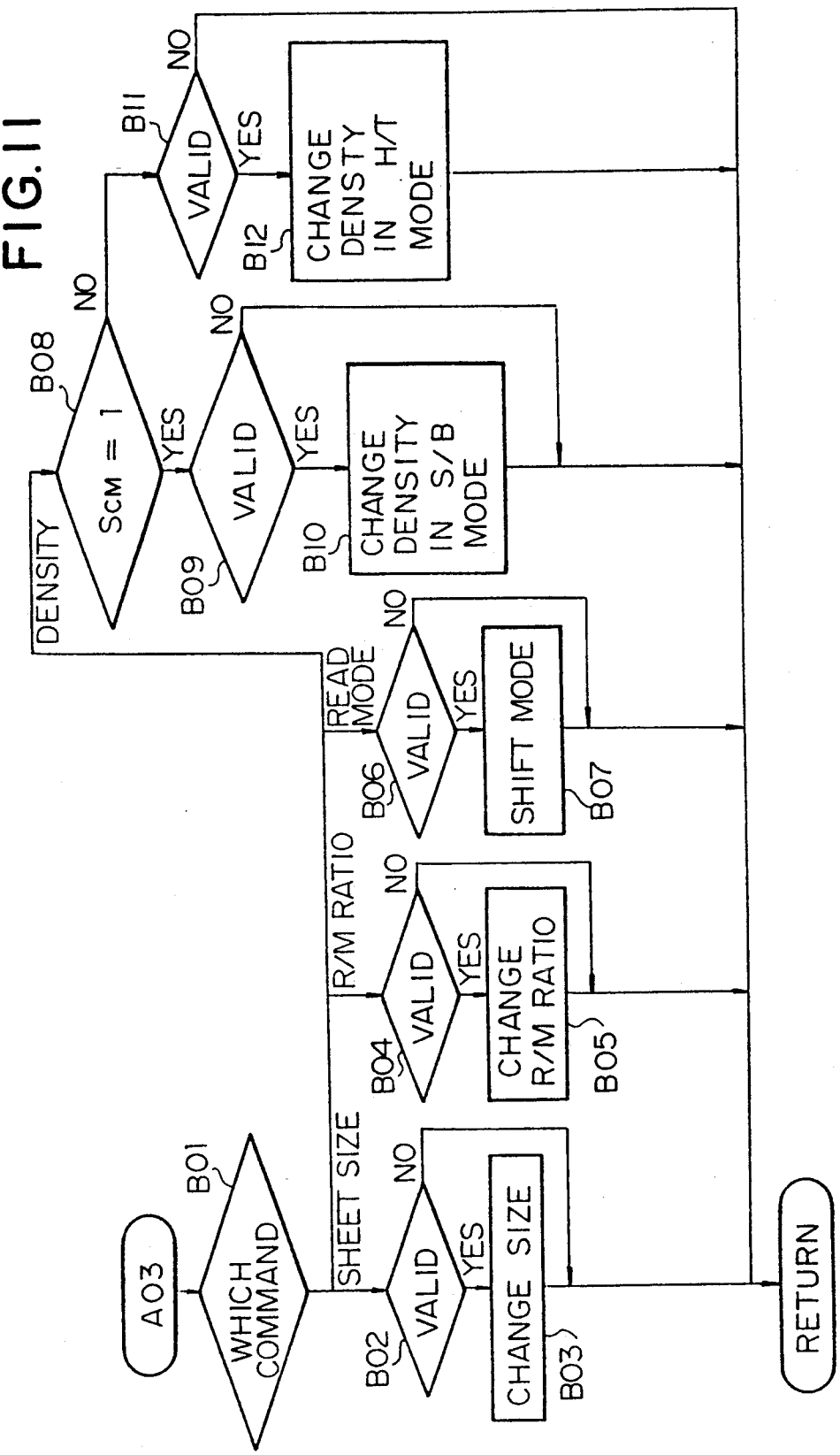
FIG. 11 is a flowchart showing the details of a mode shift subroutine program included in the main routine program illustrated in FIG. 10.

Referring to FIG. 11, the mode shift subroutine program A03 included in the routine program described with reference to FIG. 10 starts with step B01 to determine which command signal is received from the control panel 140A. Thus, if it is detected at step B01 that there is the signal received from the sheet size select key 154 or 156, the central processing unit 172 proceeds to step B02 to check if the request for the size of print output sheets designated by the signal received is validly acceptable in the apparatus and/or the external printer unit. If the answer for this step B02 is given in the affirmative, the central processing unit 172 proceeds to step B03 to select the size of print output sheets designated by the signal received and thereafter reverts to the main routine program described with reference to FIG. 10 to check if any other command signal is received from the control panel 140A. If it is determined at step B02 that the request for the size of print output sheets designated by the signal received is not validly acceptable and accordingly the answer for step B02 is given in the negative, the central processing unit 172 immediately reverts to the main routine program described with reference to FIG. 10 to check if any other command signal is received from the control panel 140A.

If it is detected at step B01 that there is the signal received from the image scale-up or scale-down key 148 or 150, the central processing unit 172 proceeds to step B04 to check if the request for the reduction/magnification ratio designated by the signal received is validly acceptable in the apparatus and/or the external printer unit. If the answer for this step B04 is given in the affirmative, the central processing unit 172 proceeds to step B05 to select the reduction/magnification ratio designated by the signal received and thereafter reverts to the main routine program described with reference to FIG. 10 to check if any other command signal is received from the control panel 140A. If it is determined at step B04 that the request for the reduction/magnification ratio designated by the signal received is not validly acceptable and accordingly the answer for step B04 is given in the negative, the central processing unit 172 immediately reverts to the main routine program described with reference to FIG. 10 to check if any other command signal is received from the control panel 140A.

If it is detected at step B01 that there is the character mode select signal $S_{CM}$ received from the character mode select key 158 or the halftone mode select signal $S_{HM}$ from the halftone mode select key 160, the central processing unit 172 proceeds to step B06 to check if the request for the simple binarization or halftone mode of image reading operation requested by the signal $S_{CM}$ or $S_{HM}$ received is validly acceptable in the apparatus. If the answer for this step B06 is given in the affirmative, the central processing unit 172 proceeds to step B07 to select the simple binarization or halftone mode of image reading operation requested by the signal $S_{CM}$ or $S_{HM}$ received and thereafter reverts to the main routine program described with reference to FIG. 10 to check if any other command signal is received from the control panel 140A. If it is determined at step B06 that the request for the mode of image reading operation requested by the signal received is not validly acceptable and accordingly the answer for step B06 is given in the negative, the central processing unit 172 immediately reverts to the main routine program described with reference to FIG. 10 to check if any other command signal is received from the control panel 140A.

If it is detected at step B01 that there is the density step-up or step-down signal $S_{D+}$ or $S_{D-}$ received from the density "plus" key 164 or density "minus" key 166, the central processing unit 172 proceeds to step B08 to check if there is the character mode select signal $S_{CM}$ received from the character mode select key 158. If the answer for this step B08 is given in the affirmative, the central processing unit 172 proceeds to step B09 to check if the request for the density for image reading designated by the signal $S_{D+}$ or $S_{D-}$ received is validly acceptable in the simple binarization mode of image reading operation. If the answer for this step B09 is given in the affirmative, the central processing unit 172 proceeds to step B10 to select the density for image reading designated by the signal $S_{D+}$ or $S_{D-}$ received for the selected simple binarization mode of image reading operation and thereafter reverts to the main routine program described with reference to FIG. 10 to check if any other command signal is received from the control panel 140A.

If it is determined at step B08 that there is not the character mode select signal $S_{CM}$ received from the character mode select key 158 and as such the answer for step B08 is given in the negative, the central processing unit 172 proceeds to step B11 to check if the request for the density for image reading designated by the signal $S_{D+}$ or $S_{D-}$ received is validly acceptable in the halftone mode of image reading operation. If the answer for this step B11 is given in the affirmative, the central processing unit 172 proceeds to step B12 to select the density for image reading designated by the signal $S_{D+}$ or $S_{D-}$ received for the selected halftone mode of image reading operation and thereafter reverts to the main routine program described with reference to FIG. 10 to check if any other command signal is received from the control panel 140A. If it is determined at step B11 that the request for the density for image reading designated by the signal $S_{D+}$ or $S_{D-}$ received is not validly acceptable and accordingly the answer for step B11 is given in the negative, the central processing unit 172 immediately reverts to the main routine program described with reference to FIG. 10 to check if any other command signal is received from the control panel 140A.

On the other hand, when it is detected at step A02 in the main routine program that there is present the signal supplied from the scan start key 142 on the control panel 140A, the central processing unit 172 executes the image read control subroutine program A04.

Figure 12A:
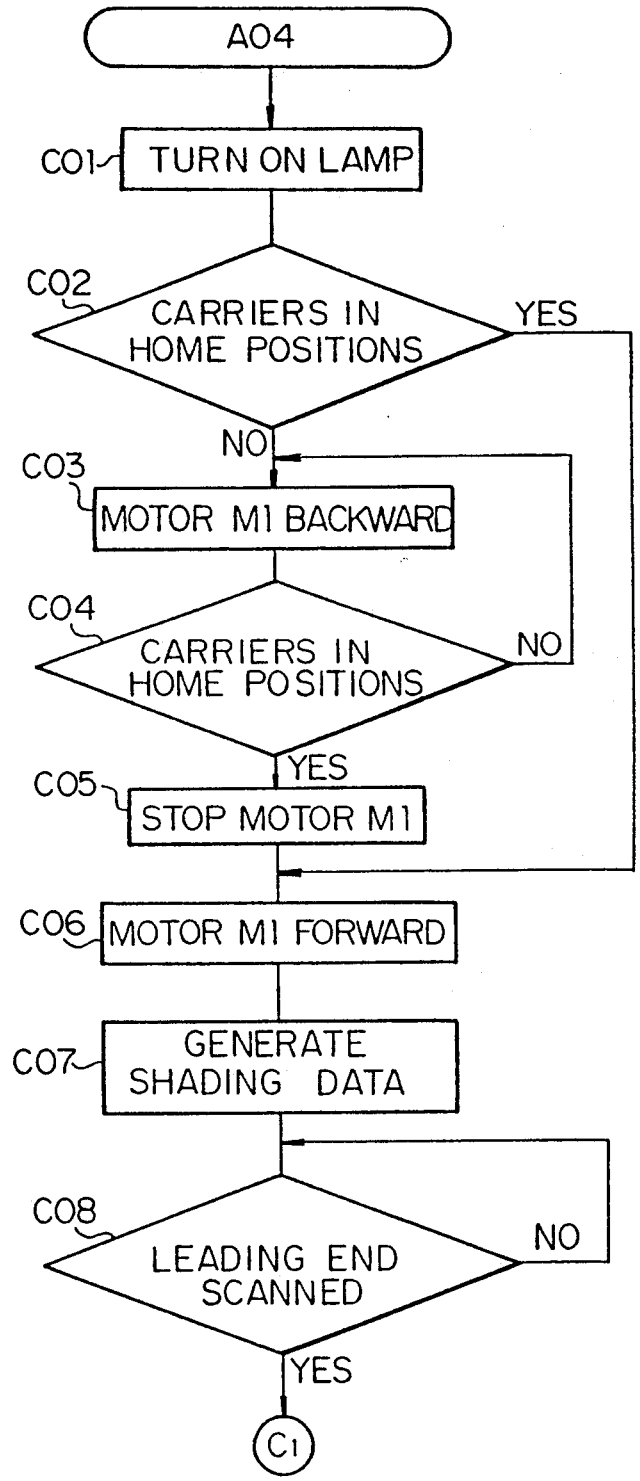

As shown in FIG. 12A, the image read control subroutine program A04 starts with step C01 at which the central processing unit 172 supplies the control signal $S_{EXP}$ to the voltage regulator circuit 184 for the exposure lamp 106. Responsive to the signal $S_{EXP}$ thus received from the central processing unit 172, the voltage regulator circuit 184 outputs the lamp control voltage signal $V_{EXP}$ to activate the exposure lamp 106 to illuminate. The central processing unit 172 then proceeds to step C02 to check if each of the lamp/mirror carrier 118 and mirror carrier 120 is held in a predetermined home position with respect to the document support table 102. This decision is made on the signal $S_{POS}$ supplied from the detecting means provided in association with each of the lamp/mirror carrier 118 and mirror carrier 120.

If it is found at this step C02 that the lamp/mirror carrier 118 and mirror carrier 120 are not held in their respective home positions, the central processing unit 172 proceeds to step C03 to supply the motor actuation signal $S_{MD1}$ to the motor driver circuit 178 for the scanner drive motor 132. Responsive to the motor actuation signal $S_{MD1}$ thus received from the central processing unit 172, the motor driver circuit 178 actuates the scanner drive motor 132 into operation to move the lamp/mirror and mirror carriers 118 and 120 toward their home positions in the directions indicated by arrowheads a' and b' in FIG. 1.

The central processing unit 172 then detects at step C04 whether or not the lamp/mirror and mirror carriers 118 and 120 have reached their respective home positions. The loop of the steps C03 and C04 is repeated until it is confirmed at step C04 that the lamp/mirror and mirror carriers 118 and 120 have reached their respective home positions. When it is thus found at step C04 that the carriers 118 and 120 have reached their respective home positions and accordingly the answer for the step C04 turns affirmative, the central processing unit 172 proceeds to step C05 to reset the signal $S_{MD1}$ and stop the scanner drive motor 132.

Subsequently to this step C05 or when it is confirmed at step C04 that the lamp/mirror and mirror carriers 118 and 120 are held in their respective home positions, the central processing unit 172 proceeds to step C06 to supply the motor actuation signal $S_{MD1}$ for a second time to the motor driver circuit 178 for the scanner drive motor 132. Responsive to the motor actuation signal $S_{MD1}$ thus received from the central processing unit 172, the motor driver circuit 178 actuates the scanner drive motor 132 into operation to move the lamp/mirror and mirror carriers 118 and 120 forwardly from their home positions in the directions indicated by arrowheads a and b in FIG. 1. The document D placed on the document support table 102 is now optically scanned by the exposure lamp 106 and the resultant image-bearing beam of light B is directed past the reflector mirrors 110, 112 and 114 to the image sensor 122.

The step C06 is followed by step C07 at which the central processing unit 172 reads the shading data correcting pattern detected from the lower face of the document scale 104 and stored in the line memory 176. On the basis of the shading data correcting pattern read from the line memory 176, the central processing unit 172 formulates the data in accordance with which shading signals are to be generated in the shading circuit 188. The data thus generated in the central processing unit 172 is stored into the line memory 176.

The central processing unit 172 then detects at step C08 whether or not the lamp/mirror carrier 118 and mirror carrier 120 have reached the positions effective to scan the leading end of the document D placed on the document support table 102. The step C08 is repeated until it is confirmed that the document D on the document support table 102 is scanned at its leading end. When it is thus determined at step C08 that the document D on the document support table 102 is scanned at its leading end and accordingly the answer for the step C08 turns affirmative, the central processing unit 172 proceeds to step C09 (FIG. 12B) to generate the valid image area signal $S_{VIA}$. The valid image area signal $S_{VIA}$ thus generated by the central processing unit 172 at step C09 is supplied to the control terminal of the image signal output circuit 198.

Subsequently to step C09, the central processing unit 172 detects at step C10 whether or not the lamp/mirror carrier 118 and mirror carrier 120 have reached the positions effective to scan the trailing end of the document D on the document support table 102. The step C10 is repeated until it is confirmed that the document D on the document support table 102 has been scanned to its trailing end. When it is thus determined at step C10 that the scanning of the document D on the document support table 102 is complete and accordingly the answer for the step C10 turns affirmative, the central processing unit 172 proceeds to step C11 to reset the valid image area signal $S_{VIA}$ which has been supplied to the control terminal of the image signal output circuit 198.

The central processing unit 172 then proceeds to step C12 to cease the supply of the control signal $S_{EXP}$ to the voltage regulator circuit 184 to de-activate the exposure lamp 106. The step C12 is followed by step C13 at which the central processing unit 172 supplies the motor actuation signal $S_{MD1}$ to the motor driver circuit 178 for the scanner drive motor 132. Responsive to the motor actuation signal $S_{MD1}$ thus received from the central processing unit 172, the motor driver circuit 178 actuates the scanner drive motor 132 into operation to move the lamp/mirror and mirror carriers 118 and 120 toward their home positions in the directions indicated by arrowheads a' and b' in FIG. 1.

The central processing unit 172 then detects at step C14 whether or not the lamp/mirror and mirror carriers 118 and 120 have reached their respective home positions. The steps C14 is repeated until it is confirmed that the lamp/mirror and mirror carriers 118 and 120 have reached their respective home positions. When it is thus found at step C14 that the carriers 118 and 120 have reached their respective home positions and accordingly the answer for the step C14 turns affirmative, the central processing unit 172 proceeds to step C15 to reset the signal $S_{MD1}$ and stop the scanner drive motor 132. Subsequently, the central processing unit 172 reverts to the main routine program described with reference to FIG. 10 to check if any other command signal is received from the control panel 140A.

Second Preferred Embodiment (FIG. 13 to FIGS. 19A and 19B)

Description will be hereinafter made in regard to a second preferred embodiment of an image reading apparatus according to the present invention. The second preferred embodiment of the present invention is characterized by the capabilities to designate a particular local area within a document and read the image in the particular area in a desired mode of image reading operation. In the second preferred embodiment of the present invention is also used the mechanical and optical arrangement described with reference to FIG. 1.

FIG. 13 shows an editor module 200A which forms part of the second preferred embodiment of the present invention. The editor module 200A largely consists of a tablet section 202 and a key section 204 comprising a total of nine control keys. The tablet section 202 of the editor module 200A is used to define a desired local area within the image-carrying document to be reproduced. For this purpose, the document D to be reproduced is placed on the tablet section 202 as shown and thereupon a light pen is used to specify particular coordinate points to define the desired local area of the document D. To define a square-shaped rectangular area of the document D, only the locations of the opposite ends of one diagonal of the area may be specified with use of a light pen.

The control keys provided in the key section 204 of the editor module 200A include:

a trimming key "F1" used to enter an instruction to blank out (or "white out") the image outside the specified local area of the document D on the tablet section 202, a masking key "F2" used to enter an instruction to blank out the image within the specified local area of document on the tablet section 202, a white/black reverse key "F3" used to enter an instruction for the reversal of the white and black features of an image on the document, a simple binarization mode select "F4" used to enter an instruction to select the simple binarization mode of image reading operation for the document on the tablet section 202 and use a fixed threshold value for the simple binarization mode of image reading operation, a first dither-pattern halftone mode select key "F5" used to enter an instruction to select the halftone mode of image reading operation for the document on the tablet section 202 and use a first prescribed dither pattern for determining the threshold value in the halftone mode of image reading operation, a second dither-pattern halftone mode select key "F6" used to enter an instruction to select the halftone mode of image reading operation for the document on the tablet section 202 and use a second prescribed dither pattern for determining the threshold value in the halftone mode of image reading operation, a trim/mask cancel key "F7" used to enter an instruction to cancel the instruction which has been entered to blank out the image outside or inside the specified local area of the document on the tablet section 202, a data-clear key "C" used to enter an instruction to clear all the data which have been entered to define a local area within the document on the table section 202, and a data-send key "S" used to enter an instruction to transmit to the control circuit of the apparatus the data and instructions entered through the editor module 200A in respect of the document on the table section 202.

Thus, the second preferred embodiment of the present invention has several kinds of attributes of image reading operation. These attributes of image reading operation include whiting (or blackening) out the image outside or inside a specified local area of a document in accordance with a command signal supplied from the key "F1" or "F2", reversing the white and black features of an image on a document in accordance with a command signal supplied from the key "F3", selecting the simple binarization or halftone mode of image reading operation in accordance with a command signal supplied from the key "F4" or one of the keys "F5" and "F6", and selecting the first or second prescribed dither pattern for the halftone mode of image reading operation in accordance with a command signal supplied from the key "F5" or "F6".

It may be noted that, when the trimming key "F1" or the masking key "F2" is depressed with the white/black reverse key "F3" depressed, the image outside or inside the specified local area of the document is blackened out.

FIG. 14 shows an example of the key/indicator configuration of a control panel 140B which also forms part of the second preferred embodiment of an image reading apparatus according to the present invention. On the control panel 140B are provided a scan start key 142, a common clear key 144, a four-digit eight-segment numerical display section 146, an image scale-up key 148, an image scale-down key 150, a sheet size indicator section 152, a first sheet size select key 154, a second sheet size select key 156, a character mode select key 158, and a halftone mode select key 160. The functions of these keys and display/indicator sections on the control panel 140B are similar to those of their respective equivalents in the control panel 140A described with reference to FIG. 2 and will not be herein described with reference to FIG. 14.

On the control panel 140B of the second preferred embodiment of the present invention are further provided first and second density indicator sections 162a and 162b each consisting of a series of subsections arranged in the of lightness indicated by numerals "1" to "9". The first density indicator section 162a is used to indicate the selected density for image reading in the simple binarization mode of image reading operation selected by the character mode select key 158, while the second density indicator section 162b is used to indicate the selected density for image reading in the halftone mode of image reading operation selected by the halftone mode select key 160. The selected density for image reading is shown highlighted such as the density "4" in the simple binarization mode density indicator section 162a and the density "5" in the halftone mode density indicator section 162b.

In association with the simple binarization mode density indicator section 162a are provided a character density "plus" key 164a used to enter an instruction to increase the valid degree of lightness for image reading in the simple binarization mode and a character density "minus" key 166a used to enter an instruction to decrease the valid degree of lightness for image reading in the simple binarization mode of image reading operation. Similarly, the halftone mode density indicator section 162a has provided in association therewith a halftone density "plus" key 164b used to enter an instruction to increase the valid degree of lightness for image reading in the halftone mode and a halftone density "minus" key 166b used to enter an instruction to decrease the valid degree of lightness for image reading in the halftone mode of image reading operation.

The control panel 140B shown in FIG. 14 further comprises an editor communication grant key 206 (labelled "ED") used to enter an instruction to grant reception of data and commands from the editor module 200A, and an editor information display section 208 for visually indicating the data received from the editor module 200A. When the editor communication grant key 206 is depressed after the key 206 was once depressed, the instruction which has been entered to grant reception of data and commands from the editor module 200A is cancelled and entry of data and command signals through the editor module 200A is invalidated.

It is now assumed that there is an operator who desires to produce a print out of a document D or otherwise reproduce the image on the document D. The operator of the apparatus will first depress the editor communication grant key 206 to enable the control panel 140B to grant reception of the data and commands to be generated in the editor module 200A. The operator may then specify particular coordinate points to define a desired local area of the document D through manipulation of a light pen with the document D placed on the tablet section 202. The operator may thereafter depress any of the keys "F1" to "F6" on the editor module 200A to select any of the attributes of the image reading operation to be performed.

Thus, the operator of the apparatus may depress the key "F1" or "F2" to blank out the image outside or inside the specified local area of the document D, the key "F3" to reverse the white and black features of an image on a document with use of the key "F3", or the key "F4", "F5" or "F6" to select the simple binarization or halftone mode of image reading operation.

The valid density for image reading in the second preferred embodiment of the present invention is designated with use of any of the density "plus" and "minus" keys 164a, 166a, 164b and 166b provided on the control panel 140B. When the valid density for image reading is thus designated from the character density "plus" or "minus" key 164a or 166a or the halftone density "plus" or "minus" key 164b or 166b on the control panel 140B, it is detected that the density required is validly acceptable in the apparatus and/or the external printer unit associated with the apparatus. This detection is made by a central processing unit incorporated in the control circuit to be described. If it is determined that the density required from the key 164a, 166a, 164b or 166b is validly acceptable, the data representing the density is stored into a memory incorporated in the central processing unit. In this instance, if the valid density for image reading is designated from the character density "plus" or "minus" key 164a or 166a with the simple binarization mode of image reading operation selected from the character mode select key 158 on the control panel 140B, the data representing the density is stored into the simple binarization mode density storage area of the internal memory of the central processing unit. Likewise; when the valid density for image reading is designated from the halftone density "plus" or "minus" key 164b or 166b with the halftone mode of image reading operation selected from the halftone mode select key 160 on the control panel 140B, the data representing the density is stored into the halftone mode density storage area of the internal memory of the central processing unit.

The operator who has selected any of the attributes allocated to the keys "F1" to "F6" on the editor module 200A may thus desire to change the valid density for image reading through manipulation of any of the density "plus" and "minus" keys 164a, 166a, 164b and 166b on the control panel 140B. When any of the density "plus" and "minus" keys 164a, 166a, 164b and 166b on the control panel 140B is depressed, the valid density for image reading is stepwise increased or decreased a predetermined value and highlight is moved from any of the subsections of the first density indicator section 162a or the second density indicator section 162a to the subsection adjacent the former.

The operator of the apparatus may then depress the data-send key "S" to enter an instruction to transmit to the control circuit of the apparatus the data and instructions which have been entered through the editor module 200A.

Figure 15:
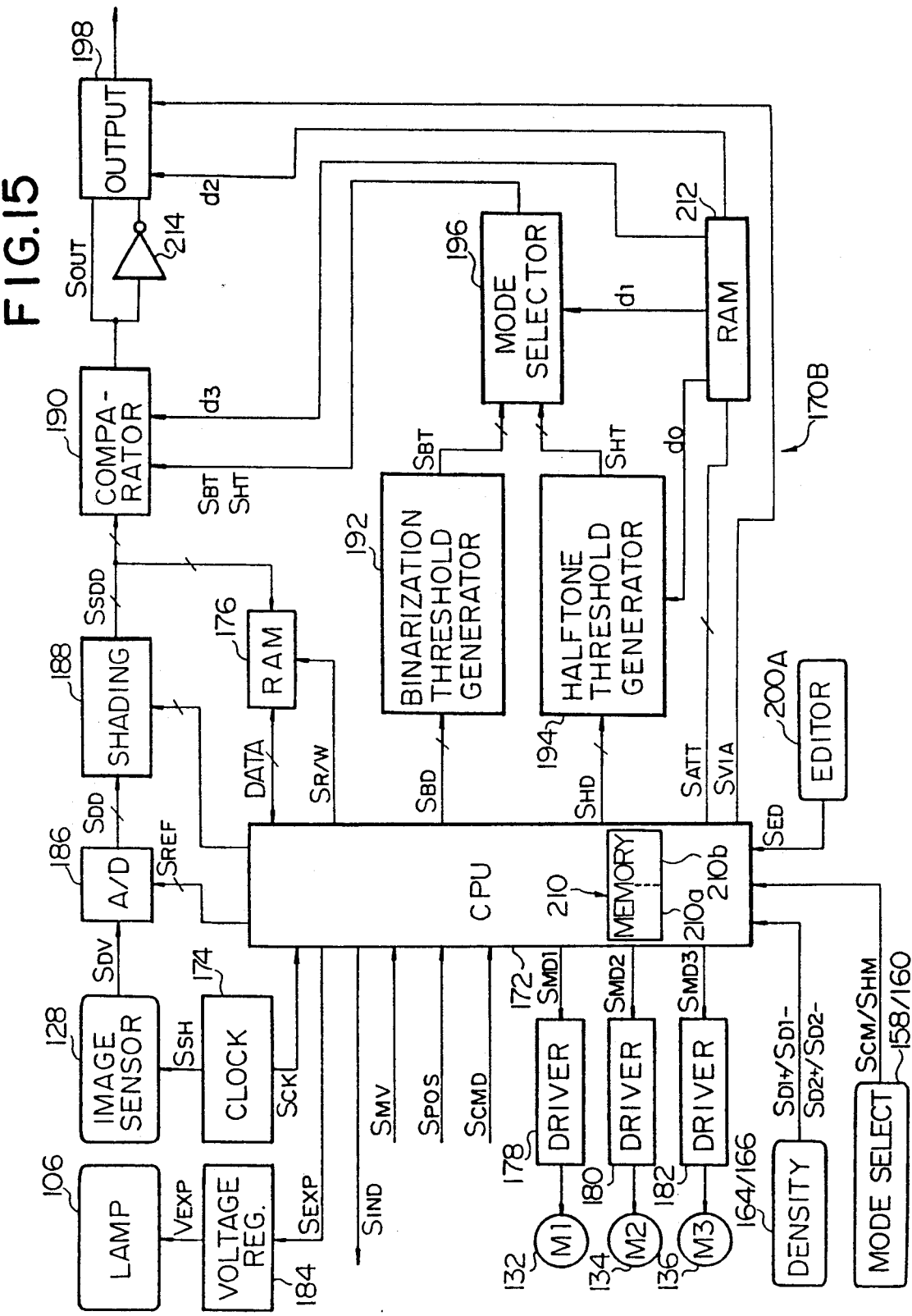
FIG. 15 is a block diagram similar to FIG. 9 but now shows the general construction and arrangement of a control circuit for use in the second preferred embodiment of an image reading apparatus according to the present invention.

FIG. 15 shows the general construction and arrangement of a control circuit 170B for use in the second preferred embodiment of an image reading apparatus according to the present invention. The control circuit 170B for use in the second preferred embodiment of the present invention is essentially similar to the control circuit 170A hereinbefore described with reference to FIG. 9 but, in the control circuit herein shown, the central processing unit 172 is responsive not only to the various command signals supplied from the control panel 140B but to various data and command signals $S_{ED}$ generated in and supplied from the editor module 200A. These data and command signals $S_{ED}$ supplied from the editor module 200A are allowed into the central processing unit 172 of the control circuit 170B in the presence of a signal generated with the editor communication grant key 206 depressed to enter an instruction to grant reception of data and commands from the editor module 200A.

In the control circuit 170B illustrated in FIG. 15, the central processing unit 172 may further receive a density step-up signal $S_{D1+}$ from the character density "plus" key 164a, a density step-down signal $S_{D1-}$ from the character density "minus" key 166a, a density step-up signal $S_{D2+}$ from the halftone density "plus" key 164b, a density step-down signal $S_{D2-}$ from the halftone density "minus" key 166b. As has been noted, the central processing unit 172 provided in the control circuit 170B of the second preferred embodiment of the present invention has incorporated therein an internal memory 210 having a simple binarization mode density storage area 210a and a halftone mode density storage area 210b, as shown. Thus, when the valid density for image reading is designated from the density "plus" or "minus" key 164a or 166a with the simple binarization mode of image reading operation selected from the character mode select key 158 on the control panel 140B, the data representing the density is stored into the simple binarization mode density storage area 210a of the internal memory 210 On the other hand, when the valid density for image reading is designated from the halftone density "plus" or "minus" key 164b or 166b with the halftone mode of image reading operation selected from the halftone mode select key 160 on the control panel 140B, the data representing the density is stored into the halftone mode density storage area 210b of the internal memory 210.

Responsive to the data and command signals $S_{ED}$ supplied from the editor module 200A and/or to the signal supplied from any of the density "plus" and "minus" keys 164a, 164b, 166a and 166b on the control panel 140B, the central processing unit 172 generates a four-bit attribute signal $S_{ATT}$ indicative of selected ones of the attributes of image reading operation. The attribute signal $S_{ATT}$ thus representative of the selected attributes of image reading operation is supplied to and stored into an attribute memory 212 implemented by a semiconductor random-access memory. Fractions of the signal $S_{ATT}$ thus stored into the attribute memory 212 are supplied to the binarizing comparator circuit 190, halftone threshold generator circuit 194, simple-binarization/halftone mode selector circuit 196, and image signal output circuit 198 as will be described in more detail.

In the control circuit 170B illustrated in FIG. 15, furthermore, the image signal output circuit 198 has two input terminals one of which is connected directly to the output terminal of the binarizing comparator circuit 190 and the other of which is connected through an inverter 214 to the output terminal of the comparator circuit 190. The binary image signals $S_{OUT}$ produced by the binarizing comparator circuit 190 responsive to the shaded digital image density data signals $S_{SDD}$ from the shading circuit 188 are thus supplied in true or non-inverted form to one input terminal of the output circuit 198 and in inverted form to the other input terminal of the output circuit 198.

The signal $S_{ATT}$ to be generated by the central processing unit 172 and stored into the attribute memory 212 is indicative of four different kinds of attributes in respect of an image pixel having a unit area measuring 1 mm by 1 mm and is provided in the form of a sequence of four bits $d_3$, $d_2$, $d_1$ and $d_0$ each of logic "1" or "0" state.

The bit $d_3$ of the attribute signal $S_{ATT}$ provides a first fraction of the signal $S_{ATT}$ and indicates selection of the blanking out of an image pixel when set to logic "0" state and selection of the non-blanking of a pixel when set to logic "1" state. The bit $d_3$ of the attribute signal $S_{ATT}$ is set to logic "0" state when the trimming key "F1" or the masking key "F2" on the editor module 200A is depressed. The first fraction of the attribute signal $S_{ATT}$ thus provided by the bit $d_3$ of the signal $S_{ATT}$ is supplied to one control terminal of the binarizing comparator circuit 190 and, when the bit $d_3$ is set to logic "0" state, enables the comparator circuit 190 to white out the specified image pixel (or blacken out the pixel in the presence of the white/black reversing bit $d_2$ of logic "1" state) as will be described in more detail. To the other control terminal of the binarizing comparator circuit 190 is supplied either the simple binarization threshold signal $S_{BT}$ output from the simple binarization threshold generator circuit 192 or the halftone threshold signal $S_{HD}$ output from the halftone threshold generator circuit 194 depending on the logic state of the bit $d_1$ applied to the selector circuit 196.

The bit $d_2$ of the attribute signal $S_{ATT}$ provides a second fraction of the signal $S_{ATT}$ and indicates selection of the non-reversing of the white and black features of an image when set to logic "0" state and selection of the reversing of the white and black features of an image when set to logic "1" state. The bit $d_2$ of the attribute signal $S_{ATT}$ is set to logic "1" state when the white/black reverse key "F3" on the editor module 200A is depressed. The second fraction of the attribute signal $S_{ATT}$ thus provided by the bit $d_2$ of the signal $S_{ATT}$ is supplied to one control terminal of the image signal output circuit 198. To another control terminal of the image signal output circuit 198 is supplied a valid image area signal $S_{VIA}$ of logic "1" or "0" state from the central processing unit 172 as in the control circuit 170A (FIG. 9) used in the first preferred embodiment of the present invention. Thus, the image signal output circuit 198 in the control circuit 170B of the second preferred embodiment of the present invention receives the binary image signals $S_{OUT}$ supplied both in inverted and non-inverted forms from the binarizing comparator circuit 190, the bit $d_2$ of the attribute signal $S_{ATT}$ supplied from the attribute memory 212, and the valid image area signal $S_{VIA}$ supplied from the central processing unit 172.

The bit $d_1$ of the attribute signal $S_{ATT}$ provides a third fraction of the signal $S_{ATT}$ and indicates selection of the simple binarization mode of image reading operation when set to logic "0" state and selection of the halftone mode of image reading operation when set to logic "1" state. The bit $d_1$ of the attribute signal $S_{ATT}$ is set to logic "0" state when the simple binarization mode select key "F4" on the editor module 200A is depressed. The third fraction of the attribute signal $S_{ATT}$ thus provided by the bit $d_1$ of the signal $S_{ATT}$ is supplied to the control terminal of the simple-binarization/halftone mode selector circuit 196. Responsive to this mode select bit $d_1$, the simple-binarization/halftone mode selector circuit 196 supplies either the simple binarization threshold signal $S_{BT}$ or the halftone threshold signal $S_{HD}$ depending on the logic state of the bit $d_1$.

The bit $d_0$ of the attribute signal $S_{ATT}$ provides a fourth fraction of the signal $S_{ATT}$ and indicates selection of the first prescribed dither pattern simple binarization when set to logic "0" state and selection of the the second dither pattern when set to logic "1" state. The bit $d_0$ of the attribute signal $S_{ATT}$ is set to logic "0" state when the first dither-pattern halftone mode select key "F5" on the editor module 200A is depressed and is set to logic "1" state when the second dither-pattern halftone mode select key "F6" on the editor module 200A is depressed. The fourth fraction of the attribute signal $S_{ATT}$ thus provided by the bit $d_0$ of the signal $S_{ATT}$ is supplied to the halftone threshold generator circuit 194, which is thus enabled to select the first or second prescribed dither pattern depending on the logic state of the bit $d_0$.

As will be seen from the above discussion, the four-bit attribute signal $S_{ATT}$ is effective to designate any combination of the four different attributes each having two possibilities in respect of each image pixel measuring 1 mm by 1 mm. Among the possible combinations of such attributes are:

| $d_3$ | $d_2$ | $d_1$ | $d_0$ | | |
|---|---|---|---|---|---|
| 0 | 0 | x | x | ... | select whiting out |
| 0 | 1 | x | x | ... | select blackening out |
| 1 | 0 | 0 | x | ... | select simple binarization threshold |
| 1 | 0 | 1 | 0 | ... | select first dither pattern |
| 1 | 0 | 1 | 1 | ... | select second dither pattern |
| 1 | 1 | 0 | x | ... | select white/black reversing and simple binarization threshold |
| 1 | 1 | 1 | 0 | ... | select white/black reversing and first dither pattern |
| 1 | 1 | 1 | 1 | ... | select white/black reversing and second dither pattern |

As has been described in regard to the control circuit 170A of the first preferred embodiment of the present invention, the image density data in the form of the shaded digital image density data signals $S_{SDD}$ supplied to the binarizing comparator circuit 190 is compared with the simple binarization threshold signal $S_{BT}$ supplied from the simple binarization threshold generator circuit 192 or with the halftone image-density signal $S_{HD}$ supplied from the halftone threshold signal generator circuit 194 through the simple-binarization/halftone mode selector circuit 196. The binarizing comparator circuit 190 is thus operative to generate binary image signals each of logic "1" or "0" state responsive to the shaded digital image density data signals $S_{SDD}$.

In the meantime, the data representing the valid density for image reading stored in the simple binarization mode density storage area 210a or the halftone mode density storage area 210b of the internal memory 210 is loaded into the simple binarization threshold generator circuit 192 as the simple binarization image-density signal $S_{BD}$ or into the halftone threshold generator circuit 194 as the halftone image-density signal $S_{HD}$. Responsive to the simple binarization image-density signal $S_{BD}$ or the halftone image-density signal $S_{HD}$ thus supplied from the central processing unit 172, the simple binarization threshold generator circuit 192 outputs the simple binarization threshold signal $S_{BT}$ indicative of a fixed threshold value for use in the simple binarization mode of image reading operation, or the halftone threshold generator circuit 194 outputs a halftone threshold signal $S_{HT}$ indicative of a stepwise variable threshold value for use in the halftone mode of image reading operation. The simple binarization threshold signal $S_{BT}$ thus output from the simple binarization threshold generator circuit 192 or the halftone threshold signal $S_{HT}$ output from the halftone threshold signal generator circuit 194 is supplied to the binarizing comparator circuit 190 through the simple-binarization/-halftone mode selector circuit 196 depending on the of the mode select bit $d_1$ which forms part of the attribute signal $S_{ATT}$ received from the attribute memory 212.

Each of these binary image signals generated in the binarizing comparator circuit 190 responsive to the shaded digital image density data signals $S_{SDD}$ is combined with the bit $d_3$ of the attribute signal $S_{ATT}$ in a logic "AND" operation so that a binary image signal of logic "1" or "0" state is generated in response to each of the shaded digital image density data signals $S_{SDD}$. Each of the binary image signals thus generated is further combined in a logic "AND" operation with the simple binarization threshold signal $S_{BT}$ output from the simple binarization threshold generator circuit 192 or the halftone threshold signal $S_{HT}$ output from the halftone threshold signal generator circuit 194 with the result that a binary image signal $S_{OUT}$ of logic "1" or "0" state is generated in respect of each of the shaded digital image density data signals $S_{SDD}$. The comparator circuit 190 supplies the output signals $S_{OUT}$ in non-inverted form to one input terminal of the image signal output circuit 198 and in inverted form to the other input terminal of the output circuit 198 through the inverter 214.

Responsive to the white/black reversing bit $d_2$ of the attribute signal $S_{ATT}$, the image signal output circuit 198 elects either the non-inverted binary image signals $S_{OUT}$ or the inverted versions of the signals $S_{OUT}$ depending on the logic state of the white/black reversing bit $d_2$. Each of the non-inverted binary image signals $S_{OUT}$ or of the inverted versions of the signals $S_{OUT}$ is combined with the valid image area signal $S_{VIA}$ of logic "1" or "0" state from the central processing unit 172 in a logic "AND" operation. The resultant binary signals are delivered to a signal processing circuit of any external output unit such as a printer or a display unit (not shown) to reproduce the image represented by the output signals from the signal output circuit 198.

Figure 16:
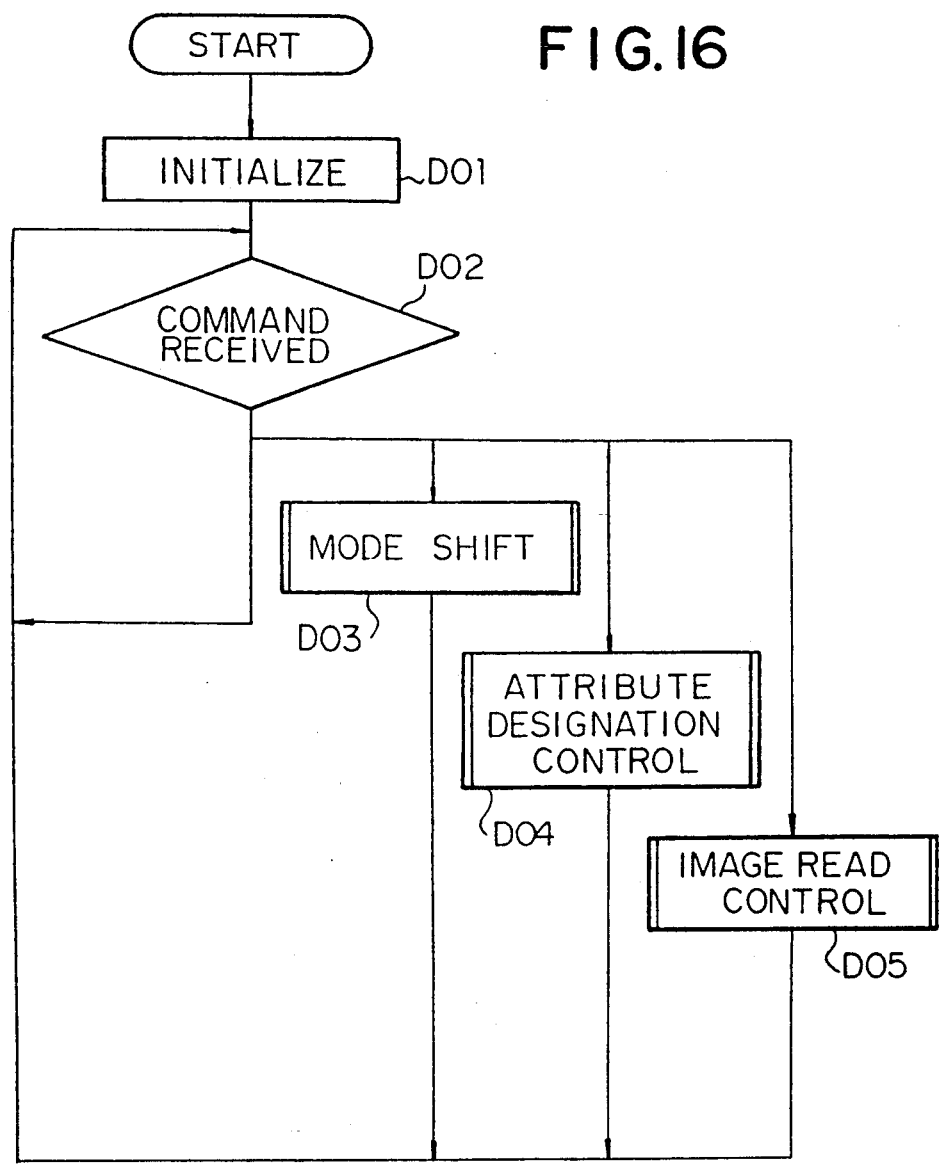
FIG. 16 is a flowchart showing a main routine program to be executed by the central processing unit included in the control circuit illustrated in FIG. 15.

FIG. 16 is a flowchart showing a main routine program to be executed by the central processing unit 172 included in the control circuit hereinbefore described with reference to FIG. 15.

The execution of the main routine program shown in FIG. 16 is started when the apparatus is initially switched in. The main routine program starts with step D01 at which the registers included in the central processing unit 172 and the line memory 176 are reset. The step D01 is followed by step D02 to check for any command signal supplied from the control panel 140B or from the editor module 200A. The command signal to be checked for at this step D02 may be the signal $S_{CMD}$ supplied from any of the scan start key 142, common clear key 144, image scale-up and scale-down keys 148 and 150 and sheet size select keys 154 and 156, or the character mode select signal $S_{CM}$ supplied from the character mode select key 158, the halftone mode select signal $S_{HM}$ supplied from the halftone mode select key 160, the density step-up signal $S_{D1+}$ or $S_{D1-}$ supplied from the character density "plus" or "minus" key 164a or 166a, or the density step-down signal $S_{D2+}$ or $S_{D2-}$ supplied from the halftone density "plus" or "minus" key 164b or 166b. When the editor communication grant key 206 is depressed, it is checked at step D02 if there is a command signal supplied from any of the keys "F1" to "F7" on the editor module 200A. In the absence detected of any command signal supplied from the control panel 140B or from the editor module 200A, the central processing unit 172 repeats the step D02 until it is found that there is any command signal $S_{CMD}$ received from the control panel 140B.

The central processing unit 172 proceeds to step D03 and executes a mode shift subroutine program if it is detected at step D02 that there is the signal from the image scale-up or scale-down key 148 or 150, the signal from the sheet size select key 154 or 156, the character mode select signal $S_{CM}$ from the character mode select key 158, the halftone mode select signal $S_{HM}$ from the halftone mode select key 160, the density step-up or step-down signal $S_{D1+}$ or $S_{D1-}$ from the character density "plus" or "minus" key 164a or 166a, or the density step-up or step-down signal $S_{D2+}$ or $S_{D2-}$ from the halftone density "plus" or "minus" key 164b or 166b. Responsive to any of these signals supplied from the control panel 140B, the central processing unit 172 executes the steps required by the supplied signal on condition that the mode of operation requested by the signal is validly acceptable in the apparatus. The details of this mode shift subroutine program D03 will be hereinafter described with reference to FIG. 17.

On the other hand, if it is detected at step D02 that there is a command signal supplied from any of the keys "F1" to "F7" on the editor module 200A, the central processing unit 172 proceeds to subroutine program D04 and executes an attribute designation control subroutine program. The details of this attribute designation control subroutine program D04 will be hereinafter described with reference to FIG. 18.

If it is detected at step D02 that there is the signal supplied from the scan start key 142 on the control panel 140B, the central processing unit 172 proceeds to subroutine program D05 and executes an image read control subroutine program. The details of this image read control subroutine program D05 will be hereinafter described with reference to FIGS. 19A and 19B.

Figure 17:
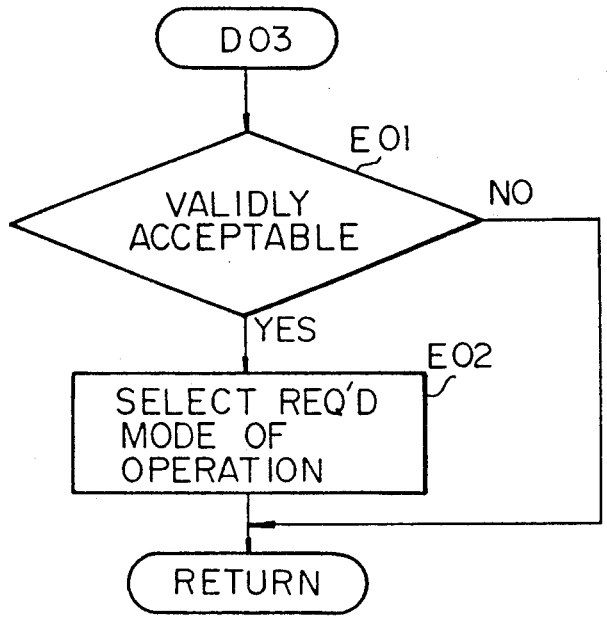
FIG. 17 is a flowchart showing the details of a mode shift subroutine program included in the main routine program illustrated in FIG. 16.

FIG. 17 shows the details of a mode shift subroutine program D03 included in the routine program hereinbefore described with reference to FIG. 16.

The mode shift subroutine program D03 starts with step E01 to check if the mode of operation requested by the command signal received from the control panel 140B is validly acceptable in the apparatus and/or the external printer unit. If the answer for this step E01 is given in the affirmative, the central processing unit 172 proceeds to step E02 to select the requested mode of operation and thereafter reverts to the main routine program described with reference to FIG. 16 to check if any other command signal is received from the control panel 140B or from the editor module 200A. If it is determined at step E01 that the mode of operation requested by the command signal received from the control panel 140B is not validly acceptable and accordingly the answer for step E01 is given in the negative, the central processing unit 172 immediately reverts to the main routine program described with reference to FIG. 16 to check if any other command signal is received from the control panel 140B or from the editor module 200A.

The request for a mode of operation to be checked for at step E01 may be a request for any size of print output sheets from the sheet size select key 154 or 156, a request for the change of the reduction/magnification ratio from the image scale-up or scale-down key 148 or 150, a request for the simple binarization or halftone mode of image reading operation from the character mode select key 158 or the halftone mode select key 160, or a request for the change of the density for image reading from any of the density "plus" and "minus" keys 164a, 164b, 166a and 166b on the control panel 140B. The steps E01 and E02 forming the mode shift subroutine program D03 herein shown are thus representative of the details similar to the steps B01 and B02 of the subroutine program A03 hereinbefore described with reference to FIG. 11 and, as such, the further details of the subroutine program D03 will not be herein described.

Figure 18:
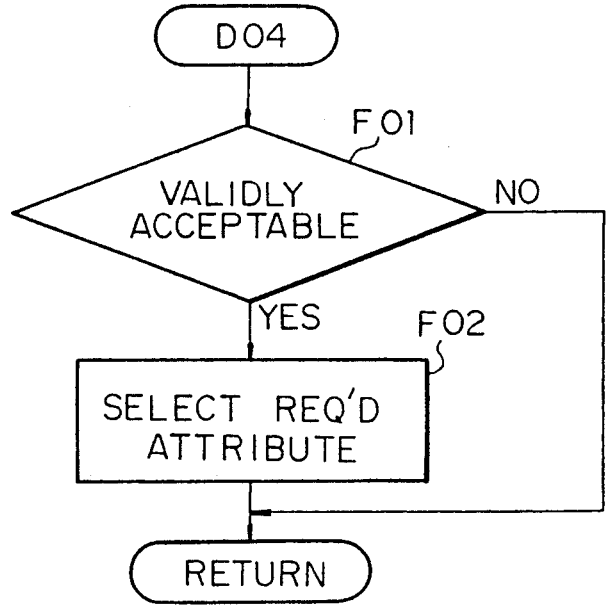
FIG. 18 is a flowchart showing the details of an attribute designation control subroutine program also included in the main routine program illustrated in FIG. 16.

FIG. 18 shows the details of the attribute designation control subroutine program D04 also included in the main routine program hereinbefore described with reference to FIG. 16.

The attribute designation control subroutine program D04 starts with step F01 to check if the attribute of image reading operation as requested by the command signal received from the editor module 200A is validly acceptable in the apparatus and/or the external printer unit. If the answer for this step F01 is given in the affirmative, the central processing unit 172 proceeds to step F02 to select the requested attribute of image reading operation and stores the data representative of the selected attribute into the attribute memory 212 in the control circuit 170 described with reference to FIG. 15. The central processing unit 172 thereafter reverts to the main routine program described with reference to FIG. 16 to check if any other command signal is received from the control panel 140B or from the editor module 200A.

If it is determined at step F01 that the attribute of image reading operation requested by the command signal received from the editor module 200A is not validly acceptable and accordingly the answer for step F01 is given in the negative, the central processing unit 172 immediately reverts to the main routine program described with reference to FIG. 16 to check if any other command signal is received from the control panel 140B or from the editor module 200A.

The attribute of image reading operation to be checked for at step F01 may be the whiting or blackening of the image outside or inside a specified local area, the reversing of the white and black features of an image, the establishment of the simple binarization or halftone mode of image reading operation, or the use of the first or second prescribed dither pattern for the halftone mode of image reading operation.

Figure 19A:
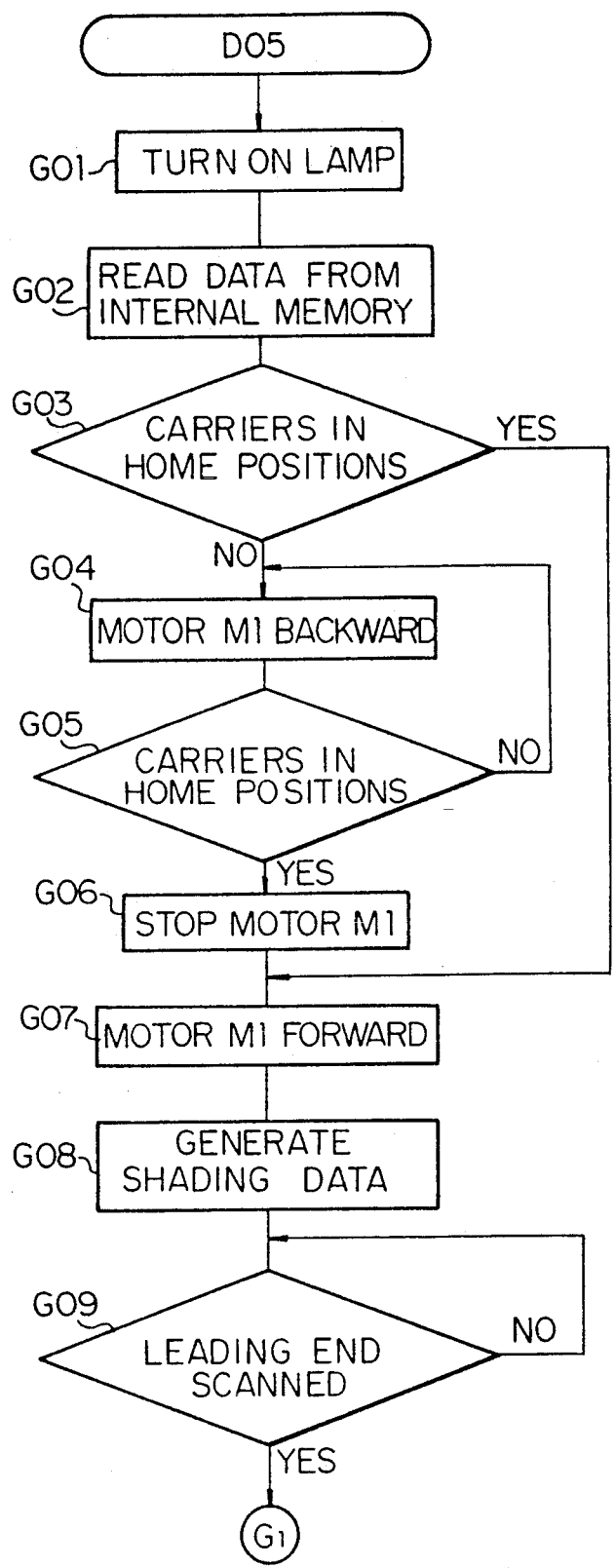

FIGS. 19A and 19B are flowcharts showing the details of the image read control subroutine program D05 further included in the main routine program hereinbefore described with reference to FIG. 16. As has been noted, the image read control subroutine program D05 is to be executed by the central processing unit 172 when if it is detected at step D02 in the main routine program that there is present the signal supplied from the scan start key 142 on the control panel 140B, the central processing unit 172 executes the image read control subroutine program D04.

As shown in FIG. 19A, the image read control subroutine program D04 starts with step G01 at which the central processing unit 172 supplies the control signal $S_{EXP}$ to voltage regulator circuit 184 for the exposure lamp 106. Responsive to the signal $S_{EXP}$ thus received from the central processing unit 172, the voltage regulator circuit 184 outputs the lamp control voltage signal $V_{EXP}$ to activate the exposure lamp 106 to illuminate. The central processing unit 172 then proceeds to step G02 to fetch the data representing the valid density for image reading from either the simple binarization mode density storage area 210a or the halftone mode density storage area 210b of the internal memory 210. The central processing unit 172 loads the data into the simple binarization threshold generator circuit 192 as the simple binarization image-density signal $S_{BD}$ or into the halftone threshold generator circuit 194 as the halftone image-density signal $S_{HD}$. Responsive to the simple binarization image-density signal $S_{BD}$ or the halftone image-density signal $S_{HD}$ thus supplied from the central processing unit 172, the simple binarization threshold generator circuit 192 outputs the simple binarization threshold signal $S_{BT}$ indicative of the fixed threshold value for use in the simple binarization mode of image reading operation, or the halftone threshold generator circuit 194 outputs the stepwise variable halftone threshold signal $S_{HT}$ for use in the halftone mode of image reading operation. The simple binarization threshold signal $S_{BT}$ thus output from the simple binarization threshold generator circuit 192 or the halftone threshold signal $S_{HT}$ output from the halftone threshold signal generator circuit 194 is supplied to the binarizing comparator circuit 190 through the simple-binarization/halftone mode selector circuit 196 depending on the logic state of the mode select bit $d_1$ which forms part of the attribute signal $S_{ATT}$ received from the attribute memory 212.

The central processing unit 172 then proceeds to step G03 to check if each of the lamp/mirror carrier 118 and mirror carrier 120 is held in a predetermined home position with respect to the document support table 102. This decision is made on the signal $S_{POS}$ supplied from the detecting means provided in association with each of the lamp/mirror carrier 118 and mirror carrier 120.

If it is found at this step G03 that the lamp/mirror carrier 118 and mirror carrier 120 are not held in their respective home positions, the central processing unit 172 proceeds to step G04 to supply the motor actuation signal $S_{MD1}$ to the motor driver circuit 178 for the scanner drive motor 132. Responsive to the motor actuation signal $S_{MD1}$ thus received from the central processing unit 172, the motor driver circuit 178 actuates the scanner drive motor 132 into operation to move the lamp/mirror and mirror carriers 118 and 120 toward their home positions in the directions indicated by arrowheads a' and b' in FIG. 1.

The central processing unit 172 then detects at step G05 whether or not the lamp/mirror and mirror carriers 118 and 120 have reached their respective home positions. The loop of the steps G04 and G05 is repeated until it is confirmed at step G05 that the lamp/mirror and mirror carriers 118 and 120 have reached their respective home positions. When it is thus found at step G05 that the carriers 118 and 120 have reached their respective home positions and accordingly the answer for the step G05 turns affirmative, the central processing unit 172 proceeds to step G06 to reset the signal $S_{MD1}$ and stop the scanner drive motor 132.

Subsequently to this step G06 or when it is confirmed at step G05 that the lamp/mirror and mirror carriers 118 and 120 are held in their respective home positions, the central processing unit 172 proceeds to step G07 to supply the motor actuation signal $S_{MD1}$ for a second time to the motor driver circuit 178 for the scanner drive motor 132. Responsive to the motor actuation signal $S_{MD1}$ thus received from the central processing unit 172, the motor driver circuit 178 actuates the scanner drive motor 132 into operation to move the lamp-/mirror and mirror carriers 118 and 120 forwardly from their home positions in the directions indicated by arrowheads a and b in FIG. 1. The document D placed on the document support table 102 is now optically scanned by the exposure lamp 106 and the resultant image-bearing beam of light B is directed past the reflector mirrors 110, 112 and 114 to the image sensor 122.

The step G07 is followed by step G08 at which the central processing unit 172 reads the shading data correcting pattern detected from the lower face of the document scale 104 and stored in the line memory 176. On the basis of the shading data correcting pattern read from the line memory 176, the central processing unit 172 formulates the data in accordance with which shading signals are to be generated in the shading circuit 188. The data thus generated in the central processing unit 172 is stored into the line memory 176.

The central processing unit 172 then detects at step G09 whether or not the lamp/mirror carrier 118 and mirror carrier 120 have reached the positions effective to scan the leading end of the document D placed on the document support table 102. The step G09 is repeated until it is confirmed that the document D on the document support table 102 is scanned at its leading end. When it is thus determined at step G09 that the document D on the document support table 102 is scanned at its leading end and accordingly the answer for the step G09 turns affirmative, the central processing unit 172 proceeds to step G10 (FIG. 19B) to generate the valid image area signal $S_{VIA}$. The valid image area signal $S_{VIA}$ thus generated by the central processing unit 172 at step G10 is supplied to the control terminal of the image signal output circuit 198.

The central processing unit 172 then proceeds to step G11 to instruct the attribute memory 212 to distribute the bits $d_3$ to $d_0$ of the attribute signal $S_{ATT}$ to the binarizing comparator circuit 190, image signal output circuit 198, mode selector circuit 196 and halftone mode threshold generator 194. The image density data represented by the shaded digital image density data signals $S_{SDD}$ output from the shading generator circuit 188 are thus processed in the binarizing comparator circuit 190 on the basis of the bits $d_3$, $d_1$ and $d_0$ of the attribute signal $S_{ATT}$ and further in the image signal output circuit 198 on the basis of the bit $d_2$ of the attribute signal $S_{ATT}$.

Subsequently to step G11, the central processing unit 172 detects at step G12 whether or not the lamp/mirror carrier 118 and mirror carrier 120 have reached the positions effective to scan the trailing end of the document D on the document support table 102. The step G12 is repeated until it is confirmed that the document D on the document support table 102 has been scanned to its trailing end. When it is thus determined at step G12 that the scanning of the document D on the document support table 102 is complete and accordingly the answer for the step G12 turns affirmative, the central processing unit 172 proceeds to step G13 to reset the valid image area signal $S_{VIA}$ which has been supplied to the control terminal of the image signal output circuit 198.

The central processing unit 172 then proceeds to step G14 to cease the supply of the control signal $S_{EXP}$ to the voltage regulator circuit 184 to de-activate the exposure lamp 106. The step G14 is followed by step G15 at which the central processing unit 172 supplies the motor actuation signal $S_{MD1}$ to the motor driver circuit 178 for the scanner drive motor 132. Responsive to the motor actuation signal $S_{MD1}$ thus received from the central processing unit 172, the motor driver circuit 178 actuates the scanner drive motor 132 into operation to move the lamp/ mirror and mirror carriers 118 and 120 toward their home positions in the directions indicated by arrowheads a' and b' in FIG. 1.

The central processing unit 172 then detects at step G16 whether or not the lamp/mirror and mirror carriers 118 and 120 have reached their respective home positions. The step G16 is repeated until it is confirmed that the lamp/mirror and mirror carriers 118 and 120 have reached their respective home positions. When it is thus found at step G16 that the carriers 118 and 120 have reached their respective home positions and accordingly the answer for the step G16 turns affirmative, the central processing unit 172 proceeds to step G17 to reset the signal $S_{MD1}$ and stop the scanner drive motor 132. Subsequently, the central processing unit 172 reverts to the main routine program described with reference to FIG. 16 to check if any other command signal is received from the control panel 140B or from the editor module 140A.

Third Preferred Embodiment (FIGS. 20 to 24)

Description will be hereinafter made in regard to a third preferred embodiment of an image reading apparatus according to the present invention. The third preferred embodiment of the present invention is a modification of the second preferred embodiment of the invention and is thus also characterized by the capabilities to designate a particular local area within a document and read the image in the particular area in a desired mode of image reading operation. In the third preferred embodiment of the present invention is used the control panel 140B described with reference to FIG. 14 in addition to the mechanical and optical arrangement described with reference to FIG. 1.

FIG. 20 shows an editor module 200B for use in the third preferred embodiment of the present invention. Similarly to its counterpart in the second preferred embodiment of the present invention, the editor module 200B herein shown largely consists of a tablet section 202 and a key section 204 comprising a total of nine control keys. The tablet section 202 of the editor module 200B is used in combination with a light pen to define a desired local area within the image-carrying document to be reproduced. As has been noted with reference to FIG. 13, a square-shaped rectangular area of a document D such as the area "A1" or the area "A2" herein indicated by phantom lines can be defined simply by specifying the locations of the opposite ends of one of the diagonals of the area "A1" or the area "A2" with use of a light pen.

The control keys provided in the key section 204 of the editor module 200B include a trimming key "F1", a masking key "F2", a white/black reverse key "F3", a simple binarization mode select key "F4", a first dither-pattern halftone mode select key "F5", a second dither-pattern halftone mode select key "F6", and a trim/mask cancel key "F7". The functions achievable through use of these keys "F1" to "F7" are similar to those of their respective equivalents provided in the editor module 200A described with reference to FIG. 13. In the key section 204 of the editor module 200B are further provided a data-clear key "C" and a data-send key "S", which are also similar to their respective equivalents provided in the editor module 200A shown in FIG. 13.

In the key section 204 of the editor module 200B used in the third preferred embodiment of the present invention are provided additional control keys which include an image editing key "E", a density control key "D", a simple binarization density key "SB", a halftone density key "HT", a density "plus" key 216, and a density "minus" key 218. The density "plus" and "minus" keys 216 and 218 are respectively provided to permit entry of instructions from the editor module 200B to increase and decrease the valid degree of lightness for image reading. In association with these density "plus" and "minus" keys 216 and 218 is provided a density indicator section 220 consisting of a series of subsections arranged in the order of lightness indicated by numerals "1" to "9". The subsection indicating the selected density for image reading is to be highlighted with the highlight stepwise moved in one direction along the indicator section 220 each time the density "plus" key 216 is depressed or in the opposite direction along the indicator section 220 each time the density "minus" key 218 is depressed by the operator.

The image editing key "E" is used to enter an instruction to select the modes of operation designated through the keys "F1" to "F7" in respect of the designated local area "A1" or "A2" of the document D. The density control key "D" is used to enter an instruction that the image density for the specified local area "A1" or "A2" of the document D is to be designated from the density "plus" key 216 or from the density "minus" key 218. The simple binarization density key "SB" is used to enter an instruction that the simple binarization mode of image reading operation is to be selected for the image density designated or to be designated through use of the density "plus" or "minus" key 216 or 218. Likewise, the halftone density key "HT" is used to enter an instruction that the halftone mode of image reading operation is to be selected for the image density designated or to be designated through use of the density "plus" or "minus" key 216 or 218.

In the third preferred embodiment of the present invention, the operator's desired mode of operation can be selected either from the control panel 140B shown in FIG. 9 or from the editor module 200B shown in FIG. 20.

When it is desired that the control panel 140B shown in FIG. 9 be used for the entry of instructions to select the desired modes of operation, it is first confirmed if the editor communication grant key 206 has been depressed to enter an instruction to grant reception of data and commands from the editor module 200B. If it is found that the key 206 has been depressed, the key 206 is depressed for a second time to cancel such an instruction. After the instruction is thus cancelled, the simple binarization density key "SB" may be depressed to enter an instruction to select the simple binarization mode of image reading operation before the desired density for image reading is designated through use of the density "plus" or "minus" key 216 or 218. Alternatively, the halftone density key "HT" may be depressed after the instruction is cancelled so that an instruction is entered to select the halftone mode of image reading operation before the desired density for image reading is designated through use of the density "plus" or "minus" key 216 or 218.

On the other hand, when it is desired that the editor module 200B shown in FIG. 20 be used for the entry of instructions to select the desired modes of operation, the editor communication grant key 206 is depressed to enter an instruction to grant reception of data and commands from the editor module 200B. After such an instruction is entered, the functions to be used for the edited mode of image reading operation may be selected from the keys "F1" to "F7" or the density for image reading may be designated from the density "plus" or "minus" key 216 or 218 on the editor module 200B.

If it is desired that the functions to be used for the edited mode of image reading operation be selected from the keys "F1" to "F7", the image editing key "E" on the editor module 200B is depressed prior to selection of the functions to inform that the functions to be used for the edited mode of image reading operation are to be selected from the keys "F1" to "F7". After the image editing key "E" is thus depressed, a desired local area of the document D on the tablet section 202 such as the area "A1" or "A2" as shown in FIG. 20 is designated by specifying the locations of a diagonal of the area area "A1" or "A2" with use of a light pen. Any one or ones of the keys "F1" to "F7" may then be depressed to select the functions to be used for the edited mode of image reading operation to be carried out for the specified local area "A1" or "A2" of the document D on the tablet section 202. The data-send key "S" may be thereafter depressed to enter an instruction to transmit to the control circuit of the apparatus the data and commands generated through manipulation of any of the keys on the editor module 200B for the specified local area "A1" or "A2" of the document D placed on the tablet section 202.

On the other hand, if it is desired that the density for image reading be designated from the density "plus" or "minus" key 216 or 218, the density control key "D" on the editor module 200B is depressed prior to selection of the density for image reading to inform that the image reading density to be used for the edited mode of image reading operation is to be designated from the key 216 or 218. After the density control key "D" is thus depressed, a desired local area of the document D on the tablet section 202 such as the area "A1" or "A2" as shown in FIG. 20 is designated by specifying the locations of a diagonal of the area area "A1" or "A2" with use of a light pen. The image density to be used for the reading of the image in the specified local area "A1" or "A2" of the document D is then designated through use of the density "plus" key 216 or the density "minus" key 218. Thereafter, either the simple binarization density key "SB" or the halftone density key "HT" is depressed to enter an instruction that the simple binarization or halftone mode of image reading operation is to be selected for the image density which has been designated through use of the density "plus" or "minus" key 216 or 218. The data-send key "S" may be thereafter depressed to enter an instruction to transmit to the control circuit of the apparatus the data and commands generated through manipulation of any of the keys on the editor module 200B for the specified local area "A1" or "A2" of the document D placed on the tablet section 202.

Figure 21:
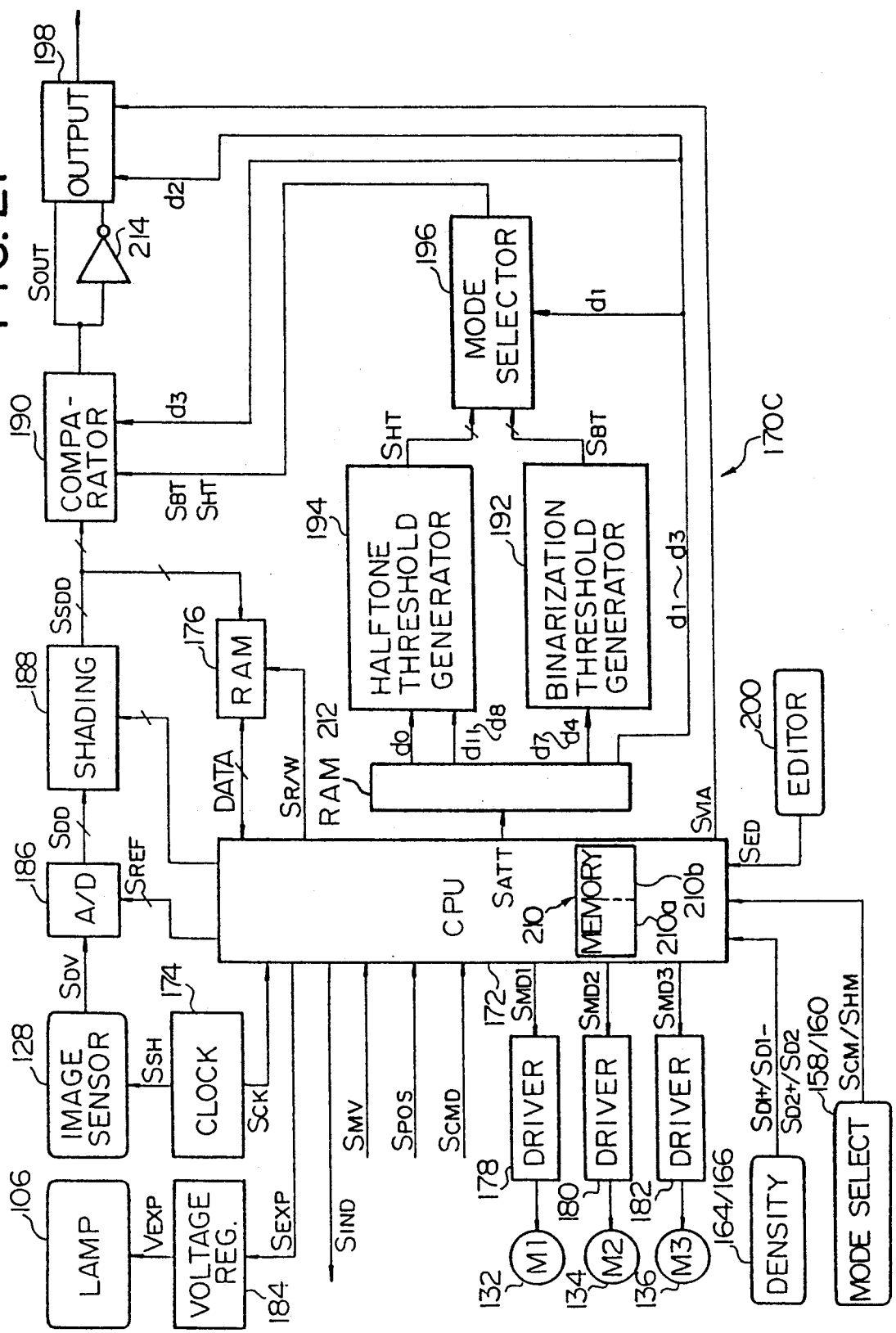
FIG. 21 is a block diagram similar to FIG. 15 but now shows the general construction and arrangement of a control circuit for use in the third preferred embodiment of an image reading apparatus according to the present invention.

FIG. 21 shows the general construction and arrangement of a control circuit 170C for use in the third preferred embodiment of an image reading apparatus according to the present invention. The control circuit 170C for use in the third preferred embodiment of the present invention is essentially similar to the control circuit 170B of the second preferred embodiment of the present invention. In the control circuit 170C herein shown, the central processing unit 172 is thus responsive not only to the various command signals supplied from the control panel 140B but to various data and command signals $S_{ED}$ generated in and supplied from the editor module 200B hereinbefore described with reference to FIG. 20. It may be noted that the data and command signals $S_{ED}$ supplied from the editor module 200B in the third preferred embodiment of the present invention include not only the command signals generated by any of the keys "F1" to "F7", "C" and "S" as in the first preferred embodiment of the present invention but also the command signals which may be generated by any of the image editing key "E", density control key "D", simple binarization density key "SB", halftone density key "HT", density "plus" key 216, and density "minus" key 218 provided on the editor module 200B. As has been noted in regard to the second preferred embodiment of the present invention, the data and command signals generated by any of these keys on the editor module 200B are accepted by the central processing unit 172 only when the editor communication grant key 206 is depressed and are invalidated when the key 206 is depressed after the key was once depressed.

In the control circuit 170C illustrated in FIG. 21, the central processing unit 172 has incorporated therein an internal memory 210 having a simple binarization mode density storage area 210a and a halftone mode density storage area 210b, as shown. Thus, when the valid density for image reading is designated from the character density "plus" or "minus" key 164a or 166a with the simple binarization mode of image reading operation selected from the character mode select key 158 on the control panel 140B, the data representing the density is stored into the simple binarization mode density storage area 210a of the internal memory 210. On the other hand, when the valid density for image reading is designated from the halftone density "plus" or "minus" key 164b or 166b with the halftone mode of image reading operation selected from the halftone mode select key 160 on the control panel 140B, the data representing the density is stored into the halftone mode density storage area 210b of the internal memory 210.

Responsive to the data and command signals $S_{ED}$ supplied from the editor module 200B and/or to the signal supplied from any of the density "plus" and "minus" keys 164a, 164b, 166a and 166b on the control panel 140B, the central processing unit 172 generates a twelve-bit attribute signal $S_{ATT}$ indicative of selected ones of the attributes of image reading operation. The attribute signal $S_{ATT}$ thus representative of the selected attributes of image reading operation is supplied to and stored into an attribute memory 212 implemented by a semiconductor random-access. Fractions of the signal $S_{ATT}$ thus stored into the attribute memory 212 are supplied to the comparator circuit 190, simple binarization threshold generator circuit 192, halftone threshold generator circuit 194, simple-binarization/halftone mode selector circuit 196, and image signal output circuit 198 as will be described in more detail.

The image signal output circuit 198 used in the control circuit 170C illustrated in FIG. 21 also has two input terminals one of which is connected directly to the output terminal of the comparator circuit 190 and the other of which is connected through an inverter 214 to the output terminal of the comparator circuit 190 The binary image signals $S_{OUT}$ produced by the comparator circuit 190 responsive to the shaded digital image density data signals $S_{SDD}$ from the shading circuit 188 are thus supplied in non-inverted form to one input terminal of the output circuit 198 and in inverted form to the other input terminal of the output circuit 198.

The signal $S_{ATT}$ to be generated by the central processing unit 172 and stored into the attribute memory 212 is indicative of twelve different kinds of attributes in respect of an image pixel having a unit area measuring 1 mm by 1 mm and is provided in the form of a sequence of twelve bits $d_{11}$ to $d_0$ each of logic "1" or "0" state.

The upper four bits $d_{11}$ to $d_8$ of the attribute signal $S_{ATT}$ provide a first fraction of the signal $S_{ATT}$ and specify the image density for use in the halftone mode of image reading operation. The image density to be specified by the bits $d_{11}$ to $d_8$ of the attribute signal $S_{ATT}$ may be any one of the nine different image densities "1" to "9" assigned to the individual subsections, respectively, of the density indicator section 220 of the editor module 200B. The first fraction of the attribute signal $S_{ATT}$ thus provided by the upper four bits $d_{11}$ to $d_8$ of the signal $S_{ATT}$ is supplied to the halftone mode threshold generator circuit 194 and designates one of the nine different image densities "1" to "9" to be used in the halftone mode of image reading operation.

The intermediate four bits $d_7$ to $d_4$ of the attribute signal $S_{ATT}$ provide a second fraction of the signal $S_{ATT}$ and specify the image density for use in the simple binarization mode of image reading operation. The image density to be specified by the bits $d_7$ to $d_4$ of the attribute signal $S_{ATT}$ may also be any one of the nine different image densities "1" to "9" assigned to the individual subsections, respectively, of the density indicator section 220 of the editor module 200B. The second fraction of the attribute signal $S_{ATT}$ thus provided by the intermediate four bits $d_7$ to $d_4$ of the signal $S_{ATT}$ is supplied to the simple binarization mode threshold generator circuit 192 and designates one of the nine different image densities "1" to "9" to be used in the simple binarization mode of image reading operation.

The remaining lower four bits $d_3$ to $d_0$ of the attribute signal $S_{ATT}$ provide third to sixth fractions, respectively, of the signal $S_{ATT}$ and are similar to their respective equivalents of the attribute signal $S_{ATT}$ used in the control circuit 170B of the second preferred embodiment of the present invention as hereinbefore described with reference to FIG. 15.

Thus, the bit $d_3$ of the attribute signal $S_{ATT}$ providing the third fraction of the signal $S_{ATT}$ indicates selection of the blanking out of an image pixel when set to logic "0" state and selection of the non-blanking of a pixel when set to logic "1" state. The third fraction of the attribute signal $S_{ATT}$ thus provided by the bit $d_3$ of the signal $S_{ATT}$ is supplied to the control terminal of the comparator circuit 190 and, when the bit $d_3$ is set to logic "0" state, enables the comparator circuit 190 to white out the specified image pixel (or blacken out the pixel in the presence of the white/black reversing bit $d_2$ of logic "1" state).

The bit $d_2$ of the attribute signal $S_{ATT}$ providing the fourth fraction of the signal $S_{ATT}$ indicates selection of the non-reversing of the white and black features of an image when set to logic "0" state and selection of the reversing of the white and black features of an image when set to logic "1" state. The fourth fraction of the attribute signal $S_{ATT}$ thus provided by the bit $d_2$ of the signal $S_{ATT}$ is supplied to one control terminal of the image signal output circuit 198. To another control terminal of the image signal output circuit 198 is supplied a valid image area signal $S_{VIA}$ of logic "1" or "0" state from the central processing unit 172. Thus, the image signal output circuit 198 in the control circuit 170C of the third preferred embodiment of the present invention also receives the binary image signals $S_{OUT}$ supplied both in inverted and non-inverted forms from the comparator circuit 190, the bit $d_2$ of the attribute signal $S_{ATT}$ supplied from the attribute memory 212, and the valid image area signal $S_{VIA}$ supplied from the central processing unit 172.

The bit $d_1$ of the attribute signal $S_{ATT}$ providing the fifth fraction of the signal $S_{ATT}$ indicates selection of the simple binarization mode of image reading operation when set to logic "0" state and selection of the halftone mode of image reading operation when set to logic "1" state. The fifth fraction of the attribute signal $S_{ATT}$ thus provided by the bit $d_1$ of the signal $S_{ATT}$ is supplied to the control terminal of the simple-binarization/halftone mode selector circuit 196. Responsive to this mode select bit $d_1$, the simple-binarization/halftone mode selector circuit 196 supplies either the simple binarization threshold signal $S_{BT}$ or the halftone threshold signal $S_{HD}$ depending on the logic state of the bit $d_1$.

The bit $d_0$ of the attribute signal $S_{ATT}$ providing the sixth fraction of the signal $S_{ATT}$ indicates selection of the first prescribed dither pattern simple binarization when set to logic "0" state and selection of the the second dither when set to logic "1" state. The sixth fraction of the attribute signal $S_{ATT}$ thus provided by the bit $d_0$ of the signal $S_{ATT}$ is supplied to the halftone threshold generator circuit 194, which is thus enabled to select the first or second prescribed dither pattern depending on the logic state of the bit $d_0$.

While the bits $d_3$, $d_2$ and $d_0$ of the attribute signal $S_{ATT}$ used in the second preferred embodiment of the present invention are to be generated exclusively responsive to command signal supplied from the editor module 200B, the other bits $d_{11}$ to $d_4$ and $d_1$ of the attribute signal $S_{ATT}$ may be generated either responsive to command signals supplied from the editor module 200B or responsive to command signals supplied from the control panel 200B described with reference to FIG. 14. The central processing unit 172 responsive to command signals supplied from the editor module 200B is enabled to generate the bits $d_{11}$ to $d_4$ and $d_1$ of the attribute signal $S_{ATT}$ on condition that the editor communication grant key 206 is depressed to grant transmission of data and command signals from the editor module 200 to the central processing unit 172. Any data and command signals which may be produced in the editor module will be invalidated when the key 206 is depressed for a second time.

When the editor communication grant key 206 is depressed so that transmission of data and command signals from the editor module 200 to the central processing unit 172, the upper four bits $d_{11}$ to $d_8$ of the attribute signal $S_{ATT}$ are generated in response to the signals produced by depression of the density control key "D", the halftone density key "HT", and one of the density "plus" and "minus" keys 216 and 218 on the editor module 200B. The data representing the bits $d_{11}$ to $d_8$ thus generated by the central processing unit 172 are stored into the halftone mode density storage area 210b of the internal memory 210. The intermediate four bits $d_7$ to $d_4$ of the attribute signal $S_{ATT}$ are generated by the central processing unit 172 in response to the signals produced by depression of the density control key "D", the simple binarization density key "SB", and one of the density "plus" and "minus" keys 216 and 218. The data representing the bits $d_7$ to $d_4$ thus generated by the central processing unit 172 are stored into the simple binarization mode density storage area 210a of the internal memory 210.

Of the remaining lower four bits $d_3$ to $d_0$ of the attribute signal $S_{ATT}$, the bit $d_3$ is set to logic "0" state when the trimming key "F1" or the masking key "F2" on the editor module 200B is depressed, and the bit $d_2$ is set to logic "1" state when the white/black reverse key "F3" on the editor module 200B is depressed. The bit $d_1$ of the attribute signal $S_{ATT}$ is set to logic "0" state when the simple binarization mode select key "F4" on the editor module 200B is depressed, and the bit $d_0$ of the attribute signal $S_{ATT}$ is set to logic "0" state when the first dither-pattern halftone mode select key "F5" on the editor module 200B is depressed and is set to logic "1" state when the second dither-pattern halftone mode select key "F6" on the editor module 200B is depressed.

On the other hand, when the editor communication grant key 206 which has once been depressed is depressed for a second time, transmission of data and command signals from the editor module 200A to the central processing unit 172 is prohibited so that the central processing unit 172 is qualified to generate the bits $d_{11}$ to $d_4$ and $d_0$ of the attribute signal $S_{ATT}$ in response to data and command signals produced by any of the keys provided on the control panel 140B described with reference to FIG. 9.

In this instance, the upper four bits $d_{11}$ to $d_8$ of the attribute signal $S_{ATT}$ are generated in response to the density step-up signal $S_{D2+}$ produced by depression of the halftone density "plus" key 164b or the density step-down signal $S_{D2-}$ produced by depression of the halftone density "minus" key 166b in the presence of the halftone mode select signal $S_{HM}$ produced by depression of the halftone mode select key 160 on the control panel 140B. The data representing the bits $d_{11}$ to $d_8$ thus generated by the central processing unit 172 are stored into the halftone mode density storage area 210b of the internal memory 210. The intermediate four bits $d_7$ to $d_4$ of the attribute signal $S_{ATT}$ are generated by the central processing unit 172 in response to the density step-up signal $S_{D1+}$ produced by depression of the character density "plus" key 164a or the density step-down signal $S_{D1-}$ produced by depression of the character density "minus" key 166a in the presence of the character mode select signal $S_{CM}$ produced by depression of the character mode select key 158 on the control panel 140B. The data representing the bits $d_7$ to $d_4$ thus generated by the central processing unit 172 are stored into the character mode density storage area 210a of the internal memory 210.

On the other hand, the bit $d_1$ of the attribute signal $S_{ATT}$ is set to logic "0" state when the character mode select key 158 on the control panel 140B is depressed and to logic "1" state when the halftone mode select key 160 on the control panel 140B is depressed. When transmission of data and command signals from the editor module 200A to the central processing unit 172 is prohibited with the editor communication grant key 206 depressed after the key 206 was once depressed, the remaining bits $d_3$, $d_2$ and $d_0$ of the attribute signal $S_{ATT}$ are set to the logic states assigned to the standard modes of operation predetermined by default rules and could not be varied from the control panel 140B. These standard modes of operation represented by the bits $d_3$, $d_2$ and $d_0$ of such logic states are the non-blanking of a pixel represented by the bit $d_3$ of logic "1" state, the non-reversing of the white and black features of an image represented by the bit $d_2$ of logic "0" state, and the first prescribed dither pattern simple binarization represented by the bit $d_0$ of logic "0".

As in the control circuit 170B of the second preferred embodiment of the present invention, the image density data in the form of the shaded digital image density data signals $S_{SDD}$ supplied to the comparator circuit 190 is compared with the simple binarization threshold signal $S_{BT}$ supplied from the simple binarization threshold generator circuit 192 or with the halftone image-density signal $S_{HD}$ supplied from the halftone threshold signal generator circuit 194 through the simple-binarization/halftone mode selector circuit 196. The comparator circuit 190 is thus operative to generate binary image signals each of logic "1" or "0" state responsive to the shaded digital image density data signals $S_{SDD}$.

In the meantime, the data representing the valid density for image reading is stored in the simple binarization mode density storage area 210a or the halftone mode density storage area 210b of the internal memory 210 of the central processing unit 172. As has been noted, this data has been originally generated on the basis of the command signals produced by the density "plus" key 216 or the density "minus" key 218 on the editor module 200B or the command signals produced by the density "plus" key 164a or 164b or the density "minus" key 166b or 166b on the control panel 140B. The central processing unit 172 formulates the attribute signal $S_{ATT}$ on the basis of the data thus stored in the simple binarization or halftone mode density storage area 210a or 210b of the internal memory 210 of the central processing unit 172 and load the signal $S_{ATT}$ into the attribute memory 212. The attribute memory 212 then distributes the bits $d_{11}$ to $d_8$ and $d_0$ to the halftone threshold generator circuit 194, the bits $d_7$ to $d_4$ to the simple binarization threshold generator circuit 192, the bit $d_3$ to the comparator circuit 190, the bit $d_2$ to the image signal output circuit 198, and the bit $d_1$ to the simple-binarization/halftone mode selector circuit 196 as has been described.

Responsive to the bits $d_7$ to $d_4$ of the attribute signal $S_{ATT}$ or the bits $d_{11}$ to $d_8$ and $d_0$ of the attribute signal $S_{ATT}$ thus supplied from the central processing unit 172, the simple binarization threshold generator circuit 192 outputs the simple binarization threshold signal $S_{BT}$ indicative of a stepwise variable threshold value for use in the simple binarization mode of image reading operation, or the halftone threshold generator circuit 194 outputs the halftone threshold signal $S_{HT}$ indicative of a stepwise variable threshold value for use in the halftone mode of image reading operation. The halftone threshold signal $S_{HT}$ output from the halftone threshold generator circuit 194 is stepwise variable in accordance with the first or second dither pattern depending on the logic state of the bit $d_0$ of the attribute signal $S_{ATT}$. The simple binarization threshold signal $S_{BT}$ thus output from the simple binarization threshold generator circuit 192 or the halftone threshold signal $S_{HT}$ output from the halftone threshold signal generator circuit 194 is supplied to the comparator circuit 190 through the simple-binarization/halftone mode selector circuit 196 depending on the logic state of the mode select bit $d_1$ which forms part of the attribute signal $S_{ATT}$ received from the attribute memory 212.

Each of these binary image signals generated in the comparator circuit 190 responsive to the shaded digital image density data signals $S_{SDD}$ is combined with the bit $d_3$ of the attribute signal $S_{ATT}$ in a logic "AND" operation so that a binary image signal of logic "1" or "0" state is generated in response to each of the shaded digital image density data signals $S_{SDD}$. Each of the binary image signals thus generated is further combined in a logic "AND" operation with the simple binarization threshold signal $S_{BT}$ output from the simple binarization threshold generator circuit 192 or the halftone threshold signal $S_{HT}$ output from the halftone threshold signal generator circuit 194 with the result that a binary image signal $S_{OUT}$ of logic "1" or "0" state is generated in respect of each of the shaded digital image density data signals $S_{SDD}$. The comparator circuit 190 supplies the output signals $S_{OUT}$ in non-inverted form to one input terminal of the image signal output circuit 198 and in inverted form to the other input terminal of the output circuit 198 through the inverter 214.

Responsive to the white/black reversing bit $d_2$ of the attribute signal $S_{ATT}$, the image signal output circuit 198 elects either the non-inverted binary image signals $S_{OUT}$ or the inverted versions of the signals $S_{OUT}$ depending on the logic state of the white/black reversing bit $d_2$. Each of the non-inverted binary image signals $S_{OUT}$ or of the inverted versions of the signals $S_{OUT}$ is combined with the valid image area signal $S_{VIA}$ of logic "1" or "0" state from the central processing unit 172 in a logic "AND" operation. The resultant binary signals are delivered to a signal processing circuit of any external output unit such as a printer or a display unit (not shown) to reproduce the image represented by the output signals from the signal output circuit 198.

Figure 22:
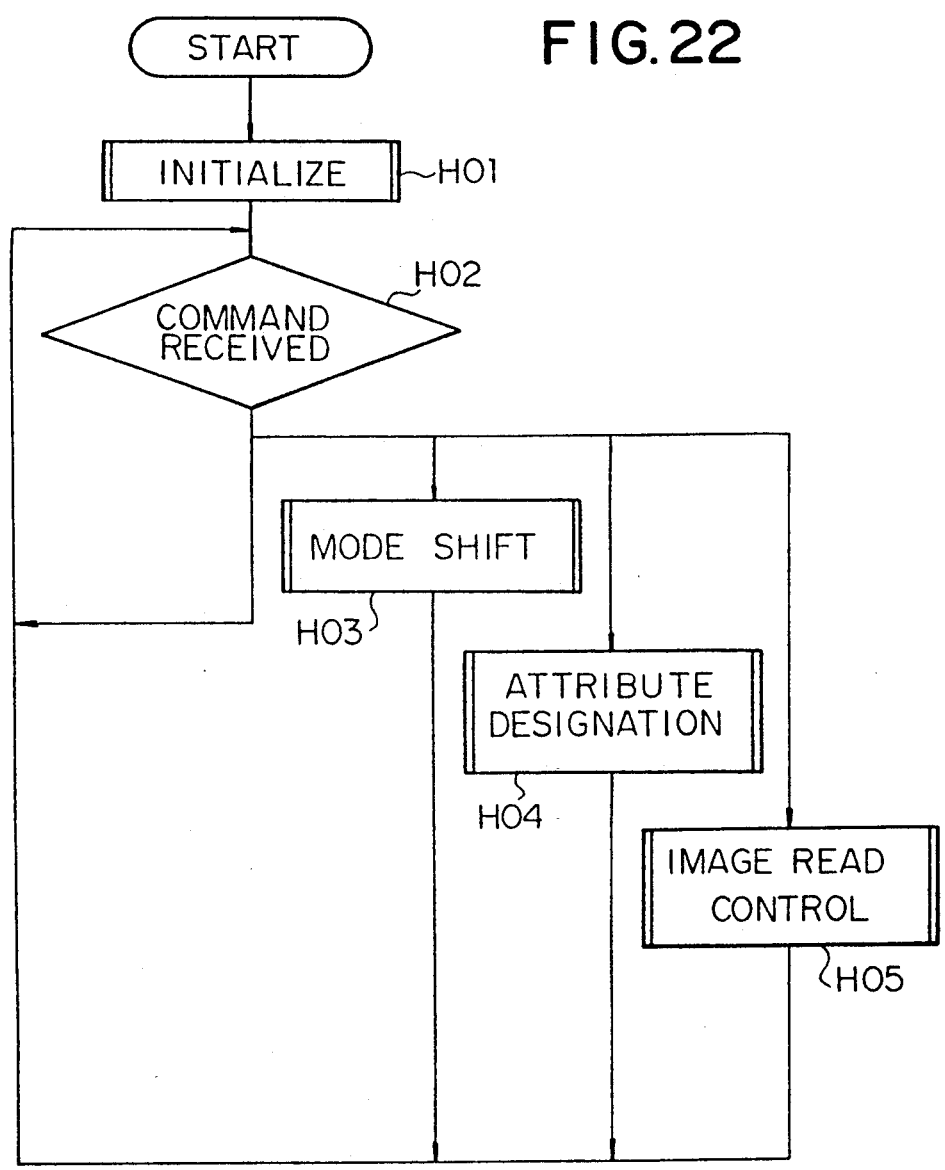
FIG. 22 is a flowchart showing a main routine program to be executed by the central processing unit included in the control circuit illustrated in FIG. 21.

FIG. 22 is a flowchart showing a main routine program to be executed by the central processing unit 172 included in the control circuit hereinbefore described with reference to FIG. 21.

The execution of the main routine program shown in FIG. 22 is started when the apparatus is initially switched in. The main routine program starts with step H01 at which the registers included in the central processing unit 172 and the line memory 176 are reset. The step H01 is followed by step H02 to check for any command signal supplied from the control panel 140B (FIG. 14). The command signal to be checked for at this step H02 may be the signal $S_{CMD}$ supplied from any of the scan start key 142, common clear key 144, image scale-up and scale-down keys 148 and 150 and sheet size select keys 154 and 156, or the character mode select signal $S_{CM}$ supplied from the character mode select key 158, the halftone mode select signal $S_{HM}$ supplied from the halftone mode select key 160, the density step-up signal $S_{D1+}$ or $S_{D1-}$ supplied from the character density "plus" or "minus" key 164a 166a, or the density step-down signal $S_{D2+}$ or $S_{D2-}$ supplied from the halftone density "plus" or "minus" key 164b or 166b. When the editor communication grant key 206 is depressed on the control panel 140B, it is checked at step H02 if there is a command signal supplied from any of the keys "F1" to "F7", "E", "D", "SB" and "HT" on the editor module 200B. In the absence detected of any command signal supplied from the control panel 140B or the editor module 200B, the central processing unit 172 repeats the step H02 until it is found that there is any command signal $S_{CMD}$ received from the control panel 140B.

The central processing unit 172 proceeds to step H03 and executes a mode shift subroutine program if it is detected at step H02 that there is the signal from the image scale-up or scale-down key 148 or 150, the signal from the sheet size select key 154 or 156, the character mode select signal $S_{CM}$ from the character mode select key 158, the halftone mode select signal $S_{HM}$ from the halftone mode select key 160, the density step-up or step-down signal $S_{D1+}$ or $S_{D1-}$ from the character density "plus" or "minus" key 164a or 166a, or the density step-up or step-down signal $S_{D2+}$ or $S_{D2-}$ from the halftone density "plus" or "minus" key 164b or 166b. Responsive to any of these signals supplied from the control panel 140B, the central processing unit 172 executes the steps required by the supplied signal on condition that the mode of operation requested by the signal is validly acceptable in the apparatus. The details of this mode shift subroutine program H03 will be hereinafter described with reference to FIG. 23.

On the other hand, if it is detected at step H02 that there is a command signal supplied from any of the keys "F1" to "F7" on the editor module 200B, the central processing unit 172 proceeds to subroutine program H04 and executes an area attribute designation control subroutine program. The central processing unit 172 is enabled to execute this area attribute designation control subroutine program H04 when, and only when, the editor communication grant key 206 on the control panel 140B is depressed to grant transmission of data and command signals from the editor module 200 to the central processing unit 172. The details of the area attribute designation control subroutine program H04 will be hereinafter described with reference to FIG. 24.

If it is detected at step H02 that there is the signal supplied from the scan start key 142 on the control panel 140B, the central processing unit 172 proceeds to subroutine program H05 and executes an image read control subroutine program. The details of this image read control subroutine program H05 are essentially similar to those which have been described with reference to FIGS. 19A and 19B in regard to the second preferred embodiment of the present invention and, as such, will not be herein described.

Figure 23:
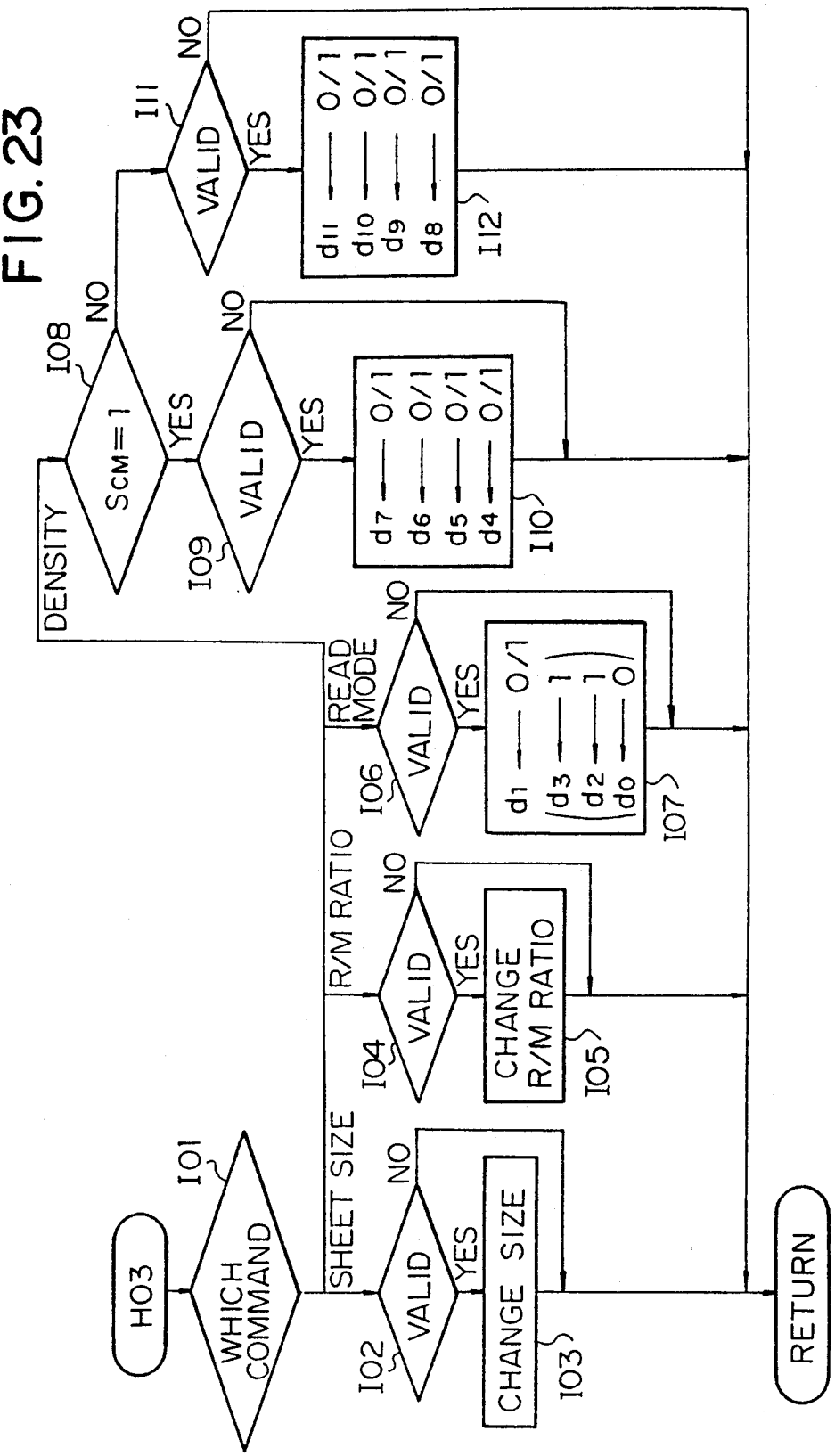
FIG. 23 is a flowchart showing the details of a mode shift subroutine program included in the main routine program illustrated in FIG. 22.

FIG. 23 shows the details of the mode shift subroutine program H03 included in the routine program hereinbefore described with reference to FIG. 22.

The mode shift subroutine program H03 starts with step I01 to determine which command signal is received from the control panel 140B. Thus, if it is detected at step I01 that there is the signal received from the sheet size select key 154 or 156, the central processing unit 172 proceeds to step I02 to check if the request for the size of print output sheets designated by the signal received is validly acceptable in the apparatus and/or the external printer unit. If the answer for this step I02 is given in the affirmative, the central processing unit 172 proceeds to step I03 to select the size of print output sheets designated by the signal received and thereafter reverts to the main routine program described with reference to FIG. 22 to check if any other command signal is received from the control panel 140B or the editor module 200B. If it is determined at step I02 that the request for the size of print output sheets designated by the signal received is not validly acceptable and accordingly the answer for step I02 is given in the negative, the central processing unit 172 immediately reverts to the main routine program described with reference to FIG. 22 to check if any other command signal is received from the control panel 140B or the editor module 200B.

If it is detected at step I01 that there is the signal received from the image scale-up or scale-down key 148 or 150, the central processing unit 172 proceeds to step I04 to check if the request for the reduction/magnification ratio designated by the signal received is validly acceptable in the apparatus and/or the external printer unit. If the answer for this step I04 is given in the affirmative, the central processing unit 172 proceeds to step I05 to select the reduction/magnification ratio designated by the signal received and thereafter reverts to the main routine program described with reference to FIG. 22 to check if any other command signal is received from the control panel 140B or the editor module 140B. If it is determined at step I04 that the request for the reduction/magnification ratio designated by the signal received is not validly acceptable and accordingly the answer for step I04 is given in the negative, the central processing unit 172 immediately reverts to the main routine program described with reference to FIG. 22 to check if any other command signal is received from the control panel 140B or the editor module 200B.

If it is detected at step I01 that there is the character mode select signal $S_{CM}$ received from the character mode select key 158 or the halftone mode select signal $S_{HM}$ received from the halftone mode select key 160, the central processing unit 172 proceeds to step I06 to check if the request for the simple binarization or halftone mode of image reading operation requested by the signal $S_{CM}$ or $S_{HM}$ received is validly acceptable in the apparatus. If the answer for this step I06 is given in the affirmative, the central processing unit 172 proceeds to step I07 to select the simple binarization or halftone mode of image reading operation requested by the signal $S_{CM}$ or $S_{HM}$ received and sets the bit $d_1$ of the attribute signal $S_{ATT}$ to logic "0" state or logic "1" state, respectively, for each of all the pixels to be reproduced. The bit $d_1$ thus set to logic "0" or "1" state and representative of the simple binarization or halftone mode of image reading operation as the selected attribute of the image reading operation to be performed is stored into the attribute memory 212 in the control circuit 170C. It may be herein noted that each of the bits $d_3$, $d_2$ and $d_0$ of the attribute signal $S_{ATT}$ is set to the logic state assigned to the predetermined standard mode of operation since the transmission of data and command signals from the editor module 200A to the central processing unit 172 is currently prohibited with the editor communication grant key 206 depressed after the key 206 was once depressed. Subsequently to step I07, the central processing unit 172 reverts to the main routine program described with reference to FIG. 22 to check if any other command signal is received from the control panel 140B or the editor module 200B.

If it is determined at step I06 that the request for the mode of image reading operation requested by the character or halftone mode select signal $S_{CM}$ or $S_{HM}$ received is not validly acceptable and accordingly the answer for step I06 is given in the negative, the central processing unit 172 immediately reverts to the main routine program described with reference to FIG. 22 to check if any other command signal is received from the control panel 140B or the editor module 200B.

If it is detected at step I01 that there is the density step-up signal $S_{D1+}$ or $S_{D2+}$ received from the density "plus" key 164a or 164b or there is the density step-down signal $S_{D1-}$ or $S_{D2-}$ received from the density "minus" key 166a or 166b on the control panel 140B, the central processing unit 172 proceeds to step I08 to check if there is the character mode select signal $S_{CM}$ received from the character mode select key 158 on the control panel 140B. If the answer for this step I08 is given in the affirmative, the central processing unit 172 proceeds to step I09 to check if the request for the density for image reading designated by the signal $S_{D1+}$ or $S_{D1-}$ or the signal $S_{D2+}$ or $S_{D2-}$ received is validly acceptable in the simple binarization mode of image reading operation. If the answer for this step I09 is given in the affirmative, the central processing unit 172 proceeds to step I10 to select the density for image reading designated by the signal $S_{D1+}$ or $S_{D1-}$ or the signal $S_{D2+}$ or $S_{D2-}$ received for the selected simple binarization mode of image reading operation. The central processing unit 172 thus sets the bits $d_7$ to $d_4$ of the attribute signal $S_{ATT}$ to logic "0" and/or "1" states for each of all the pixels to be reproduced. The bits $d_7$ to $d_4$ thus set to logic "0" and/or "1" states and representative any of the nine different densities "1" to "9" available in the simple binarization mode of image reading operation are also stored into the attribute memory 212 in the control circuit 170C. Subsequently to the step I10, the central processing unit 172 reverts to the main routine program described with reference to FIG. 22 to check if any other command signal is received from the control panel 140B or the editor module 200B.

If it is determined at step I08 that there is not the character mode select signal $S_{CM}$ received from the character mode select key 158 and as such the answer for step I08 is given in the negative, the central processing unit 172 proceeds to step I11 to check if the request for the density for image reading designated by the signal $S_{D1+}$ or $S_{D1-}$ or the signal $S_{D2+}$ or $S_{D2-}$ received for the selected simple binarization mode of image reading operation is validly acceptable in the halftone mode of image reading operation. If the answer for this step I11 is given in the affirmative, the central processing unit 172 proceeds to step I12 to select the density for image reading designated by the signal $S_{D1+}$ or $S_{D1-}$ or the signal $S_{D2+}$ or $S_{D2-}$ received for the selected halftone mode of image reading operation and sets the bits $d_{11}$ to $d_8$ of the attribute signal $S_{ATT}$ to logic "0" and/or "1" states for each of all the pixels to be reproduced. The bits $d_{11}$ to $d_8$ thus set to logic "0" and/or "1" states and representative any of the nine different densities "1" to "9" available in the halftone mode of image reading operation are also stored into the attribute memory 212 in the control circuit 170C. Subsequently to the step I12, the central processing unit 172 reverts to the main routine program described with reference to FIG. 22 to check if any other command signal is received from the control panel 140B or the editor module 200B. If it is determined at step I11 that the request for the density for image reading designated by the signal $S_{D1+}$ or $S_{D1-}$ or the signal $S_{D2+}$ or $S_{D2-}$ received for the selected halftone mode of image reading operation is not validly acceptable and accordingly the answer for step I11 is given in the negative, the central processing unit 172 immediately reverts to the main routine program described with reference to FIG. 22 to check if any other command signal is received from the control panel 140B or the editor module 200B.

Figure 24:
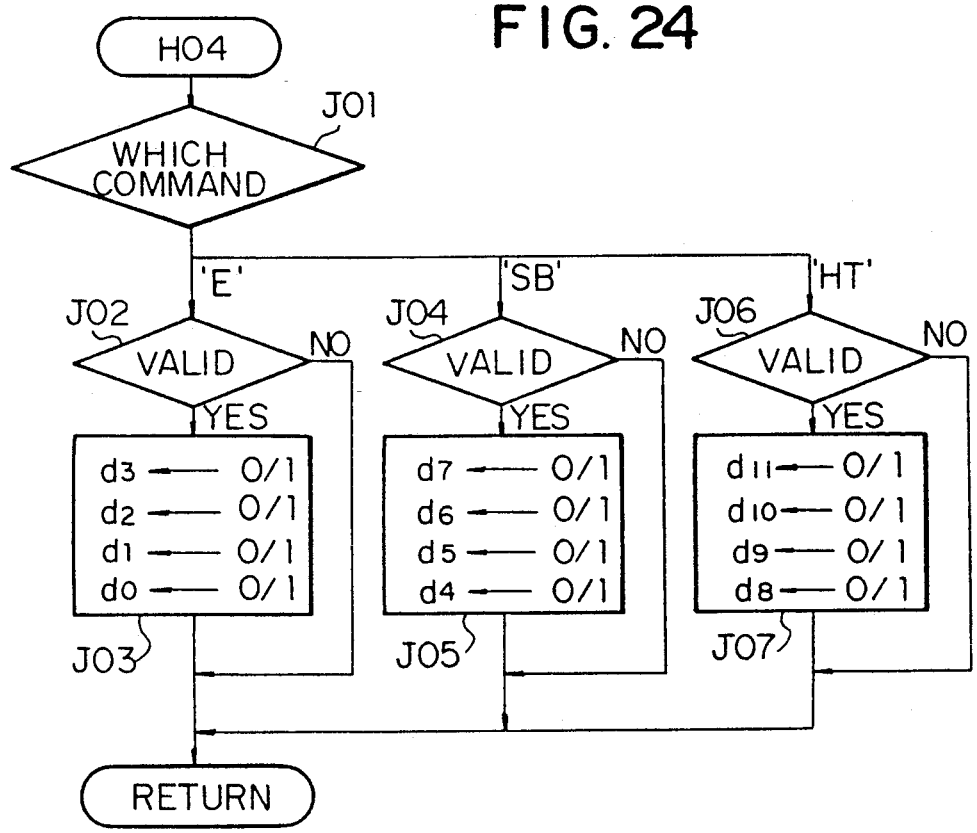
FIG. 24 is a flowchart showing the details of an area attribute designation control subroutine program also included in the main routine program illustrated in FIG. 16.

FIG. 24 shows the details of the area attribute designation control subroutine program H04 also included in the main routine program hereinbefore described with reference to FIG. 22. As has been noted, the central processing unit 172 is enabled to execute this area attribute designation control subroutine program H04 when, and only when, the editor communication grant key 206 on the editor module 200B is depressed to grant transmission of data and command signals from the editor module 200 to the central processing unit 172.

The area attribute designation control subroutine program H04 starts with step J01 to determine which command signal is received from the editor module 200B. The command signal to be detected at this step J01 may be the signal produced with any of the image editing key "E", density control key "D", simple binarization density key "SB" and halftone density key "HT" provided on the editor module 200B. As has been noted, the image editing key "E" is used to enter an instruction to select the modes of operation designated through the keys "F1" to "F7" in respect of the designated local area of the document D. The density control key "D" is used to enter an instruction that the image density for the specified local area "A1" or "A2" of the document D is to be designated from the density "plus" key 216 or from the density "minus" key 218. The simple binarization density key "SB" is used to enter an instruction that the simple binarization mode of image reading operation is to be selected for the image density designated or to be designated through use of the density "plus" or "minus" key 216 or 218. Likewise, the halftone density key "HT" is used to enter an instruction that the halftone mode of image reading operation is to be selected for the image density designated or to be designated through use of the density "plus" or "minus" key 216 or 218.

If it is detected at step J01 that there is the command signal received from the image editing key "E" on the editor module 200B, the central processing unit 172 proceeds to step J02 to check if the request for the modes of operation designated through the keys "F1" to "F7" on the editor module 200B in respect of the designated local area of the document D are validly acceptable in the apparatus and/or the external printer unit. If the answer for this step J02 is given in the affirmative, the central processing unit 172 proceeds to step J03 to select the modes of operation designated by the keys "F1" to "F7" and sets the lower four bits $d_3$, $d_2$, $d_1$ and $d_0$ of the attribute signal $S_{ATT}$ to logic "0" and/or logic "1" states for each of all the pixels in the designated local area of the document D. The bits $d_3$, $d_2$, $d_1$ and $d_0$ of the attribute signal $S_{ATT}$ thus set to logic "0" and/or logic "1" states and representative of the modes of operation designated by the keys "F1" to "F7" on the editor module 200B are stored into the attribute memory 212 in the control circuit 170C. The central processing unit 172 then reverts to the main routine program described with reference to FIG. 22 to check if any other command signal is received from the control panel 140B or from the editor module 200B. If it is determined at step J02 that the request for the modes of operation designated by the keys "F1" to "F7" are not validly acceptable and accordingly the answer for this step J02 is given in the negative, the central processing unit 172 immediately reverts to the main routine program described with reference to FIG. 22 to check if any other command signal is received from the control panel 140B or from the editor module 200B.

On the other hand, if it is detected at step J01 that there are the command signals received from the density control key "D" and the simple binarization density key "SB" on the editor module 200B, the central processing unit 172 proceeds to step J04 to check if the request for the image density for the specified local area of the document D as designated from the density "plus" key 216 or from the density "minus" key 218 is validly acceptable in the apparatus and/or the external printer unit. If the answer for this step J04 is given in the affirmative, the central processing unit 172 proceeds to step J05 to select the image density designated by the density "plus" or "minus" key 216 or 218 and sets the intermediate four bits $d_7$, $d_6$, $d_5$ and $d_4$ of the attribute signal $S_{ATT}$ to logic "0" and/or logic "1" states indicating the designated image density for each of all the pixels in the designated local area of the document D. The bits $d_7$, $d_6$, $d_5$ and $d_4$ of the attribute signal $S_{ATT}$ thus set to logic "0" and/or logic "1" states and representative of the image density designated by the density "plus" or "minus" key 216 or 218 on the editor module 200B are also stored into the attribute memory 212 in the control circuit 170C. The central processing unit 172 then reverts to the main routine program described with reference to FIG. 22 to check if any other command signal is received from the control panel 140B or from the editor module 200B. If it is determined at step J04 that the request for the image density designated by the density "plus" or "minus" key 216 or 218 is not validly acceptable and accordingly the answer for this step J04 is given in the negative, the central processing unit 172 immediately reverts to the main routine program described with reference to FIG. 22 to check if any other command signal is received from the control panel 140B or from the editor module 200B.

Furthermore, if it is detected at step J01 that there are the command signals received from the density control key "D" and the halftone density key "HT" on the editor module 200B, the central processing unit 172 proceeds to step J06 to check if the request for the image density for the specified local area of the document D as designated from the density "plus" key 216 or from the density "minus" key 218 is validly acceptable in the apparatus and/or the external printer unit. If the answer for this step J06 is given in the affirmative, the central processing unit 172 proceeds to step J07 to select the image density designated by the density "plus" or "minus" key 216 or 218 and sets the upper four bits $d_{11}$, $d_{10}$, $d_9$ and $d_8$ of the attribute signal $S_{ATT}$ to logic "0" and/or logic "1" states indicating the designated image density for each of all the pixels in the designated local area of the document D. The bits $d_{11}$, $d_{10}$, $d_9$ and $d_8$ of the attribute signal $S_{ATT}$ thus set to logic "0" and/or logic "1" states and representative of the image density designated by the density "plus" or "minus" key 216 or 218 on the editor module 200B are also stored into the attribute memory 212 in the control circuit 170C. The central processing unit 172 then reverts to the main routine program described with reference to FIG. 22 to check if any other command signal is received from the control panel 140B or from the editor module 200B. If it is determined at step J06 that the request for the image density designated by the density "plus" or "minus" key 216 or 218 is not validly acceptable and accordingly the answer for this step J06 is given in the negative, the central processing unit 172 immediately reverts to the main routine program described with reference to FIG. 22 to check if any other command signal is received from the control panel 140B or from the editor module 200B.

Fourth Preferred Embodiment (FIGS. 25 to 45)

Description will be hereinafter made in regard to a fourth preferred embodiment of an image reading apparatus according to the present invention. The fourth preferred embodiment of the present invention is characterized in that the valid density for image reading can be adjusted not only manually through manipulation of keys on the control panel but also in an automatic mode manually selected by the operator of the apparatus. In the fourth preferred embodiment of the present invention is also used the mechanical and optical arrangement described with reference to FIG. 1.

Figure 25:
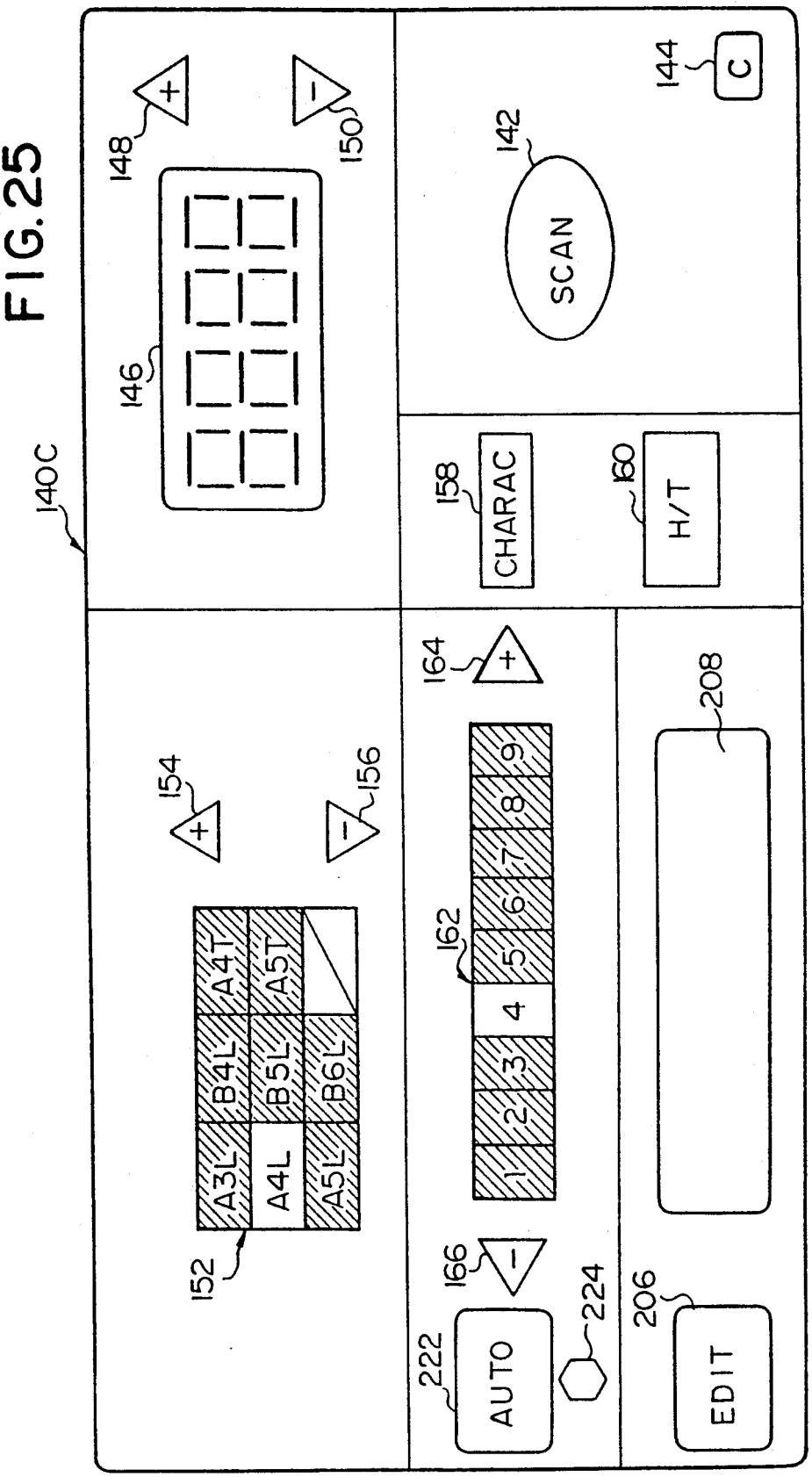
FIG. 25 is a plan view showing the key/indicator configuration of a control panel further included in a fourth preferred embodiment of an image reading apparatus according to the present invention.

FIG. 25 shows an example of the key/indicator configuration of a control panel 140C which also forms part of the fourth preferred embodiment of an image reading apparatus according to the present invention. On the control panel 140C are provided a scan start key 142, a common clear key 144, a four-digit eight-segment numerical display section 146, an image scale-up key 148, an image scale-down key 150, a sheet size indicator section 152, a first sheet size select key 154, a second sheet size select key 156, a character mode select key 158, and a halftone mode select key 160. The functions of these keys and display/indicator sections on the control panel 140C are similar to those of their respective equivalents in the control panel 140A described with reference to FIG. 2 and will not be herein described with reference to FIG. 25.

On the control panel 140C of the fourth preferred embodiment of the present invention is further provided a density indicator section 162 consisting of a series of subsections arranged in the order of lightness indicated by numerals "1" to "9". The density indicator section 162 is used to indicate the selected density for image reading manually entered through the control panel 140C. The operator of the apparatus is allowed to manually enter a desired density for image reading manually with use of a manual density "plus" key 164 to enter an instruction to increase the valid degree of lightness for image reading and a manual density "minus" key 166 to enter an instruction to decrease the valid degree of lightness.

The control panel 140C shown in FIG. 25 further comprises an editor communication grant key 206 (labelled "EDIT") used to enter an instruction to grant reception of data and commands from the editor module 200A, and an editor information display section 208 for visually indicating the data received from the editor module 200A. When the editor communication grant key 206 is depressed after the key 206 was once depressed, the instruction which has been entered to grant reception of data and commands from the editor module 200A is cancelled and entry of data and command signals through the editor module 200A is invalidated.

The operator of the apparatus is allowed to select an automatic density control mode through manipulation of an automatic density control key 222. In association with this automatic density control key 222 is provided an automatic density control mode indicator 224 which is activated to continuously illuminate when the automatic density control mode is selected with the automatic density control key 222 depressed by the operator. The automatic density control mode indicator 224 is typically implemented by a semiconductor light emitting diode (LED).

In the fourth preferred embodiment of the present invention, the valid density for image reading can be adjusted through manipulation of the manual density "plus" key 164 or manual density "minus" key 166 when the automatic density control mode indicator 224 is turned off. When the automatic density control key 222 is depressed so that the automatic density control mode indicator 224 is turned on and illuminating, the valid density for image reading is adjusted automatically on the basis of the control data generated by the preliminary scanning of the document to be reproduced.

Figure 26:
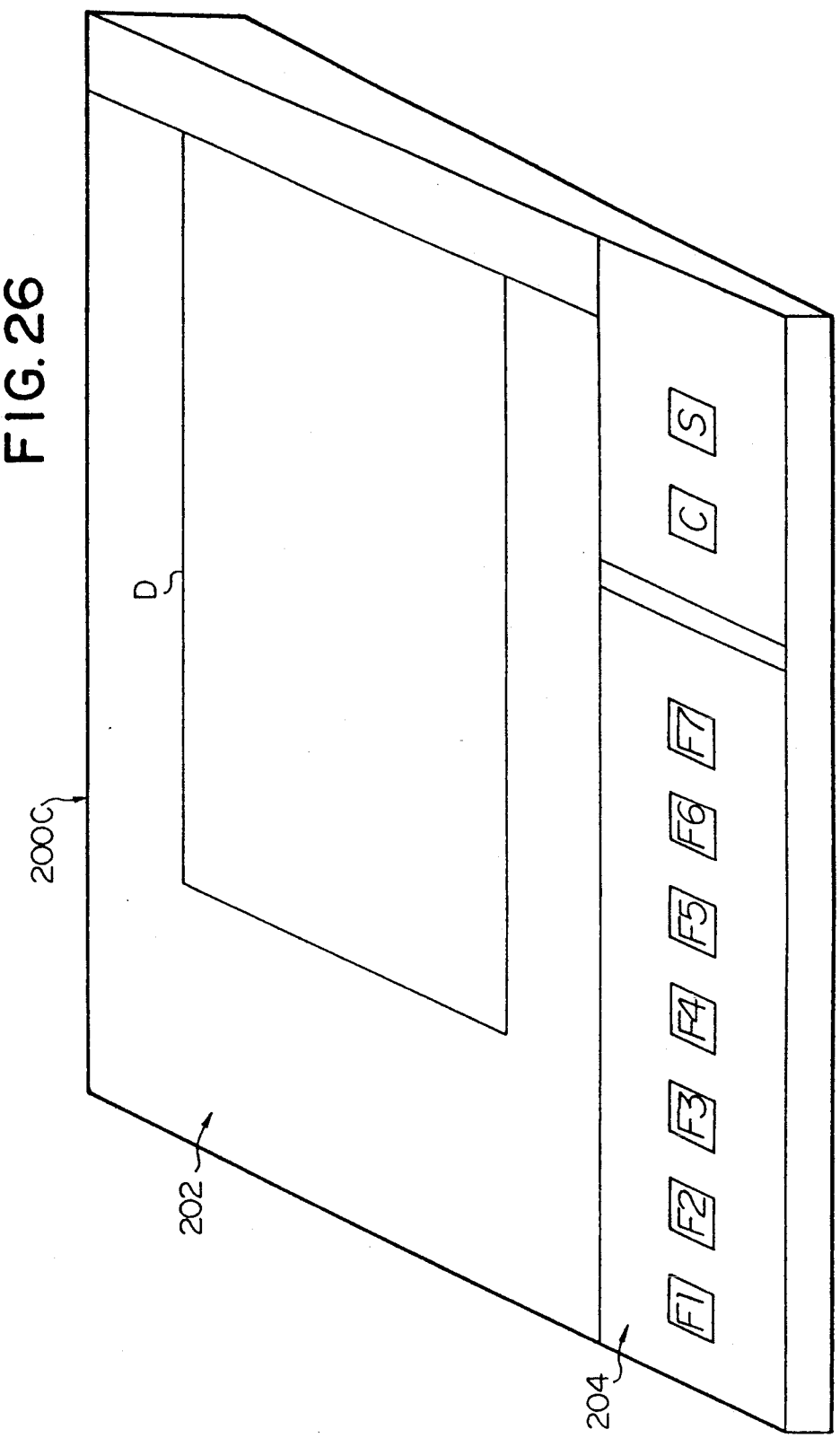
FIG. 26 is a perspective view showing the key and tablet configuration of an editor module forming part of the fourth preferred embodiment of an image reading apparatus according to the present invention.

FIG. 26 shows an editor module 200C which forms part of the fourth preferred embodiment of the present invention. The editor module 200C is essentially similar to its counterpart used in the first preferred embodiment of the present invention and largely consists of a tablet section 202 and a key section 204. In the key section 204 are provided control keys including a trimming key "F1", a masking key "F2", a white/black reverse key "F3", a simple binarization mode select key "F4", first and second dither-pattern halftone mode select key "F5" and "F6", and a trim/mask cancel key "F7". These keys "F1" to "F7" are used for purposes similar to those of their respective equivalents provided in the editor module 200A used in the first preferred embodiment of the present invention. In the key section 204 of the editor module 200C herein shown are further provided a data-clear key "C" used to enter an instruction to clear all the data which have been entered to define a local area within the document on the table section 202, and a data-send key "S" used to enter an instruction to transmit to the control circuit of the apparatus the data and instructions entered through the editor module 200C in respect of the document on the table section 202.

Thus, the fourth preferred embodiment of the present invention also has several kinds of attributes of image reading operation that are achievable by the use of the keys "F1" to "F7". These attributes of image reading operation are essentially similar to those which are achievable in each of the second and third preferred embodiments of the present invention and include whiting (or blackening) out the image outside or inside a specified local area (key "F1" or "F2"), reversing the white and black features of an image on a document (key "F3"), selecting the simple binarization or halftone mode of image reading operation (key "F4"), and selecting the first or second prescribed dither pattern for the halftone mode of image reading operation (key "F5" or "F6").

Figure 27:
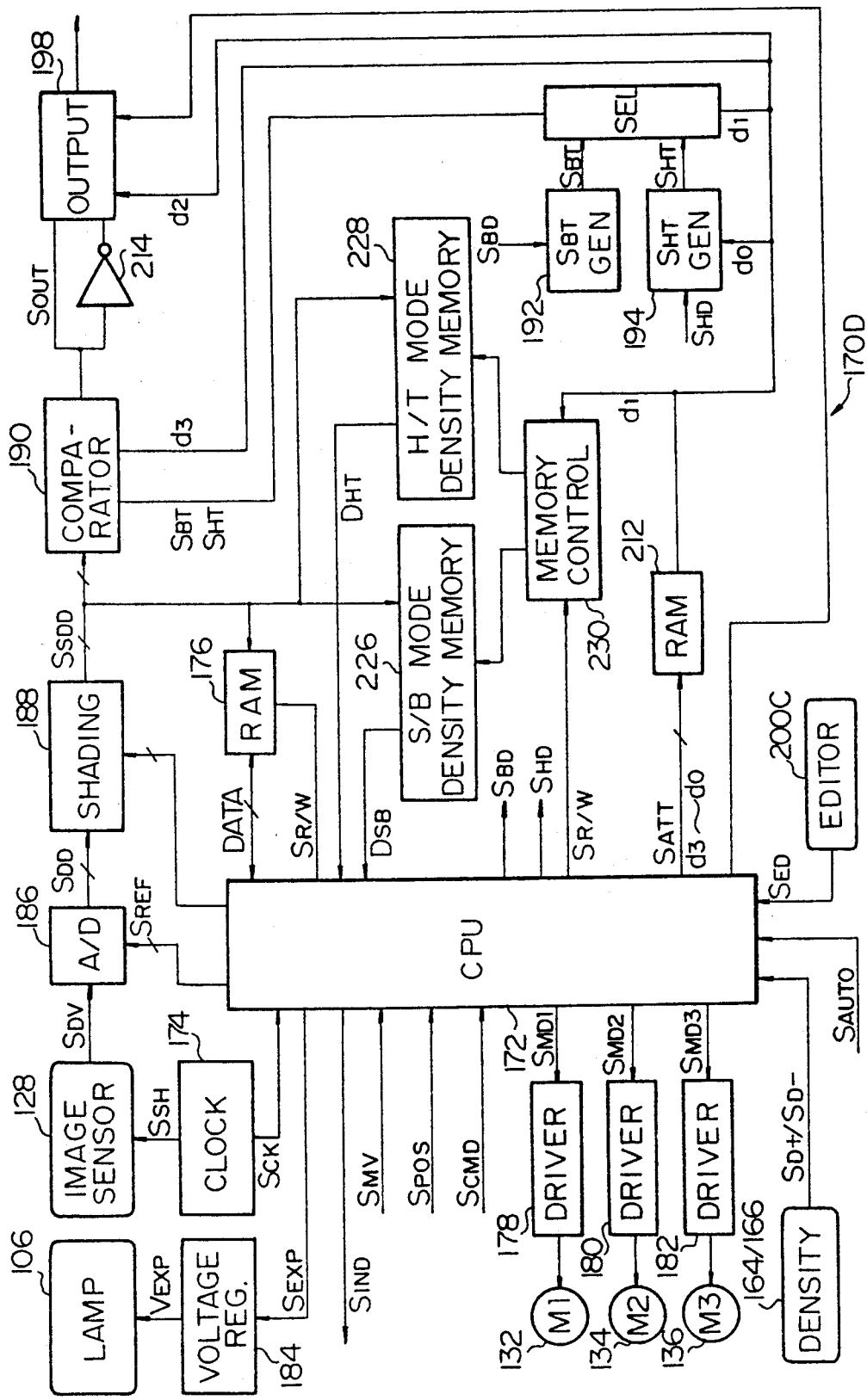
FIG. 27 is a block diagram similar to FIG. 15 but now shows the general construction and arrangement of a control circuit for use in the fourth preferred embodiment of an image reading apparatus according to the present invention.

FIG. 27 shows the general construction and arrangement of a control circuit 170D for use in the fourth preferred embodiment of an image reading apparatus according to the present invention. The control circuit 170C for use in the fourth preferred embodiment of the present invention is essentially similar to the control circuit 170B or 170C of each of the second and third preferred embodiments of the present invention hereinbefore described. In the control circuit 170D herein shown, the central processing unit 172 is thus responsive not only to the command signals supplied from the control panel 140C but to the data and command signals $S_{ED}$ generated in and supplied from the editor module 200C hereinbefore described with reference to FIG. 26. As has been noted, the data and command signals $S_{ED}$ generated by any of these keys on the editor module 200C are accepted by the central processing unit 172 only when the editor communication grant key 206 is depressed on the control panel 140C and are invalidated when the key 206 is depressed after the key was once depressed.

The command signals which the central processing unit 172 used in the fourth preferred embodiment of the present invention is to receive from the control panel 140C include an automatic density control mode select signal $S_{AUTO}$ produced when the automatic density control mode is selected with the automatic density control key 222 depressed by the operator. On receipt of this automatic density control mode select signal $S_{AUTO}$, the central processing unit 172 outputs a signal effective to activate the automatic density control mode indicator 224.

Responsive to the data and command signals $S_{ED}$ supplied from the editor module 200C and/or to the signal supplied from any of the manual density "plus" and "minus" keys 164 and 166 on the control panel 140C, the central processing unit 172 generates an attribute signal $S_{ATT}$ indicative of selected ones of the attributes of image reading operation. The attribute signal $S_{ATT}$ thus representative of the selected attributes of image reading operation is supplied to and stored into an attribute memory 212 implemented by a semiconductor random-access memory.

The signal $S_{ATT}$ to be generated by the central processing unit 172 is provided in the form of a sequence of four bits $d_3$ to $d_0$ each of logic "1" or "0" state. These four bits $d_3$ to $d_0$ of the attribute signal $S_{ATT}$ provide first to fourth fractions, respectively, of the signal $S_{ATT}$ and are similar to their respective equivalents of the attribute signal $S_{ATT}$ used in the control circuit 170B of the second preferred embodiment of the present invention as hereinbefore described with reference to FIG. 15.

Thus, the bit $d_3$ of the attribute signal $S_{ATT}$ providing the first fraction of the signal $S_{ATT}$ indicates selection of the blanking out of an image pixel when set to logic "0" state and selection of the non-blanking of a pixel when set to logic "1" state. The first fraction of the attribute signal $S_{ATT}$ provided by the bit $d_3$ of the signal $S_{ATT}$ is supplied to one control terminal of the binarizing comparator circuit 190.

The bit $d_2$ of the attribute signal $S_{ATT}$ providing the second fraction of the signal $S_{ATT}$ indicates selection of the non-reversing of the white and black features of an image when set to logic "0" state and selection of the reversing of the white and black features of an image when set to logic "1" state. The second fraction of the attribute signal $S_{ATT}$ provided by the bit $d_2$ of the signal $S_{ATT}$ is supplied to one control terminal of the image signal output circuit 198. To another control terminal of the image signal output circuit 198 is supplied a valid image area signal $S_{VIA}$ of logic "1" or "0" state from the central processing unit 172.

The bit $d_1$ of the attribute signal $S_{ATT}$ providing the third fraction of the signal $S_{ATT}$ indicates selection of the simple binarization mode of image reading operation when set to logic "0" state and selection of the halftone mode of image reading operation when set to logic "1" state. The third fraction of the attribute signal $S_{ATT}$ provided by the bit $d_1$ of the signal $S_{ATT}$ is supplied to the control terminal of the simple-binarization/halftone mode selector circuit 196. Responsive to this mode select bit $d_1$, the simple binarization/halftone mode selector circuit 196 supplies either the simple binarization threshold signal $S_{BT}$ or the halftone threshold signal $S_{HD}$ depending on the logic state of the bit $d_1$.

The bit $d_0$ of the attribute signal $S_{ATT}$ providing the fourth fraction of the signal $S_{ATT}$ indicates selection of the first prescribed dither pattern simple binarization mode of image reading operation when set to logic "0" state and selection of the the second dither pattern when set to logic "1" state. The fourth fraction of the attribute signal $S_{ATT}$ provided by the bit $d_0$ of the signal $S_{ATT}$ is supplied to the halftone threshold generator circuit 194, which is thus enabled to select the first or second prescribed dither pattern depending on the logic state of the bit $d_0$.

While the bits $d_3$, $d_2$ and $d_0$ of the attribute signal $S_{ATT}$ used in the fourth preferred embodiment of the present invention are to be generated exclusively responsive to command signal supplied from the editor module 200C, the bit $d_1$ of the attribute signal $S_{ATT}$ may be generated either responsive to a command signal supplied from the editor module 200C or to a command signal supplied from the control panel 200C described with reference to FIG. 25. The central processing unit 172 responsive to command signals supplied from the editor module 200C is enabled to generate the bits $d_3$ to $d_0$ of the attribute signal $S_{ATT}$ on condition that the editor communication grant key 206 is depressed to grant transmission of data and command signals from the editor module 200 to the central processing unit 172. Any data and command signals which may be produced in the editor module will be invalidated when the key 206 is depressed for a second time.

When the editor communication grant key 206 is depressed so that transmission of data and command signals from the editor module 200 to the central processing unit 172, the bit $d_3$ of the attribute signal $S_{ATT}$ is set to logic "0" state when the trimming key "F1" or the masking key "F2" on the editor module 200C is depressed, and the bit $d_2$ is set to logic "1" state when the white/black reverse key "F3" on the editor module 200C is depressed. The bit $d_1$ of the attribute signal $S_{ATT}$ is set to logic "0" state when the simple binarization mode select key "F4" on the editor module 200C is depressed, and the bit $d_0$ of the attribute signal $S_{ATT}$ is set to logic "0" state when the first dither-pattern halftone mode select key "F5" on the editor module 200C is depressed and is set to logic "1" state when the second dither-pattern halftone mode select key "F6" on the editor module 200C is depressed.

On the other hand, when the editor communication grant key 206 which has once been depressed is depressed for a second time, transmission of data and command signals from the editor module 200C to the central processing unit 172 is prohibited. In this instance, the central processing unit 172 is qualified to set the bit $d_1$ of the attribute signal $S_{ATT}$ to logic "0" state when the character mode select key 158 on the control panel 140C is depressed and to logic "1" state when the halftone mode select key 160 on the control panel 140C is depressed. The remaining bits $d_3$, $d_2$ and $d_0$ of the attribute signal $S_{ATT}$ are set to logic states assigned to standard modes of operation predetermined by default rules and could not be varied from the control panel 140C. As has been described in regard to the second preferred embodiment of the present invention, the standard modes of operation represented by the bits $d_3$, $d_2$ and $d_0$ of such logic states are the non-blanking of a pixel represented by the bit $d_3$ of logic "1" state, the non-reversing of the white and black features of an image represented by the bit $d_2$ of logic "0" state, and the first prescribed dither pattern simple binarization mode of image reading operation represented by the bit $d_0$ of logic "0".

In the control circuit 170D of the fourth preferred embodiment of the present invention are further provided a simple binarization mode density data storage memory 226 and a halftone mode density data storage memory 228 each implemented by a random-access memory. Each of these simple binarization and halftone mode density data storage memories 226 and 228 is responsive to the shaded digital image density data signals $S_{SDD}$ supplied from the shading circuit 188, the bit $d_1$ of the attribute signal $S_{ATT}$ supplied from the attribute memory 212, and control signals supplied from the central processing unit 172. Thus, each of the simple binarization and halftone mode density data storage memories 226 and 228 is adapted to store data indicating the original image densities represented by the shaded digital image density data signals $S_{SDD}$. The control signals to be supplied from the central processing unit 172 to each of the density data storage memories 226 and 228 include a density data signal generated in the control panel 140C, and a read/write control signal $S_{R/W}$ to select either a read cycle or a write cycle in the memory 226 or 228. The control signals thus supplied from the central processing unit 172 are transmitted through a memory control circuit 230 to the simple binarization mode density data storage memory 226 or to the halftone mode density data storage memory 228 depending on the logic state of the bit $d_1$ of the attribute signal $S_{ATT}$ supplied from the attribute memory 212. The density data representing the original image density of each image pixel is stored into the density data storage memory 226 or 228 in response to a read/write control signal $S_{R/W}$ of, for example, logic "0" state passed through the control circuit 230 or fetched from the memory 226 or 228 in response to a read/write control signal $S_{R/W}$ of, for example, logic "1" state passed through the control circuit 230.

As in the control circuit 170B or 170C of the second or third preferred embodiment of the present invention, the image density data in the form of the shaded digital image density data signals $S_{SDD}$ supplied to the binarizing comparator circuit 190 and representing the original densities of the pixels forming the image on the document D is compared with the threshold signal $S_{BT}$ supplied from the simple binarization threshold generator circuit 192 or with the threshold signal $S_{HT}$ supplied from the halftone threshold signal generator circuit 194 through the simple-binarization/halftone mode selector circuit 196. The binarizing comparator circuit 190 is thus operative to generate binary image signals each of logic "1" or "0" state responsive to the shaded digital image density data signals $S_{SDD}$.

In the meantime, the data representing the valid density for image reading is stored in the simple binarization mode density data storage memory 210 or the halftone mode density data storage memory 210. This data has been originally generated either on the basis of the density step-up or step-down signal $S_{D+}$ or $S_{D-}$ produced by the manual density plus" or "minus" key 164 or 166 on the control panel 140C or automatically with the automatic density control key 224 depressed on the control panel 140C. The central processing unit 172 formulates the attribute signal $S_{ATT}$ on the basis of the data thus read from the simple binarization or halftone mode density data storage memory 226 or 228 and loads the signal $S_{ATT}$ into the attribute memory 212. The attribute memory 212 then distributes the bits the bit $d_3$ to the binarizing comparator circuit 190, the bit $d_2$ to the image signal output circuit 198, and the bit $d_1$ to the simple-binarization/halftone mode selector circuit 196 as has been described.

Responsive to the bits $d_3$ to $d_0$ of the attribute signal $S_{ATT}$ thus supplied from the central processing unit 172, the simple binarization threshold generator circuit 192 outputs the simple binarization threshold signal $S_{BT}$ indicative of a fixed threshold value for use in the simple binarization mode of image reading operation, or the halftone threshold generator circuit 194 outputs the halftone threshold signal $S_{HT}$ indicative of a stepwise variable threshold value for use in the halftone mode of image reading operation. The halftone threshold signal $S_{HT}$ output from the halftone threshold generator circuit 194 is stepwise variable in accordance with the first or second dither pattern depending on the logic state of the bit $d_0$ of the attribute signal $S_{ATT}$. The simple binarization threshold signal $S_{BT}$ thus output from the simple binarization threshold generator circuit 192 or the halftone threshold signal $S_{HT}$ output from the halftone threshold signal generator circuit 194 is supplied to the binarizing comparator circuit 190 through the simple-binarization/halftone mode selector circuit 196 depending on the logic state of the mode select bit $d_1$ which forms part of the attribute signal $S_{ATT}$ received from the attribute memory 212.

Each of these binary image signals generated in the binarizing comparator circuit 190 responsive to the shaded digital image density data signals $S_{SDD}$ is combined with the bit $d_3$ of the attribute signal $S_{ATT}$ in a logic "AND" operation so that a binary image signal of logic "1" or "0" state is generated in response to each of the shaded digital image density data signals $S_{SDD}$. Each of the binary image signals thus generated is further combined in a logic "AND" operation with the simple binarization threshold signal $S_{BT}$ output from the simple binarization threshold generator circuit 192 or the halftone threshold signal $S_{HT}$ output from the halftone threshold signal generator circuit 194 with the result that a binary image signal $S_{OUT}$ of logic "1" or "0" state is generated in respect of each of the shaded digital image density data signals $S_{SDD}$. The binarizing comparator circuit 190 supplies the output signals $S_{OUT}$ in non-inverted form to one input terminal of the image signal output circuit 198 and in inverted form to the other input terminal of the output circuit 198 through the inverter 214.

Responsive to the white/black reversing bit $d_2$ of the attribute signal $S_{ATT}$, the image signal output circuit 198 elects either the non-inverted binary image signals $S_{OUT}$ or the inverted versions of the signals $S_{OUT}$ depending on the logic state of the white/black reversing bit $d_2$. Each of the non-inverted binary image signals $S_{OUT}$ or of the inverted versions of the signals $S_{OUT}$ is combined with the valid image area signal $S_{VIA}$ of logic "1" or "0" state from the central processing unit 172 in a logic "AND" operation. The resultant binary signals are delivered to a signal processing circuit of any external output unit such as a printer or a display unit (not shown) to reproduce the image represented by the output signals from the signal output circuit 198.

Figure 28:
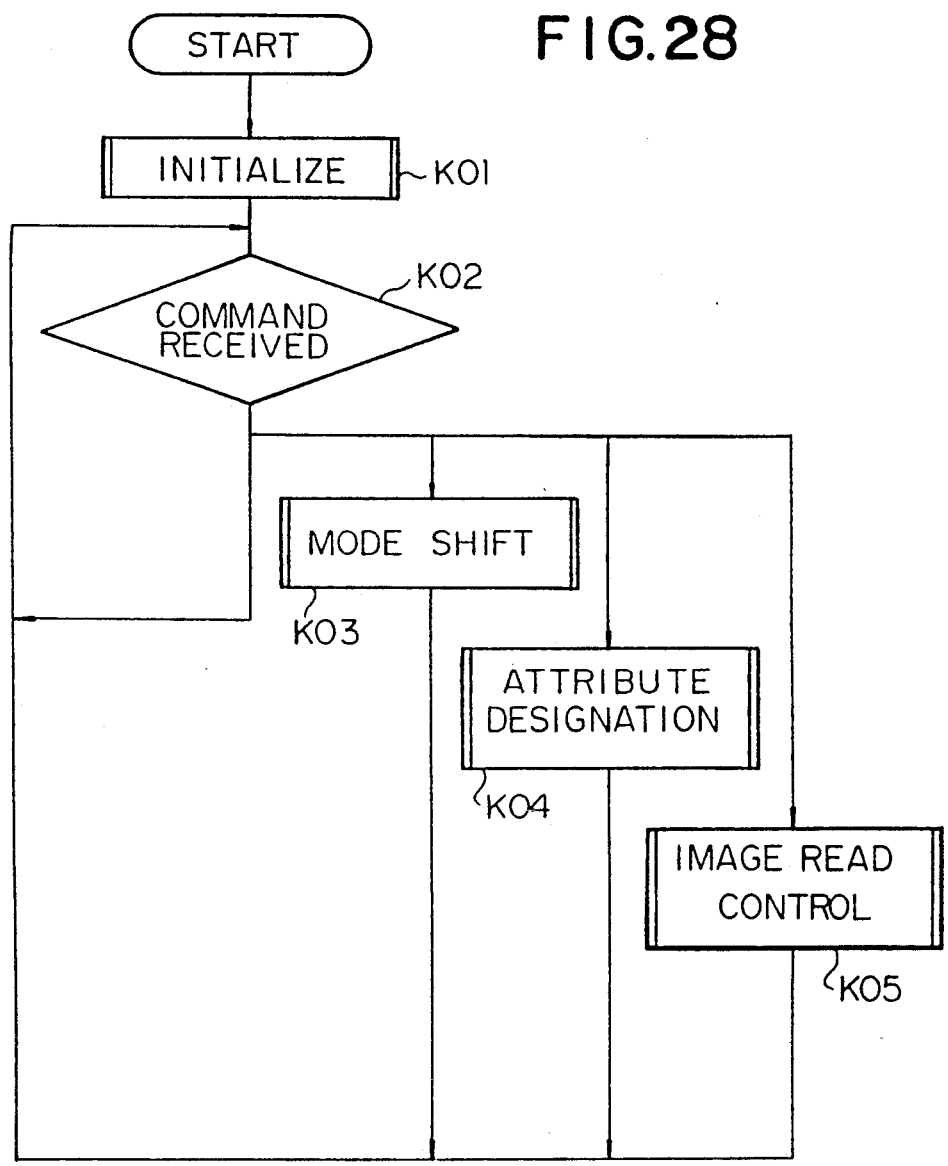
FIG. 28 is a flowchart showing a main routine program to be executed by the central processing unit included in the control circuit illustrated in FIG. 27.

FIG. 28 is a flowchart showing a main routine program to be executed by the central processing unit 172 included in the control circuit 170D hereinbefore described with reference to FIG. 27.

The execution of the main routine program shown in FIG. 28 is started when the apparatus is initially switched in. The main routine program starts with step K01 at which the registers included in the central processing unit 172 and the line memory 176 are reset. The step K01 is followed by step K02 to check for any command signal supplied from the control panel 140C. The command signal to be checked for at this step K02 may be the signal $S_{CMD}$ supplied from any of the scan start key 142, common clear key 144, image scale-up and scale-down keys 148 and 150 and sheet size select keys 154 and 156, or the character mode select signal $S_{CM}$ from the character mode select key 158, the halftone mode select signal $S_{HM}$ from the halftone mode select key 160, the density step-up signal $S_{D+}$ or $S_{D-}$ from the manual density "plus" or "minus" key 164 or 166, or the automatic density control mode select signal $S_{AUTO}$ from the automatic density control key 222. When the editor communication grant key 206 is depressed on the control panel 140C, it is checked at step K02 if there is a command signal supplied from any of the keys "F1" to "F7" on the editor module 200C. In the absence detected of any command signal supplied from the control panel 140C or the editor module 200C, the central processing unit 172 repeats the step K02 until it is found that there is any command signal $S_{CMD}$ received from the control panel 140C.

The central processing unit 172 proceeds to step K03 and executes a mode shift subroutine program if it is detected at step K02 that there is the signal from the image scale-up or scale-down key 148 or 150, the signal from the sheet size select key 154 or 156, the character mode select signal $S_{CM}$ from the character mode select key 158, the halftone mode select signal $S_{HM}$ from the halftone mode select key 160, the density step-up or step-down signal $S_{D+}$ or $S_{D-}$ from the manual density "plus" or "minus" key 164 or 166, or the automatic density control mode select signal $S_{AUTO}$. Responsive to any of these signals supplied from the control panel 140C, the central processing unit 172 executes the steps required by the supplied signal on condition that the mode of operation requested by the signal is validly acceptable in the apparatus. The details of this mode shift subroutine program K03 will be hereinafter described with reference to FIG. 29.

On the other hand, if it is detected at step K02 that there is a command signal supplied from any of the keys "F1" to "F7" on the editor module 200C, the central processing unit 172 proceeds to subroutine program K04 and executes an area attribute designation control subroutine program. The central processing unit 172 is enabled to execute this area attribute designation control subroutine program K04 when, and only when, the editor communication grant key 206 on the control panel 140C is depressed to grant transmission of data and command signals from the editor module 200 to the central processing unit 172. The details of the area attribute designation control subroutine program K04 will be hereinafter described with reference to FIG. 30.

If it is detected at step K02 that there is the signal supplied from the scan start key 142 on the control panel 140C, the central processing unit 172 proceeds to subroutine program K05 and executes an image read control subroutine program. The details of this image read control subroutine program K05 will be hereinafter described with reference to FIG. 31.

Figure 29:
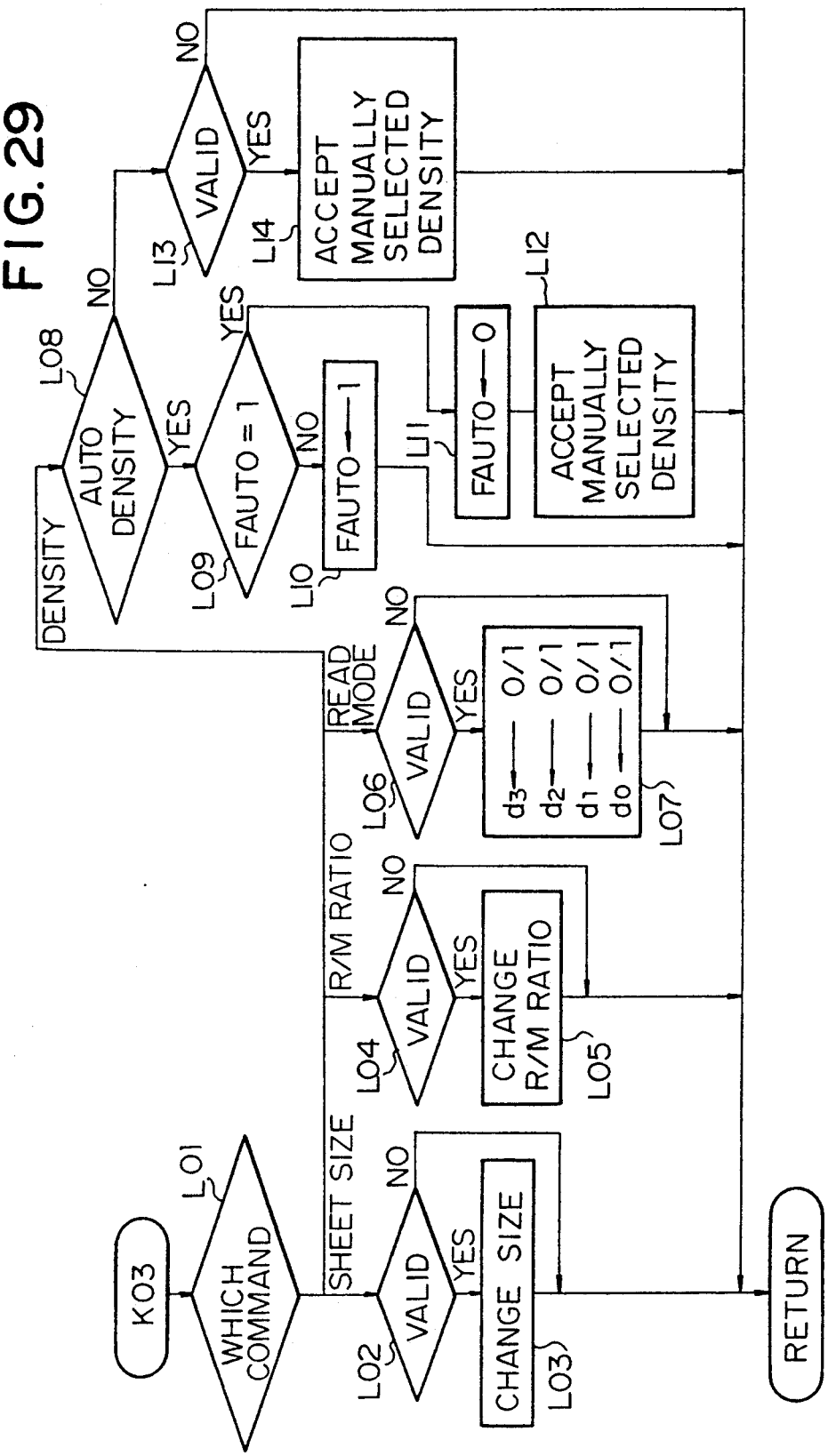
FIG. 29 is a flowchart showing the details of a mode shift subroutine program included in the main routine program illustrated in FIG. 28.

FIG. 29 shows the details of the mode shift subroutine program K03 included in the routine program hereinbefore described with reference to FIG. 28.

The mode shift subroutine program K03 starts with step L01 to determine which command signal is received from the control panel 140C. Thus, if it is detected at step L01 that there is the signal received from the sheet size select key 154 or 156, the central processing unit 172 proceeds to step L02 to check if the request for the size of print output sheets designated by the signal received is validly acceptable in the apparatus and/or the external printer unit. If the answer for this step L02 is given in the affirmative, the central processing unit 172 proceeds to step L03 to select the size of print output sheets designated by the signal received and thereafter reverts to the main routine program described with reference to FIG. 28 to check if any other command signal is received from the control panel 140C or from the editor module 200C. If it is determined at step L02 that the request for the size of print output sheets designated by the signal received is not validly acceptable and accordingly the answer for step L02 is given in the negative, the central processing unit 172 immediately reverts to the main routine program described with reference to FIG. 28 to check if any other command signal is received from the control panel 140C or from the editor module 200C.

If it is detected at step L01 that there is the signal received from the image scale-up or scale-down key 148 or 150, the central processing unit 172 proceeds to step L04 to check if the request for the reduction/magnification ratio designated by the signal received is validly acceptable in the apparatus and/or the external printer unit. If the answer for this step L04 is given in the affirmative, the central processing unit 172 proceeds to step L05 to select the reduction/magnification ratio designated by the signal received and thereafter reverts to the main routine program described with reference to FIG. 28 to check if any other command signal is received from the control panel 140C or from the editor module 200C. If it is determined at step L04 that the request for the reduction/magnification ratio designated by the signal received is not validly acceptable and accordingly the answer for step L04 is given in the negative, the central processing unit 172 immediately reverts to the main routine program described with reference to FIG. 28 to check if any other command signal is received from the control panel 140C or from the editor module 200C.

If it is detected at step L01 that there is the character mode select signal $S_{CM}$ received from the character mode select key 158 or the halftone mode select signal $S_{HM}$ received from the halftone mode select key 160, the central processing unit 172 proceeds to step L06 to check if the request for the simple binarization or halftone mode of image reading operation requested by the signal $S_{CM}$ or $S_{HM}$ received is validly acceptable in the apparatus. If the answer for this step L06 is given in the affirmative, the central processing unit 172 proceeds to step L07 to select the simple binarization or halftone mode of image reading operation requested by the signal $S_{CM}$ or $S_{HM}$ received and sets the bit $d_1$ of the attribute signal $S_{ATT}$ to logic "0" state or logic "1" state, respectively, for each of all the pixels to be reproduced. The bit $d_1$ thus set to logic "0" or "1" state and representative of the simple binarization or halftone mode of image reading operation as the selected attribute of the image reading operation to be performed is stored into the attribute memory 212 in the control circuit 170D. It may be herein noted that each of the bits $d_3$, $d_2$ and $d_0$ of the attribute signal $S_{ATT}$ is set to the logic state assigned to the predetermined standard since the transmission of data and command signals from the editor module 200C to the central processing unit 172 is currently prohibited with the editor communication grant key 206 depressed after the key 206 was once depressed. Subsequently to step L07, the central processing unit 172 reverts to the main routine program described with reference to FIG. 28 to check if any other command signal is received from the control panel 140C or from the editor module 200C.

If it is determined at step L06 that the request for the mode of image reading operation requested by the character or halftone mode select signal $S_{CM}$ or $S_{HM}$ received is not validly acceptable and accordingly the answer for step L06 is given in the negative, the central processing unit 172 immediately reverts to the main routine program described with reference to FIG. 28 to check if any other command signal is received from the control panel 140C or from the editor module 200C.

If it is detected at step L01 that there is the density step-up or step-down signal $S_{D+}$ or $S_{D-}$ received from the manual density "plus" or "minus" key 164 or 166, the central processing unit 172 proceeds to step L08 to detect whether or not the automatic density control signal $S_{AUTO}$ is received from the automatic density control key 222 on the control panel 140C. In the presence detected of the automatic density control signal $S_{AUTO}$, the central processing unit 172 further checks at step L09 if flag "FAUTO" is set to logic "1" state. If the answer for this step L09 is given in the negative, the central processing unit 172 proceeds to step L10 to set the flag "FAUTO" to logic "1" state and thereafter reverts to the main routine program described with reference to FIG. 28 to check if any other command signal is received from the control panel 140C or from the editor module 200C. The setting of the flag "FAUTO" to logic "1" state establishes the automatic density control mode in the apparatus.

If it is detected at step L09 that the flag "FAUTO" is not set to logic "1" state and accordingly the answer for the step L09 is given in the affirmative, the central processing unit 172 proceeds to step L11 to reset the flag "FAUTO" to logic "0" state to clear the automatic density control mode which has been established in the apparatus. Then, the central processing unit 172 proceeds to step L12 to accept the density step-up or step-down signal $S_{D+}$ or $S_{D-}$ supplied from the manual density "plus" or "minus" key 164 or 166 on the control panel 140C. The central processing unit 172 thereafter reverts to the main routine program described with reference to FIG. 28 to check if any other command signal is received from the control panel 140C or from the editor module 200C.

If it is found at step L08 that the automatic density control signal $S_{AUTO}$ is not received from the automatic density control key 222 on the control panel 140C, the central processing unit 172 proceeds to step L12 to check if the request for the density for image reading designated by the signal $S_{D+}$ or $S_{D-}$ received from the manual density "plus" or "minus" key 164 or 166 is validly acceptable. If the answer for this step L11 is given in the affirmative, the central processing unit 172 proceeds to step L13 to select the density for image reading designated by the signal $S_{D+}$ or $S_{D-}$ received from the manual density "plus" or "minus" key 164 or 166. Subsequently to the step L13, the central processing unit 172 reverts to the main routine program described with reference to FIG. 28 to check if any other command signal is received from the control panel 140C or from the editor module 200C. If it is determined at step L13 that the request for the density for image reading designated by the signal $S_{D+}$ or $S_{D-}$ received from the manual density "plus" or "minus" key 164 or 166 is not validly acceptable and accordingly the answer for step L13 is given in the negative, the central processing unit 172 immediately reverts to the main routine program described with reference to FIG. 28 to check if any other command signal is received from the control panel 140C or from the editor module 200C.

Figure 30:
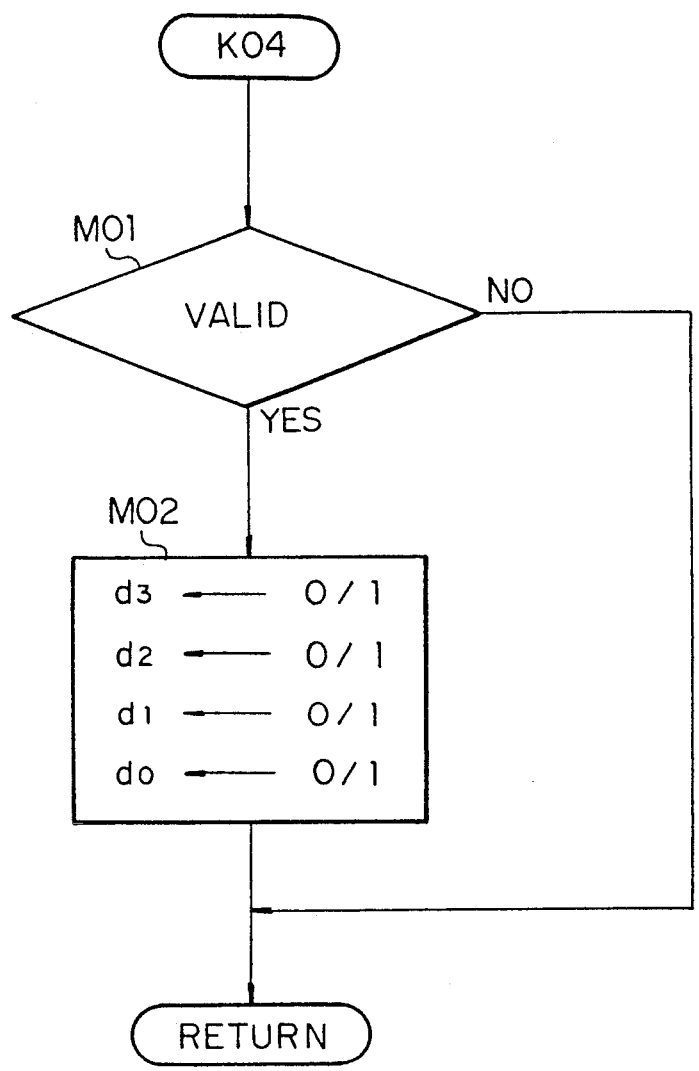
FIG. 30 is a flowchart showing the details of an area attribute designation control subroutine program also included in the main routine program illustrated in FIG. 28.

FIG. 30 shows the details of the area attribute designation control subroutine program K04 also included in the main routine program hereinbefore described with reference to FIG. 28. The area attribute designation control subroutine program K04 is executed when there is a command signal received from the editor module 200C with any of the keys "F1" to "F7" on the editor module 200C depressed in respect of the designated local area of the document D. As has been noted, the central processing unit 172 is enabled to execute this area attribute designation control subroutine program K04 when, and only when, the editor communication grant key 206 on the editor module 200C is depressed to grant transmission of data and command signals from the editor module 200C to the central processing unit 172.

The area attribute designation control subroutine program K04 starts with step M01 at which the central processing unit 172 checks if the request for the modes of operation designated by the command signal supplied from any of the keys "F1" to "F7" on the editor module 200C in respect of the designated local area of the document D is validly acceptable in the apparatus and/or the external printer unit. If the answer for this step M01 is given in the affirmative, the central processing unit 172 proceeds to step M02 to select the mode of operation designated by any of the keys "F1" to "F7" and sets the four bits $d_3$, $d_2$, $d_1$ and $d_0$ of the attribute signal $S_{ATT}$ to logic "0" and/or logic "1" states for each of all the pixels in the designated local area of the document D. The bits $d_3$, $d_2$, $d_1$ and $d_0$ of the attribute signal $S_{ATT}$ thus set to logic "0" and/or logic "1" states and representative of the modes of operation designated by the keys "F1" to "F7" on the editor module 200C are stored into the attribute memory 212 in the control circuit 170D. The central processing unit 172 then reverts to the main routine program described with reference to FIG. 28 to check if any other command signal is received from the control panel 140C or the editor module 200C.

If it is determined at step M01 that the request for the mode of operation designated by the command signal from any of the keys "F1" to "F7" is not validly acceptable and accordingly the answer for this step M01 is given in the negative, the central processing unit 172 immediately reverts to the main routine program described with reference to FIG. 28 to check if any other command signal is received from the control panel 140C or the editor module 200C.

FIG. 31 shows the details of the image read control subroutine program K05 further included in the main routine program hereinbefore described with reference to FIG. 28. As has been noted, the image read control subroutine program K05 is to be executed by the central processing unit 172 when it is detected at step K02 in the main routine program that there is present the signal supplied from the scan start key 142 on the control panel 140C.

The image read control subroutine program K05 starts with step N01 to check if the flag "FAUTO" is set to logic "1" state selecting the automatic density control mode of operation. If the answer for this step N01 is given in the affirmative, the central processing unit 172 executes preliminary scan control subroutine program N02 prior to the execution of the regular scan control subroutine program N03. If it is found at step N01 that the flag "FAUTO" is not set to logic "1" state so that the answer for the step N01 is given in the negative, the central processing unit 172 executes the regular scan control subroutine program N03 without executing the preliminary scan control subroutine program N02 and before executing regular scan control subroutine program N03. On termination of the regular scan control subroutine program N03, the central processing unit 172 reverts to the main routine program described with reference to FIG. 28 to check if any other command signal is received from the control panel 140C or the editor module 200C.

Figure 32B:
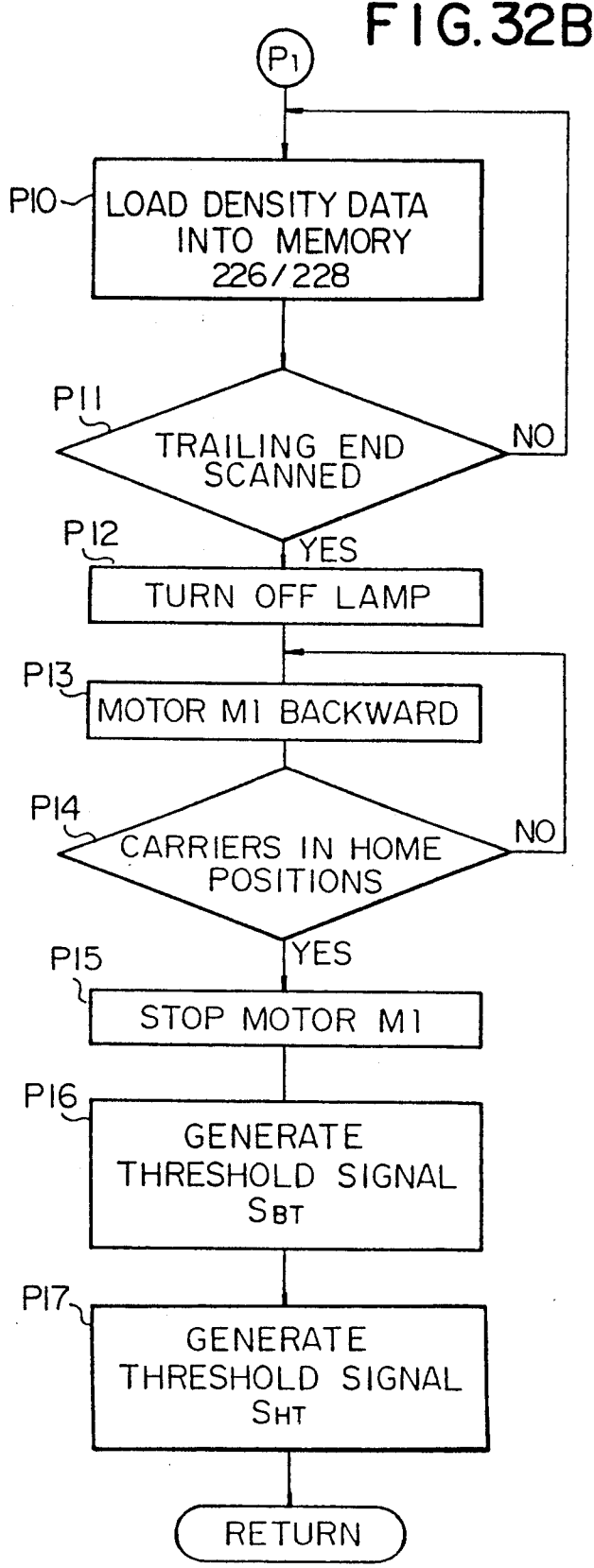

FIGS. 32A and 32B are flowcharts showing the details of the preliminary scan control subroutine program N02 included in the image read control subroutine program K05 hereinbefore described with reference to FIG. 31. As has been noted, the preliminary scan control subroutine program N02 is to be executed by the central processing unit 172 when it is detected at step N01 of the subroutine program K05 that the flag "FAUTO" is set to logic "1" state prior to execution of the regular scan control subroutine program N03 also included in the image read control subroutine program K05. During execution the preliminary scan control subroutine program N02, the central processing unit 172 supplies modified reference voltage signals $S_{REF}$ to the analog-to-digital converter 186.

As shown in FIG. 32A, the preliminary scan control subroutine program N02 starts with step P01 at which the central processing unit 172 resets to logic "0" state the valid image area signal $S_{VIA}$ to be supplied to the control terminal of the image signal output circuit 198. The valid image area signal $S_{VIA}$ being thus reset to logic "0" state, the image signal output circuit 198 is disabled from delivering its output signals to the external unit such as the printer associated with the apparatus embodying the present invention.

The central processing unit 172 thereafter proceeds to step P02 to supply the control signal $S_{EXP}$ to the voltage regulator circuit 184 for the exposure lamp 106. Responsive to the signal $S_{EXP}$ thus received from the central processing unit 172, the voltage regulator circuit 184 outputs the lamp control voltage signal $V_{EXP}$ to activate the exposure lamp 106 to illuminate. The central processing unit 172 then proceeds to step P03 to check if each of the lamp/mirror carrier 118 and mirror carrier 120 is held in a predetermined home position with respect to the document support table 102. This decision is made on the signal $S_{POS}$ supplied from the detecting means provided in association with each of the lamp/mirror carrier 118 and mirror carrier 120.

If it is found at this step P03 that the lamp/mirror carrier 118 and mirror carrier 120 are not held in their respective home positions, the central processing unit 172 proceeds to step P04 to supply the motor actuation signal $S_{MD1}$ to the motor driver circuit 178 for the scanner drive motor 132. Responsive to the motor actuation signal $S_{MD1}$ thus received from the central processing unit 172, the motor driver circuit 178 actuates the scanner drive motor 132 into operation to move the lamp- /mirror and mirror carriers 118 and 120 toward their home positions in the directions indicated by arrowheads a' and b' in FIG. 1.

The central processing unit 172 then detects at step P05 whether or not the lamp/mirror and mirror carriers 118 and 120 have reached their respective home positions. The loop of the steps P04 and P05 is repeated until it is confirmed at step P05 that the lamp/mirror and mirror carriers 118 and 120 have reached their respective home positions. When it is thus found at step P05 that the carriers 118 and 120 have reached their respective home positions and accordingly the answer for the step P05 turns affirmative, the central processing unit 172 proceeds to step P06 to reset the signal $S_{MD1}$ and stop the scanner drive motor 132.

Subsequently to this step P06 or when it is confirmed at step P03 that the lamp/mirror and mirror carriers 118 and 120 are held in their respective home positions, the central processing unit 172 proceeds to step P07 to supply the motor actuation signal $S_{MD1}$ for a second time to the motor driver circuit 178 for the scanner drive motor 132. Responsive to the motor actuation signal $S_{MD1}$ thus received from the central processing unit 172, the motor driver circuit 178 actuates the scanner drive motor 132 into operation to move the lamp/mirror and mirror carriers 118 and 120 forwardly from their home positions in the directions indicated by arrowheads a and b in FIG. 1. The document D placed on the document support table 102 is now optically scanned by the exposure lamp 106 and the resultant image-bearing beam of light B is directed past the reflector mirrors 110, 112 and 114 to the image sensor 122.

The step P07 is followed by step P08 at which the central processing unit 172 reads the shading data correcting pattern detected from the lower face of the document scale 104 and stored in the line memory 176. On the basis of the shading data correcting pattern read from the line memory 176, the central processing unit 172 formulates the data in accordance with which shading signals are to be generated in the shading circuit 188. The data thus generated in the central processing unit 172 is stored into the line memory 176.

The central processing unit 172 then detects at step P09 whether or not the lamp/mirror carrier 118 and mirror carrier 120 have reached the positions effective to scan the leading end of the document D placed on the document support table 102. The step P09 is repeated until it is confirmed that the document D on the document support table 102 is scanned at its leading end. When it is thus determined at step P09 that the document D on the document support table 102 is scanned at its leading end and accordingly the answer for the step P09 turns affirmative, the central processing unit 172 proceeds to step P10 (FIG. 32B) whereby the shaded digital image density data signals $S_{SDD}$ supplied from the shading circuit 188 and representing the original densities of the pixels forming the image on the document D are loaded into the simple binarization mode density data storage memory 226 or the halftone mode density data storage memory 228. Whether the signals $S_{SDD}$ are to be loaded into the simple binarization mode density data storage memory 226 or into the halftone mode density data storage memory 228 depends on the logic state of the bit $d_1$ of the attribute signal $S_{ATT}$ supplied from the attribute memory 212.

The central processing unit 172 then proceeds to step P11 to detect whether or not the lamp/mirror carrier 118 and mirror carrier 120 have reached the positions effective to scan the trailing end of the document D on the document support table 102. The step P11 is repeated until it is confirmed that the document D on the document support table 102 has been scanned to its trailing end. Thus, the shaded digital image density data signals $S_{SDD}$ are loaded into the simple binarization mode density data storage memory 226 or into the halftone mode density data storage memory 228 successively for the individual scanning lines until all the image on the document or in the designated local area of the document are scanned. The detailed aspects of this step P10 will be hereinafter described.

When it is thus determined at step P11 that the scanning of the document D on the document support table 102 is complete and accordingly the answer for the step P11 turns affirmative, the central processing unit 172 proceeds to step P12 to cease the supply of the control signal $S_{EXP}$ to the voltage regulator circuit 184 to deactivate the exposure lamp 106. The step P12 is followed by step P13 at which the central processing unit 172 supplies the motor actuation signal $S_{MD1}$ to the motor driver circuit 178 for the scanner drive motor 132. Responsive to the motor actuation signal $S_{MD1}$ thus received from the central processing unit 172, the motor driver circuit 178 actuates the scanner drive motor 132 into operation to move the lamp/mirror and mirror carriers 118 and 120 toward their home positions in the directions indicated by arrowheads a' and b' in FIG. 1.

The central processing unit 172 then detects at step P14 whether or not the lamp/mirror and mirror carriers 118 and 120 have reached their respective home positions. The step P14 is repeated until it is confirmed that the lamp/mirror and mirror carriers 118 and 120 have reached their respective home positions. When it is thus found at step P14 that the carriers 118 and 120 have reached their respective home positions and accordingly the answer for the step P14 turns affirmative, the central processing unit 172 proceeds to step P15 to reset the signal $S_{MD1}$ and stop the scanner drive motor 132.

Thereupon, the central processing unit 172 proceeds to steps P16 and P17 to fetch the data representative of the image densities stored in the simple binarization mode density data storage memory 226 and the halftone mode density data storage memory 228 and calculate the optimum threshold values for the simple binarization and halftone modes of image reading operation. The values thus calculated on the basis of the image density data fetched from the density data storage memories 226 and 228 are transmitted in the forms of the simple binarization image-density signal $S_{BD}$ and halftone image-density signal $S_{HD}$ to the simple binarization threshold generator circuit 192 and halftone threshold generator circuit 194, respectively. The threshold generator circuits 192 and 194 are thus enabled to output the simple binarization and halftone threshold signals $S_{BT}$ and $S_{HT}$ which correspond to the calculated optimum values for the simple binarization and halftone modes of image reading operation. On termination of the steps P16 and P17, the central processing unit 172 reverts to the image read control subroutine program K03 described with reference to FIG. 31. The detailed aspects of the steps P16 and P17 will be hereinafter described.

Figure 33A:
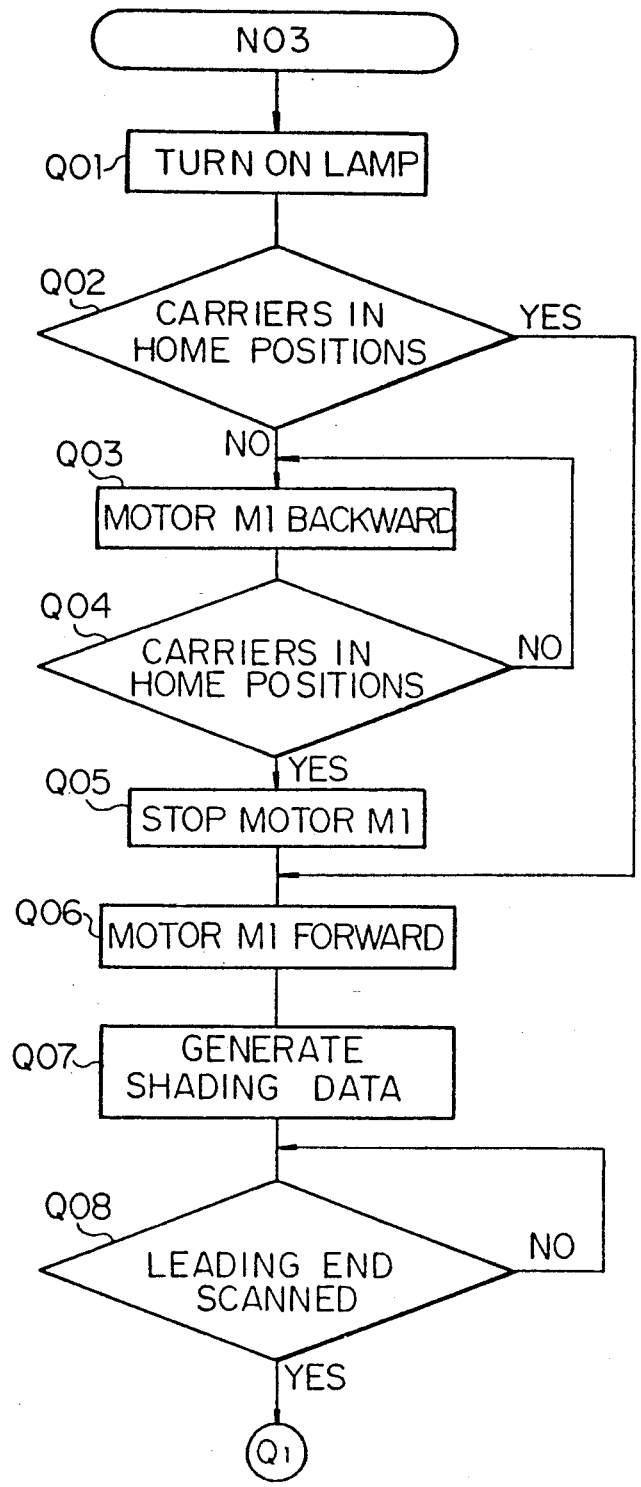

FIGS. 33A and 33B are flowchart showing the details of the regular scan control subroutine program N03 further included in the image read control subroutine program K05 hereinbefore described with reference to FIG. 31. As has been noted, the regular scan control subroutine program N03 is to be executed by the central processing unit 172 when it is detected at step N01 of the subroutine program K05 that the flag "FAUTO" is reset to logic "0" state or on termination of the preliminary scan control subroutine program N02 included in the image read control subroutine program K05.

As shown in FIG. 33A, the regular scan control subroutine program N03 starts with step Q01 at which the central processing unit 172 supplies the control signal $S_{EXP}$ to the voltage regulator circuit 184 for the exposure lamp 106. Responsive to the signal $S_{EXP}$ thus received from the central processing unit 172, the voltage regulator circuit 184 outputs the lamp control voltage signal $V_{EXP}$ to activate the exposure lamp 106 to illuminate. The central processing unit 172 then proceeds to step Q02 to check if each of the lamp/mirror carrier 118 and mirror carrier 120 is held in a predetermined home position with respect to the document support table 102. This decision is made on the signal $S_{POS}$ supplied from the detecting means provided in association with each of the lamp/mirror carrier 118 and mirror carrier 120.

If it is found at this step Q02 that the lamp/mirror carrier 118 and mirror carrier 120 are not held in their respective home positions, the central processing unit 172 proceeds to step Q03 to supply the motor actuation signal $S_{MD1}$ to the motor driver circuit 178 for the scanner drive motor 132. Responsive to the motor actuation signal $S_{MD1}$ thus received from the central processing unit 172, the motor driver circuit 178 actuates the scanner drive motor 132 into operation to move the lamp/mirror and mirror carriers 118 and 120 toward their home positions in the directions indicated by arrowheads a' and b' in FIG. 1.

The central processing unit 172 then detects at step Q04 whether or not the lamp/mirror and mirror carriers 118 and 120 have reached their respective home positions. The loop of the steps Q03 and Q04 is repeated until it is confirmed at step Q04 that the lamp/mirror and mirror carriers 118 and 120 have reached their respective home positions. When it is thus found at step Q04 that the carriers 118 and 120 have reached their respective home positions and accordingly the answer for the step Q04 turns affirmative, the central processing unit 172 proceeds to step Q05 to reset the signal $S_{MD1}$ and stop the scanner drive motor 132.

Subsequently to this step Q05 or when it is confirmed at step Q02 that the lamp/mirror and mirror carriers 118 and 120 are held in their respective home positions, the central processing unit 172 proceeds to step Q06 to supply the motor actuation signal $S_{MD1}$ for a second time to the motor driver circuit 178 for the scanner drive motor 132. Responsive to the motor actuation signal $S_{MD1}$ thus received from the central processing unit 172, the motor driver circuit 178 actuates the scanner drive motor 132 into operation to move the lamp/mirror and mirror carriers 118 and 120 forwardly from their home positions in the directions indicated by arrowheads a and b in FIG. 1. The document D placed on the document support table 102 is now optically scanned by the exposure lamp 106 and the resultant image-bearing beam of light B is directed past the reflector mirrors 110, 112 and 114 to the image sensor 122.

The step Q06 is followed by step Q07 at which the central processing unit 172 reads the shading data correcting pattern detected from the lower face of the document scale 104 and stored in the line memory 176. On the basis of the shading data correcting pattern read from the line memory 176, the central processing unit 172 formulates the data in accordance with which shading signals are to be generated in the shading circuit 188. The data thus generated in the central processing unit 172 is stored into the line memory 176.

The central processing unit 172 then detects at step Q08 whether or not the lamp/mirror carrier 118 and mirror carrier 120 have reached the positions effective to scan the leading end of the document D placed on the document support table 102. The step Q08 is repeated until it is confirmed that the document D on the document support table 102 is scanned at its leading end. When it is thus determined at step Q08 that the document D on the document support table 102 is scanned at its leading end and accordingly the answer for the step Q08 turns affirmative, the central processing unit 172 proceeds to step Q09 (FIG. 33B) to generate the valid image area signal $S_{VIA}$. The valid image area signal $S_{VIA}$ thus generated by the central processing unit 172 at step Q09 is supplied to the control terminal of the image signal output circuit 198.

The central processing unit 172 then proceeds to step Q10 to instruct the attribute memory 212 to distribute the bits $d_3$ to $d_0$ of the attribute signal $S_{ATT}$ to the binarizing comparator circuit 190, image signal output circuit 198, mode selector circuit 196, halftone mode threshold generator 194 and memory control circuit 230. The original image density data represented by the shaded digital image density data signals $S_{SDD}$ output from the shading generator circuit 188 are thus processed in the comparator circuit 190 on the basis of the bits $d_3$, $d_1$ and $d_0$ of the attribute signal $S_{ATT}$ and further in the image signal output circuit 198 on the basis of the bit $d_2$ of the attribute signal $S_{ATT}$. Thus, the image density data representing the image in the designated local area of the document to be read in the simple binarization mode of image reading operation is processed on the basis of the threshold value $S_{BT}$ output from the simple binarization threshold generator circuit 192 at step P16 of the preliminary scan control subroutine program N02 described with reference to FIG. 32. On the other hand, the image density data representing the image in the designated local area of the document to be read in the halftone mode of image reading operation is processed on the basis of the threshold value $S_{HT}$ output from the simple binarization threshold generator circuit 192 at step P17 of the subroutine program N02. In the presence of the flag "FAUTO" of logic "0" state selecting the manual density control mode of operation, the data generated on the basis of the step-up or step-down signal $S_{D+}$ or $S_{D-}$ from the density "plus" or "minus" key 164 or 166 on the control panel 140C is used for the processing of the image density data. The detailed aspects of the step Q10 will be hereinafter described.

Subsequently to step Q10, the central processing unit 172 detects at step Q11 whether or not the lamp/mirror carrier 118 and mirror carrier 120 have reached the positions effective to scan the trailing end of the document D on the document support table 102. The step Q11 is repeated until it is confirmed that the document D on the document support table 102 has been scanned to its trailing end. When it is thus determined at step Q11 that the scanning of the document D on the document support table 102 is complete and accordingly the answer for the step Q11 turns affirmative, the central processing unit 172 proceeds to step Q12 to reset the valid image area signal $S_{VIA}$ which has been supplied to the control terminal of the image signal output circuit 198.

The central processing unit 172 then proceeds to step Q13 to cease the central processing unit 172 supply of the control signal $S_{EXP}$ to the voltage regulator circuit 184 to de-activate the exposure lamp 106. The step Q13 is followed by step Q14 at which the central processing unit 172 supplies the motor actuation signal $S_{MD1}$ to the motor driver circuit 178 for the scanner drive motor 132. Responsive to the motor actuation signal $S_{MD1}$ thus received from the central processing unit 172, the motor driver circuit 178 actuates the scanner drive motor 132 into operation to move the lamp/mirror and mirror carriers 118 and 120 toward their home positions in the directions indicated by arrowheads a' and b' in FIG. 1.

The central processing unit 172 then detects at step Q15 whether or not the lamp/mirror and mirror carriers 118 and 120 have reached their respective home positions. The step Q15 is repeated until it is confirmed that the lamp/mirror and mirror carriers 118 and 120 have reached their respective home positions. When it is thus found at step Q15 that the carriers 118 and 120 have reached their respective home positions and accordingly the answer for the step Q15 turns affirmative, the central processing unit 172 proceeds to step Q16 to reset the signal $S_{MD1}$ and stop the scanner drive motor 132. Subsequently, the central processing unit 172 reverts to the image read control subroutine program K03 described with reference to FIG. 31.

As has been described with reference to FIG. 32, the original image density data representing the shaded digital image data signals $S_{SDD}$ supplied from the shading circuit 188 is at step P10 of the preliminary scan control subroutine program N02 loaded into the simple binarization mode density data storage memory 226 or into the halftone mode density data storage memory 228 depending on the logic state of the bit $d_1$ of the attribute signal $S_{ATT}$ supplied from the attribute memory 212.

Figure 34:
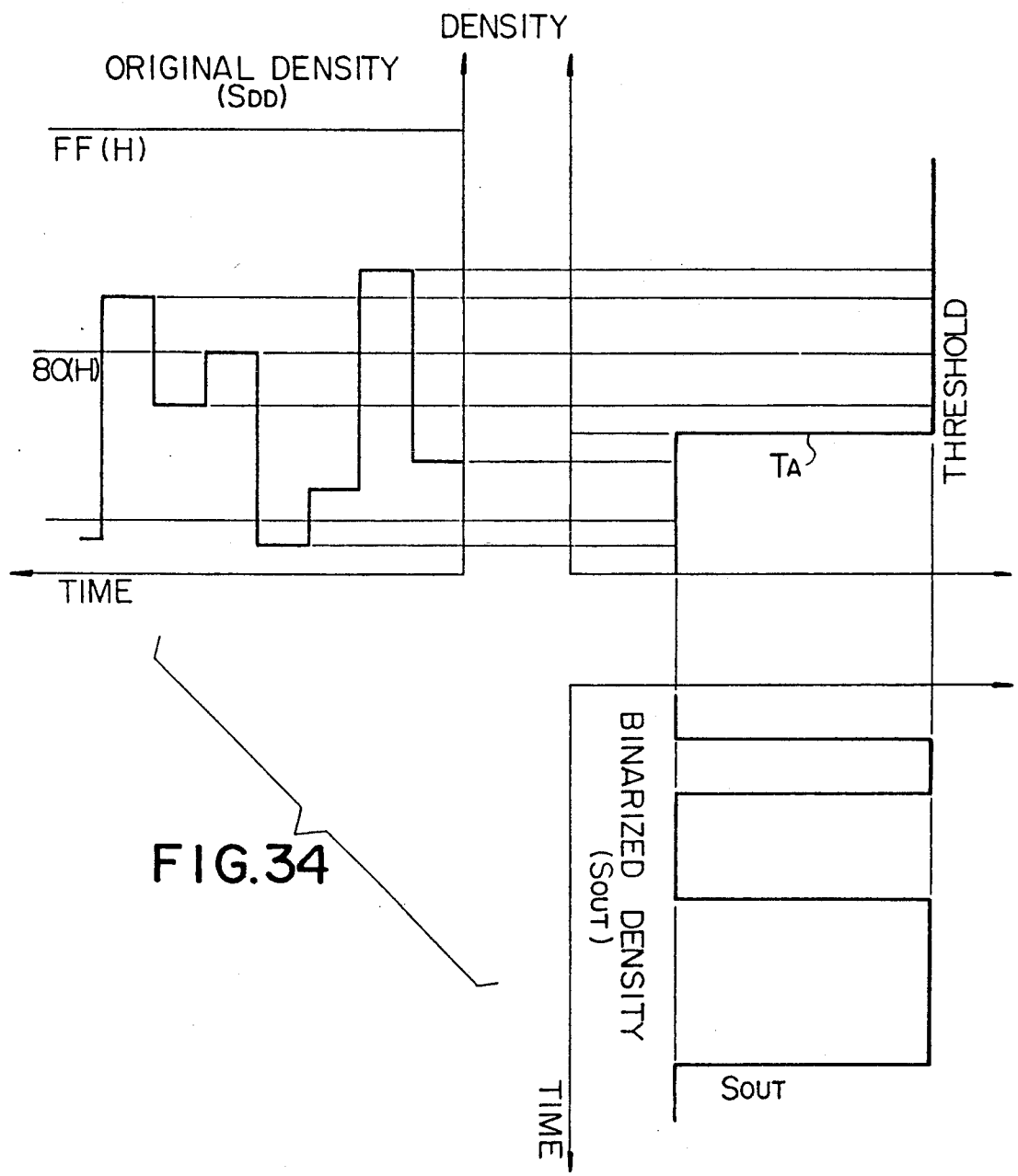
FIG. 34 is similar to FIGS. 3A to 3C, respectively, but shows the basic principles on which the original density levels of pixels forming a frame of image in a character document having a relatively light background area may be binarized in the simple binarization mode of image reading operation in the preliminary scan control subroutine program illustrated in FIG. 32 with use of a relatively low first threshold value to produce the binarized densities of the pixels.
Figure 35:
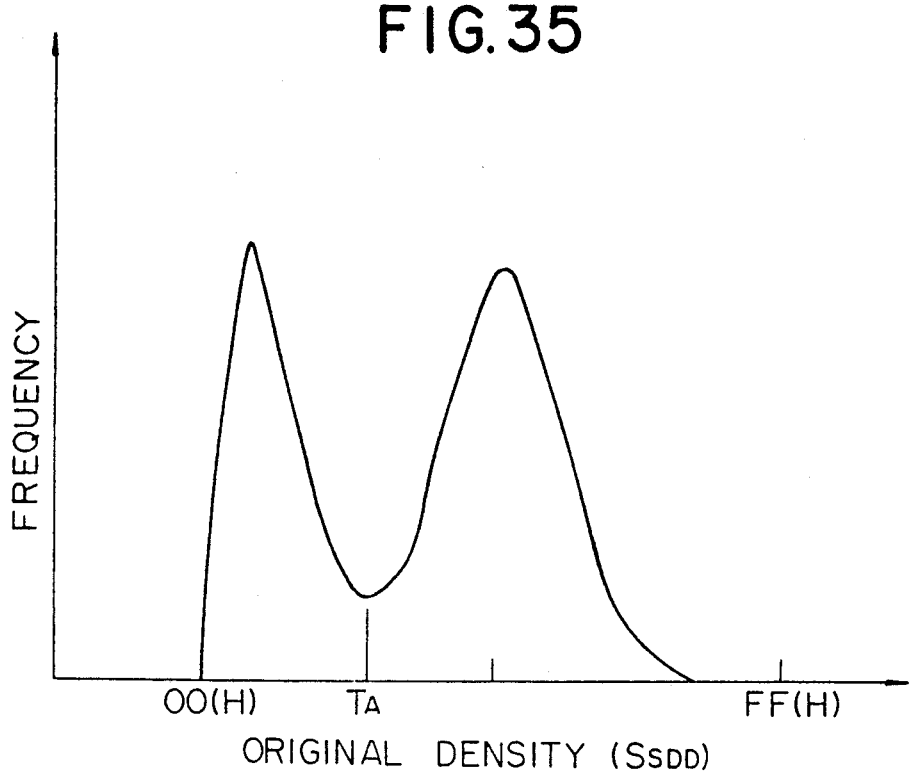
FIG. 35 is a diagram similar to FIG. 7 but now shows the distribution of the pixel densities of the frame of image which has the original density levels shown in FIG. 34 and which is to be binarized with use of the relatively low first threshold value shown in FIG. 34.

FIG. 34 shows the basic principles on which the original density levels of pixels forming a frame of image in a character document having a relatively light background area may be binarized in the simple binarization mode of image reading operation. It is herein assumed that the original density levels of the pixels forming the image frame are to be binarized with use of a relatively low first threshold value $T_A$ to produce the binarized densities of the pixels. FIG. 35 shows the distribution of the original density levels shown in FIG. 34 and thus assumed to be loaded into the simple binarization mode density data storage memory 226 at step P10 of the preliminary scan control subroutine program N02.

Figure 37:
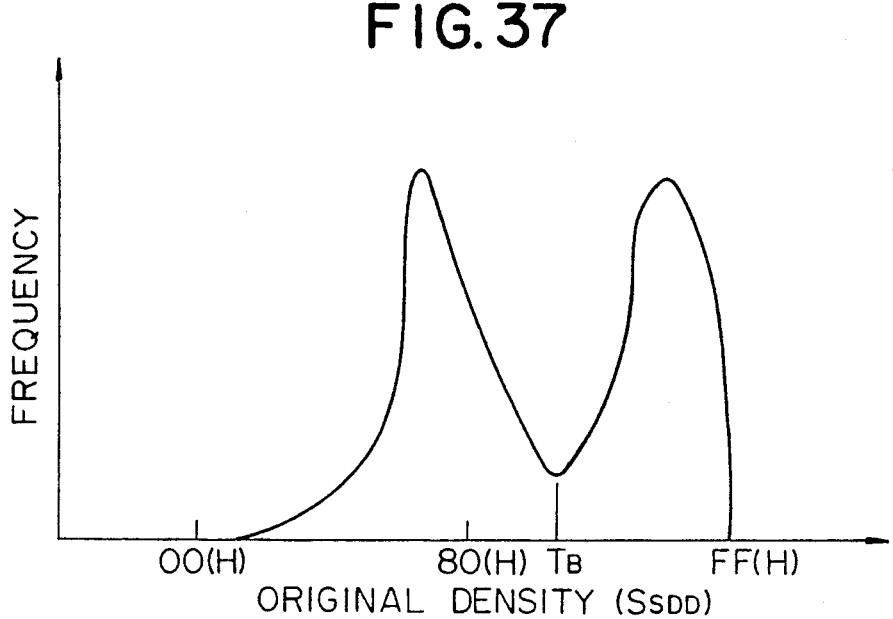
FIG. 37 is a diagram similar to FIG. 35 but shows the distribution of the pixel densities of the frame of image which has the original density levels shown in FIG. 36 and which is to be binarized with use of the relatively high second threshold value shown in FIG. 36.
Figure 36:
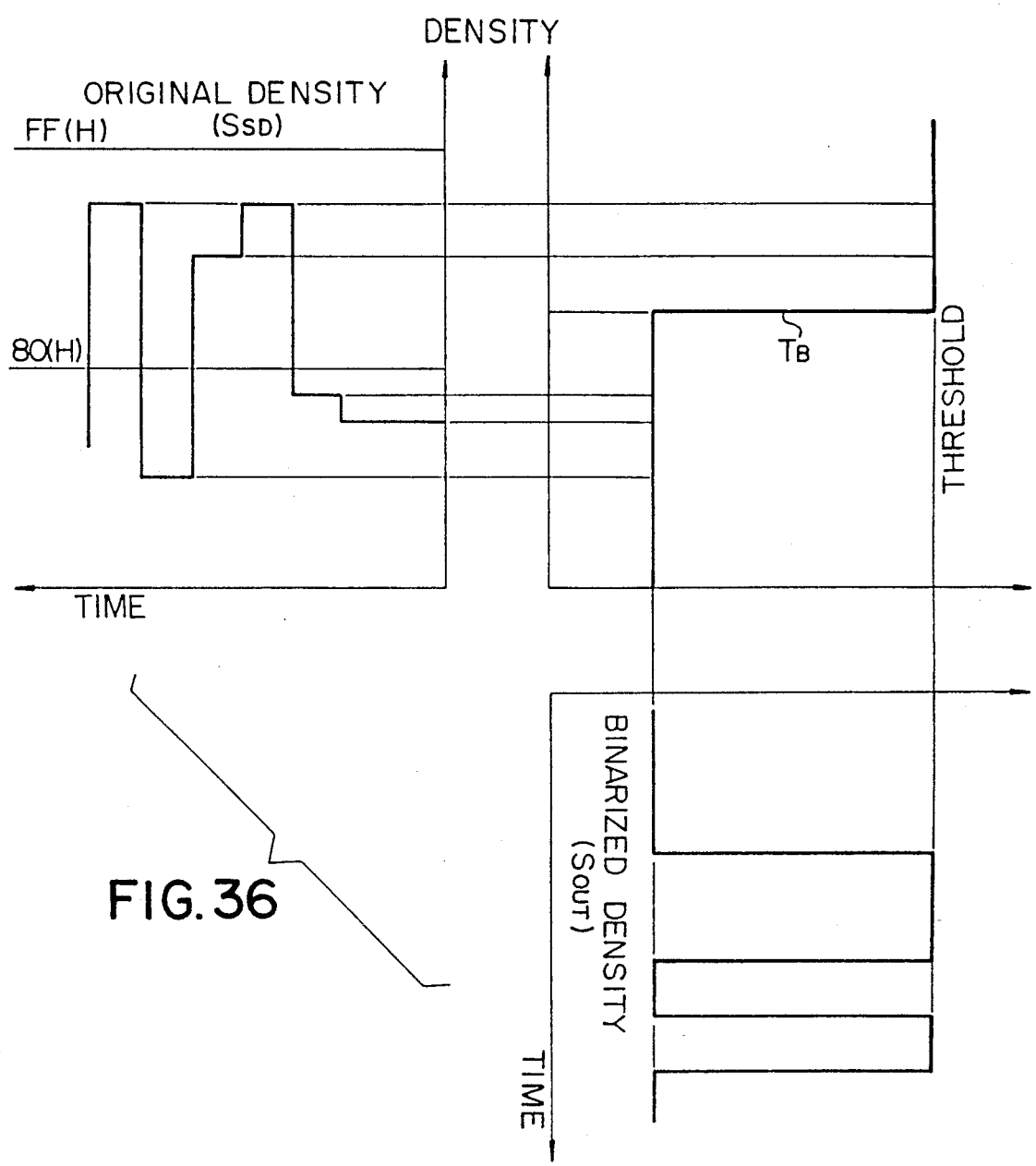
FIG. 36 is similar to FIG. 34, but shows the basic principles on which the original density levels of pixels forming a frame of image in a character document having a relatively dark background area may be binarized in the simple binarization mode of image reading operation in the preliminary scan control subroutine program illustrated in FIG. 32 with use of a relatively high second threshold value to produce the binarized densities of the pixels.

FIG. 36 shows the basic principles on which the original density levels of pixels forming a frame of image in a character document having a relatively dark background area may be binarized in the simple binarization mode of image reading operation. In this instance, the original density levels of the pixels forming the image frame are assumed to be binarized with use of a relatively high second threshold value $T_B$ to produce the binarized densities of the pixels. FIG. 37 shows the distribution of the density levels shown in FIG. 36 and also assumed to be loaded into the simple binarization mode density data storage memory 226 at step P10 of the preliminary scan control subroutine program N02.

As will be seen from comparison between the curves indicated in FIGS. 35 and 37, the image densities represented by the original image density data loaded into the simple binarization mode density data storage memory 226 at step P10 of the subroutine program N02 occur at low levels more frequently for the character document having the relatively light background area than for the character document having the relatively dark background area.

Figure 38:
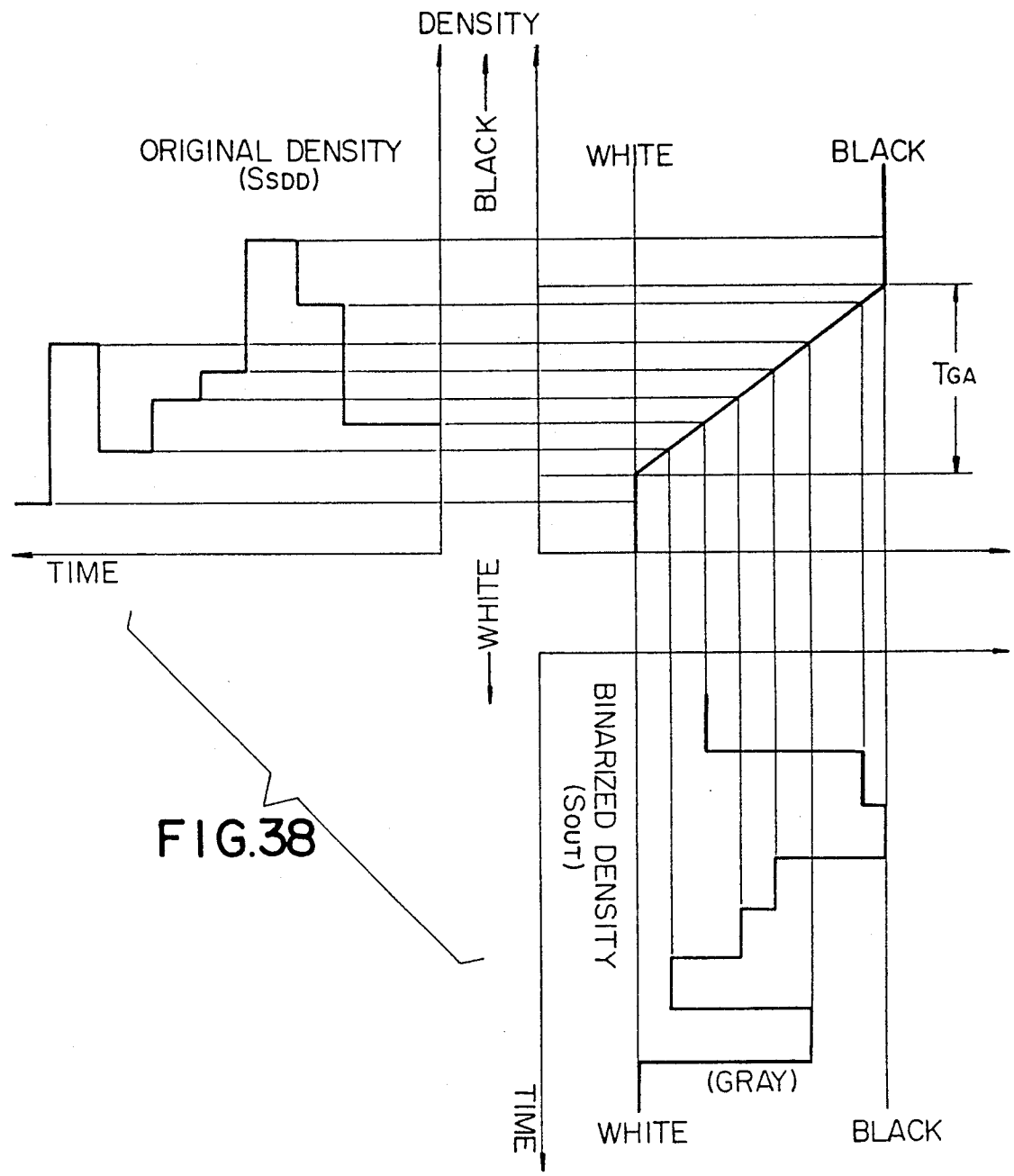
FIG. 38 is similar to FIGS. 6A to 6C, respectively, but shows the basic principles on which the original density levels of pixels forming a frame of image in a photographic document having a relatively light background area may be binarized in the halftone mode of image reading operation in the preliminary scan control subroutine program illustrated in FIG. 32 with use of a relatively low first set of threshold values to produce the binarized densities of the pixels.
Figure 39:
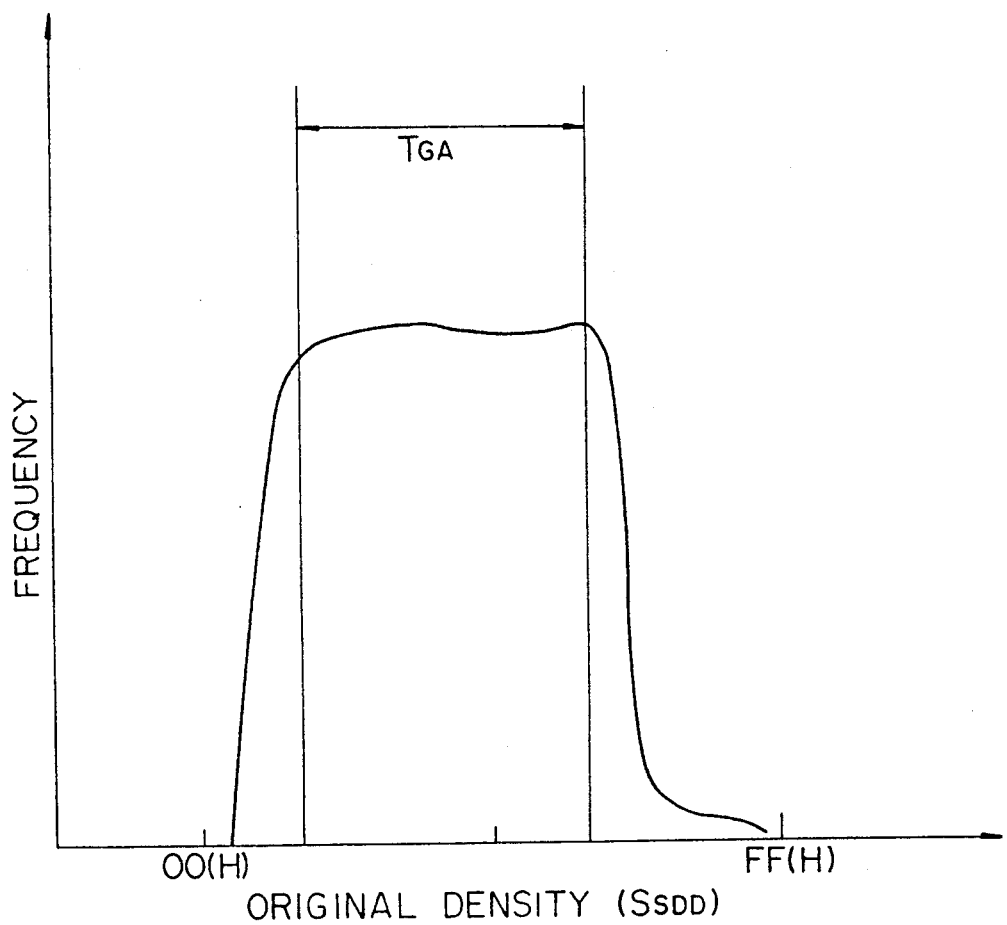
FIG. 39 is a diagram similar to FIG. 8 but shows the distribution of the pixel densities of the frame of image which has the original density levels shown in FIG. 38 and which is to be binarized with use of the relatively low first threshold value shown in FIG. 38.

On the other hand, FIG. 38 shows the basic principles on which the original density levels of pixels forming a frame of image in a photographic document having a relatively light background area may be binarized in the halftone mode of image reading operation. It is herein assumed that the original density levels of the pixels forming the image frame are to be binarized with use of a relatively low first set of threshold values $T_{GA}$ to produce the binarized densities of the pixels. FIG. 39 shows the distribution of the original density levels shown in FIG. 38 and also assumed to be loaded into the simple binarization mode density data storage memory 226 at step P10 of the preliminary scan control subroutine program N02.

Figure 40:
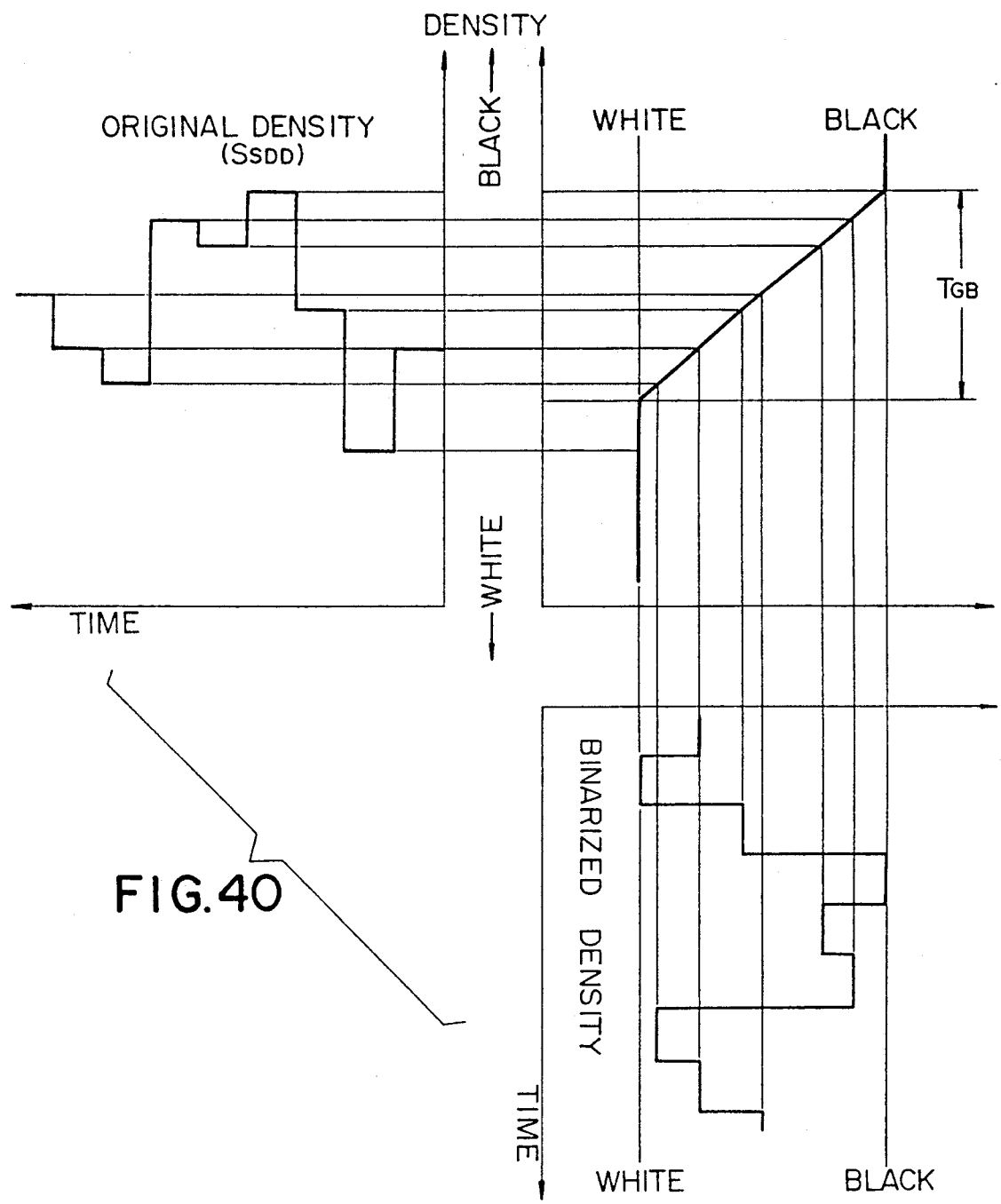
FIG. 40 is similar to FIG. 38, but shows the basic principles on which the original density levels of pixels forming a frame of image in a photographic document having a relatively dark background area may be binarized in the halftone mode of image reading operation in the preliminary scan control subroutine program illustrated in FIG. 32 with use of a relatively high second set of threshold values to produce the binarized densities of the pixels.
Figure 41:
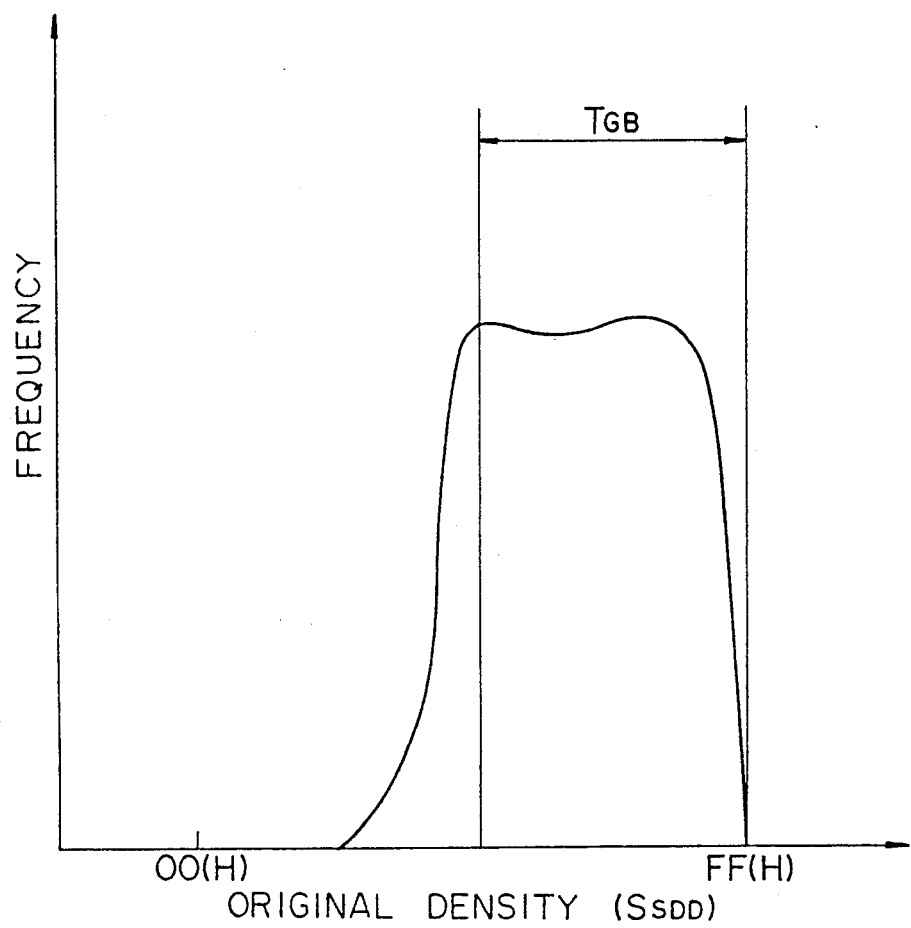
FIG. 41 is a diagram similar to FIG. 39 but shows the distribution of the pixel densities of the frame of image which has the original density levels shown in FIG. 40 and which is to be binarized with use of the relatively high second set of threshold values shown in FIG. 40.

FIG. 40 shows the basic principles on which the original density levels of pixels forming a frame of image in a photographic document having a relatively dark background area may be binarized in the halftone mode of operation. It is herein assumed that the original density levels of the pixels forming the image frame are to be binarized with use of a relatively high second set of threshold values $T_{GB}$ to produce the binarized densities of the pixels. FIG. 41 shows the distribution of the original density levels shown in FIG. 40 and assumed to be loaded into the simple binarization mode density data storage memory 226 at step P10 of the preliminary scan control subroutine program N02.

Comparison between the curves indicated in FIGS. 39 and 41 will reveal that the image densities represented by the original image density data loaded into the halftone mode density data storage memory 228 at step P10 of the preliminary scan control subroutine program N02 also occur at low levels more frequently for the photographic document having the relatively light background area than for the photographic document having the relatively dark background area.

On the basis of the original image density data loaded into the simple binarization mode density data storage memory 226 at step P10 of the preliminary scan control subroutine program N02, the optimum threshold value for use in the simple binarization mode of image reading operation is determined at step P16 of the subroutine program N02. In this instance, such an optimum threshold value for the simple binarization is to be fixed in the vicinity of the relatively low first threshold value $T_A$ for the character document having the relatively light background area, as will be seen from FIG. 35. For the character document having the relatively dark background area, the optimum threshold value for the simple binarization is to be fixed in the vicinity of the relatively high second threshold value $T_B$ for the character document having the relatively dark background area, as will be seen from FIG. 37.

Furthermore, the optimum threshold value for use in the halftone mode of image reading operation is determined at step P17 of the preliminary scan control subroutine program N02 on the basis of the original image density data loaded into the halftone mode density data storage memory 228 at step P10 of the subroutine program N02. In this instance, the optimum threshold value for the halftone mode of image reading operation is to be fixed within the range of the relatively low first set of threshold values $T_{GA}$ for the photographic document having the relatively light background area, as will be seen from FIG. 39. For the photographic document having the relatively dark background area, the optimum threshold value for the halftone mode of image reading operation is to be fixed within the range of relatively high second set of threshold values $T_{GB}$ for the photographic document having the relatively light background area, as will be seen from FIG. 39.

FIG. 42 shows the input-output characteristics of a group of conceptual threshold values, viz., the relationship between the original image densities indicated by the shaded image density signals $S_{SDD}$ and the image densities binarized on the principles indicated in FIG. 38. FIG. 43 shows an example of the dither pattern which may be used to provide the input-output characteristics indicated in FIG. 42. As will be seen from FIGS. 42 and 43, a group of conceptual threshold values ranges between 15(H) and 9C(H) for a photographic document having a relatively light background area.

FIG. 44 shows the relationship between the original image densities indicated by the shaded image density signals $S_{SDD}$ and the image densities binarized on the principles indicated in FIG. 40. FIG. 45 shows an example of the dither pattern which may be used to provide the input-output characteristics indicated in FIG. 44. From FIGS. 44 and 45 will be seen that a group of conceptual threshold values ranges between 69(H) and FF(H) for a photographic document having a relatively dark background area.

Fifth Preferred Embodiment (FIG. 46 to 56)

Description will be hereinafter made in regard to a fifth preferred embodiment of an image reading apparatus according to the present invention. In the fifth preferred embodiment of the present invention are used the control panel 140C shown in FIG. 25 and editor module 200C shown in FIG. 26 in addition to the mechanical and optical arrangement described with reference to FIG. 1. The fifth preferred embodiment of the present invention is characterized by the provision of a reference voltage generator connected between the central processing unit 172 and the analog-to-digital converter 186.

Figure 46:
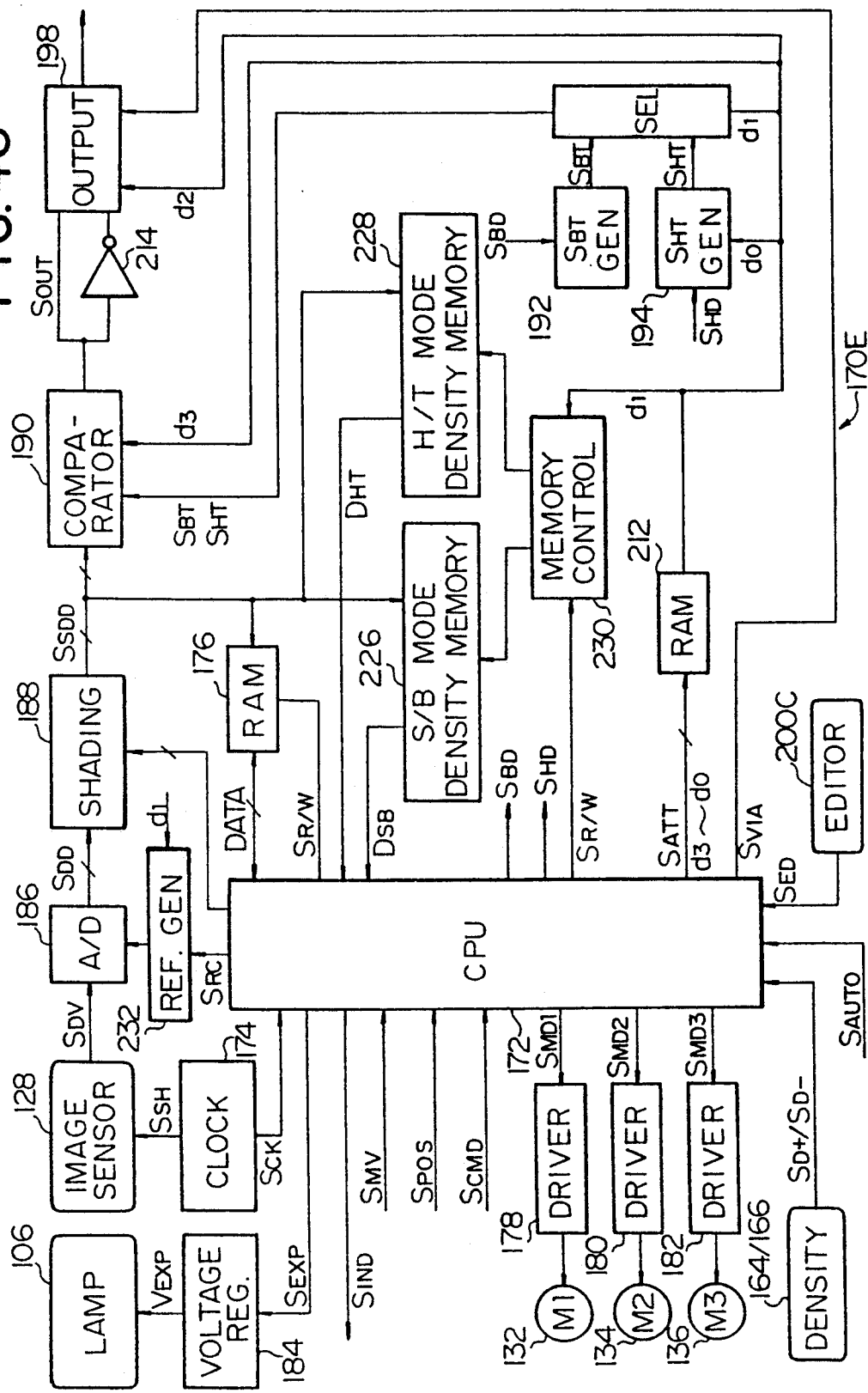
FIG. 46 is a block diagram similar to FIG. 27 but now shows the general construction and arrangement of a control circuit for use in the fifth preferred embodiment of an image reading apparatus according to the present invention.

FIG. 46 shows the general construction and arrangement of a control circuit 170E for use in the third preferred embodiment of an image reading apparatus according to the present invention. The control circuit 170E for use in the fifth preferred embodiment of the present invention is essentially similar to the control circuit 170D of the fifth preferred embodiment of the present invention. In the control circuit 170E herein shown, however, there is additionally provided a reference voltage generator circuit 232 having parallel input terminals connected to the central processing unit 172 and parallel output terminals connected to the control terminals of the analog-to-digital converter 186. The reference voltage generator circuit 232 further has a control terminal responsive to the bit $d_1$ of the four-bit attribute signal $S_{ATT}$.

As has been described, the bit $d_1$ of the attribute signal $S_{ATT}$ is indicative of the selection of the simple binarization mode of image reading operation when set to logic "0" state and the selection of the halftone mode of image reading operation when set to logic "1" state. The fraction of the attribute signal $S_{ATT}$ thus provided by the bit $d_1$ of the signal $S_{ATT}$ is supplied to not only to the control terminal of the reference voltage generator circuit 232 but to the control terminal of the simple-binarization/halftone mode selector circuit 196 and the control terminal of the memory control circuit 230 for the simple binarization and halftone mode density data storage memories 226 and 228.

Figure 47:
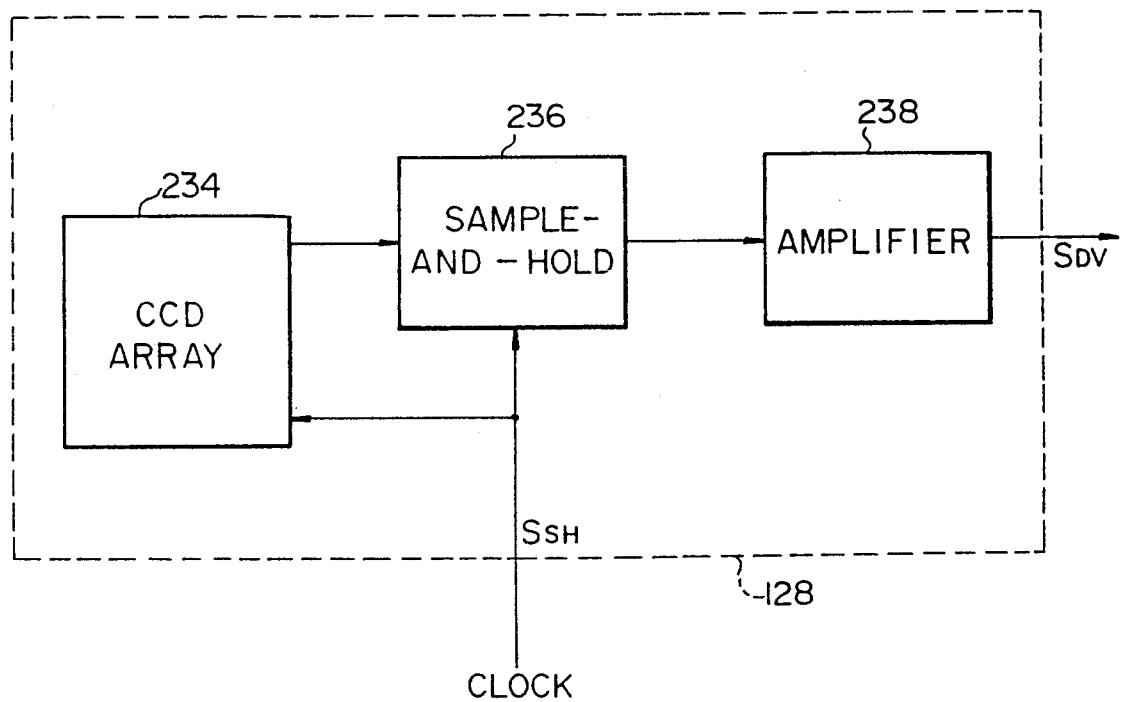
FIG. 47 is a block diagram showing the detailed construction of the image sensor included in the control circuit illustrated in FIG. 46.

As has been described, the analog-to-digital converter 186 receives analog image density data signal signals $S_{DV}$ representative of the image information contained in a beam of light incident on the image sensor 128. As illustrated in FIG. 47, the image sensor 128 comprises an array 234 of semiconductor charge-coupled devices (CCDs) which has a control terminal connected to the clock generator circuit 174. The CCD array 234 thus forming part of the image sensor 128 is thus responsive to the sample-and-hold signals $S_{SH}$ supplied from the clock generator circuit 174 to output analog signals respectively representative of the image densities of the pixels of each line of pixel elements on the document scanned by the image sensor 128. The analog image density data signals out from the individual elements of the CCD array 234 are sampled by a sample-and-hold circuit 236 also responsive to the sample-and-hold signals $S_{SH}$ and, upon amplification by an amplifier 238, output as the analog image density data signals $S_{DV}$ from the image sensor 128 to the analog-to-digital converter 186 as shown in FIG. 47 and further in FIG. 48.

Figure 49:
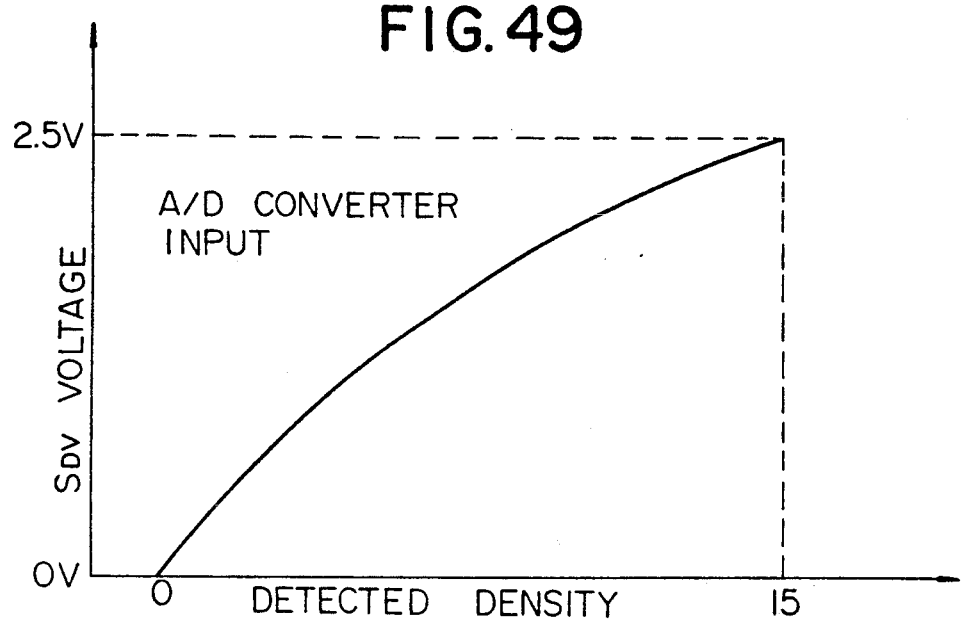
FIG. 49 is a graphic representation of the variation in the voltage of an analog image density data signal output from each of the individual elements of the CCD array forming part of the image sensor included in the control circuit illustrated in FIG. 46.
Figure 50:
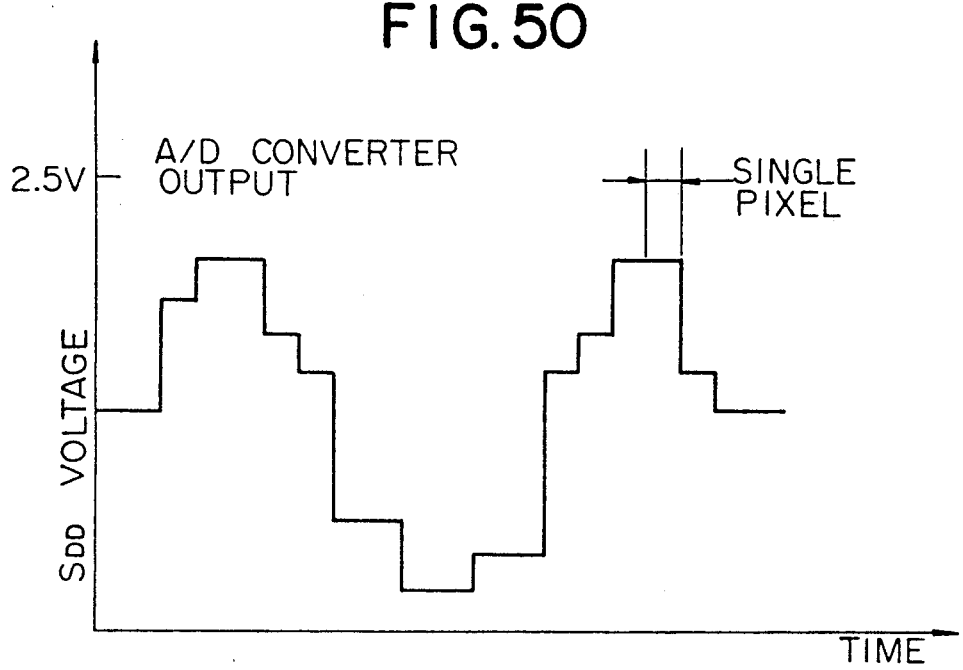
FIG. 50 is a view showing a graphic representation of a digital image density data signal which may be converted from the analog image density data signal indicated in FIG. 49.

The voltage of the analog image density data signal $S_{DV}$ out from each of the individual elements of the CCD array 234 is typically variable within the range of 0 volts to 2.5 volts, decreasing toward 0 volts as the image detected becomes lighter and increasing toward 2.5 volts as the image detected becomes darker, as will be seen from FIG. 49. Responsive to such an analog image density data signal $S_{DV}$ and further to the reference voltage signals $S_{REF}$ supplied from the reference voltage generator circuit 232, the analog-to-digital converter 186 converts the input signal $S_{VD}$ into corresponding digital signals $S_{DD}$ which stepwise vary between, for example, zero volts and 2.5 volts as indicated in FIG. 50.

As has been described, the digital signals $S_{DD}$ thus output from the analog-to-digital converter 186 are supplied to the shading circuit 188 which compensates for the spurious components in the supplied signals $S_{DD}$. The image density data provided in the form of shaded digital image density data signals $S_{SDD}$ output from the shading circuit 188 to the binarizing comparator circuit 190 is supplied on one hand to the binarizing comparator circuit 190 and on the other hand to the line memory 176.

Figure 48:
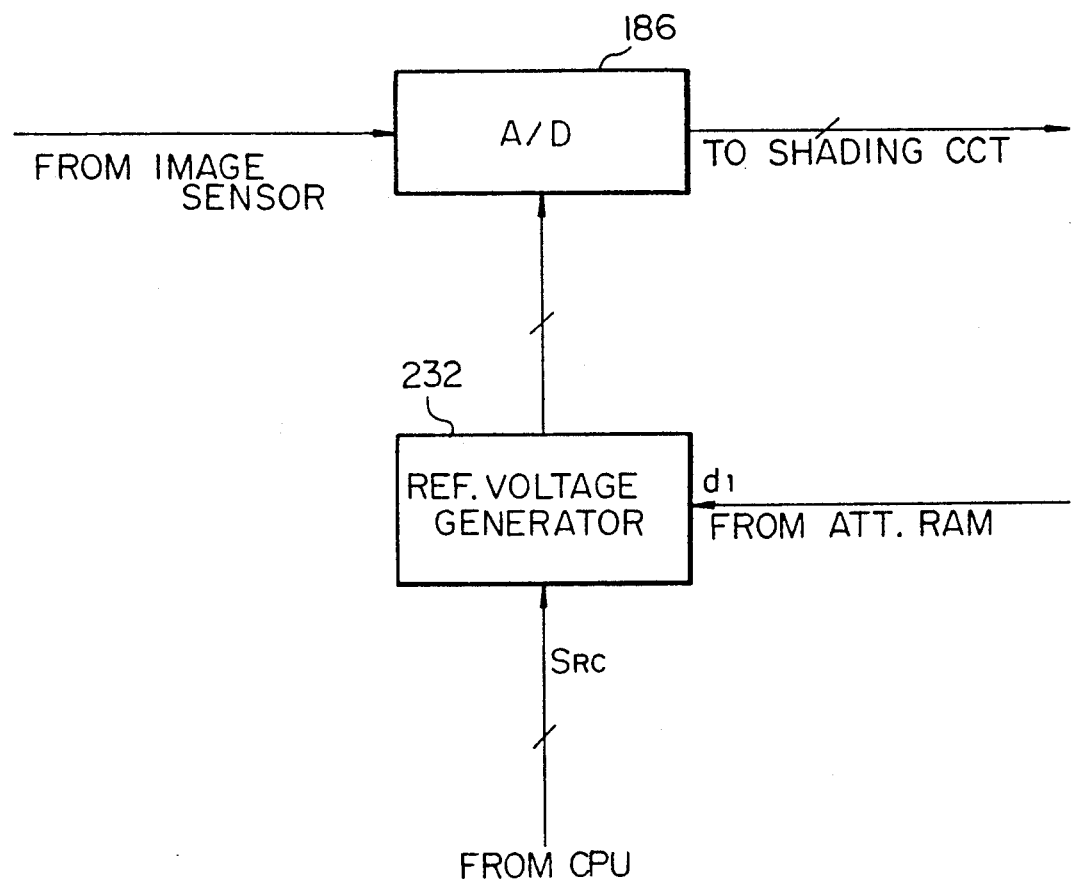
FIG. 48 is a block diagram showing the arrangement of an analog-to-digital converter and a converter reference voltage generator which also form part of the control circuit illustrated in FIG. 46.

As shown in FIG. 48, the reference voltage generator circuit 232 connected between the central processing unit 172 and analog-to-digital converter 186 is responsive to the bit $b_1$ of the attribute signal $S_{ATT}$ and further to a reference voltage control signal $S_{RC}$ output from the central processing unit 172. The image sensor 128 is responsive to sample-and-hold signals $S_{SH}$ supplied from the clock generator circuit 174 and outputs analog image density data signals $S_{DV}$ representative of the image information contained in a beam of light incident on the sensor 128. The analog-to-digital converter 186 receives these analog image density data signals $S_{DV}$ from the array of the charge-coupled devices forming the image sensor 128 and outputs corresponding digital signals $S_{DD}$ on the basis of the reference voltage signals $S_{REF}$ supplied from the central processing unit 172. The digital signals $S_{DD}$ thus output from the analog-to-digital converter 186 are supplied to the shading circuit 188 which compensates for the spurious components in the supplied signals $S_{DD}$ to eliminate the irregularities in the quantities of light incident on the individual charge-coupled devices forming the image sensor 128 and the irregularities in the degrees of sensitiveness of the charge-coupled devices.

The shaded digital image density data signals $S_{SDD}$ thus output from the shading generator circuit 188 are representative of the original pixel densities of the frame of image detected from the document D currently in use. The image density data in the form of the shaded digital image density data signals $S_{SDD}$ is on one hand stored in the line memory 176 and on the other hand supplied to a binarizing comparator circuit 190.

On the other hand, the bit $d_1$ of the attribute signal $S_{ATT}$ is set to logic "0" state when the character mode select key 158 on the control panel 140C is depressed and to logic "1" state when the halftone mode select key 160 on the control panel 140C is depressed. Responsive to the bit $d_1$ of the attribute signal $S_{ATT}$ set to logic "0" state, the reference voltage generator circuit 232 supplies to the analog-to-digital converter 186 the reference voltage signals $S_{REF}$ which are formulated to be optimum for the simple binarization mode of image reading operation by the reference voltage control signal $S_{RC}$ output from the central processing unit 172. On the other hand, when the bit $d_1$ of the attribute signal $S_{ATT}$ set to logic "1" state is received, the reference voltage generator circuit 232 supplies to the analog-to-digital converter 186 the reference voltage signals $S_{REF}$ formulated to be optimum for the halftone mode of image reading operation by the reference voltage control signal $S_{RC}$ from the central processing unit 172.

Figure 51:
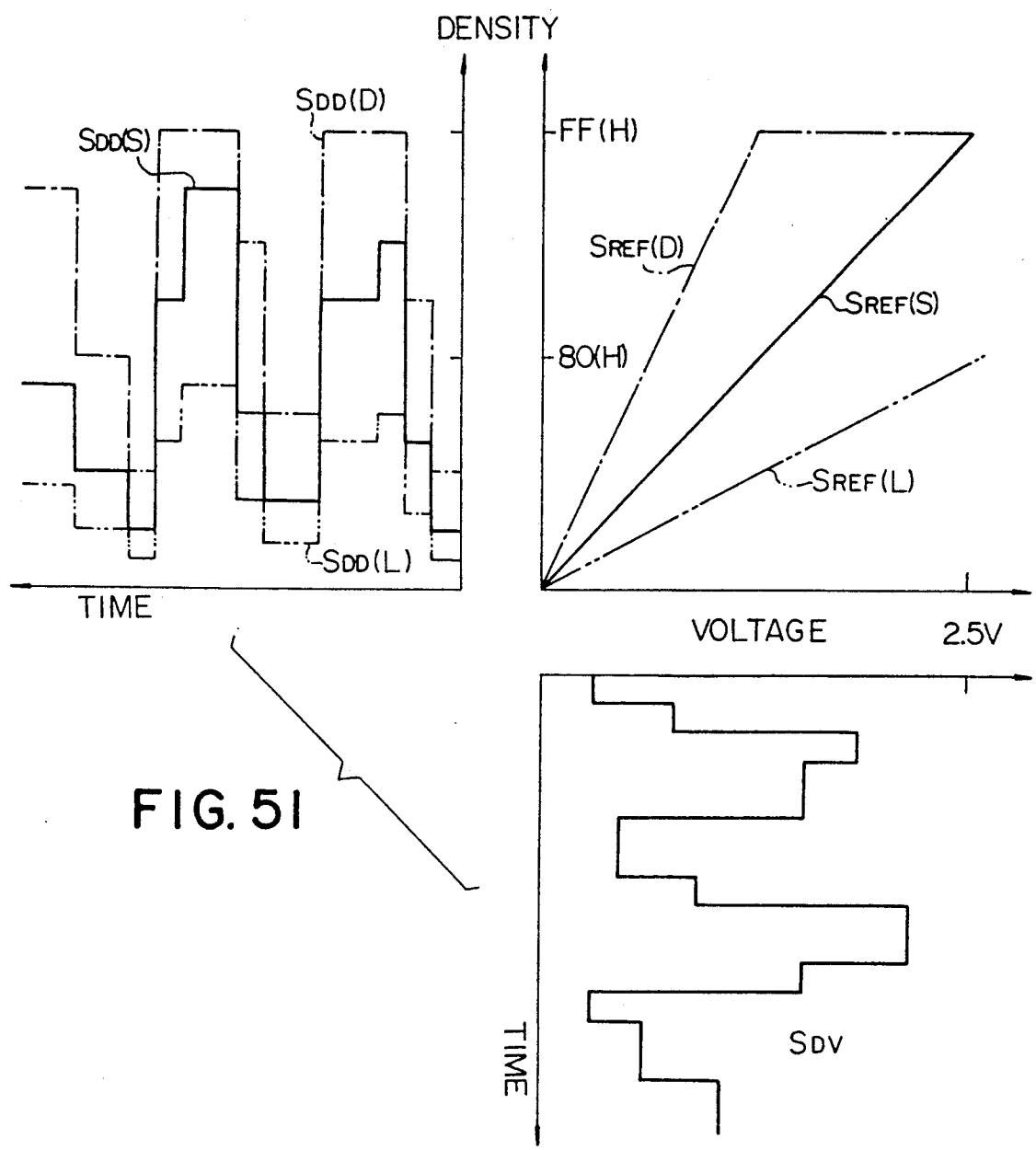
FIG. 51 shows diagrams showing the basic principles on which the original density levels of pixels forming a frame of image are to be binarized with different sets of reference voltage signals for the analog-to-digital converter in the control circuit illustrated in FIG. 46, thus showing examples of the signals involved in the operation of the analog-to-digital converter.

FIG. 51 shows examples of the signals involved in the operation of the analog-to-digital converter 186. In FIG. 51 is shown an example of the analog image density data signals $S_{DV}$ which may be supplied from the image sensor 128 to the analog-to-digital converter 186. FIG. 51 also show examples of the reference voltage signals $S_{REF}$ which may be output from the reference voltage generator circuit 232 responsive to the reference voltage control signal $S_{RC}$ output from the central processing unit 172. In FIG. 51, the plot indicated by full line represents examples of the standard reference voltage signals $S_{REF(S)}$ for use in the preliminary scanning of a document and the plots indicated by dot-and-dash and dots-and-dash lines represent examples of the reference voltage signals $S_{REF(D)}$ and $S_{REF(L)}$ to reproduce relatively dark and light images from documents having relatively light and dark image patterns, respectively, by regular scanning of the documents. The standard reference voltage signals $S_{REF(S)}$ for use in the preliminary scanning operation is variable within the range of 0 volts and 2.5 volts which correspond to the image density levels of 00(H) and FF(H), respectively. FIG. 51 also shows examples of the digital image density data signals $S_{DD}$ which may be output from the analog-to-digital converter 186 responsive to the analog image density data signals $S_{DV}$ and the reference voltage signals $S_{REF(S)}$, $S_{REF(D)}$ and $S_{REF(L)}$. In FIG. 51, the waveform indicated by full lines represents an example of the digital image density data signals $S_{DD(S)}$ output from the analog-to-digital converter 186 responsive to the standard reference voltage signals $S_{REF(S)}$ during preliminary scanning of a document. The waveforms indicated by dot-and-dash and dots-and-dash lines in FIG. 51 represent examples of the digital image density data signals $S_{DD(D)}$ and $S_{DD(L)}$ output from the analog-to-digital converter 186 responsive to the reference voltage signals $S_{REF(D)}$ and $S_{REF(L)}$ during regular scanning of documents having relatively dark and light image patterns, respectively.

Figure 52B:
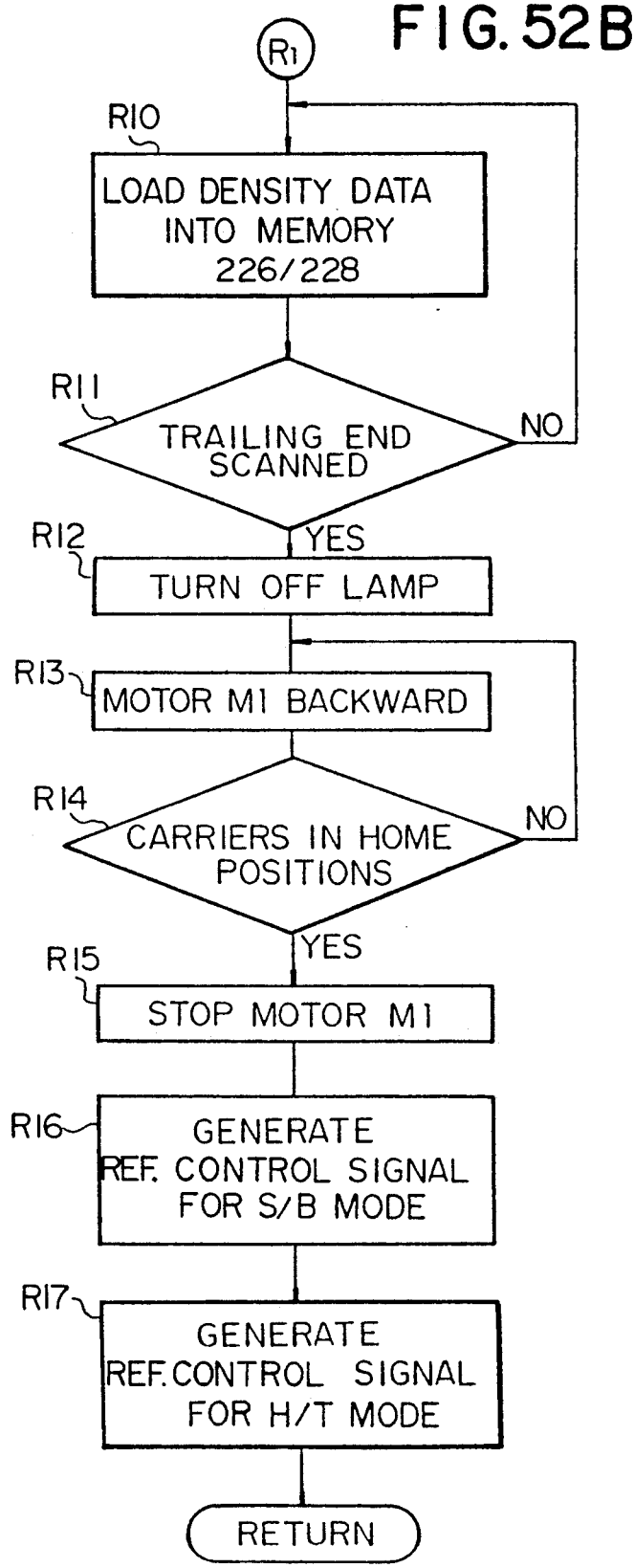

FIGS. 52A and 52B are flowcharts showing the details of the preliminary scan control subroutine program to be executed by the central processing unit 172 hereinbefore described with reference to FIG. 46. The preliminary scan control subroutine program is similar to its equivalent described with reference to FIGS. 32A and 32B and is to be executed by the central processing unit 172 when it is detected at step N01 of the subroutine program K05 that the flag "FAUTO" is set to logic "1" state prior to execution of the regular scan control subroutine program. During execution the preliminary scan control subroutine program, the central processing unit 172 supplies the standard reference voltage signals $S_{REF(S)}$ to the analog-to-digital converter 186.

The preliminary scan control subroutine program to be executed by the central processing unit 172 of the fifth preferred embodiment of the present invention consists of steps R01 to R17, of which the steps R01 to R15 are similar to the steps P01 to P15 of the subroutine program N02 described with reference to FIGS. 32A and 32B.

When it is thus found at step R14 that the lamp/mirror and mirror carriers 118 and 120 have reached their respective home positions, the central processing unit 172 proceeds to step R15 to reset the signal $S_{MD1}$ and stop the scanner drive motor 132. Thereupon, the central processing unit 172 proceeds to steps R16 and R17 to fetch the image density data stored at step R10 in the simple binarization mode density data storage memory 226 and the halftone mode density data storage memory 228. At steps R16 and R17, the central processing unit 172 further calculates the value for the reference control signal $S_{RC}$ to enable the reference voltage generator circuit 232 to generate the optimum reference voltage signal for the regular scanning of the preliminarily scanned document. Responsive to the reference control signal $S_{RC}$ thus generated by the central processing unit 172, the reference voltage generator circuit 232 produces the optimum reference voltage signal $S_{REF(D)}$ or $S_{REF(L)}$ for the regular scanning of the preliminarily scanned document in respect of the simple binarization or halftone mode of image reading operation depending on the logic state of the bit $d_1$ of the attribute signal $S_{ATT}$ supplied to the control terminal of the circuit 232.

FIGS. 53A to 53E show the basic principles on which the binarized image density data signals $S_{OUT}$ are to be produced from the analog image density data signals $S_{DV}$ with the standard reference voltage signals $S_{REF(S)}$ applied to the analog-to-digital converter 186 during simple binarization mode of image reading operation. FIGS. 53A, 53B and 53C are diagrams similar to FIG. 51 and thus show an example of the analog image density data signals $S_{DV}$ (FIG. 53A) which may be supplied from the image sensor 128 to the analog-to-digital converter 186, examples of the reference voltage signals $S_{REF}$ (FIG. 53B) which may be output from the reference voltage generator circuit 232, and examples of the digital image density data signals $S_{DD}$ (FIG. 53C) which may be output from the analog-to-digital converter 186 responsive to the analog image density data signals $S_{DV}$ and the reference voltage signals $S_{REF}$. Furthermore, FIGS. 53C, 53D and 53E are diagrams similar to FIGS. 34 or 36, and thus show the basic principles on which the digital image density data signals $S_{DD}$ (FIG. 53C) may be binarized in the simple binarization mode of image reading operation with use of the threshold value $T_{SB}$ (FIG. 53D) to produce the binarized image density signals $S_{OUT}$ (FIG. 53E).

The plot indicated in FIG. 53A is obtained with a document having a relatively light image and accordingly the analog image density data signals $S_{DV}$ supplied from the image sensor 128 to the analog-to-digital converter 186 has relatively low voltage levels. If the standard reference voltage signals $S_{REF(S)}$ having the minimum and maximum voltages of 0 volts and 2.5 volts corresponding to the image density levels of 00(H) and FF(H), respectively, are used for the regular scanning of such a document, the digital image density data signals $S_{DD(S)}$ output from the analog-to-digital converter 186 also have relatively low voltage levels as will be seen from FIG. 53C. In FIG. 53C, the maximum voltage level $V_{max(S)}$ of the digital output signals $S_{DD(S)}$ from the analog-to-digital converter 186 is shown approximating the level for an image density level intermediate between the levels 80(H) and FF(H). The result will be that the image reproduced from the image density signals $S_{OUT}$ (FIG. 53E) binarized from such digital output signals $S_{DD(S)}$ from the analog-to-digital converter 186 appear more whitish than the original image on the document does.

Figure 54:
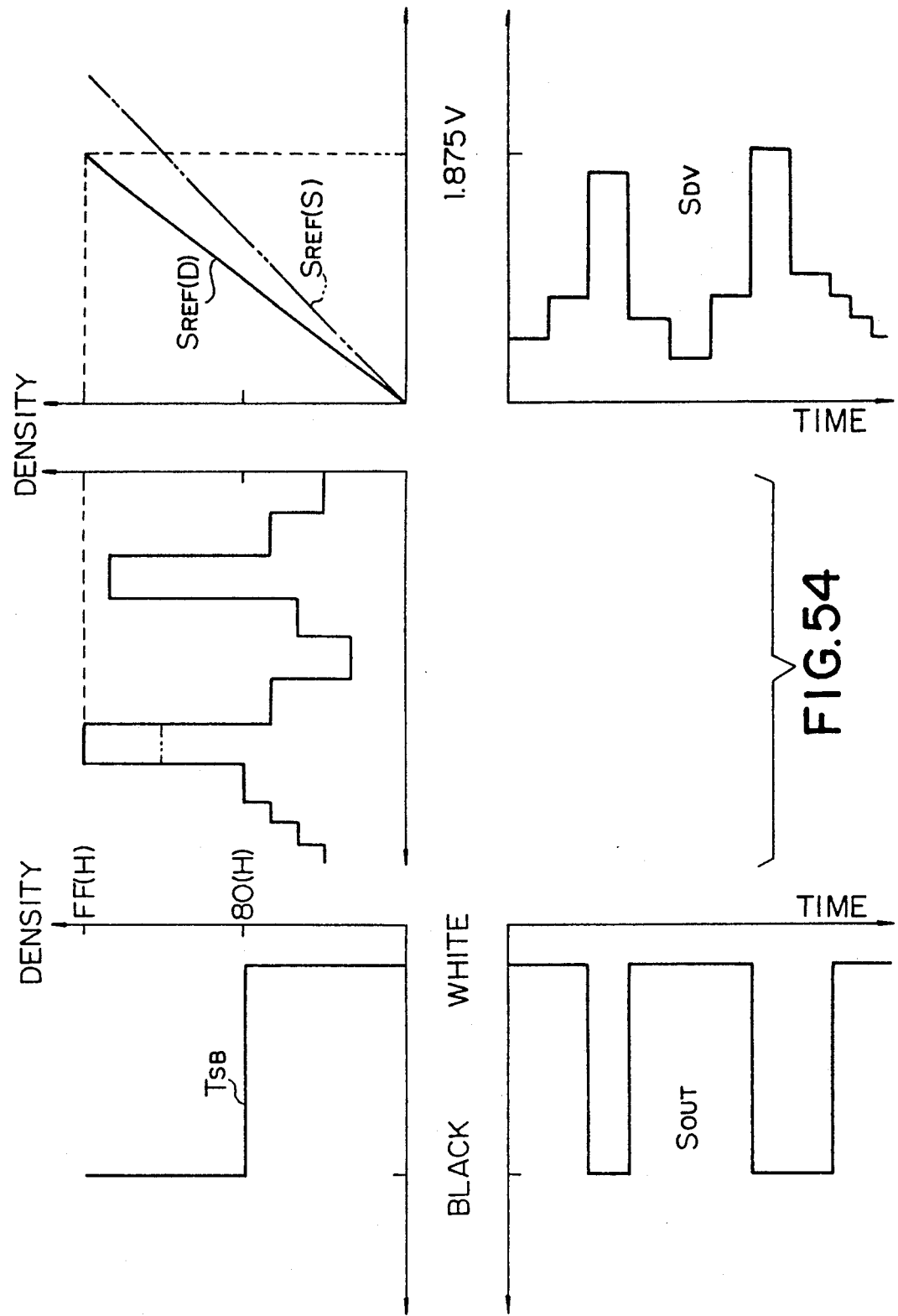
FIGS. 54 shows diagrams showing the basic principles on which binarized image density data signals are to be produced from analog image density data signals with modified reference voltage signals applied to the analog-to-digital converter during simple binarization mode of image reading operation.

In order to make the reproduced image more blackish, it is necessary to produce the digital output signals from the analog-to-digital converter 186 in such a manner that the maximum voltage level of the digital output signals from the analog-to-digital converter 186 is located closer to the maximum density level FF(H) as indicated by phantom lines in FIG. 53C. Such digital image density data signals can be produced by the use of modified reference voltage signals $S_{REF(D)}$ having a lower maximum voltage of, for example, 1.875 volt in response to the maximum image density level FF(H) as indicated by full line in FIG. 54. FIG. 54 shows diagrams similar to FIGS. 53A to 53E, respectively, and show the basic principles on which the binarized image density data signals $S_{OUT}$ are to be produced from the analog image density data signals $S_{DV}$ with the modified reference voltage signals $S_{REF(D)}$ applied to the analog-to-digital converter 186 during simple binarization mode of image reading operation.

Modifying the reference voltage characteristics in the above described manner is, briefly, to vary the gradient of the characteristic curve about the origin of the coordinate system or, in other words, as simply to vary the upper limit value of the reference voltage signals. A change in the upper limit value of the reference voltage signals would result in changes in the differences between the individual digital output signals from the analog-to-digital converter 186 as will be seen from comparison between FIGS. 53C and 54. Changes in the differences between the output signals from the analog-to-digital converter 186 in turn will result in changes in the contrasts of the individual elements of the image reproduced from the resultant binary image density data signals $S_{OUT}$ as will be seen from comparison between FIGS. 53D and 54. Such variation in the contrasts of the individual elements of the image reproduced can be compensated for if a suitable bias voltage is added to the modified reference voltage to increase or decrease the lower limit value of the reference signal to be put to actual use.

Figure 55:
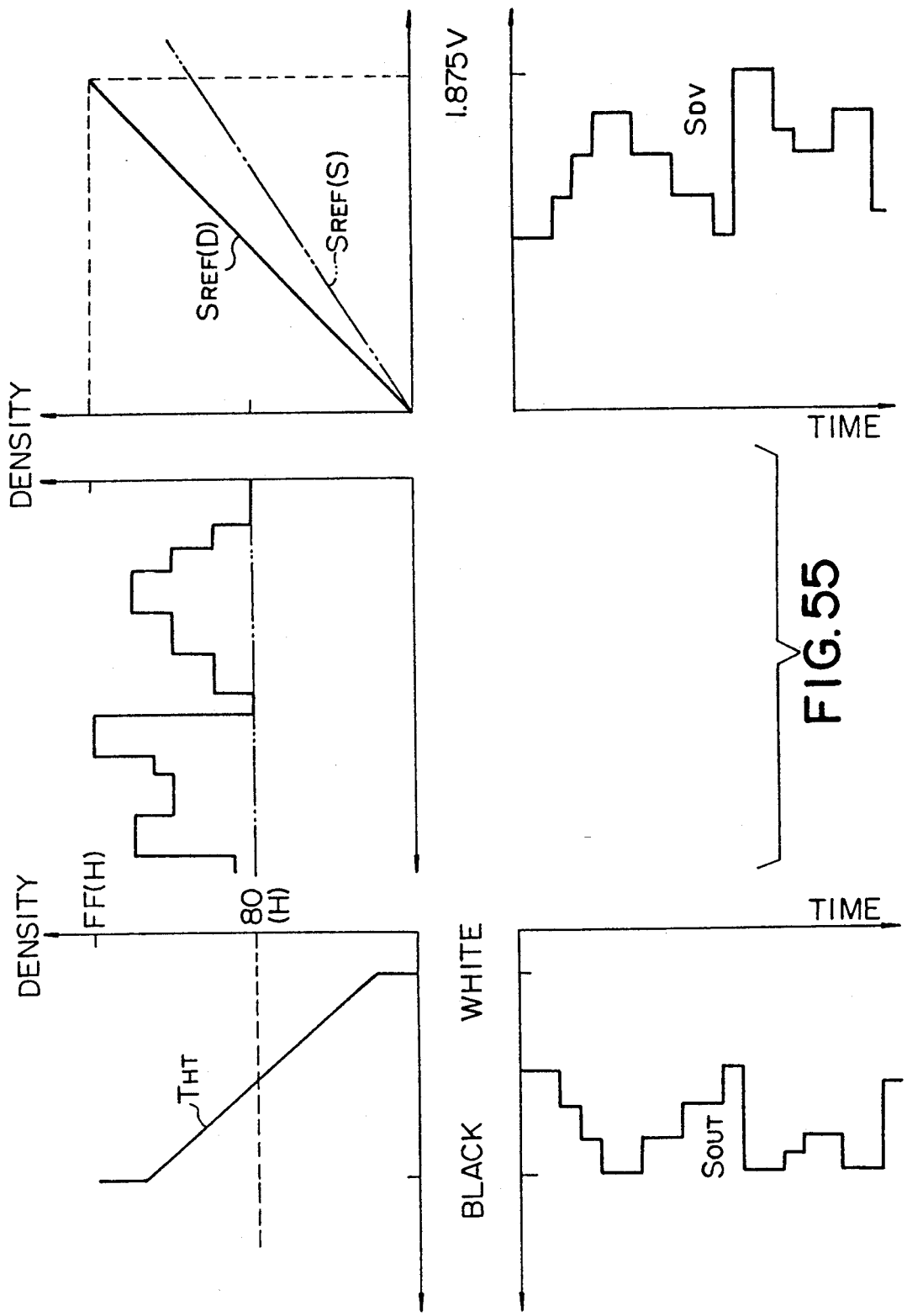
FIG. 55 shows diagrams showing the basic principles on which binarized image density data signals are to be produced from analog image density data signals with standard reference voltage signals applied to the analog-to-digital converter during halftone mode of image reading operation.

FIG. 55 shows diagrams similar to FIGS. 53A to 53E, respectively, and show the basic principles on which the binarized image density data signals $S_{OUT}$ are to be produced from the analog image density data signals $S_{DV}$ with the standard reference voltage signals $S_{REF(S)}$ applied to the analog-to-digital converter 186 during halftone mode of image reading operation. Thus, the digital image density data signals $S_{DD}$ may be binarized in the halftone mode of image reading operation with use of the threshold value $T_{HT}$ to produce the binarized image density signals $S_{OUT}$.

The plot indicated in FIG. 55 is obtained with a document having a relatively dark image and accordingly the analog image density data signals $S_{DV}$ supplied from the image sensor 128 to the analog-to-digital converter 186 has relatively high voltage levels. If the standard reference voltage signals $S_{REF(S)}$ having the minimum and maximum voltages of 0 volts and 2.5 volts corresponding to the image density levels of 00(H) and FF(H), respectively, are used for the regular scanning of such a document, the digital image density data signals $S_{DD(S)}$ output from the analog-to-digital converter 186 also have relatively high voltage levels as will be seen from FIG. 55. The result will be that the image reproduced from the image density signals $S_{OUT}$ binarized from such digital output signals $S_{DD(S)}$ from the analog-to-digital converter 186 appear more blackish than the original image on the document does.

Figure 56:
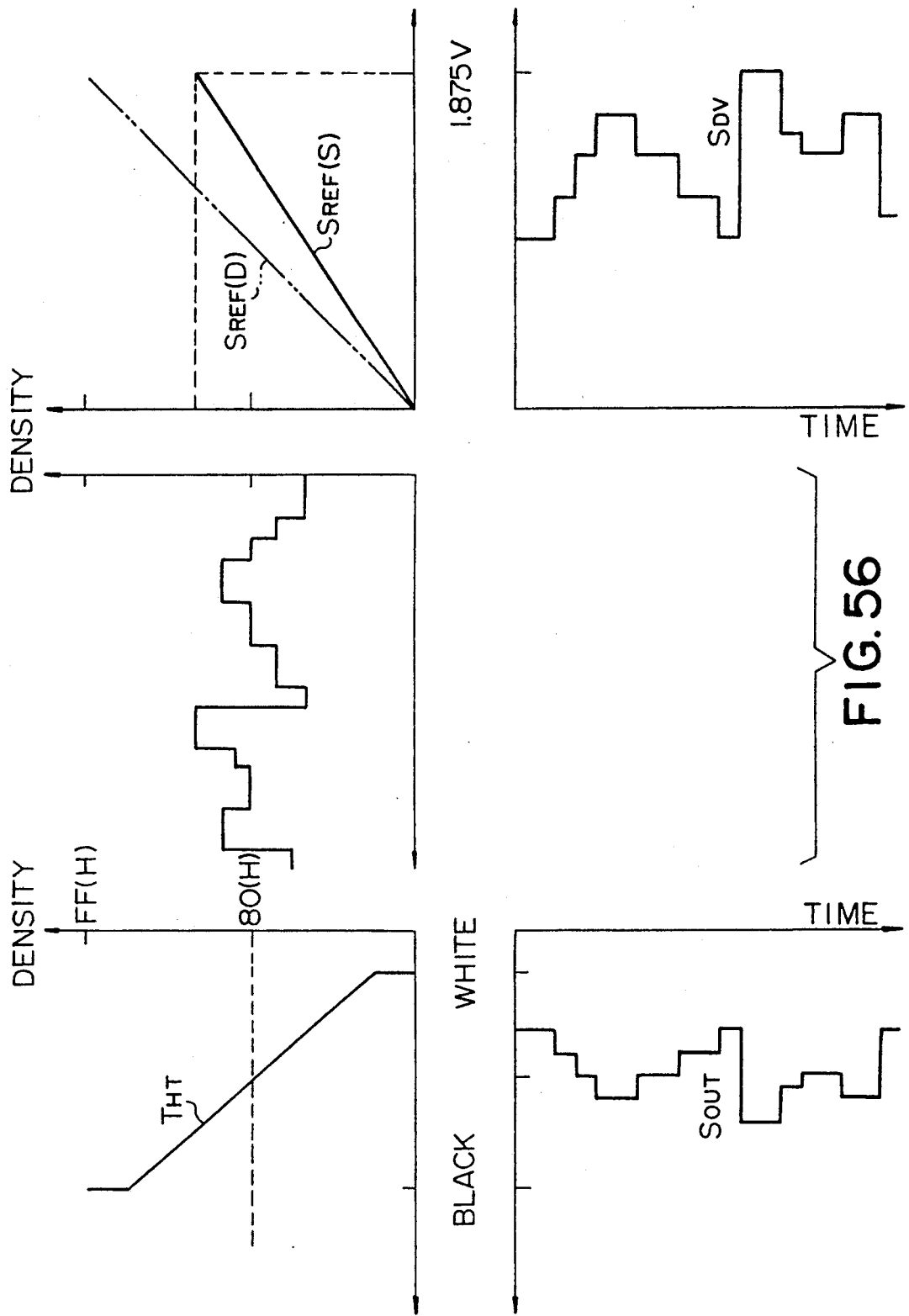
FIG. 56 shows diagrams showing the basic principles on which binarized image density data signals are to be produced from analog image density data signals with modified reference voltage signals applied to the analog-to-digital converter during halftone mode of image reading operation.

In order to make the reproduced image more whitish, it is necessary to produce the digital output signals from the analog-to-digital converter 186 in such a manner that the intermediate voltage level or weighted mean voltage level of the digital output signals from the analog-to-digital converter 186 is located close to, for example, the density level 80(H) as indicated by a phantom line in FIG. 55. Such digital image density data signals can be produced by the use of modified reference voltage signals $S_{REF(L)}$ having the maximum voltage of 2.5 volts in response to an image density level approximating the density level 80(H) as indicated by full line in FIG. 56. FIG. 56 shows diagrams similar to FIG. 54 and shows the basic principles on which the binarized image density data signals $S_{OUT}$ are to be produced from the analog image density data signals $S_{DV}$ with the modified reference voltage signals $S_{REF(L)}$ applied to the analog-to-digital converter 186 during halftone mode of image reading operation.

Sixth Preferred Embodiment (FIG. 57 to 65)

Description will be hereinafter made in regard to a sixth preferred embodiment of an image reading apparatus according to the present invention. The sixth preferred embodiment of the present invention is characterized in that the valid density for image reading can be adjusted either automatically or manually in respect of each of the local areas which may be designated by the operator of the apparatus. In the sixth preferred embodiment of the present invention is also used the mechanical and optical arrangement described with reference to FIG. 1.

Figure 57:
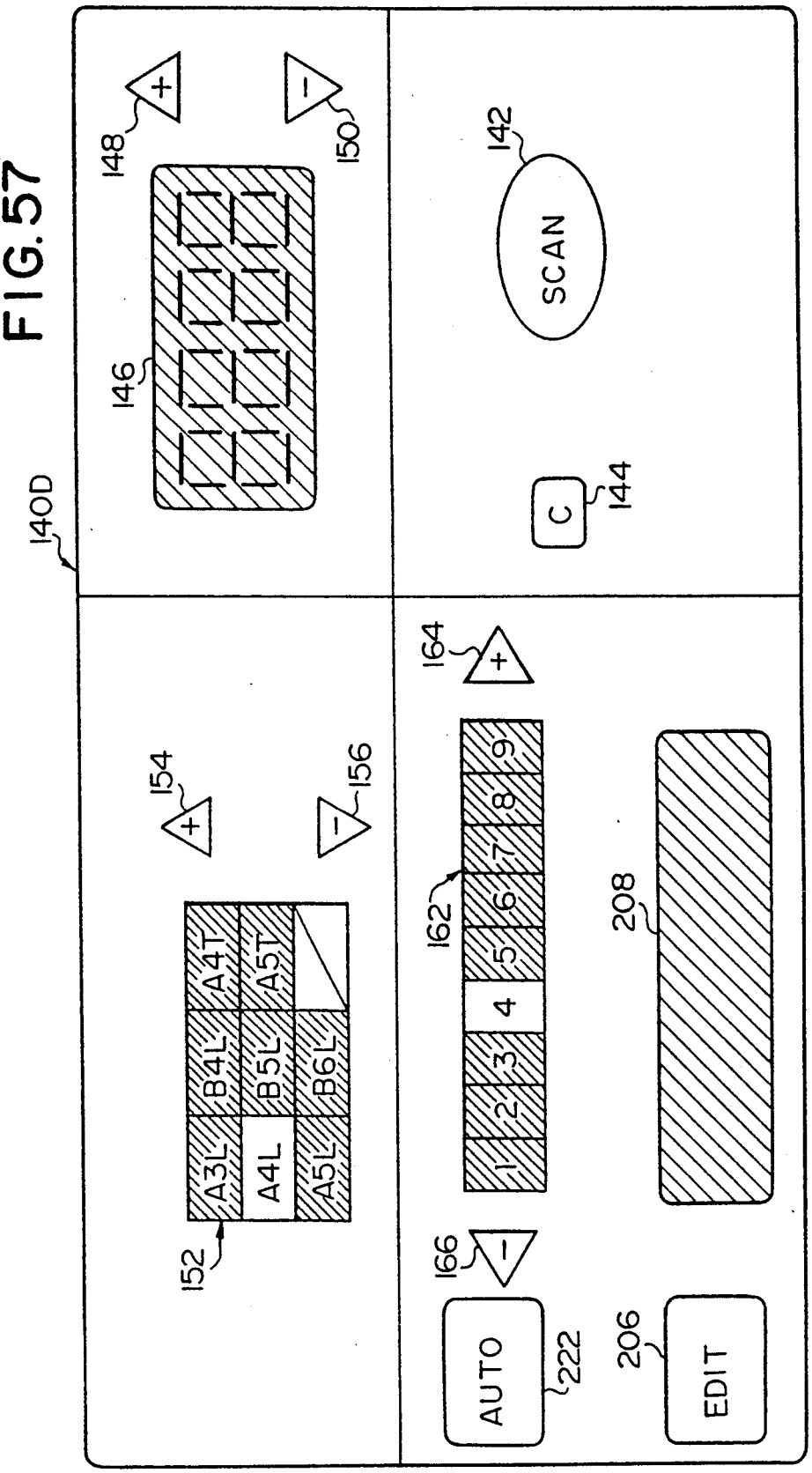
FIG. 57 is a perspective view showing the key and tablet configuration of an editor module forming part of a sixth preferred embodiment of an image reading apparatus according to the present invention.

FIG. 57 shows an example of the key/indicator configuration of a control panel 140D which also forms part of the sixth preferred embodiment of an image reading apparatus according to the present invention. On the control panel 140D are provided a scan start key 142, a common clear key 144, a four-digit eight-segment numerical display section 146, an image scale-up key 148, an image scale-down key 150, a sheet size indicator section 152, a first sheet size select key 154, and a second sheet size select key 156. The functions of these keys and display/indicator sections on the control panel 140D are similar to those of their respective equivalents in the control panel 140C described with reference to FIG. 25.

On the control panel 140D of the sixth preferred embodiment of the present invention is also provided a density indicator section 162 consisting of a series of subsections arranged in the order of lightness indicated by numerals "1" to "9". The density indicator section 162 is used to indicate the selected density for image reading manually entered through the control panel 140D. The operator of the apparatus is allowed to manually enter a desired density for image reading manually with use of a manual density "plus" key 164 to enter an instruction to increase the valid degree of lightness for image reading and a manual density "minus" key 166 to enter an instruction to decrease the valid degree of lightness.

The control panel 140D shown in FIG. 57 further comprises an editor communication grant key 206 used to enter an instruction to grant reception of data and commands from the editor module to be described, and an editor information display section 208 for visually indicating the data received from the editor module. When the editor communication grant key 206 is depressed after the key 206 was once depressed, the instruction which has been entered to grant reception of data and commands from the editor module is cancelled and entry of data and command signals through the editor module is invalidated as has been described. The operator of the apparatus is allowed to select an automatic density control mode through manipulation of an automatic density control key 222.

Figure 58:
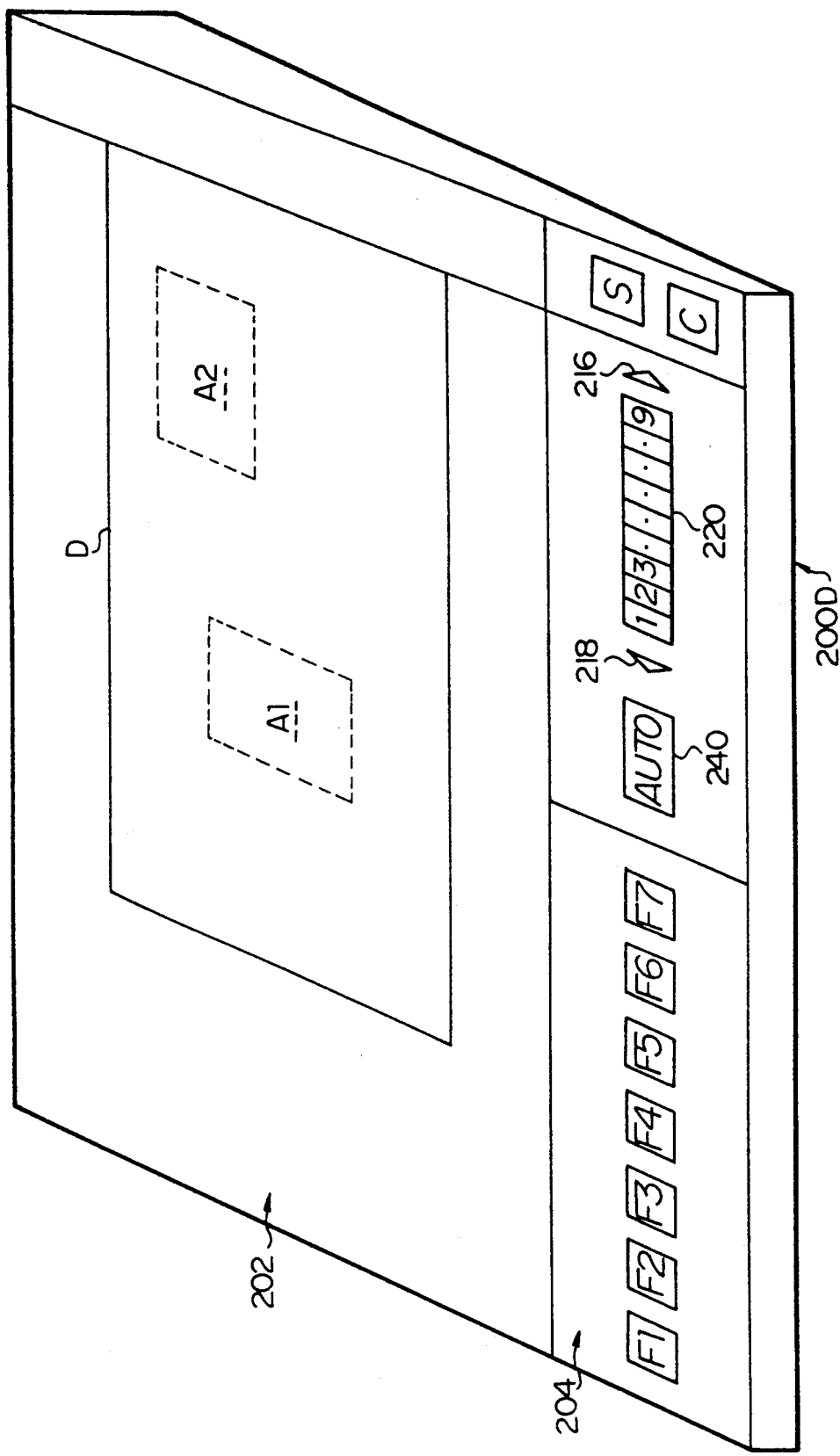
FIG. 58 is a plan view showing the key/indicator configuration of a control panel further included in the sixth preferred embodiment of an image reading apparatus according to the present invention.

FIG. 58 shows an editor module 200D for use in the sixth preferred embodiment of the present invention. Similarly to its counterpart (FIG. 26) in the fourth preferred embodiment of the present invention, the editor module 200D herein shown largely consists of a tablet section 202 and a key section 204 comprising a total of nine control keys. As has been noted with reference to FIG. 26, a square-shaped rectangular area of a document D such as the area "A1" or the area "A2" herein indicated by phantom lines can be defined simply by specifying the locations of the opposite ends of one of the diagonals of the area "A1" or the area "A2" with use of a light pen.

The control keys provided in the key section 204 of the editor module 200D include a trimming key "F1", a masking key "F2", a white/black reverse key "F3", a simple binarization mode select key "F4", a first dither-pattern halftone mode select key "F5", a second dither-pattern halftone mode select key "F6", and a trim/mask cancel key "F7". The functions achievable through use of these keys "F1" to "F7" are similar to those of their respective equivalents provided in the editor module 200D described with reference to FIG. 26. In the key section 204 of the editor module 200D are further provided a data-clear key "C" and a data-send key "S", which are also similar to their respective equivalents provided in the editor module 200C shown in FIG. 26.

In the key section 204 of the editor module 200D used in the sixth preferred embodiment of the present invention are provided additional control keys which include a density "plus" key 216, and a density "minus" key 218. The density "plus" and "minus" keys 216 and 218 are respectively provided to permit entry of instructions from the editor module 200D to increase and decrease the valid degree of lightness for image reading in respect of the specified local area "A1" or "A2" of the document D. In association with these density "plus" and "minus" keys 216 and 218 is provided a density indicator section 220 consisting of a series of subsections arranged in the order of lightness indicated by numerals "1" to "9". The subsection indicating the selected density for image reading is to be highlighted with the highlight stepwise moved in one direction along the indicator section 220 each time the density "plus" key 216 is depressed or in the opposite direction along the indicator section 220 each time the density "minus" key 218 is depressed by the operator.

In the editor module 200D used in the sixth preferred embodiment of the present invention is further provided an automatic density control key 240 to allow the operator of the apparatus to select an automatic density control mode. In the sixth preferred embodiment of the present invention, the valid density for image reading can be adjusted through manipulation of the manual density "plus" key 164 or manual density "minus" key 166 for each of the designated local areas "A1" and "A2" when the automatic density control key 222 is depressed after the key 222 was once depressed. When the automatic density control key 222 is depressed for a first time, the valid density for image reading is adjusted automatically for each of the designated local areas "A1" and "A2" on the basis of the control data generated by the preliminary scanning of the document to be reproduced.

The sixth preferred embodiment of the present invention also has several kinds of attributes of image reading operation that are achievable by the use of the keys "F1" to "F7". These attributes of image reading operation are essentially similar to those which are achievable in the fifth preferred embodiment of the present invention and include whiting (or blackening) out the image outside or inside a specified local area (key "F1" or "F2"), reversing the white and black features of an image on a document (key "F3"), selecting the simple binarization or halftone mode of image reading operation (key "F4"), and selecting the first or second prescribed dither pattern for the halftone mode of image reading operation (key "F5" or "F6").

Figure 59:
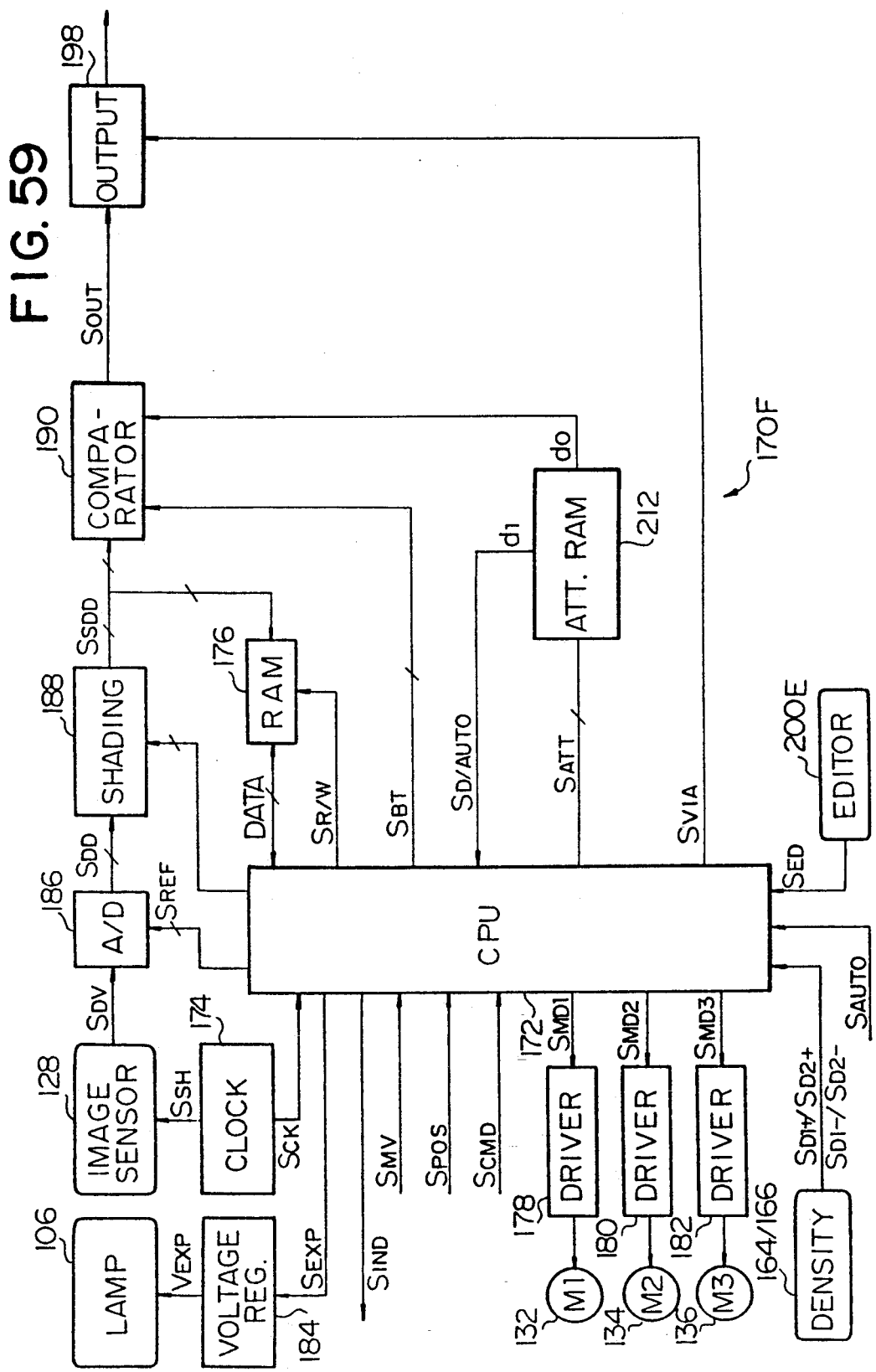
FIG. 59 is a block diagram showing the general construction and arrangement of a control circuit for use in the fourth preferred embodiment of an image reading apparatus according to the present invention.

FIG. 59 shows the general construction and arrangement of a control circuit 170F for use in the fourth preferred embodiment of an image reading apparatus according to the present invention. The control circuit 170F for use in the sixth preferred embodiment of the present invention is essentially similar to the control circuit of each of the preferred embodiments of the present invention hereinbefore described. In the control circuit 170F herein shown, the central processing unit 172 is thus responsive not only to the command signals supplied from the control panel 140C but to the data and command signals $S_{ED}$ generated in and supplied from the editor module 200C hereinbefore described with reference to FIG. 26. As has been noted, the data and command signals $S_{ED}$ generated by any of these keys on the editor module 200D are accepted by the central processing unit 172 only when the editor communication grant key 206 is depressed on the control panel 140D and are invalidated when the key 206 is depressed after the key was once depressed.

The command signals which the central processing unit 172 used in the sixth preferred embodiment of the present invention is to receive from the control panel 140D include an automatic density control mode select signal $S_{AUTO}$ produced when the automatic density control mode is selected with the automatic density control key 222 depressed by the operator. On receipt of this automatic density control mode select signal $S_{AUTO}$, the central processing unit 172 outputs a signal effective to activate the automatic density control mode indicator 224.

Responsive to the data and command signals $S_{ED}$ supplied from the editor module 200D and/or to the signal supplied from any of the manual density "plus" and "minus" keys 164 and 166 on the control panel 140C, the central processing unit 172 generates an attribute signal $S_{ATT}$ indicative of selected ones of the attributes of image reading operation. The attribute signal $S_{ATT}$ thus representative of the selected attributes of image reading operation is supplied to and stored into an attribute memory 212 implemented by a semiconductor random-access memory.

The signal $S_{ATT}$ to be generated by the central processing unit 172 is provided in the form of two bits $d_1$ and $d_0$ each of logic "1" or "0" state. These four bits $d_1$ and $d_0$ of the attribute signal $S_{ATT}$ provide first and second fractions, respectively, of the signal $S_{ATT}$. Thus, the bit $d_1$ of the attribute signal $S_{ATT}$ providing the first fraction of the signal $S_{ATT}$ indicates selection of the automatic density control mode when set to logic "0" state and selection of the manual density control mode when set to logic "1" state. The first fraction of the attribute signal $S_{ATT}$ provided by the bit $d_1$ of the signal $S_{ATT}$ is supplied from the attribute memory 212 to the central processing unit 172.

The bit $d_0$ of the attribute signal $S_{ATT}$ providing the second fraction of the signal $S_{ATT}$ indicates selection of the blanking out of an image pixel when set to logic "0" state and selection of the non-blanking of a pixel when set to logic "1" state. The second fraction of the attribute signal $S_{ATT}$ provided by the bit $d_0$ of the signal $S_{ATT}$ is supplied to one control terminal of the binarizing comparator circuit 190. To another control terminal of the comparator circuit 190 is supplied a simple binarization threshold signal $S_{BT}$ generated by the central processing unit 172 and indicative of the threshold value to be used for the binarization of the digital image density data signal $S_{SDD}$ supplied from the shading circuit 188. It may be noted that the comparator circuit 190 is connected directly to the image signal output circuit 198 which has a control terminal responsive to a valid image area signal $S_{VIA}$ of logic "1" or "0" state from the central processing unit 172.

In the control circuit of the sixth preferred embodiment of the present invention, the image density data in the form of the shaded digital image density data signals $S_{SDD}$ supplied to the binarizing comparator circuit 190 and representing the original densities of the pixels forming the image on the document D is compared with the simple binarization threshold signal $S_{BT}$ supplied from the central processing unit 172. The binarizing comparator circuit 190 is thus operative to generate binary image signals each of logic "1"or "0" state responsive to the shaded digital image density data signals $S_{SDD}$.

In the meantime, data representing the valid density for image reading is generated either on the basis of the density step-up or step-down signal $S_{D+}$ or $S_{D-}$ produced by the manual density "plus" or "minus" key 164 or 166 on the control panel 140D or automatically with the automatic density control key 224 depressed on the control panel 140D. The central processing unit 172 formulates the attribute signal $S_{ATT}$ on the basis of the data thus generated and loads the signal $S_{ATT}$ into the attribute memory 212. The attribute memory 212 then distributes the bit $d_0$ to the binarizing comparator circuit 190 and the bit $d_1$ back to the central processing unit 172.

Responsive to the bits $d_1$ of the attribute signal $S_{ATT}$ thus supplied from the attribute memory 212, the binarizing comparator circuit 190 combines each of the binary image signals generated therein with the bit $d_1$ of the attribute signal $S_{ATT}$ in a logic "AND" operation so that a binary image density data signal of logic "1" or "0" state is generated in response to each of the shaded digital image density data signals $S_{SDD}$. Each of the binary image signals thus generated is further combined in a logic "AND" operation with the threshold signal $S_T$ supplied from the central processing unit 172 with the result that a binary image signal $S_{OUT}$ of logic "1" or "0" state is generated in respect of each of the shaded digital image density data signals $S_{SDD}$. The binarizing comparator circuit 190 supplies the output signals $S_{OUT}$ to the image signal output circuit 198 and via the circuit 198 to a signal processing circuit of any external output unit such as a printer or a display unit (not shown) to reproduce the image represented by the output signals from the signal output circuit 198.

Figure 60:
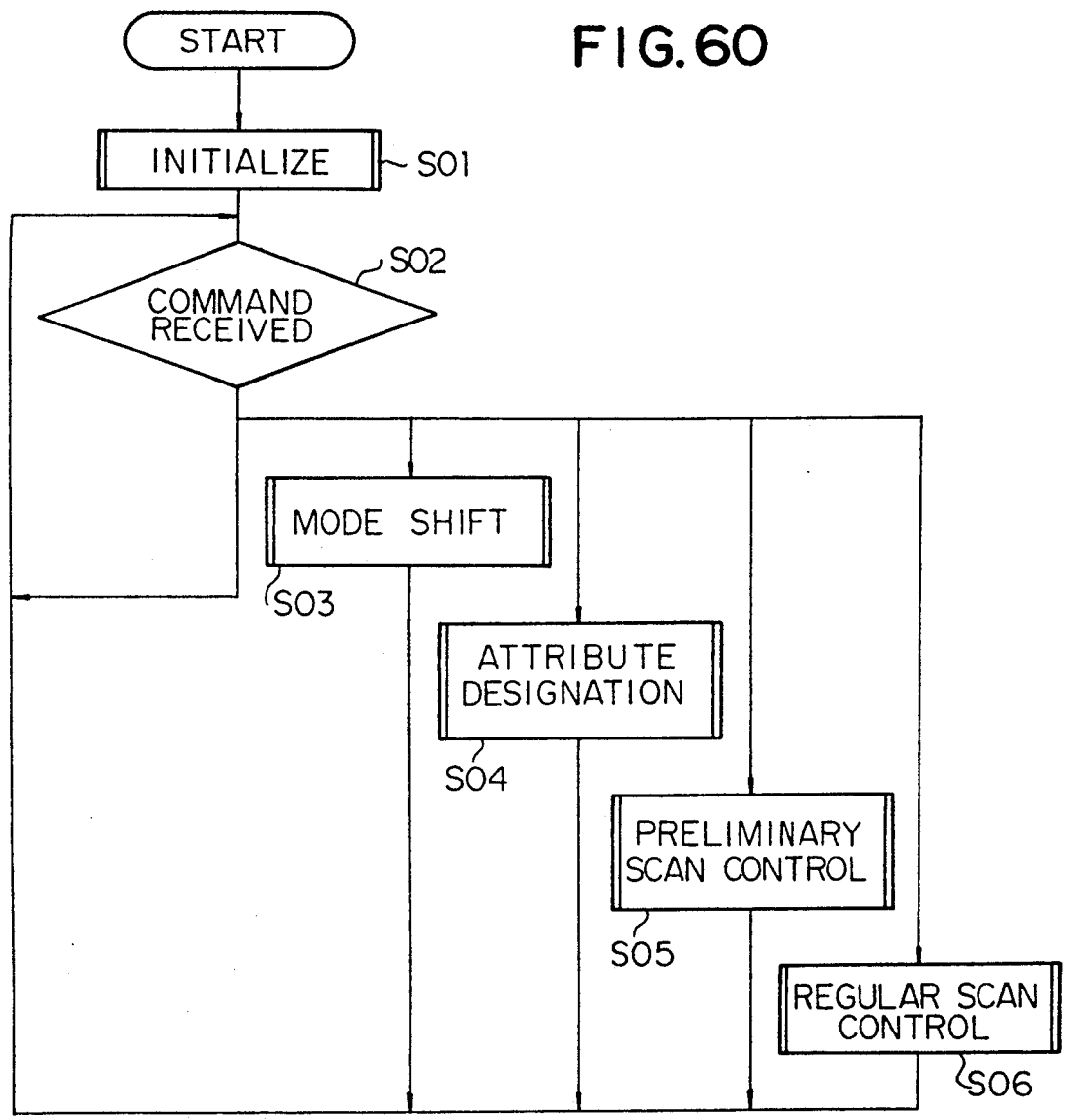
FIG. 60 is a flowchart showing a main routine program to be executed by the central processing unit included in the control circuit illustrated in FIG. 59.

FIG. 60 is a flowchart showing a main routine program to be executed by the central processing unit 172 included in the control circuit 170F hereinbefore described with reference to FIG. 59.

The execution of the main routine program shown in FIG. 60 is started when the apparatus is initially switched in. The main routine program starts with step S01 at which the registers included in the central processing unit 172 and the line memory 176 are reset. The step S01 is followed by step S02 to check for any command signal supplied from the control panel 140D. The command signal to be checked for at this step S02 may be the signal $S_{CMD}$ supplied from any of the scan start key 142, common clear key 144, image scale-up and scale-down keys 148 and 150 and sheet size select keys 154 and 156, or the density step-up signal $S_{D+}$ or $S_{D-}$ from the manual density "plus" or "minus" key 164 or 166, or the automatic density control mode select signal $S_{AUTO}$ from the automatic density control key 222. When the editor communication grant key 206 is depressed on the control panel 140D, it is checked at step S02 if there is a command signal supplied from any of the keys "F1" to "F7" on the editor module 200C. In the absence detected of any command signal supplied from the control panel 140D or the editor module 200D, the central processing unit 172 repeats the step S02 until it is found that there is any command signal $S_{CMD}$ received from the control panel 140D.

The central processing unit 172 proceeds to step S03 and executes a mode shift subroutine program if it is detected at step S02 that there is the signal from the image scale-up or scale-down key 148 or 150, the signal from the sheet size select key 154 or 156, the density step-up or step-down signal $S_{D+}$ or $S_{D-}$ from the manual density "plus" or "minus" key 164 or 166, or the automatic density control mode select signal $S_{AUTO}$. Responsive to any of these signals supplied from the control panel 140D, the central processing unit 172 executes the steps required by the supplied signal on condition that the mode of operation requested by the signal is validly acceptable in the apparatus. The details of this mode shift subroutine program S03 will be hereinafter described with reference to FIG. 61.

On the other hand, if it is detected at step S02 that there is a command signal supplied from any of the keys "F1" to "F7" on the editor module 200C, the central processing unit 172 proceeds to subroutine program S04 and executes an area attribute designation control subroutine program. The central processing unit 172 is enabled to execute this area attribute designation control subroutine program S04 when, and only when, the editor communication grant key 206 on the control panel 140D is depressed to grant transmission of data and command signals from the editor module 200 to the central processing unit 172. The details of the area attribute designation control subroutine program S04 will hereinafter described with reference to FIG. 62.

If it is detected at step S02 that there is the signal supplied from the scan start key 142 on the control panel 140D, the central processing unit 172 proceeds to subroutine program S05 and executes a preliminary scan control subroutine program. The details of this image read control subroutine program S05 will be hereinafter described with reference to FIGS. 63A and 63B. The central processing unit 172 then proceeds to subroutine program S06 and executes an image read control subroutine program. The details of this image read control subroutine program S06 are shown in FIGS. 64A and 64B.

Figure 61:
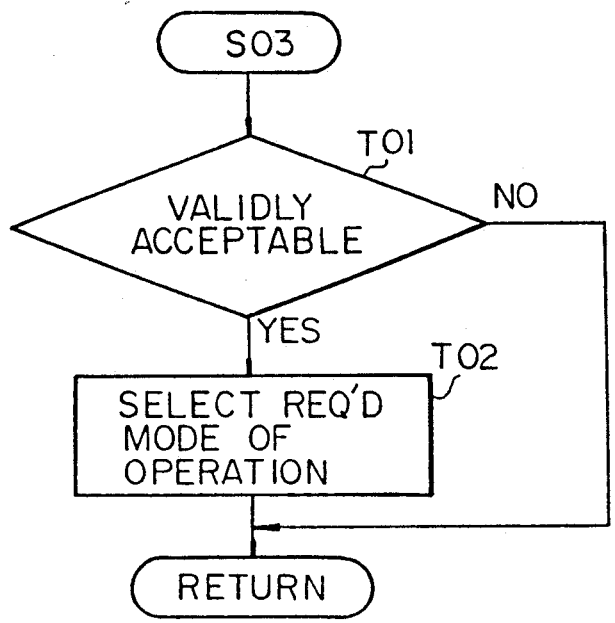
FIG. 61 is a flowchart showing the details of a mode shift subroutine program included in the main routine program illustrated in FIG. 60.

FIG. 61 shows the details of the mode shift subroutine program S03 included in the routine program hereinbefore described with reference to FIG. 60.

The mode shift subroutine program S03 starts with step T01 to check if the mode of operation requested by the command signal received from the control panel 140D is validly acceptable in the apparatus and/or the external printer unit. If the answer for this step T01 is given in the affirmative, the central processing unit 172 proceeds to step T02 to select the requested mode of operation and thereafter reverts to the main routine program described with reference to FIG. 60 to check if any other command signal is received from the control panel 140B or from the editor module 200D. If it is determined at step T01 that the mode of operation requested by the command signal received from the control panel 140D is not validly acceptable and accordingly the answer for step T01 is given in the negative, the central processing unit 172 immediately reverts to the main routine program described with reference to FIG. 60 to check if any other command signal is received from the control panel 140D or from the editor module 200D.

The request for a mode of operation to be checked for at step T01 may be a request for any size of print output sheets from the sheet size select key 154 or 156, a request for the change of the reduction/magnification ratio from the image scale-up or scale-down key 148 or 150, or a request for the change of the density for image reading from the density "plus" or "minus" key 164 or 166 on the control panel 140D, or a request for the automatic density control mode from the automatic density control mode select key 222 on the control panel 140D. When the editor communication grant key 206 is depressed on the control panel 140D, it may be further checked at step T01 if there is a command signal supplied from any of the keys "F1" to "F7" on the editor module 200D, a request for the change of the density for image reading from the density "plus" or "minus" key 216 or 218, and a request for the selection of the automatic density control mode from the automatic density control mode select key 240 on the editor module 200D.

In the absence detected of any command signal supplied from the control panel 140D or the editor module 200D, the central processing unit 172 repeats the step T01 until it is found that there is any command signal $S_{CMD}$ received from the control panel 140D.

Figure 62:
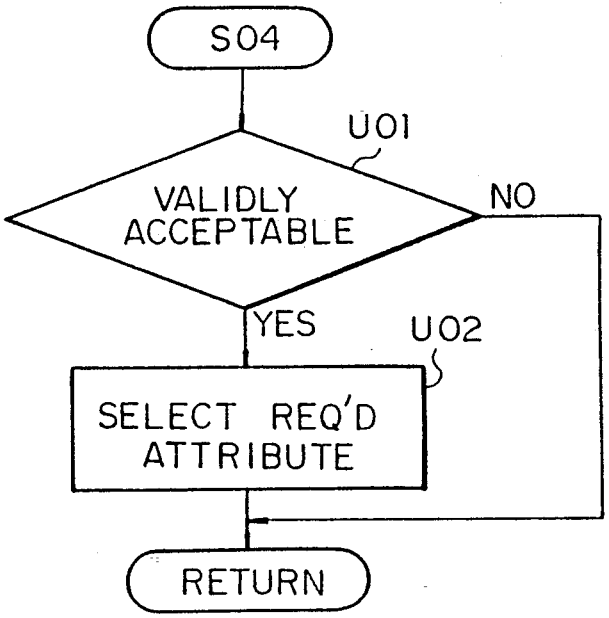
FIG. 62 is a flowchart showing the details of an area attribute designation control subroutine program also included in the main routine program illustrated in FIG. 60.

FIG. 62 shows the details of the attribute designation control subroutine program S04 also included in the main routine program hereinbefore described with reference to FIG. 60.

The attribute designation control subroutine program S04 starts with step U01 to check if the attribute of image reading operation as requested by the command signal received from the editor module 200D is validly acceptable in the apparatus and/or the external printer unit. If the answer for this step U01 is given in the affirmative, the central processing unit 172 proceeds to step U02 to select the requested attribute of image reading operation and stores the data representative of the selected attribute into the attribute memory 212 in the control circuit 170F described with reference to FIG. 59. The central processing unit 172 thereafter reverts to the main routine program described with reference to FIG. 60 to check if any other command signal is received from the control panel 140D or from the editor module 200D.

If it is determined at step U01 that the attribute of image reading operation requested by the command signal received from the editor module 200D is not validly acceptable and accordingly the answer for step U01 is given in the negative, the central processing unit 172 immediately reverts to the main routine program described with reference to FIG. 60 to check if any other command signal is received from the control panel 140D or from the editor module 200D.

The attribute of image reading operation to be checked for at step U01 may be the whiting or blackening of the image outside or inside a specified local area or the selection of the automatic density control mode, as indicated by the bit $d_1$ or $d_0$ of the attribute signal $S_{ATT}$.

Figure 63A:
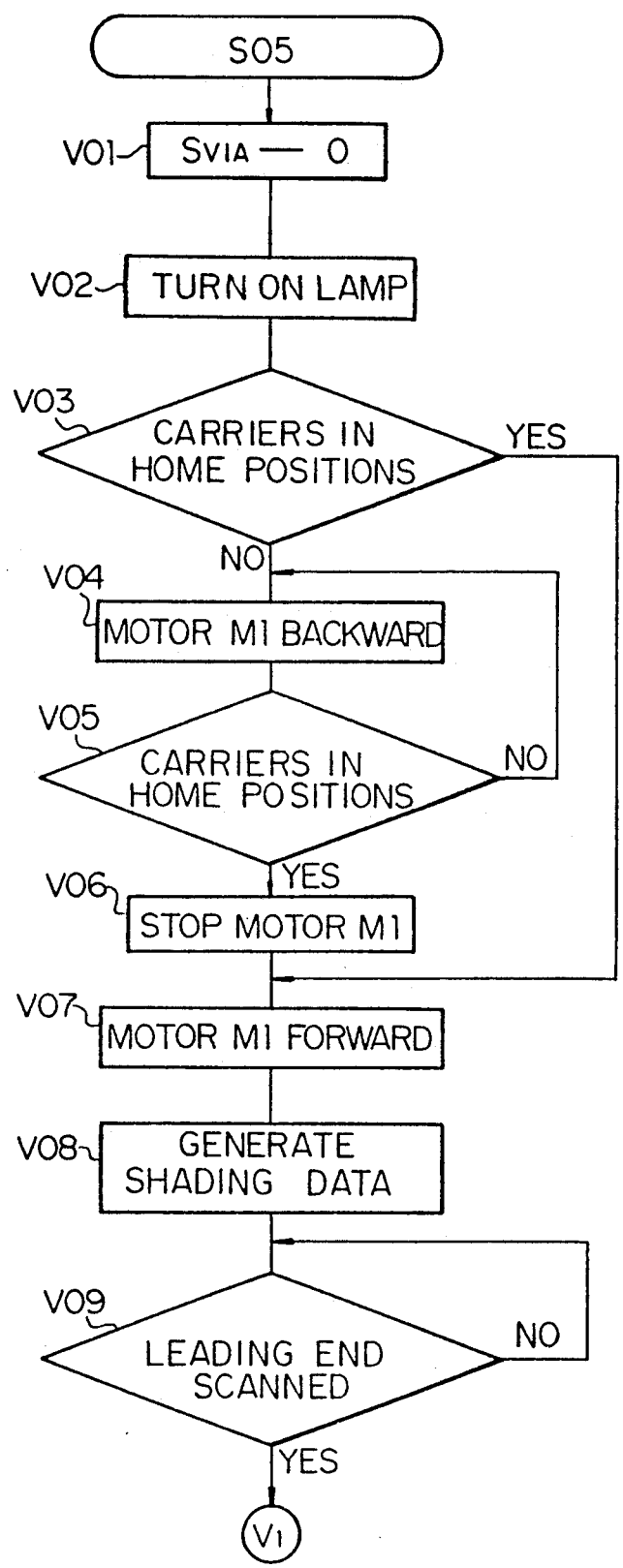
FIGS. 63A and 63B are flowcharts showing the details of a preliminary scan control subroutine program included in the main routine program illustrated in FIG. 60.
Figure 63B:
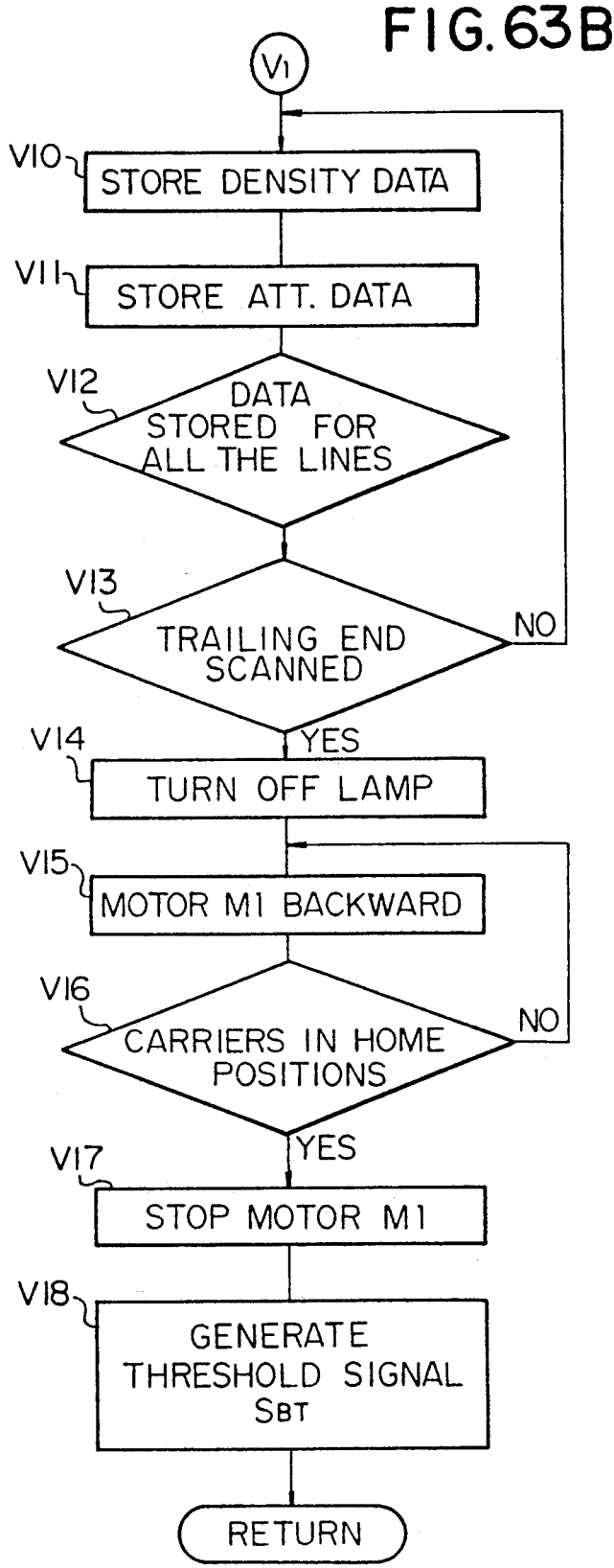

FIGS. 63A and 63B are flowcharts showing the details of the preliminary scan control subroutine program S05 included in the main routine program hereinbefore described with reference to FIG. 60. As has been noted, the central processing unit 172 supplies the standard reference voltage signals to the analog-to-digital converter 186 during execution the preliminary scan control subroutine program.

As shown in FIGS. 63A and 63B, the preliminary scan control subroutine program S05 comprises steps V01 to V18, of which the steps V01 to V09 are similar to the steps P01 to P09, respectively, of the preliminary scan control ss hereinbefore described with reference to FIGS. 32A and 32B in respect of the fourth preferred embodiment of the present invention.

When it is thus determined at step V09 that the document D on the document support table 102 is scanned at its leading end and accordingly the answer for the step V09 turns affirmative, the central processing unit 172 proceeds to step V10 (FIG. 63B) at which the shaded digital image density data signals $S_{SDD}$ supplied from the shading circuit 188 and representing the original densities of the pixels forming the image on the document D are loaded into the line memory 176 for each of the lines of pixels. The central processing unit 172 then proceeds to step V11 to store into the internal memory (not shown) of the central processing unit 172 the attribute data fetched from the attribute memory 212 and selected for the pixels forming the designated local area "A1" or "A2" of the document D for which the automatic density control mode is selected. Subsequently to step V11, the central processing unit 172 proceeds to step V12 to check if the shaded digital image density data signals $S_{SDD}$ supplied from the shading circuit 188 have been loaded into the line memory 176 for all the lines of pixels.

When the answer for this step V12 is given in the affirmative, the central processing unit 172 proceeds to step V13 to detect whether or not the lamp/mirror carrier 118 and mirror carrier 120 have reached the positions effective to scan the trailing end of the document D on the document support table 102. The step V13 is repeated until it is confirmed that the document D on the document support table 102 has been scanned to its trailing end. Thus, the shaded digital image density data signals $S_{SDD}$ are loaded into the internal memory of the central processing unit 172 successively for the individual scanning lines until all the image on the document or in the designated local area of the document are scanned.

When it is thus determined at step V13 that the scanning of the document D on the document support table 102 is complete and accordingly the answer for the step V13 turns affirmative, the central processing unit 172 proceeds to step V14 to cease the supply of the control signal $S_{EXP}$ to the voltage regulator circuit 184 to deactivate the exposure lamp 106. The step V14 is followed by step V15 at which the central processing unit 172 supplies the motor actuation signal $S_{MD1}$ to the motor driver circuit 178 for the scanner drive motor 132. Responsive to the motor actuation signal $S_{MD1}$ thus received from the central processing unit 172, the motor driver circuit 178 actuates the scanner drive motor 132 into operation to move the lamp/mirror and mirror carriers 118 and 120 toward their home positions in the directions indicated by arrowheads a' and b' in FIG. 1.

The central processing unit 172 then detects at step V16 whether or not the lamp/mirror and mirror carriers 118 and 120 have reached their respective home positions. The step V16 is repeated until it is confirmed that the lamp/mirror and mirror carriers 118 and 120 have reached their respective home positions. When it is thus found at step V16 that the carriers 118 and 120 have reached their respective home positions and accordingly the answer for the step V16 turns affirmative, the central processing unit 172 proceeds to step V17 to reset the signal $S_{MD1}$ and stop the scanner drive motor 132.

Thereupon, the central processing unit 172 proceeds to step V18 to fetch the data representative of the attribute data stored in the internal memory of the central processing unit 172 (step V10) and calculate the optimum threshold value for the image reading operation using the selected attributes for the designated local area "A1" or "A2" of the document D. On termination of the step V18, the central processing unit 172 reverts to the main routine program illustrated in FIG. 60 and may execute the regular scan control subroutine program S06.

FIGS. 64A and 64B are flowcharts showing the details of the regular scan control subroutine program S06. The steps W01 to W17 of the regular scan control subroutine program S06 to be executed by the central processing unit 172 in the sixth preferred embodiment of the present invention are entirely similar to the steps Q01 to Q16 of the ss hereinbefore described with reference to FIGS. 33A and 33B in regard to the fourth preferred embodiment of the present invention and, as such, will not be herein described.

Figure 66A:
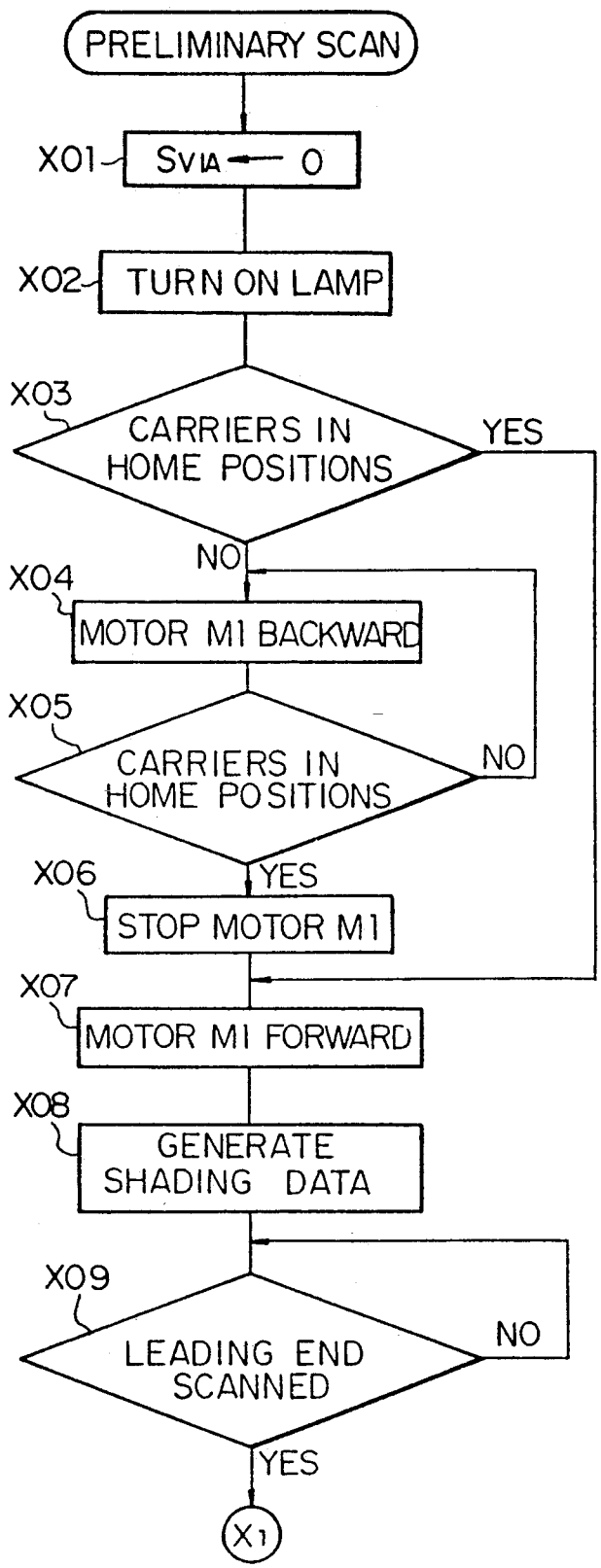
FIG. 66A and 66B are flowcharts showing the details of a preliminary scan control subroutine program included in the image read control routine program illustrated in FIG. 65.
Figure 66B:
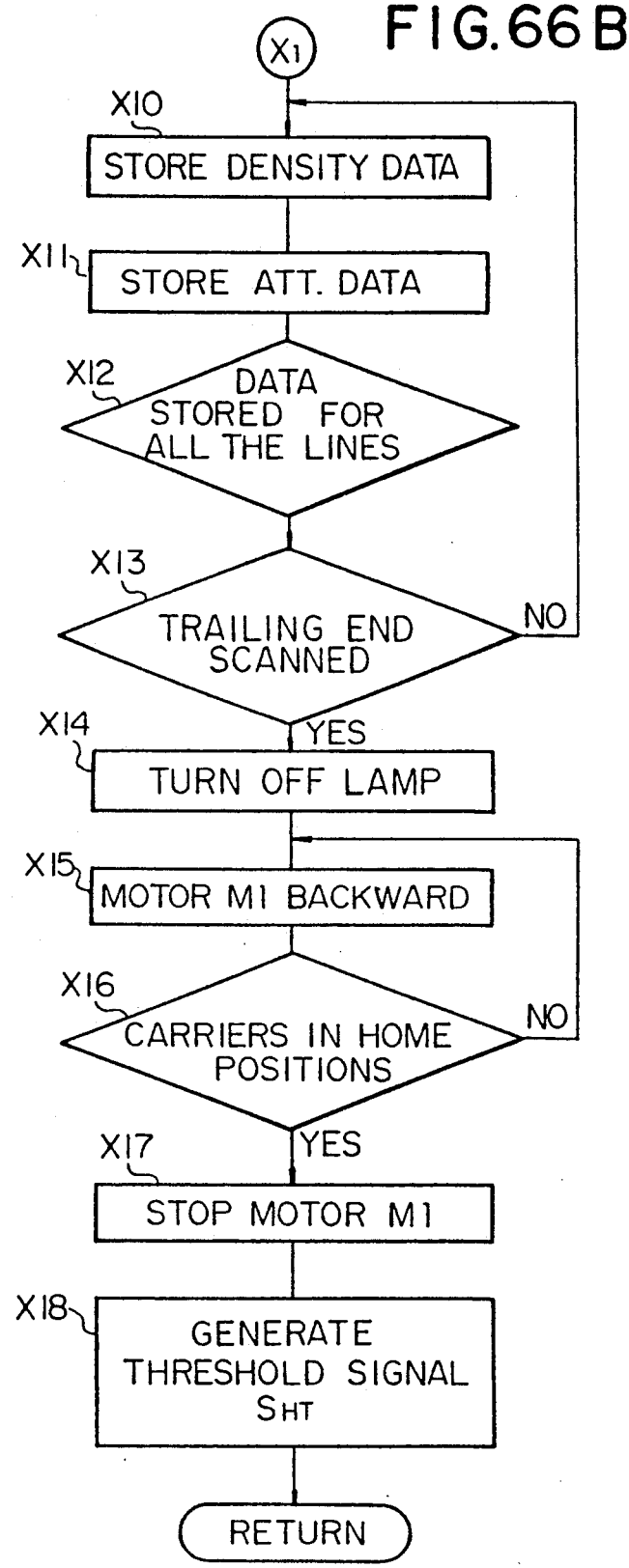

Seventh Preferred Embodiment (FIGS. 65, 66A and 66B)

While the sixth preferred embodiment of the present invention is adapted to carry out the image reading operation exclusively in the simple binarization mode, such an embodiment of the present invention may be readily modified. FIG. 65 illustrates the control circuit 170G included in such a modified embodiment of the present invention.

In the control circuit 170G shown in FIG. 65, there is provided a halftone threshold generator circuit 242 in addition to the circuit elements forming the control circuit 170F described with reference to FIG. 59. The halftone threshold generator circuit 242 is responsive to a halftone image-density signal $S_{HD}$ supplied from the central processing unit 172 to generate a signal $S_{HT}$ representative of the optimum threshold values or the dither pattern for the halftone mode of image reading operation on the basis of the image density represented by the halftone image-density signal $S_{HD}$.

FIGS. 66A and 66B are flowcharts showing the details of the preliminary scan control subroutine program included in the main routine program to be executed by the central processing unit 172 in the seventh preferred embodiment of the present invention. The preliminary scan control subroutine program herein shown comprises steps X01 to X18, of which the steps X01 to X17 are similar to the steps V01 to V17, respectively, of the preliminary scan control ss hereinbefore described with reference to FIGS. 63A and 63B in respect of the fourth preferred embodiment of the present invention.

After the scanner drive motor 132 is brought to a stop at step X17, the central processing unit 172 proceeds to step X18 to fetch the data representative of the attribute data stored in the internal memory of the central processing unit 172 (step X10) and calculate the optimum set of threshold values, that is, the optimum dither pattern for the image reading operation using the selected attributes for the designated local area "A1" or "A2" of the document D. On termination of the step X18, the central processing unit 172 reverts to the main routine program and may execute the regular scan control subroutine program which is also similar to the ss described with reference to FIGS. 33A and 33B.

What is claimed is:

1. An image reading apparatus comprising:
    a) image reading means for optically reading images on a document and for generating electric signals representative of the optically read images,
    b) area designating means for designating a plurality of local areas of said document,
    c) density designating means for designating the density level of the image to be reproduced from each of the designated local areas of the document independently of the density level of other areas, and
    d) control means for controlling said image reading means so that the images in the designated local areas of the document are to be reproduced with densities based on the density levels designated for each of the local areas.

2. An apparatus as set forth in claim 1, wherein said area designating means comprises a support means for supporting said document, and pen means for designating particular points corresponding to the local areas on the support means.

3. An apparatus as set forth in claim 1, wherein said density designating means comprises a plurality of keys.

4. An apparatus as set forth in claim 1, further comprising means for indicating the density levels designated by said density designating means.

5. An image data processing apparatus for processing image data comprising:
   a) area designating means for designating a plurality of local areas of an image to be reproduced,
   b) density designating means for designating density levels of images corresponding to the designated local areas wherein the density level of the image corresponding to each of the local areas is individually designated,
   c) data processing means for processing the image data corresponding to said images to be reproduced and outputting the same, and
   d) control means for controlling said data processing means so that the images in the designated local areas are to be reproduced with the densities based on the density levels which are designated for each of the local areas.

6. An apparatus as set forth in claim 5, wherein said area designating means comprises a support means for supporting said document, and pen means for designating particular points corresponding to the local areas on the support means.

7. An apparatus as set forth in claim 5, wherein said density designating means comprises a plurality of keys.

8. An apparatus as set forth in claim 5, further comprising indicating means for indicating the density levels designated by said density designating means.

9. An image processing apparatus for processing an image data comprising:
   area designating means for designating a plurality of local areas of an image corresponding to the image data to be processed;
   density designating means for designating individual density levels corresponding to each of the designated local areas;
   generating means for generating a threshold value corresponding to each of the density levels designated by said density designating means; and
   data processing means for comparing the image data corresponding to each of the local areas with the corresponding threshold value generated by said generating means and for outputting processed image data according to results of the comparison.

10. An image processing apparatus for processing an image data comprising:
    area designating means for designating a plurality of local areas of an image corresponding to the image data to be processed;
    selecting means for selecting one or more reference values corresponding to each of the plurality of local areas designated by said area designating means, said reference values corresponding to each of the local areas being selected independently of each other; and
    comparing means for comparing the image data corresponding to each of the local areas with selected reference values corresponding to the same local area and for outputting processed image data based on results of the comparison.

11. An image processing apparatus for processing an image data comprising:
    area designating means for designating a plurality of local areas of an image corresponding to the image data to be processed;
    density designating means for designating individual density levels corresponding to each of the designated local areas;
    generating means for generating a plurality of threshold values including one or more standard threshold values and local threshold values which correspond to each of the designated local areas, generating each of the local threshold values according to the corresponding density level designated by said density designating means; and
    data processing means for comparing the image data corresponding to each of the local areas with the corresponding local threshold value, for comparing the image data corresponding to an area which is out of the local areas with the standard threshold values, and for outputting processed image data according to results of the comparison.

* * * * *

UNITED STATES PATENT AND TRADEMARK OFFICE
CERTIFICATE OF CORRECTION

PATENT NO. : 5,289,291

DATED : February 22, 1994

INVENTOR(S) : Masamichi Kishi, et al.

It is certified that error appears in the above-identified patent and that said Letters Patent is hereby corrected as shown below:

In Col. 2, line 28, change "drawings" to --invention--.

In Col. 2, line 29, change "invention" to --drawings--.

In Col. 8, line 52, delete "and".

In Col. 11, line 35, change "pf" to --of--.

In Col. 21, line 7, after "select" insert --key--.

In Col. 22, line 13, after "the" insert --order--.

In Col. 23, line 51, change "162a" (second occurrence) to --162b--.

UNITED STATES PATENT AND TRADEMARK OFFICE
CERTIFICATE OF CORRECTION

PATENT NO. : 5,289,291

DATED : Feburary 22, 1994

INVENTOR(S) : Masamichi Kishi, et al.

It is certified that error appears in the above-identified patent and that said Letters Patent is hereby corrected as shown below:

In Col. 26, line 37 (following the table), insert the following paragraph:
--(The sign "x" indicates either "0" or "1" logic state)--.

In Col. 37, line 33, after "dither" insert --pattern--.

In Col. 70, line 47, change "fourth" to --sixth--.

Signed and Sealed this

Thirteenth Day of September, 1994

Attest:

Attesting Officer

BRUCE LEHMAN

Commissioner of Patents and Trademarks